(12) United States Patent
Ozawa

(10) Patent No.: US 7,020,673 B2
(45) Date of Patent: Mar. 28, 2006

(54) RECONFIGURABLE ARITHMETIC DEVICE AND ARITHMETIC SYSTEM INCLUDING THAT ARITHMETIC DEVICE AND ADDRESS GENERATION DEVICE AND INTERLEAVE DEVICE APPLICABLE TO ARITHMETIC SYSTEM

(75) Inventor: Kunihiko Ozawa, Tokyo (JP)

(73) Assignee: Sony Corporation, (JP)

( * ) Notice: Subject to any disclaimer, the term of this patent is extended or adjusted under 35 U.S.C. 154(b) by 687 days.

(21) Appl. No.: 10/050,849

(22) Filed: Jan. 18, 2002

(65) Prior Publication Data

US 2002/0103839 A1   Aug. 1, 2002

(30) Foreign Application Priority Data

Jan. 19, 2001  (JP) ........................... P2001-012524
Jan. 19, 2001  (JP) ........................... P2001-012535

(51) Int. Cl.
  *G06F 7/38*  (2006.01)

(52) U.S. Cl. ........................... 708/490; 708/230

(58) Field of Classification Search ................. 708/230, 708/231, 490, 523, 524

See application file for complete search history.

(56) References Cited

U.S. PATENT DOCUMENTS

| 5,241,492 | A   | * | 8/1993  | Girardeau, Jr. ............. 708/523 |
| 5,361,373 | A   |   | 11/1994 | Gilson |
| 6,247,036 | B1  | * | 6/2001  | Landers et al. ............. 708/603 |
| 6,266,760 | B1  | * | 7/2001  | DeHon et al. ................ 712/15 |
| 6,754,805 | B1  | * | 6/2004  | Juan ........................... 712/35 |

FOREIGN PATENT DOCUMENTS

| JP | 7-503804    | 4/1995 |
| JP | 10-307787   | 11/1998 |
| WO | WO 94/14123 | 6/1994 |

* cited by examiner

*Primary Examiner*—Chuong D Ngo
(74) *Attorney, Agent, or Firm*—Rader, Fishman & Grauer PLLC; Ronald P. Kananen

(57) ABSTRACT

An arithmetic device able to optimize the logic level, able to prevent an increase in the component data, able to prevent the area efficiency as an integrated operation efficiency, and circuit, achieving an improvement in the achieving a reduction power consumption, provided with a first selection device for selecting coefficient inputs C0I to CkI in accordance with a control signal ASEL, a second selection device for selecting data inputs D0I to DmI in accordance with a control signal BSEL, a third selection device for selecting cascade inputs P0 to Pn-2 in accordance with a control signal CSEL, an ALU for receiving as input the output signal of the first to third selection devices and performing a logic operation in accordance with instructions of the control signals ALUMD etc., a MAC for receiving as input the output signals of the first to third selection devices and performing operation in accordance with instructions of

57 Claims, 26 Drawing Sheets

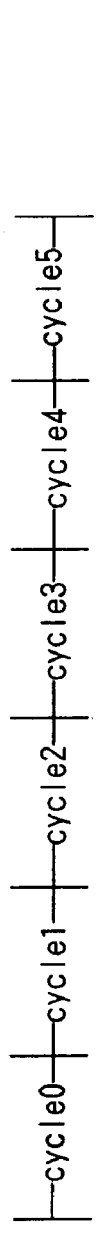
FIG.17A MBNKR0
FIG.17B MBNKR1
FIG.17C MEMR0
FIG.17D MEMR1
FIG.17E mbsel r0
FIG.17F mbsel r1

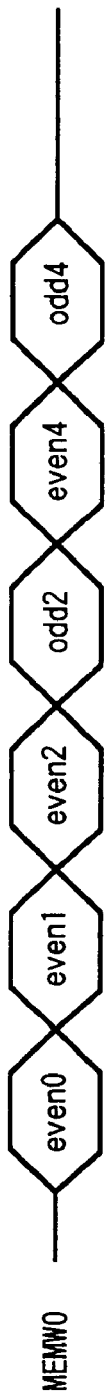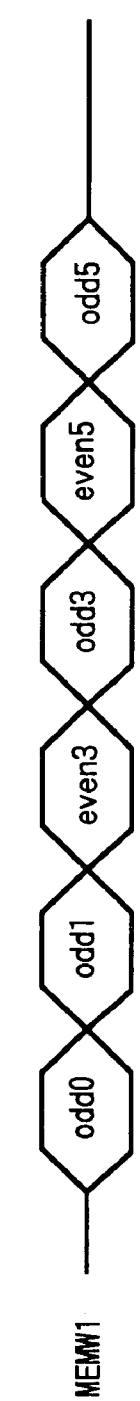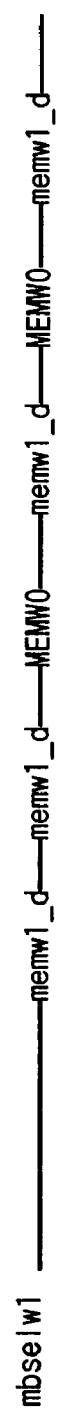

RECONFIGURABLE ARITHMETIC DEVICE AND ARITHMETIC SYSTEM INCLUDING THAT ARITHMETIC DEVICE AND ADDRESS GENERATION DEVICE AND INTERLEAVE DEVICE APPLICABLE TO ARITHMETIC SYSTEM

BACKGROUND OF THE INVENTION

1. Field of the Invention

The present invention relates to an arithmetic device reconfigurable by outside control, in particular relates to an arithmetic device reconfigurable by outside control used in a DSP (Digital Signal Processor) etc., including arithmetic logic units (ALU) for performing arithmetic and logic operations or MAC structure (Multiply-Accumulate Architecture) computing units for repeating multiplication and addition operations, etc., or arithmetic devices able to perform so-called butterfly operation or other multiple input, multiple output operations.

Further, the present invention relates to an arithmetic system including a reconfigurable arithmetic device, in particular, an arithmetic system including an arithmetic device able to reconfigure the array of the computing units or the coefficient parameters at the time of executing operations etc. based on component data.

Further, the present invention relates to an address generation device applicable to an arithmetic system including a reconfigurable arithmetic device.

Further, the present invention relates to a reconfigurable interleave device which can be applied to for example an arithmetic system including a reconfigurable arithmetic device and a data memory whose stored data is read as operation data by the arithmetic device and in which operation results are written and which absorbs the difference in the data transfer rates between the arithmetic device and data memory and accesses them by interleaving.

2. Description of the Related Art

As an arithmetic device reconfigurable by control from the outside, there is for example known an integrated circuit arithmetic device configured by a dynamically configurable gate array as disclosed in Japanese National Patent Publication (Tokuhyo) No. 7-503804.

This integrated circuit arithmetic device is configured by a dynamically configurable field programmable gate array (FPGA).

An FPGA is comprised of a large number of input/output (I/O) blocks, programmable logic blocks, and interconnections and other signal distribution resources for connecting the logic blocks to the I/O blocks and connecting the I/O blocks to FPGA pins through input/output pads.

Further, an FPGA program loads component data in the component memory array of the FPGA.

Further, this arithmetic device has a processor and a reconfigurable instruction execution unit. By dynamically changing the reconfigurable instruction execution unit, complicated processing is achieved by the hardware and different combination logic functions are realized.

However, since the above arithmetic device is comprised using an FPGA and is reconfigured by switching at the gate level, there are the disadvantages that optimization of the logic level is difficult, the component data becomes large, and the area efficiency as an integrated circuit is poor.

Further, a conventional DSP is mostly comprised of a single or two MACs or ALUs. For example, when performing multiple-item operation such as MEMW=ax+by+cz+dw, it is necessary to perform the following. Here, reg1 to reg4 indicate registers.

$reg1 = ax$ $reg2 = by$ $reg3 = cz$ $reg4 = dw$ $reg1 = reg1 + reg2$ $reg3 = reg3 + reg4$ $MEMW = reg1 + reg3$ In this way, with a conventional DSP, it was necessary to rewrite the data in the registers for a while to obtain the operation results.

That is, in a conventional DSP, it becomes necessary to access the registers other than in operations actually desired to be performed. Therefore, extra cycles were involved. This is not desirable from the viewpoint of lowering the power.

Further, in a conventional processor, when performing butterfly operation and other multiple input and multiple output operations, for example, when performing the operations of y0=x−+x1, y1=x0−x1, even if part of the input data is in common, it is necessary to perform the operations separately for each output and necessary to access x0 for each operation. Therefore, the efficiency was poor.

Further, with dedicated hardware, the operations were fixed, such as for simultaneous operations of y0=x0+x1 and y1=x0−x1, and reconfiguration was not possible.

Further, conventional DSPs and other processors can perform the following operations:

$MEMW0 = x[k0] + x[k1]$, $MEMW1 = px*(x[k0] - x[k1]) - py*(y[k0] - y[k1])$, $MEMW2 = y[k0] + y[k1]$, $MEMW3 = px*(x[k0] - x[k1]) + py*(y[k0] - y[k1])$

When performing this processing, specifically for example the calculation of MEMW1, it is necessary to perform the following. Here, reg1 to reg4 indicate registers.

$reg1 = x[k0] - x[k1]$ $reg2 = px*reg1$ $reg3 = y[k0] - y[k1]$ $reg4 = py*reg3$ $MEMW1 = reg2 - reg4$ That is, in a conventional processor, as explained above, processing was necessary for temporarily storing values in the registers.

Therefore, the number of unnecessary write operations in the registers not required for processing operations and the number of read operations from the registers became greater resulting in the undesirable increase in the number of processing cycles and the power consumption.

Further, the number of registers has to be increased by the amount of increase of the intermediate results left temporarily. Further, there was the defect that when the registers are insufficient, it was necessary to rewrite the data in the memory requiring further extra cycles and power.

Further, in the above processing, the operation of MEMW0 and the operation of MEMW1 make common use of x[k0], x[k1], but with a conventional processor, it is not possible to simultaneously perform the operations of x[k0]+x[k1], x[k0]−x[k1] and therefore there is also the defect of an increase in the number of cycles required for processing.

A conventional arithmetic system, however, is comprised of for example a CPU, an address generation device, a plurality of component data memories, and a reconfigurable arithmetic device.

In such an arithmetic system, the CPU is used to control the selection of the plurality of component data memories.

In this case, in order to allow use of the CPU to select the memories while the address generation device is generating addresses, a synchronization mechanism is provided between the CPU and the address generation device.

In this way, in a conventional arithmetic system, since it was necessary to provide a synchronization mechanism between the CPU and the address generation device in order to allow use of the CPU to select the memories while the address generation device is generating addresses, the control became complicated, extra hardware became required, or, depending on the structure of the hardware, synchronization itself became impossible.

Further, in the above way, a conventional arithmetic system is, for example, comprised of a CPU, an address generation device, a plurality of component data memories, and a reconfigurable arithmetic device.

In this arithmetic system, the CPU is used to control the selection of the plurality of component memories.

In this case, the CPU is used to select the memories while the address generation device is generating addresses.

In a conventional DSP etc., the address generation pattern is limited to relatively simple ones such as for loops of the C-language. When trying for complicated access, the automatically generated addresses are insufficient and it was necessary to use the ALUs of the DSP to calculate the addresses.

Therefore, the number of cycles required for the processing became greater than when automatically generating addresses and the efficiency was poor.

Further, for example, an arithmetic system including a reconfigurable arithmetic device has a data memory, a CPU, an address generation device, and a plurality of component data memories.

Further, such an arithmetic system uses the CPU to select the component data of the plurality of component memories, reads out the stored data of the data memory in accordance with the addresses generated by for example the CPU or address generation device as operation data to the arithmetic device, and rewrites the operation results by the arithmetic device.

When the data memory used in such an arithmetic system etc., however, is for example provided with two banks (BANK)0, 1 and when reading out the data even2 to the output MEMR0 and reading out the data even3 to the output MEMR1 in a certain cycle and reading out odd3 to the output MEMR0 and odd3 to the output MEMR1 in the next cycle or writing data even2, even3 in the BANK0 in a certain cycle and writing data odd2, odd3 in the BANK1 in the next cycle, an ordinary dual port (2R2W) memory becomes necessary as the memory bank.

However, a 2R2Wmemory has the defect of a large cell area. Further, in some cases, it is necessary to design a dedicated memory, so there is the defect of a low process portability.

Therefore, a buffer memory device giving a performance equal to that in the case of use of this dual port memory has been proposed (see Japanese Unexamined Patent Publication (Kokai) No. 10-307787).

This buffer memory device has a competition control circuit which judges when access by interleaving is possible or when accessing the same memory bank and the address signals collide and access by interleaving becomes impossible, sends a wait signal to the DMA controller when access is impossible, and temporarily suspends the DMA transfer.

A buffer memory device provided with such a competition control circuit, however, has the disadvantage that sometimes continuous access of the memory is not possible.

Further, in the above way, a conventional arithmetic system is, for example, comprised of a CPU, an address generation device, component data memories, and a reconfigurable arithmetic device.

This arithmetic system is comprised to use the CPU to rewrite the component data of the component data memories so as to set any array of computing units of the arithmetic device, coefficient parameters at the time of execution of operations, etc. and reconfigure the arithmetic device to obtain the desired operation results.

In this conventional arithmetic system, when it is only possible to hold one set of the component data simultaneously, it is not possible to rewrite the component data while executing operation and is not possible to perform operation while rewriting component data.

That is, when it is only possible to simultaneously store one set of component data, it is not possible to execute processing and rewrite component data at the same time.

If the number of reconfigurable elements becomes large, a certain time is required for rewriting the component data, so when performing operation while repeatedly switching a plurality of component data etc., it is necessary to rewrite the component data after the end of each operation and therefore the overhead for reconfiguration for the inherent processing content becomes great.

That is, in general, component data of a reconfigurable arithmetic device is rewritten by the host CPU etc. writing data placed in an external memory etc. in the component data storage unit.

At this time, the work of "reading in the memory→writing in the component data storage unit" has to be repeated for the number of sets of the component data. When performing large-scale reconfiguration, the time overhead involved in this becomes no longer negligible.

SUMMARY OF THE INVENTION

A first object of the present invention is to provide an arithmetic device which can optimize the logic level, can prevent an increase in the component data, and can prevent a drop in the area efficiency as an integrated circuit.

A second object of the present invention is to provide an arithmetic device which achieves an improvement in the operation efficiency and achieves a lower power consumption.

A third object of the present invention is to provide an arithmetic device which can optimize the logic level, prevent an increase in the component data, and prevent a deterioration in the area efficiency as an integrated circuit.

A fourth object of the present invention is to provide an arithmetic device which achieves an improvement in the operation efficiency and can be reconfigured.

A fifth object of the present invention is to provide a parallel arithmetic device which can optimize the logic level, can prevent an increase in the component data, and can prevent a drop in the area efficiency as an integrated circuit.

A sixth object of the present invention is to provide a parallel arithmetic device which reduces the number of cycles required for an operation, achieves an improvement in the operation efficiency, and achieves a reduction in the power consumption.

A seventh object of the present invention is to provide an arithmetic system not requiring a synchronization mechanism and achieving simplification of control and simplification of hardware.

An eight object of the present invention is to provide an address generation device which does not need to use ALUs etc. to calculate the addresses, can slash the number of cycles required for processing, and can generate addresses efficiently.

A ninth object of the present invention is to provide an interleave device which can prevent an increase in the cell area, achieve an improvement in the process portability, and can access the memory continuously.

A 10th object of the present invention is to provide an arithmetic system which can perform reconfiguration simultaneously with execution of operation and can reduce the time overhead at the time of reconfiguration.

According to a first aspect of the present invention, there is provided an arithmetic device able to reconfigure an operation path by outside control, comprising a first selecting means for selecting desired data from a plurality of input data in accordance with a control signal, a second selecting means for selecting desired data from a plurality of input data in accordance with a control signal, and an arithmetic means receiving as input the output signal of the first selecting means and the output signal of the second selecting means and performing operations in accordance with instructions of a control signal.

Further, preferably, the arithmetic means is able to perform dyadic operation.

Further, preferably, the arithmetic means performs monadic operation on the result of the dyadic operation.

Further, preferably, the device further has a delay means for outputting the input data delayed by an amount of delay according to a control signal.

According to a second aspect of the present invention, there is provided an arithmetic device able to reconfigure an operation path by outside control, comprising a first selecting means for selecting desired data from a plurality of input data in accordance with a control signal, a second selecting means for selecting desired data from a plurality of input data in accordance with a control signal, a third selecting means for selecting desired data from a plurality of input data in accordance with a control signal, and an arithmetic means receiving as input the output signal of the first selecting means, the output signal of the second selecting means, and the output signal of the third selecting means and performing operation in accordance with instructions of a control signal.

Further, preferably, the arithmetic means performs trinomial operation.

Further, preferably, the arithmetic means performs monadic operation on the result of the trinomial operation.

According to a third aspect of the present invention, there is provided an arithmetic device able to reconfigure an operation path by outside control, comprising a first selecting means for selecting desired data from a plurality of input data in accordance with a control signal, a second selecting means for selecting desired data from a plurality of input data in accordance with a control signal, a third selecting means for selecting desired data from a plurality of input data in accordance with a control signal, a first arithmetic means receiving as input the output signal of the first selecting means and the output signal of the second selecting means and performing operation in accordance with instructions of a control signal, and a second arithmetic means receiving as input the output signal of the first selecting means and the output signal of the second selecting means and third selecting means and performing operation in accordance with instructions of a control signal.

Further, preferably, the device further has a fourth selecting means for selecting one of the output signal of the first arithmetic means and the output signal of the second arithmetic means in accordance with a control signal.

Further, preferably, the first arithmetic means performs dyadic operation, while the second arithmetic means performs trinomial operation.

Further, preferably, the first arithmetic means performs monadic operation on the result of the dyadic operation, while the second arithmetic means performs monadic operation on the result of the trinomial operation.

According to a fourth aspect of the present invention, there is provided an arithmetic device able to reconfigure an operation path by outside control, comprising a first selecting means for selecting one data from a first data group in accordance with a control signal, a second selecting means for selecting one data from a second data group in accordance with a control signal, a first arithmetic means for receiving as input the output signal of the first selecting means and the output signal of the second selecting means and performing operation in accordance with instructions of a control signal, a second arithmetic means for receiving as input the output signal of the first selecting means and the output signal of the second selecting means and performing operation in accordance with instructions of a control signal, and a third selecting means for selecting one of the output signal of the first arithmetic means and the output signal of the second arithmetic means.

According to a fifth aspect of the present invention, there is provided an arithmetic device able to reconfigure an operation path by outside control, comprising a first selecting means for selecting one data from a first data group in accordance with a control signal, a second selecting means for selecting one data from a second data group in accordance with a control signal, a third selecting means for selecting one data of a third data group in accordance with a control signal, a first arithmetic means for receiving as input at least two signals among the output signal of the first selecting means, the output signal of the second selecting means, and the output signal of the third selecting means and performing operation in accordance with instructions of a control signal, a second arithmetic means for receiving as input at least two signals among the output signal of the first selecting means, the output signal of the second selecting means, and the output signal of the third selecting means and performing operation in accordance with instructions of a control signal, and a fourth selecting means for selecting one of the output signal of the first arithmetic means and the output signal of the second arithmetic means.

A parallel arithmetic device according to a sixth aspect of the present invention has a plurality of arithmetic devices, each comprising a first selecting means for selecting desired data from a plurality of input data in accordance with a control signal, a second selecting means for selecting desired data from a plurality of input data in accordance with a control signal, and an arithmetic means receiving as input the output signal of the first selecting means and the output signal of the second selecting means in accordance with a control signal and able to reconfigure an operation path by outside control, connects the inputs and outputs of data of the plurality of arithmetic devices in cascade, and supplies the operation result signal of an arithmetic device as one data of a plurality of data inputs of another device.

The parallel arithmetic device according to a seventh aspect of the present invention has a plurality of arithmetic devices, each comprising a first selecting means for selecting desired data from a plurality of input data in accordance with a control signal, a second selecting means for selecting desired data from a plurality of input data in accordance with a control signal, a third selecting means for selecting desired data from a plurality of input data in accordance with a control signal, and an arithmetic means receiving as input the output signal of the first selecting means, the output signal of the second selecting means, and the output signal of the third selecting means and performing operation in accordance with instructions of a control signal and able to reconfigure an operation path under outside control, connects in cascade the inputs and outputs of data of the plurality of arithmetic devices, and supplies the operation result signal of an arithmetic device as one data of the plurality of data inputs of another device.

The parallel arithmetic device according to an eighth aspect of the present invention has a plurality of arithmetic devices, each comprising a first selecting means for selecting desired data from a plurality of input data in accordance with a control signal, a second selecting means for selecting desired data from a plurality of input data in accordance with a control signal, a third selecting means for selecting desired data from a plurality of input data in accordance with a control signal, a first arithmetic means receiving as input the output signal of the first selecting means and the output signal of the second selecting means and performing operation in accordance with instructions of a control signal, a second arithmetic means receiving as input the output signal of the first selecting means, the output signal of the second selecting means, and the output signal of the third selecting means and performing operation in accordance with instructions of a control signal, and a fourth selecting means for selecting one of the output of the first arithmetic means and the output of the second arithmetic means in accordance with a control signal and outputting the same as an operation result signal and able to reconfigure an operation path under outside control, connects in cascade the inputs and outputs of data of the plurality of arithmetic devices, and supplies the operation result signal of an arithmetic device as one data of the plurality of data inputs of another device.

The parallel arithmetic device according to a ninth aspect of the present invention has a plurality of arithmetic devices, each comprising a first selecting means for selecting one data from a first data group in accordance with a control signal, a second selecting means for selecting one data from a second data group in accordance with a control signal, a first arithmetic means receiving as input the output signal of the first selecting means and the output signal of the second selecting means and performing operation in accordance with instructions of a control signal, a second arithmetic means receiving as input the output signal of the first selecting means and the output signal of the second selecting means and performing operation in accordance with instructions of a control signal, and a third selecting means for selecting one of the output of the first arithmetic means and the output of the second arithmetic means in accordance with a control signal and outputting the same as an operation result signal and able to reconfigure an operation path under outside control, connects in cascade the inputs and outputs of data of the first data group of the plurality of arithmetic devices, and supplies the operation result signal of an arithmetic device as one data of a second data group of another device.

The parallel arithmetic device according to a 10th aspect of the present invention has a plurality of arithmetic devices, each comprising a first selecting means for selecting one data from a first data group in accordance with a control signal, a second selecting means for selecting one data from a second data group in accordance with a control signal, a third selecting means for selecting one data from a third data group in accordance with a control signal, a first arithmetic means receiving as input at least two signals of the output signal of the first selecting means, the output signal of the second selecting means, and the output signal of the third selecting means and performing operation in accordance with instructions of a control signal, a second arithmetic means receiving as input at least two signals of the output signal of the first selecting means, the output signal of the second selecting means, and the output signal of the third selecting means and performing operation in accordance with instructions of a control signal, and a fourth selecting means for selecting one of the output of the first arithmetic means and the output of the second arithmetic means in accordance with a control signal and able to reconfigure an operation path under outside control, connects in cascade the inputs and outputs of data of the first data group and the second data group of the plurality of arithmetic devices, and supplies the operation result signal of an arithmetic device as one data of a third data group of another device.

Further, preferably, the device further has a first delay means for outputting the first data group to the arithmetic device of the next stage delayed by an amount of delay in accordance with a control signal and a second delay means for outputting the second data group to the arithmetic device of the next stage delayed by exactly an amount of delay in accordance with a control signal.

According to the present invention, the first selecting means selects desired data from a plurality of input data in accordance with a control signal and supplies it to an arithmetic means. Similarly, the second selecting means selects desired data from a plurality of input data in accordance with a control signal and supplies it to an arithmetic means.

Further, the arithmetic means uses the output signal of the first selecting means and the output signal of the second selecting means to perform operation in accordance with instructions of the output signal, for exactly, dyadic operation.

Further, for example, the arithmetic means performs monadic operation on the result of the dyadic operation.

According to the present invention, the first selecting means selects desired data from a plurality of input data in accordance with a control signal and supplies it to an arithmetic means. Similarly, the second selecting means selects desired data from a plurality of input data in accordance with a control signal and the third selecting means selects desired data from a plurality of input data in accordance with a control signal and supply the same to an arithmetic means.

Further, the arithmetic means uses the output signal of the first selecting means, the output signal of the second selecting means, and the output signal of the third selecting means to perform operation in accordance with instructions of a control signal, for example, trinomial operation.

Further, for example, the arithmetic means performs monadic operation on the result of the trinomial operation.

According to the present invention, the first selecting means selects desired data from a plurality of input data in accordance with a control signal and supplies it to an arithmetic means. Similarly, the second selecting means selects desired data from a plurality of input data in accordance with a control signal and the third selecting means selects desired data from a plurality of input data in accordance with a control signal. Further, the signals selected by the first selecting means and second selecting means are supplied to a first arithmetic means, while the signals selected by the first selecting means, second selecting means, and third selecting means are supplied to a second arithmetic means.

Further, the first arithmetic means uses the output signal of the first selecting means and the output signal of the second selecting means to perform operation in accordance with instructions of a control signal, for example, dyadic operation.

Further, for example, the first arithmetic means performs monadic operation on the result of the dyadic operation.

Further, the second arithmetic means uses the output of the first selecting means, the output signal of the second selecting means, and the output signal of the third selecting means to perform operation in accordance with instructions of a control signal, for example, trinomial operation.

Further, for example, the second arithmetic means performs monadic operation on the result of the trinomial operation.

Further, for example, the fourth selecting means selects one of the output signal of the first arithmetic means and the output signal of the second arithmetic means in accordance with a control signal and outputs the same as the operation results of the arithmetic device.

Further, the parallel arithmetic device of the present invention connects in cascade the inputs and outputs of data of a plurality of arithmetic devices and supplies the operation result signal of each arithmetic device as one data of the plurality of data inputs of another arithmetic device.

As a result, for example, when performing multiple-term operations, each arithmetic device is allocated processing. By connecting in cascade the operation results of the former stages, multiple-term operation can be performed at one time.

Therefore, the number of cycles of execution becomes shorter and the number of temporary accesses to registers becomes smaller.

According to an 11th aspect of the present invention, there is provided an arithmetic device reconfigurable by outside control, comprising at least one computing unit having a plurality of inputs and a plurality of outputs, performing a plurality of operations based on data supplied to the plurality of inputs in accordance with a control signal and outputting the operation results and a plurality of input selection devices for selecting one data from the plurality of input data in accordance with a control signal and supplying the same to different inputs of the computing unit.

Further, preferably, the device has at least one monadic arithmetic means for performing monadic operation on predetermined data in the plurality of input data and supplying the operation results to one input of the input selection device.

According to the 12th aspect of the present invention, there is provided an arithmetic device reconfigurable by outside control, comprising at least one multiple input, multiple output computing unit each having a plurality of inputs and a plurality of outputs, performing a plurality of operations based on data supplied to the plurality of inputs in accordance with a control signal, and outputting the operation results from the plurality of outputs and a plurality of output selection devices for selecting and outputting one data from the plurality of input data and the output data of the computing unit in accordance with a control signal.

According to a 13th aspect of the present invention, there is provided an arithmetic device reconfigurable by outside control, comprising at least one computing unit having a plurality of inputs and a plurality of outputs, performing a plurality of operations based on data supplied to the plurality of inputs in accordance with a control signal, and outputting the operation results from the plurality of outputs, a plurality of input selection devices each selecting one data from a plurality of input data in accordance with a control signal and supplying it to different inputs of the computing unit, and a plurality of output selection devices each selecting and outputting one data from the plurality of input data and the output data of the computing unit in accordance with a control signal.

Further, preferably, the device has at least one monadic arithmetic means for performing monadic operation on predetermined data among the plurality of input data and supplying operation results to one input of the input selection devices and the output selection device.

According to a 14th aspect of the present invention, there is provided an arithmetic device reconfigurable by outside control, comprising a plurality of first computing units each having a plurality of inputs and a plurality of outputs, performing a plurality of operations based on data supplied to the plurality of inputs in accordance with a control signal, and outputting the operation results from the plurality of outputs, a plurality of input selection devices each selecting one data from a plurality of input data in accordance with a control signal and supplying the same to different inputs of the first computing units, and at least one second computing unit having a plurality of inputs and a plurality of outputs, supplied at the plurality of inputs with output data of the plurality of first computing units, performing a plurality of operations based on the plurality of data supplied in accordance with a control signal, and outputting the operation results from the plurality of outputs.

According to a 15th aspect of the present invention, there is provided an arithmetic device reconfigurable by outside control, comprising a plurality of first computing units each having a plurality of inputs and a plurality of outputs, performing a plurality of operations based on data supplied to the plurality of inputs in accordance with a control signal, and outputting the operation results from the plurality of outputs, at least one second computing unit having a plurality of inputs and a plurality of outputs, supplied at the plurality of inputs with output data of the plurality of first computing units, performing a plurality of operations based on the plurality of data supplied in accordance with a control signal, and outputting the operation results from the plurality of outputs, and a plurality of output selection devices each selecting and outputting one data from the plurality of input data and the output data of at least one of the first and second computing units.

Further, preferably, the plurality of output selection devices include a plurality of first output selection devices for selecting and outputting one data from a plurality of input data and output data of the first computing unit in accordance with a control signal and a plurality of second output selection devices selecting and outputting one data from a plurality of input data, the output data of the first computing unit, and the output data of the second computing unit in accordance with a control signal.

According to a 16th aspect of the present invention, there is provided an arithmetic device reconfigurable by outside control, comprising a plurality of first computing units each having a plurality of inputs and a plurality of outputs, performing a plurality of operations based on data supplied to the plurality of inputs in accordance with a control signal, and outputting the operation results from the plurality of outputs, a plurality of input selection devices for selecting one data from the plurality of input data in accordance with a control signal and supplying the same to different inputs of the first computing units, at least one second computing unit each having a plurality of inputs and a plurality of outputs, supplied at the plurality of inputs with the output data of the plurality of first computing units, performing a plurality of operations based on the plurality of data supplied in accordance with a control signal, and outputting the operation results from the plurality of outputs, and a plurality of output selection devices each selecting and outputting one data from the plurality of input data and at least one output data among the first and second computing units in accordance with a control signal.

According to a 17th aspect of the present invention, there is provided an arithmetic device reconfigurable by outside control, comprising a plurality of first computing units each having a plurality of inputs and a plurality of outputs, performing a plurality of operations based on data supplied to the plurality of inputs in accordance with a control signal, and outputting the operation results from the plurality of outputs, a plurality of first input selection devices each selecting one data from a plurality of input data in accordance with a control signal and supplying the same to different inputs of the first computing units, at least one second computing unit each having a plurality of inputs and a plurality of outputs, performing a plurality of operations based on a plurality of data supplied to the plurality of inputs in accordance with a control signal, and outputting the operation results from the plurality of outputs, and a plurality of second input selection devices each selecting one data from the plurality of input data and the output data of the second computing units in accordance with a control signal and supplying it to different inputs of the second computing unit.

According to an 18th aspect of the present invention, there is provided an arithmetic device reconfigurable by outside control, comprising a plurality of first computing units each having a plurality of inputs and a plurality of outputs, performing a plurality of operations based on data supplied to the plurality of inputs in accordance with a control signal, and outputting the operation results from the plurality of outputs, a plurality of first input selection devices each selecting one data from a plurality of input data in accordance with a control signal and supplying it to different inputs of the first computing units, at least one second computing unit having a plurality of inputs and a plurality of outputs, performing a plurality of operations based on a plurality of data supplied to the plurality of inputs in accordance with a control signal, and outputting the operation results from the plurality of outputs, a plurality of second input selection devices for selecting one data from the plurality of input data and the output data of the second computing unit in accordance with a control signal and supplying it to different inputs of the second computing unit, and a plurality of output selection devices each selecting and outputting one data from a plurality of input data and at least one output data of the second computing unit in accordance with a control signal.

According to a 19th aspect of the present invention, there is provided an arithmetic device reconfigurable by outside control, comprising a plurality of computing units, arranged in multiple stages, each having a plurality of inputs and a plurality of outputs, performing a plurality of operations based on data supplied to the plurality of inputs in accordance with a control signal, and outputting the operation results from the plurality of outputs and a plurality of input selection devices each selecting one data from a plurality of input data in accordance with a control signal and supplying it to different inputs of the plurality of computing units of the first stage, the computing units arranged in stages other than the computing units of the first stage each being supplied at the plurality of inputs with output data of the plurality of computing units of the previous stage, performing a plurality of operations based on the plurality of data supplied in accordance with a control signal, and outputting the operation results from the plurality of outputs.

According to a $20^{th}$ aspect of the present invention, there is provided an arithmetic device reconfigurable by outside control, comprising a plurality of computing units, arranged in multiple stages, each having a plurality of inputs and a plurality of outputs, performing a plurality of operations based on data supplied to the plurality of inputs in accordance with a control signal, and outputting the operation results from the plurality of outputs and a plurality of output selection devices each selecting and outputting one data from a plurality of input data and at least one output data of the computing units of each stage in accordance with a control signal, the computing units arranged in the stages other than the computing units of the first stage each being supplied at the plurality of inputs with output data of the plurality of computing units of the previous stage, performing a plurality of operations based on the plurality of data supplied in accordance with a control signal, and outputting the operation results from the plurality of outputs.

According to a 21st aspect of the present invention, there is provided an arithmetic device reconfigurable by outside control, comprising a plurality of computing units, arranged in multiple stages, each having a plurality of inputs and a plurality of outputs, performing a plurality of operations based on the data supplied to the plurality of inputs in accordance with a control signal, and outputting the operation results from the plurality of outputs, a plurality of input selection devices each selecting one data from a plurality of input data in accordance with a control signal and supplying it to different inputs of the plurality of computing units of the first stage, and a plurality of output selection devices each selecting and outputting one data from the plurality of input data and at least one output data among the computing units of stages in accordance with a control signal, the computing units arranged in the stages other than the computing units of the first stage each being supplied at the plurality of inputs with the output data of the plurality of computing units of the previous stage, performing a plurality of operations based on the plurality of data supplied in accordance with a control signal, and outputting the operation results from the plurality of outputs.

According to the present invention, for example a plurality of input data, further input data subjected to monadic operation by a monadic operation arithmetic means, is supplied to the input selection device.

Each input selection device selects one data of the plurality of input data in accordance with the control signal and supplies it to the computing unit.

The computing unit performs a plurality of operations based on data supplied to a plurality of inputs in accordance with the control signal and outputs the operation results to each output selection device.

Further, for example, the input data subjected to monadic operation by the monadic arithmetic means is supplied to each output selection device.

Further, for example, each output selection device selects and outputs one data from the plurality of input data and output data of the computing unit in accordance with a control signal.

Further, according to the present invention, for example a plurality of input data, further input data subjected to monadic operation by a monadic operation arithmetic means, is supplied to the input selection device.

Each first computing unit performs a plurality of operations based on data supplied to the plurality of inputs in accordance with a control signal and outputs the operation results to a second computing unit.

The second computing unit performs a plurality of operations based on a plurality of data supplied from the plurality of first computing units and outputs the operation results to the output selection device.

The output selection device selects and outputs one data from a plurality of input data and at least one output data from among the first and second computing units in accordance with a control signal.

For example, the first output selection device selects and outputs one data from a plurality of input data and output data of the first computing unit in accordance with a control signal.

Further, the second output selection device selects and outputs one data from the plurality of input data, the output data of the first computing unit, and the output data of the second computing unit.

Further, according to the present invention, for example a plurality of input data, further, input data subjected to monadic operation by the monadic arithmetic means, is supplied to the first input selection devices.

Each first input selection device selects one data from a plurality of input data in accordance with a control signal and supplies it to a first computing unit.

Each first computing unit performs a plurality of operations based on data supplied to a plurality of inputs in accordance with a control signal and outputs the operation results to each second input selection device.

Each second input selection device selects one data from a plurality of input data and output data of the second computing unit in accordance with a control signal and supplies it to different inputs of the second computing unit.

The second computing unit performs a plurality of operations based on a plurality of data supplied to the plurality of inputs in accordance with the control signal and outputs the operation results from the plurality of outputs to the output selection device.

Further, each output selection device selects and outputs one data from the plurality of input data and at least one output of the second computing unit.

Further, according to the present invention, for example a plurality of input data, further, input data subjected to monadic operation by the monadic arithmetic means, is supplied to each input selection device.

Each input selection device selects one data from a plurality of input data in accordance with a control signal and supplies it to the plurality of computing units of the first stage.

The plurality of computing units of the first stage perform a plurality of operations based on data supplied to the plurality of inputs in accordance with a control signal and outputs the operation results to the computing units of the next stage.

Further, the computing units arranged in stages other than computing units of the first stage are supplied at the plurality of inputs with output data of the plurality of computing units of the previous stage, perform a plurality of operations based on the plurality of data supplied in accordance with a control signal, and output the operation results from the plurality of outputs to the output selection devices.

Each output selection device selects and outputs one data from the plurality of input data and at least one output data among the computing units of the stages.

A parallel arithmetic device according to the 22nd aspect of the present invention has a first arithmetic device reconfigurable by outside control having at least two selecting means each selecting desired data from a plurality of input data in accordance with a control signal and at least one arithmetic device including at least one arithmetic means for receiving output signals of the selecting means and performing operation in accordance with instructions of a control signal and a second arithmetic device reconfigurable by outside control including at least one computing unit having a plurality of inputs and a plurality of outputs, performing a plurality of operations based on data supplied to the plurality of inputs in accordance with a control signal, and outputting the operation results from the plurality of outputs, the operation results of at least one of the first arithmetic device and second arithmetic device being supplied as input data of the other arithmetic device.

A parallel arithmetic device according to the 23rd aspect of the present invention has a plurality of first arithmetic devices reconfigurable by outside control each having at least two selecting means each selecting desired data from a plurality of input data in accordance with a control signal and at least one arithmetic device including at least one arithmetic means for receiving output signals of the selecting means and performing operation in accordance with instructions of a control signal and a plurality of second arithmetic devices reconfigurable by outside control each including at least one computing unit each having a plurality of inputs and a plurality of outputs, performing a plurality of operations based on data supplied to the plurality of inputs in accordance with a control signal, and outputting the operation results from the plurality of outputs, the operation results of the plurality of first arithmetic devices being supplied to the corresponding second arithmetic devices and the operation results of the second arithmetic devices being supplied to the cor responding first arithmetic devices.

Further, in the 22nd or 23rd aspect of the present invention, the first arithmetic device in cludes a first selecting means for selecting desired data from a plurality of input data in accordance with a control signal, a second selecting means for selecting desired data from a plurality of input data in accordance with a control signal, a third selecting means for selecting desired data from a plurality of input data in accordance with a control signal, a first arithmetic means for receiving as input the output signal of the first selecting means and the output signal of the second selecting means and performing operation in accordance with instructions of a control signal, and a second arithmetic means for receiving as input the output signal of the first selecting means and the output signals of the second selecting means and third selecting means and performing operation in accordance with instructions of a control signal.

Further, preferably, the first arithmetic device further comprises fourth selecting means for selecting one of the first arithmetic means and the output signal of the second arithmetic means in accordance with a control signal.

Further, in the 22nd or 23rd aspect of the present invention, the first arithmetic device includes a plurality of arithmetic devices, connects in cascade the inputs and outputs of data of the plurality of arithmetic devices, and supplies the operation result signal of each arithmetic device as one data of the plurality of data inputs of another device.

Further, preferably, the second arithmetic device comprises a plurality of input selection devices each selecting one data from a plurality of input data in accordance with a control signal and supplying it to different inputs of the computing unit and a plurality of output selection devices each selecting and outputting one data from the plurality of input data and the output data of the computing unit in accordance with a control signal.

Further, preferably, the second arithmetic device includes a plurality of first computing units each having a plurality of inputs and a plurality of outputs, performing a plurality of operations based on data supplied to the plurality of inputs in accordance with a control signal, and outputting the operation results from the plurality of outputs, a plurality of input selection devices each selecting one data from a plurality of input data in accordance with a control signal and supplying it to different inputs of the first computing units, at least one second computing unit each having a plurality of inputs and a plurality of outputs, supplied at the plurality of inputs with output data of the plurality of first computing units, performing a plurality of operations based on the plurality of data supplied in accordance with a control signal, and outputting the operation results from the plurality of outputs, and a plurality of output selection devices each selecting and outputting one data from a plurality of input data and at least one output data of the first and second computing units in accordance with a control signal.

Further, preferably, the second arithmetic device includes a plurality of first computing units each having a plurality of inputs and a plurality of outputs, performing a plurality of processing based on data supplied to the plurality of inputs in accordance with a control signal, and outputting the operation results from the plurality of outputs, a plurality of first input selection devices each selecting one data from a plurality of input data in accordance with a control signal and supplying it to different inputs of the first computing units, at least one second computing unit each having a plurality of inputs and a plurality of outputs, performing a plurality of processing based on the plurality of data supplied to the plurality of inputs in accordance with a control signal, and outputting the operation results from the plurality of outputs, a plurality of second input selection devices each selecting one data from the plurality of input data and output data of the second computing unit in accordance with a control signal, and a plurality of output selection devices each selecting and outputting one data from a plurality of input data and at least one output data of the second computing unit in accordance with a control signal.

Further, preferably, the second arithmetic device includes a plurality of computing units, arranged in multiple stages, each having a plurality of inputs and a plurality of outputs, performing a plurality of processing based on data supplied to the plurality of inputs in accordance with a control signal, and outputting the operation results from the plurality of outputs, a plurality of input selection devices each selecting one data from a plurality of input data in accordance with a control signal and supplying it to different inputs of the computing units of the first stage, and a plurality of output selection devices each selecting and outputting one data from a plurality of input data and at least one output data of the computing units of the stages in accordance with a control signal, the computing units arranged in stages other than the computing units of the first stage each being supplied at the plurality of inputs with output data of the plurality of computing units of the previous stage, performing a plurality of operations based on the plurality of data supplied in accordance with a control signal, and outputting the operation results from the plurality of outputs.

Further, preferably, the device has a means which can set any delay between arithmetic devices.

According to the present invention, for example, the second arithmetic means is supplied with a plurality of data from the outside, a plurality of operations are performed based on the plurality of input data in accordance with a control signal, and the operation results are output to the first arithmetic device.

In the first arithmetic device, the selecting means selects desired data from a plurality of input data in accordance with a control signal and supplies it to the arithmetic means. The arithmetic means receives as input the output signals of the selecting means, performs operation in accordance with instructions of a control signal, and outputs the operation results to for example a second arithmetic device.

The second arithmetic device performs a plurality of operations based on data supplied from the first arithmetic device and outputs the operation results as operation results of the parallel arithmetic device.

Further, the second arithmetic device supplies for example a plurality of data to the input selection devices.

Each input selection device selects one data from a plurality of input data in accordance with a control signal and supplies it to each first computing unit.

Each first computing unit performs a plurality of operations based on data supplied to a plurality of inputs in accordance with a control signal and outputs the operation results to the second computing unit.

The second computing unit performs a plurality of operations based on the plurality of data supplied from the plurality of first computing units and outputs the operation results to the output selection devices.

Each output selection device selects and outputs one data from the plurality of input data and at least one output data of the first and second computing units in accordance with a control signal.

Further, in the first arithmetic device, for example, the first selecting means selects desired data from a plurality of input data in accordance with a control signal and supplies it to the arithmetic means. Similarly, the second selecting means selects desired data from a plurality of input data in accordance with a control signal, while the third selecting means selects desired data from a plurality of input data in accordance with a control signal. The signals selected by the first selecting means and second selecting means are supplied to the first arithmetic means, while the signals selected by the first selecting means, second selecting means, and third selecting means are supplied to the second arithmetic means.

Further, the first arithmetic means uses the output signal of the first selecting means and the output signal of the second selecting means to perform operation in accordance with instructions of a control signal, for example, dyadic operation.

Further, for example, the first arithmetic means performs monadic operation on the result of the dyadic operation.

Further, the second arithmetic means uses the output signal of the first selecting means, the output signal of the second selecting means, and the output signal of the third selecting means to perform operation in accordance with instructions of a control signal, for example, trinomial operation.

Further, for example, the second arithmetic means performs monadic operation on the result of the trinomial operation.

Further, for example, the fourth selecting means selects one of the output signal of the first arithmetic means and the output signal of the second arithmetic means in accordance with a control signal and outputs it as the operation results of the arithmetic device.

Further, the first arithmetic device of the present invention connects in cascade the inputs and outputs of the data of for example a plurality of arithmetic devices and supplies the operation result signal of each arithmetic device as one data of the plurality of data input of another arithmetic device.

As a result, when for example performing multiple-term operation etc., each arithmetic device is allocated operation and multiple-term operation is performed at one time by cascade connection of the operation results of the previous stages.

Therefore, the number of cycles of execution becomes shorter and the number of temporary accesses to registers becomes smaller.

An arithmetic system according to the 24th aspect of the present invention has a plurality of component data memories for storing different component data, a data memory able to read and write at least operation data in accordance with a designated address, a selection device for selecting component data of the plurality of component data memories in accordance with a control signal, an address generation device for, when receiving a startup signal, generating addresses of the data memory by a designated pattern, reading from the data memory and writing to the data memory, generating a control signal including selection information in accordance with the generated addresses, and outputting it to the selection device, and an arithmetic device reconfigured based on component data selected by the selection device, performing predetermined operation on read data of the data memory, and outputting the operation results to the data memory as write data.

Further, preferably, the address generation device performs a series of operations of reading data of the data memory for the amount of the generated addresses and rewriting the operation results in the data memory for the amount of generated addresses.

The arithmetic system according to the 25th aspect of the present invention has a plurality of component data memories for storing different component data, a data memory able to read and write at least operation data in accordance with a designated address, a selection device for selecting component data of the plurality of component data memories in accordance with a control signal, an address generation device for, when receiving a startup signal, generating an address of the data memory by a designated pattern, reading from the data memory and writing to the data memory, generating a control signal including selection information in accordance with the generated address, and outputting it to the selection device, an arithmetic device reconfigured based on component data selected by the above selection device, performing predetermined operation on read data of the data memory, and outputting the operation results to the data memory as write data, and a control circuit for outputting a startup signal to the address generation device at a predetermined timing and designating an address pattern to be generated.

Further, preferably, in the present invention, the control circuit is able to access the plurality of component data memories and data memory, writes the component data in the plurality of component data memories, outputs the second control signal to the selection device, decides whether to utilize the component data of the plurality of component data memories, writes the data of the data memory, then outputs the startup signal to the address generation device.

Further, preferably, the address generation device performs a series of operations of reading data of the data memory for the amount of the generated addresses and rewriting the operation results in the data memory for the amount of generated addresses and notifies the completion of operation to the control circuit.

Further, preferably, while the address generation device is generating addresses, the control circuit outputs the second control signal to the selection device and able to dynamically change the selected component data.

According to the present invention, for example, first, the control circuit writes different component data in the plurality of component data memories.

Further, the control circuit writes a plurality of data in the data memory in advance.

Further, the control circuit outputs a startup signal to the address generation device, designates the address generation pattern, and starts up the address generation device.

Due to this, the control circuit transfers control to the address generation device, while the address generation device starts automatic generation of addresses and supplies them to the data memory.

Further, the address generation device outputs a control signal to the selection device in accordance with the generated address.

The selection device selects one of the component data of the plurality of component data memories in accordance with a control signal of the address generation device and supplies it to the arithmetic device.

The arithmetic device reconfigures the array of computing units, coefficient parameters at the time of execution of operations, etc. based on the component data selected by the selection device.

Further, the reconfigured arithmetic device performs predetermined operation on the read data of the data memory.

The operation results of the arithmetic device are written in the data memory as write data.

By the above control, the series of operations of reading data of the data memory, executing the operation designated by the path written in the path selection data memory, and rewriting it in the data memory is performed automatically for the amount of addresses generated.

When that amount of addresses is generated, the automatic generation of addresses by the address generation device is ended.

Further, for example, the address generation device informs the control circuit of the end of the operation.

According to a 26th aspect of the present invention, there is provided an address generation device for generating an address of a memory, comprising a plurality of counters for setting a count value by a processed count value, a plurality of arithmetic means provided corresponding to the counters, processing the count values of the counters corresponding to supplied step values in accordance with a control signal, and supplying the processed count values to the corresponding counters, and an address arithmetic means for performing operation in accordance with a control signal on the count values of the plurality of counters and outputting the operation results as the address.

Further, preferably, the device comprises a means for stopping the count operation of the counters in accordance with the operation results of the input parameters and the count values of the counters.

Further, preferably, the device comprises a means for stopping the count operation of one counter in accordance with operation results between the count value of that one counter and the count value of another counter.

Further, preferably, the device comprises a means for resetting the counters in accordance with the operation results between the input parameters and the count value of the counter.

Further, preferably, the device comprises a means which can freely designate initial values of the plurality of counters.

Further, preferably the device comprises a means able to temporarily stop countup of all of the counters in accordance with a control signal.

According to a 27th aspect of the present invention, there is provided an address generation device for generating an address of a memory accessed by an arithmetic device, comprising a plurality of counters for setting a count value by a processed count value, a plurality of arithmetic means provided corresponding to the counters, processing the count values of the counters corresponding to supplied step values in accordance with a control signal, and supplying the processed count values to the corresponding counters, an address arithmetic means for performing operation in accordance with a control signal on the count values of the plurality of counters and outputting the operation results as the address, and a control signal generating means for generating a control signal of the arithmetic device based on the count values of the plurality of counters.

Further, preferably, the device comprises a means for stopping the count operations of the counters in accordance with the operation results between the input parameters and the count values of the counters, while the control signal generating means generates a control signal based on the operation results of the means for stopping the count operations.

Further, preferably, in the present invention, the device comprises a means for stopping the count operation of one counter in accordance with the operation results between the count value of that one counter and the count value of another counter, while the control signal generating means generates a control signal based on operation results of the means for stopping the count operation.

According to the present invention, each counter is set to a predetermined initial value, the initial value and the supplied step value are processed by a corresponding arithmetic means, and the count value of a counter is set by the processed count value.

Further, the address arithmetic means performs an operation in accordance with a control signal on the count values of a plurality of counters. The operation results are output as addresses.

Further, the count operation of a counter is stopped in accordance with the operation results of an input parameter and count value of a counter.

Further, the count operation of one counter is stopped in accordance with the operation results between the count value of that one counter and the count value of another counter.

Further, each counter is reset in accordance with the operation results of an input parameter and the count value of the above counter.

Further, one counter is reset in accordance with the operation results between the count value of one counter and the count value of another counter.

Further, according to the present invention, each counter is set to a predetermined initial value, the initial value and the supplied step value are processed by a corresponding arithmetic means, and the processed count value is used to set the count value of each counter.

Further, the address arithmetic means performs operation in accordance with a control signal on the count values of a plurality of counters. The operation results are output as addresses.

Further, the control signal generating means generates a control signal for selecting for example component data of an arithmetic device based on the count values of the plurality of counters.

According to a 28th aspect of the present invention, the device has at least one delay means able to insert any delay cycles into a plurality of input data and a plurality of selecting means for selecting as output data any of the input data and the output of the delay means in accordance with a control signal.

Further, according to a 29th aspect of the present invention, the device has a first delay means able to insert delay of predetermined cycles into first input data, a second delay means able to insert delay of predetermined cycles into second input data, a first selecting means for selecting as the first output data one of the first input data, second input data, output data of the first delay means, and output data of the second delay means, and a second selecting means for selecting as the second output data one of the first input data, second input data, output data of the first delay means, and output data of the second delay means.

According to a 30th aspect of the present invention, the device has a first delay means for causing the first read data input from a first memory bank to be delayed by predetermined cycles, a second delay means for causing the second read input from a second memory bank to be delayed by predetermined cycles, a first selecting means for selecting as first read output the value of one of the first read data input, second read data input, output data of the first delay means, and output data of the second delay means in accordance with a control signal, and a second selecting means for selecting as second read data output the value of one of the first read data input, the second read data input, the output data of the first delay means, and the output data of the second delay means in accordance with a control signal.

According to a 31st aspect of the present invention, there is provided an interleave device for a plurality of read data input from a plurality n (n≧3) of memory banks, comprising a plurality of delay means provided corresponding to the read data inputs and able to insert delay of any cycles and a plurality of selecting means for selecting as read data output any of the a plurality of read data inputs and output data of the delay means in accordance with a control signal.

Further, preferably, the delay means generates a delay of m cycles (1≦m≦n) with respect to the read data input.

According to a 32nd aspect of the present invention, the device has a first delay means for delaying a first write data input from a first series by predetermined cycles, a second delay means for delaying a second write data input from a second series by predetermined cycles, a first selecting means for selecting the value of any of the first write data input, second write data input, output data of the first delay means, and output data of the second delay means, as write data output for the first memory bank in accordance with a control signal, and a second selecting means for selecting the value of any of the first write data input, second write data input, output data of the first delay means, and output data of the second delay means as write data for the second memory bank in accordance with a control signal.

According to a 33rd aspect of the present invention, there is provided an interleave device for a plurality of write data from a plurality n (n≧3) of series, comprising a plurality of delay means able to insert delay of any cycles in the write data inputs and a plurality of selecting means for selecting any of the plurality of write data inputs and output data of the delay means as write data output for the corresponding memory banks in accordance with a control signal.

According to the present invention, for example, the first delay means gives delay of predetermined cycles, for example, exactly 1 cycle, to the first read data input from the first memory bank and outputs the result to the first and second selecting means.

Further, the second delay means gives delay of predetermined cycles, for example, 1 cycle, to second read data input from the second memory bank and outputs the result to the first and second selecting means.

The first selecting means selects as the first read data output the value of any one of the first read data input, second read data input, the output of the first delay means, and the output data of the second delay means in accordance with a control signal.

Similarly, the second selecting means selects as the second read data output the value of any one of the first read data input, second read data input, the output of the first delay means, and the output data of the second delay means in accordance with a control signal.

Further, according to the present invention, the first delay means gives to the first write data input from the first series delay of predetermined cycles, for example, exactly 1 cycle, and outputs the result to the first and second selecting means.

Further, the second delay means gives to the second write data input from the second series delay of predetermined cycles, for example, exactly 1 cycle, and outputs the result to the first and second selecting means.

The first selecting means selects as the write data output for the first memory bank a value of any of the first write data input, second write data input, output data of the first delay means, and output data of the second delay means in accordance with a control signal.

Similarly, the second selecting means selects as the write data output for the second memory bank a value of any of the first write data input, second write data input, output data of the first delay means, and output data of the second delay means in accordance with a control signal.

The arithmetic system according to a 34th aspect of the present invention has an arithmetic execution unit reconfigured based on supplied component data and performing predetermined operation on predetermined data, a component data storage unit in which a plurality of storage means able to store component data connected in a ring and able to shift the stored data, supplies the component data stored in one storage means to the arithmetic execution unit, and component data is written in another storage means, and a control means for writing component data in predetermined storage means of the component data storage unit.

The arithmetic system according to a 35th aspect of the present invention has an arithmetic execution unit reconfigured based on supplied component data and performing predetermined operation on predetermined data, a component data storage unit including a plurality of registers including a first register able to store component data connected in a ring and to be able to shift the stored data upon receipt of a shift signal and supplying the stored component data to the arithmetic execution unit and a second register able to rewrite component data upon receipt of a write signal and a selecting means for supplying component data to be written to the second register at the time of a write operation receiving a write signal and supplying component data stored in a register of the previous stage to the second register at the time of being written, and a control means for transmitting a write signal and component data to be written to the component data storage unit and rewriting the component data of the second register.

Further, preferably, the control means shifts the component data stored in each register of the component data storage unit to a register of the next stage by a shift signal and changes the component data to be supplied to the arithmetic execution unit.

According to the present invention, the storage unit for holding component data for the arithmetic execution unit enabling reconfiguration of array of computing units and other hardware configuration is comprised of a plurality of registers connected in a ring.

Further, the content of a register for other component data is rewritten while using one component data for processing.

Further, the component data stored in each register is switched by rotation inside the ring by the shift signal.

Due to this, even while the arithmetic execution units are executing processing, it becomes possible to simultaneously set the component data to be used next.

Further, previously used component data can be reused by just switching the configuration without writing new component data.

BRIEF DESCRIPTION OF THE DRAWINGS

These and other objects and features of the present invention will become clearer from the following description of the preferred embodiments given with reference to the accompanying drawings, in which:

FIGS. 17A to 17F show a timing chart for explaining the operation of the read system interleave device of FIG. 16, FIGS. 19A to 19F show a timing chart for explaining the operation of the write system interleave device of FIG. 18.

DESCRIPTION OF THE PREFERRED EMBODIMENTS

Below, embodiments of the present invention will be explained with reference to the drawings.

First Embodiment

Figure 1:
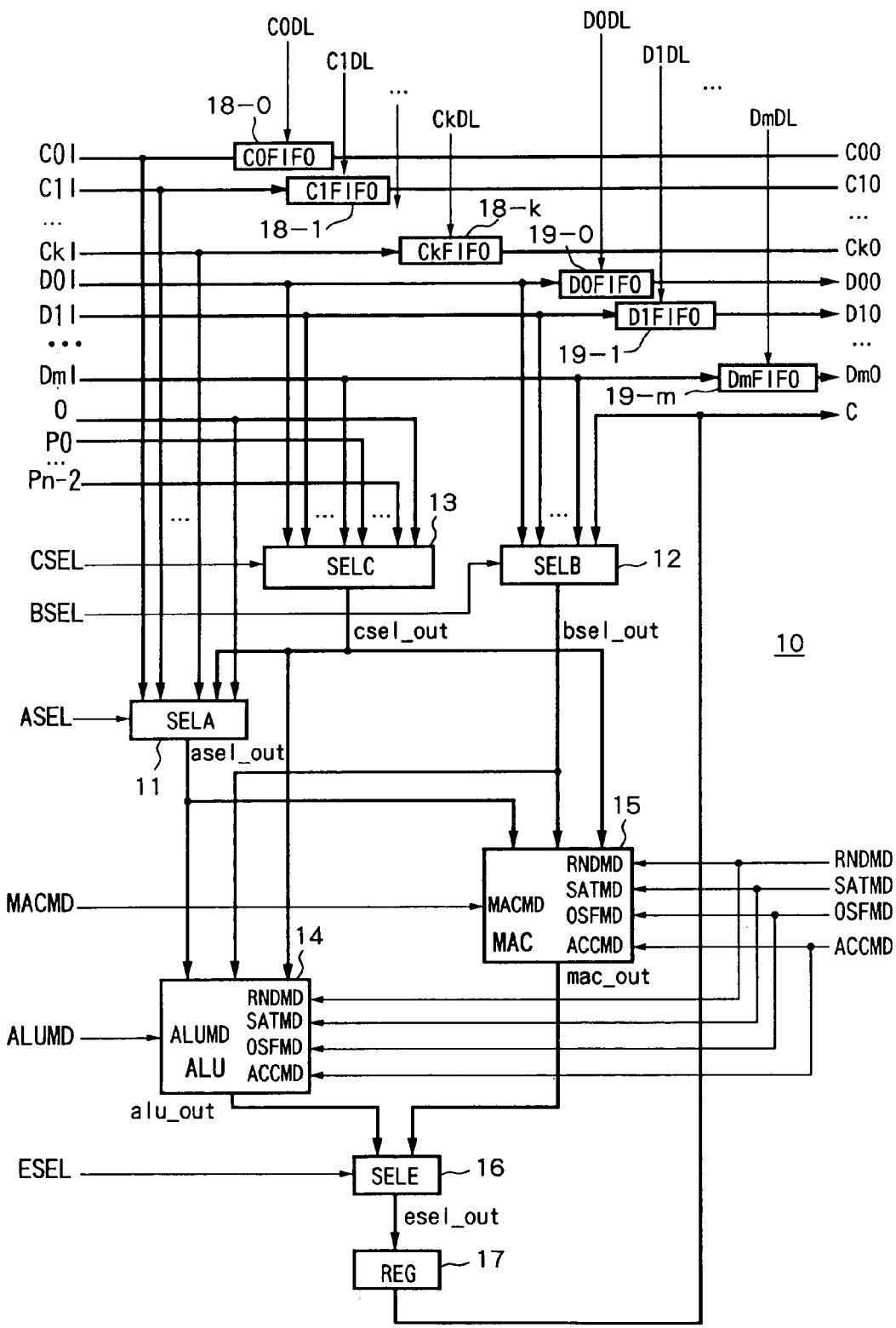
FIG. 1 is a view of the configuration showing a first embodiment of an arithmetic device according to the present invention.

FIG. 1 is a view of the configuration showing a first embodiment of an arithmetic device according to the present invention.

The arithmetic device 10 of FIG. 1 includes an ALU and MAC structure computing unit reconfigurable based on component data and has n (=m+1) number of coefficient buses, n (=k+1) number of data buses, n−1 number of cascade inputs, and output data.

Below, the specific configuration and functions of the arithmetic device 10 will be explained in order.

The arithmetic device 10, as shown in FIG. 1, has as main components a first selection device (SELA) 11, second selection device (SELB) 12, third selection device (SELC) 13, ALU 14, MAC structure computing unit (below, simply called a MAC) 15, fourth selection device (SELE) 16, register (REG) 17, k (for example k=n−1) number of FIFOs (First-In First-Out, C0FIFO to CkFIFO) 18-0 to 18-k for coefficient input delay, and m (for example m=n−1=k) number of FIFOs (D0FIFO to DmFIFO) 19-0 to 19-m for data input delay.

Further, the arithmetic device 10 has coefficient inputs C0I, C1I, . . . , CkI, data input D0I, D1I, . . . , DmI, cascade inputs P0, P1, . . . Pn−2, coefficient outputs C0O, C1O, . . . , CkO, data outputs D0O, D1O, . . . , DmO, and an operation output C and is supplied with operation control signals for reconfiguration etc. ASEL, BSEL, CSEL, ESEL, MACMD, ALUMD, RNDMD, SATHD, OSFMD, ACCMD, delay control signals C0DL, C1DL, . . . CkDL, D0DL, D1DL, . . . DmDL.

The first selection device 11, in accordance with the control signal ASEL, selects the coefficient inputs C0I, C1I, . . . , CkI and data 0 and outputs them as the signal asel_out to the ALU 14 and MAC 15.

The second selection device 12, in accordance with the control signal BSEL, selects the data inputs D0I, D1I, . . . , DmI and outputs it as the signal bsel_out to the ALU 14 and MAC 15.

The third selection device 13, in accordance with the control signal CSEL, selects the cascade inputs P0, P1, . . . , Pn−2 and data 0 and outputs them as the signal csel_out to the first selection device 11, ALU 14, and MAC 15.

The ALU 14 uses alu_acc as an accumulate register, receives as input the output signal asel_out of the first selection device 11, the output signal bsel_out of the second selection device 12, and the output signal csel_out of the third selection device 13, performs logic operations in accordance with the instructions of the control signals ALUMD, RNDMD, SATMD, OSFMD, and ACCMD, and outputs the result as the signal alu_out to the fourth selection device 16.

Specifically, the ALU 14, in accordance with the value of the control signal RNDMD, can select the rounding mode from among "the 0 direction, direction far from 0, positive infinitely large direction, negative infinitely large direction, closest integer", can designate the saturation bit width by the value of the control signal SATMD, and can designate the amount of shift by the value of the control signal OSFMD.

Further, the ALU 14 can select loading of a value into the accumulate register alu_acc and zero initialization in accordance with the value of the control signal ACCMD.

The ALU 14 performs one of the following operations in accordance with the value of the control signal ALUMD:

alu_out=asel_out+bsel_out
  alu_out=asel_out−bsel_out
  alu_out=alu_acc+bsel_out
  alu_out=alu_acc−bsel_out
  alu_out=~bsel_out
  alu_out=−bsel_out
  alu_out=|bsel_out|
  alu_out=|asel_out−bsel_out|
  alu_out=asel_out & bsel_out
  alu_out=asel_out|bsel_out
  alu_out=asel_outΛbsel_out
  alu_out=MAX (asel_out, bsel_out)
  alu_out=MIN (asel_out, bsel_out)
  alu_out=Leading ZERO (bsel_out)
  alu_out=Leading ONE (bsel_out)
  alu_out=ALS (bsel_out)
  alu_out=ARS (bsel_out)
  alu_out=LLS (bsel_out)
  alu_out=LRS (bsel_out)
  alu_out=asel_out+bsel_out+csel_out
  alu_out=asel_out−bsel_out+csel_out
  alu_out=asel_out+bsel_out−csel_out
  alu_out=asel_out−bsel_out−csel_out Here, ~ indicates bit inversion, − indicates sign inversion, | | indicates an absolute value, & indicates AND, | indicates OR, and Λ indicates EXOR. Further, MAX indicates a function returning a maximum value, MIN indicates a function returning a minimum value, Leading ZERO indicates a function returning a number of continuous 0s from the MSB in the case of binary notation, Leading ONE indicates a function returning a number of continuous 1s from the MSB in the case of binary notation, ALS indicates an arithmetic left shift, ARS indicates an arithmetic right shift, LLS indicates a logic left shift, and LRS indicates a logic right shift.

The MAC 15 uses mac_acc as an accumulate register, receives as input the output signal asel_out of the first selection device 11, output signal bsel_out of the second selection device 12, and output signal csel_out of the third selection device 13, performs operations in accordance with instructions of the control signals MACMD, RNDMD, SATMD, OSFMD, and ACCMD, and outputs the result as the signal mac_out.

Specifically, the MAC 15, in accordance with the value of the control signal RNDMD, can select the rounding mode from among "the 0 direction, direction far from 0, positive infinitely large direction, negative infinitely large direction, closest integer", can designate the saturation bit width by the value of the control signal SATMD, and can designate the amount of shift by the value of the control signal OSFMD. Further, the MAC 15, in accordance with the value of the control signal ACCMD, can select loading of a value in the accumulate register mac_acc and zero initialization.

The MAC 15 performs one of the following operations in accordance with the value of the control signal MACMD:

mac_out=asel_out*bsel_out
  mac_out=−(asel_out*bsel_out)
  mac_out=asel_out*bsel_out+csel_out
  mac_out=−(asel_out*bsel_out)+csel_out
  mac_out=asel_out*bsel_out−csel_out
  mac_out=−(asel_out*bsel_out)−csel_out
  mac_out=asel_out*bsel_out+mac_acc
  mac_out=−(asel_out*bsel_out)+mac_acc
  mac_out=asel_out*bsel_out−mac_acc
  mac_out=−(asel_out*bsel_out)−mac_acc The fourth selection device 16, in accordance with the control signal ESEL, selects one of the output signal alu_out of the ALU 14 and the output signal mac_out of the MAC 15 and outputs it as the signal esel_out to the register 17.

The register 17 stores the output signal esel_out of the fourth selection device 16, outputs the stored data to the second selection device 12, and outputs it as the operation output C.

The C0FIFO18-0 can be set with any cycle delay in accordance with the value of the control signal C0DL, delays the coefficient input C0I by cycles in accordance with the value of the control signal C0DL to obtain the coefficient output C0O, and outputs it to the device of the next stage for example.

The C1FIFO18-1 can be set with any cycle delay in accordance with the value of the control signal C1DL, delays the coefficient input C1I by cycles in accordance with the value of the control signal C1DL to obtain the coefficient output C1O, and outputs it to the device of the next stage for example.

Similarly, the CkFIFO18-k can be set with any cycle delay in accordance with the value of the control signal CkDL, delays the coefficient input CkI by cycles in accordance with the value of the control signal CkDL to obtain the coefficient output CkO, and outputs it to the device of the next stage for example.

The D0FIFO19-0 can be set with any cycle delay in accordance with the value of the control signal D0DL, delays the data input D0I by cycles in accordance with the value of the control signal D0DL to obtain the data output D0O, and outputs it to the device of the next stage for example.

The D1FIFO19-1 can be set with any cycle delay in accordance with the value of the control signal D1DL, delays the data input D1I by cycles in accordance with the value of the control signal D1DL to obtain the data output D1O, and outputs it to the device of the next stage for example.

Similarly, the DmFIFO19-m can be set with any cycle delay in accordance with the value of the control signal DmDL, delays the data input DmI by cycles in accordance with the value of the control signal DmDL to obtain the data output DmO, and outputs it to the device of the next stage for example.

Note that, in the present embodiment, the case of not giving a delay by predetermined cycles is designated as a delay 0 and is included in the definition of delay.

Figure 2:
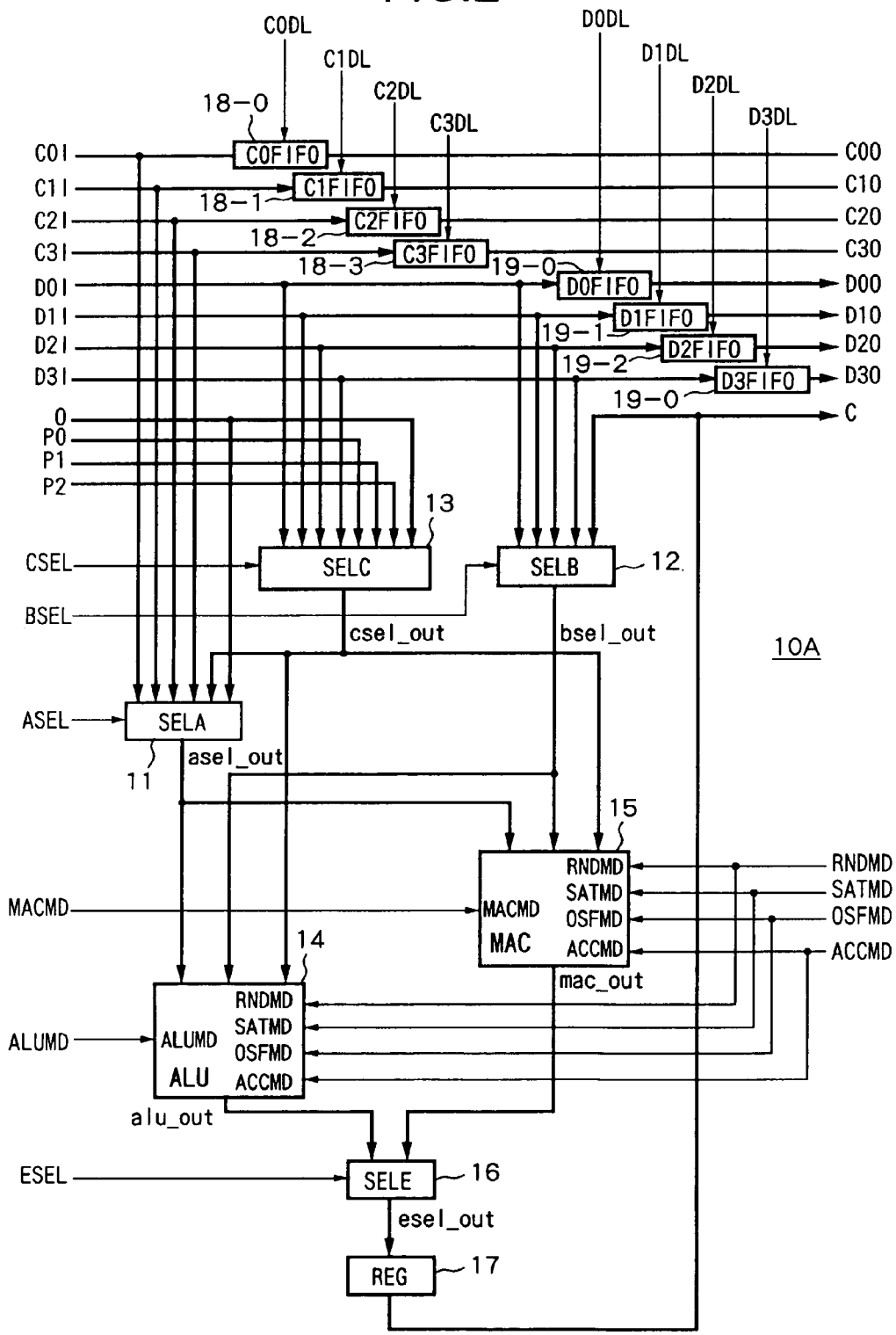
FIG. 2 is a view explaining the operation of the first embodiment and shows the configuration of hardware in the arithmetic device of FIG. 1 when n=4, there are four coefficient input/output data, and there are three cascade inputs.

Next, the operation according to the above configuration, as shown in FIG. 2, will be explained with reference to the operation of arithmetic device 10A where n=4, there are four coefficient input/output data, and there are three cascade inputs.

Note that here, the coefficient inputs C0I, C1I, C2I, and C3I are made a, b, c, and d, while the data inputs D0I, D1I, D2I, and D3I are made x, y, z, and w. Further, the cascade inputs P0, P1, and P2 are made a*x, a*x+b*y, and a*x+b*y+c*z.

First, the case of finding C=a*x will be explained.

In this case, the control signal ASEL is set so as to select the coefficient input C0I(a) and is supplied to the first selection device 11.

Further, the control signal BSEL is set so as to select the data input D0I(x) and is supplied to the second selection device 12.

Due to this, the first selection device 11 outputs the coefficient a as the signal asel_out to the ALU 14 and MAC 15. Further, the second selection device 12 outputs the data x as the signal bsel_out to the ALU 14 and MAC 15.

At this time, the control signal MACMD designating multiplication is supplied to the MAC 15. Due to this, the MAC 15 multiplies the coefficient a and data x and outputs the result a*x as the signal mac_out to the fourth selection device 16.

Further, the control signal ESEL is set so as to select the output of the MAC 15 and is supplied to the fourth selection device 16. As a result, the fourth selection device 16 selects the output signal mac_out (a*x) of the MAC 15 and outputs it as the signal esel_out (a*x) to the register 17.

The register 17 stores the operation results a*x of the MAC 15 and outputs the stored data as the operation output C.

Next, the case of finding C=a*x+b*y will be explained.

In this case, the control signal ASEL is set so as to select the coefficient input C1I(b) and is supplied to the first selection device 11.

Further, the control signal BSEL is set so as to select the data input D1I(y) and is supplied to the second selection device 12.

Further, the control signal CSEL is set so as to select the cascade input P0 (a*x) and is supplied to the third selection device 13.

Due to this, the first selection device 11 outputs the coefficient b as the signal asel_out to the ALU 14 and MAC 15. Further, the second selection device 12 outputs the data y as the signal bsel_out to the ALU 14 and MAC 15. Further, the third selection device 13 outputs the cascade input data a*x as the signal csel_out to the first selection device 11, ALU 14, and MAC 15.

At this time, the control signal MACMD designating multiplication and addition is supplied to the MAC 15. Due to this, the MAC 15 multiplies the coefficient b and the data y and adds the results b*y and a*x. Due to this, the MAC 15 outputs the multiplication and addition result a*x+b*y as the signal mac_out to the fourth selection device 16.

Further, the control signal ESEL is set to select the output of the MAC 15 and is supplied to the fourth selection device 16. As a result, the fourth selection device 16 selects the output signal mac_out (a*x+b*y) of the MAC 15 and outputs it as the signal esel_out (a*x+b*y) to the register 17.

The register 17 stores the operation results a*x+b*y of the MAC 15 and outputs the stored data as the operation output C.

Next, the case of finding C=a*x+b*y+c*z will be explained.

In this case, the control signal ASEL is set so as to select the coefficient input C2I(c) and is supplied to the first selection device 11.

Further, the control signal BSEL is set so as to select the data input D2I(z) and is supplied to the second selection device 12.

Further, the control signal CSEL is set so as to select the cascade input P1 (a*x+b*y) and is supplied to the third selection device 13.

Due to this, the first selection device 11 outputs the coefficient c as the signal asel_out to the ALU 14 and MAC 15. Further, the second selection device 12 outputs the data z as the signal bsel_out to the ALU 14 and MAC 15. Further, the third selection device 13 outputs the cascade input data a*x+b*y as the signal osel_out to the first selection device 11, ALU 14, and MAC 15.

At this time, the control signal MACMD designating multiplication and addition is supplied to the MAC 15. Due to this, the MAC 15 multiplies the coefficient c and the data z and adds the result c*z and (a*x+b*y). Due to this, the MAC 15 outputs the multiplication and addition result a*x+b*y+c*z as the signal mac_out to the fourth selection device 16.

Further, the control signal ESEL is set so as to select the output of the MAC 15 and is supplied to the fourth selection device 16. As a result, the fourth selection device 16 selects the output signal mac_out (a*x+b*y+c*z) of the MAC 15 and outputs it as the signal esel_out (a*x+b*y+c*z) to the register 17.

The register 17 stores the operation results a*x+b*y+c*z of the MAC 15 and outputs this stored data as the operation output C.

Next, the case of finding C=a*x+b*y+c*z+d*w will be explained.

In this case, a control signal ASEL is set so as to select the coefficient input C3I(d) and is supplied to the first selection device 11.

At Further, the control signal BSEL is set so as to select the data input D3I(w) and is supplied to the second selection device 12.

Further, the control signal CSEL is set so as to select the cascade input P2 (a*x+b*y+c*z) and is supplied to the third selection device 13.

Due to this, the first selection device 11 outputs the coefficient d as the signal asel_out to the ALU 14 and MAC 15. Further, the second selection device 12 outputs the data w as the signal bsel_out to the ALU 14 and MAC 15. Further, the third selection device 13 outputs the cascade input data a*x+b*y+c*z as the signal csel_out to the first selection device 11, ALU 14, and MAC 15.

At this time, the control signal MACMD designating multiplication and addition is supplied to the MAC 15. Due to this, the MAC 15 multiplies the coefficient d and data w and adds the results d*w and (a*x+b*y+c*z). Due to this, the MAC 15 outputs the multiplication and addition result a*x+b*y+c*z+d*w as the signal mac_out to the fourth selection device 16.

Further, the control signal ESEL is set so as to select the output of the MAC 15 and is supplied to the fourth selection device 16. As a result, the fourth selection device 16 selects the output signal mac_out (a*x+b*y+c*z+d*w) of the MAC 15 and outputs it as the signal esel_out (a*x+b*y+c*z+d*w) to the register 17.

The register 17 stores the operation results a*x+b*y+c*z+d*w of the MAC 15 and outputs the stored data as the operation output C.

As explained above, according to the first embodiment, since provision is made of a first selection device 11 for selecting coefficient inputs C0I, C1I, . . . , and CkI and data 0 in accordance with a control signal ASEL, a second selection device 12 for selecting data inputs D0I, D1I, . . . , DmI in accordance with a control signal BSEL, a third selection device 13 for selecting cascade inputs P0, P1, . . . , Pn−2 and data 0 in accordance with a control signal CSEL, and ALU 14 for receiving as inputs the output signal asel_out of the first selection device 11, the output signal bsel_out of the second selection device 12, and the output signal csel_out of the third selection device 13 and performing logic operations in accordance with instructions of the control signals ALUMD, RNDMD, SATMD, OSFMD, and ACCMD, a MAC 15 for receiving as input the output signal asel_out of the first selection device 11, the output signal bsel_out of the second selection device 12, and the output signal csel_out of the third selection device 13 and performing operations in accordance with instructions of the control signals MACMD, RNDMD, SATMD, OSFMD, and ACCMD, and a fourth selection device 16 for selecting one of the output signal alu_out of the ALU 14 and the output signal mac_out of the MAC 15 in accordance with the control signal ESEL, it is possible to reconfigure the arithmetic device itself from the outside.

Therefore, according to the first embodiment, there are the advantages that it is possible to realize an arithmetic device able to optimize the logic level, of course, and also able to prevent an increase in the component data and able to prevent deterioration of the area efficiency as an integrated circuit.

Further, since the arithmetic device can be reconfigured, not only cascade processing, but also parallel processing can be realized by the same hardware. Therefore, it is possible to increase the number of the arithmetic devices and efficiently execute more parallel processable processing.

Second Embodiment

Figure 3:
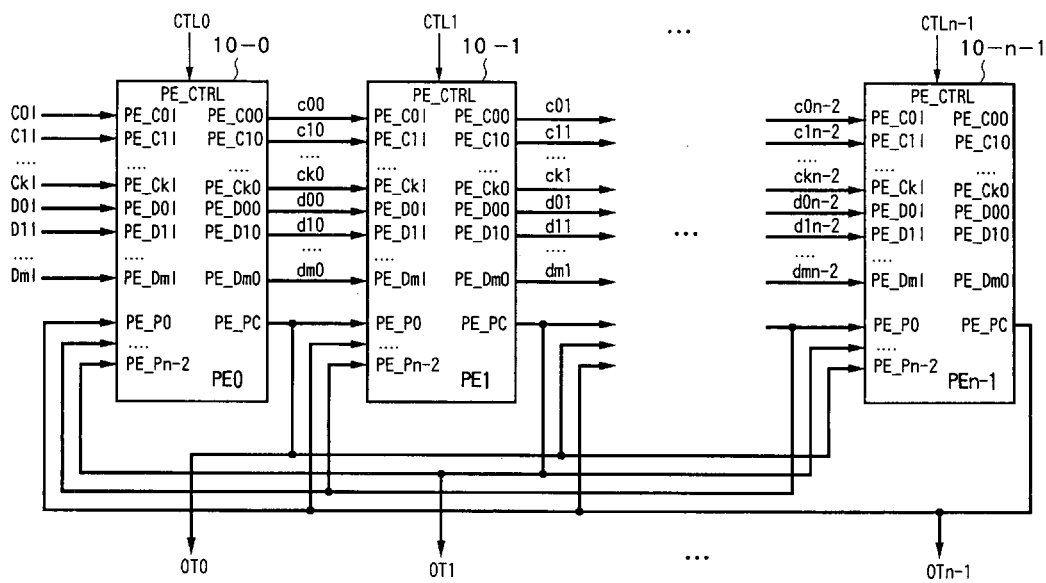
FIG. 3 is a view of the configuration showing a second embodiment of an arithmetic device according to the present invention.

FIG. 3 is a view of the configuration showing a second embodiment of a parallel arithmetic device according to the present invention.

In the second embodiment, a plurality (n number) of the arithmetic devices are connected in cascade and the operation results of other arithmetic devices are input in cascade input so as to efficiently execute more parallel processable processing.

The arithmetic devices 10-0 to 10-n–1 (PE0 to PEn–1) have coefficient input terminals PE_C0I to PE_CkI, data input terminals PE_D0I to PE_DmI, cascade input terminals PE_P0 to PE_Pn–2, coefficient output terminals PE_C0O to PE_CkO, data output terminals PE_D0O to PE_DmO, and an operation output terminal PE_C.

The arithmetic device 10-0 is supplied at the coefficient input terminals PE_C0I to PE_CkI with the coefficients C0I to CkI, is supplied at the data input terminals PE_D0I to PE_DmI with the data inputs D0I to DmI, and is supplied at the cascade inputs PE_P0 to PE_Pn–2 the operation result signals OT1 to OTn–1 output from the operation output terminal PE_C of the other arithmetic devices 10-1 to 10-n–1. For example, it is supplied at the cascade input PE_P0 with the operation result signal OTn–1 of the arithmetic device 10-n–1 of the final stage, while is supplied at the cascade input terminal PE_Pn–2 with the operation result signal OT1 of the arithmetic device 10-1.

Further, the arithmetic device 10-0 outputs from the coefficient output terminals PE_C0O to PE_CkO the coefficient delayed by exactly the desired amount of delay by the C0FIFO18-0 to CkFIFO18-k as the coefficient outputs c00 to ck0 to the arithmetic device 10-1 of the next stage and output from the data output terminals PE_D0O to PE_DmO the data delayed by exactly the desired amount of delay by the D0FIFO19-0 to DmFIFO19-m as the data outputs d00 to dm0 to the arithmetic device 10-1 of the next stage.

Further, the arithmetic device 10-0 outputs from the operation output terminal PE_C the operation result signal OT0 to other arithmetic devices 10-1 to 10-n–1.

Note that, in FIG. 3, the operation control signals to be supplied to the arithmetic device 10-0 ASEL, BSEL, CSEL, ESEL, MACMD, ALUMD, RNDMD, SATMD, OSFMD, ACCMD and delay control signals C0DL, C1DL, . . . CkDL, D0DL, D1DL, . . . DmDL are for simplification shown as the control signal CTL0.

The arithmetic device 10-1 is supplied at the coefficient input terminals PE_C0I to PE_CkI with the coefficient outputs c00 to ck0 of the arithmetic device 10-0, is supplied at the data input terminals PE_D0I to PE_DmI with the data outputs d00 to dm0 of the arithmetic device 10-0, and is supplied at the cascade inputs PE_P0 to PE_Pn–2 with the operation result signals OT0, OT2 to OTn–1 output from the operation output terminal PE_C of the other arithmetic devices 10-0, 10-2 (not shown) to 10-n–1. For example, it is supplied at the cascade input PE_P0 with the operation result signal OT0 of the arithmetic device 10-0 of the previous stage and is supplied at the cascade input terminal PE_Pn–2 with the operation result signal OTn–2 of the arithmetic device 10-n–2.

Further, the arithmetic device 10-1 outputs from the coefficient output terminals PE_C0O to PE_CkO the coefficient delayed by exactly the desired amount of delay by the C0FIFO18-0 to CkFIFO18-k as the coefficient outputs c01 to ck1 to the arithmetic device 10-2 of the next stage and outputs from the data output terminals PE_D0O to PE_DmO data delayed by exactly the desired amount of delay by the D0FIFO19-0 to DmFIFO19-m as the data outputs d01 to dm1 to the arithmetic device 10-2 of the next stage.

Further, the arithmetic device 10-1 outputs from the operation output terminal PE_C the operation result signal OT1 to other arithmetic devices 10-0, 10-2 to 10-n–1.

Note that, in FIG. 3, the operation control signals to be supplied to the arithmetic device 10-1 ASEL, BSEL, CSEL, ESEL, MACMD, ALUMD, RNDMD, SATMD, OSFMD, ACCMD and delay control signals C0DL, C1DL, . . . CkDL, D0DL, D1DL, . . . DmDL are for simplification shown as the control signal CTL1.

Similarly, the arithmetic device 10-I ($2 \leq i \leq n-2$) is supplied at the coefficient input terminals PE_C0I to PE_CkI with the coefficient outputs c0i–1 to cki–1 of the arithmetic device 10-i–1, is supplied at the data input terminals PE_D0I to PE_DmI with the data outputs d0i–1 to dmi–1 of the arithmetic device 10-i–1, and is supplied at the cascade inputs PE_P0 to PE_Pn–2 with the operation result signals OT0 to OTi–1, OTi+1 to OTn–1 output from the operation output terminal PE_C of the other arithmetic devices 10-0 to 10-i–1, 10-i+1 to 10-n–1.

Further, the arithmetic device is 10-I outputs from the coefficient output terminals PE_C0O to PE_CkO the coefficient delayed by exactly the desired amount of delay by the C0FIFO18-0 to CkFIFO18-k as the coefficient outputs c0i to cki to the arithmetic devices 10-i+1 of the next stage and outputs from the data output terminals PE_D0O to PE_DmO the data delayed by exactly the desired amount of delay by the D0FIFO19-0 to DmFIFO19-m as the data outputs d0i to dmi to the arithmetic device 10-i+1 of the next stage.

Further, the arithmetic device 10-I outputs from the operation output terminal PE_C the operation result signal OTi to the other arithmetic devices 10-0 to 10-i–1, 10-i+1 to 10-n–1.

Note that, while not shown, the arithmetic device 10-I is supplied with the operation control signals ASEL, BSEL, CSEL, ESEL, MACMD, ALUMD, RNDMD, SATMD, OSFMD, ACCMD and delay control signals C0DL, CLDL, . . . CkDL, D0DL, D1DL, . . . DmDL as for example the control signal CTLi.

Further, the arithmetic device 10-n–1 is supplied at the coefficient input terminals PE_C0I to PE_CkI with the coefficient outputs c0n–2 to ckn–2 of the arithmetic device 10-n–2, is supplied at the data input terminals PE_D0I to PE_DmI with the data outputs d0n–2 to dmn–2 of the arithmetic device 10-n–2, and is supplied at the cascade inputs PE_P0 to PE_Pn–2 with the operation result signals OT0 to OTn–2 output from the operation output terminal PE_C of the other arithmetic devices 10-0 to 10-n–2. For example, it is supplied at the cascade input PE_P0 with the operation result signal OTn–2 of the arithmetic device 10-n–2 of the previous stage and is supplied at the cascade input terminal PE_Pn−2 with the operation result signal OT0 of the arithmetic device 10-0.

Further, the arithmetic device 10-n−1 does not output coefficients from the coefficient output terminals PE_C0O to PE_CkO and output data from the data output terminals PE_D0O to PE_DmO to other arithmetic devices.

Further, the arithmetic device 10-n−1 outputs from the operation output terminal PE_C the operation result signal OTn−1 to the other arithmetic devices 10-0 to 10-n−2.

Note that, in FIG. 3, the operation control signals to be supplied to the arithmetic device 10-n−1 ASEL, BSEL, CSEL, ESEL, MACMD, ALUMD, RNDMD, SATMD, OSFMD, ACCMD and delay control signals C0DL, C1DL, . . . CkDL, D0DL, D1DL, . . . DmDL are for simplification shown as the control signal CTLn−1.

Figure 4:
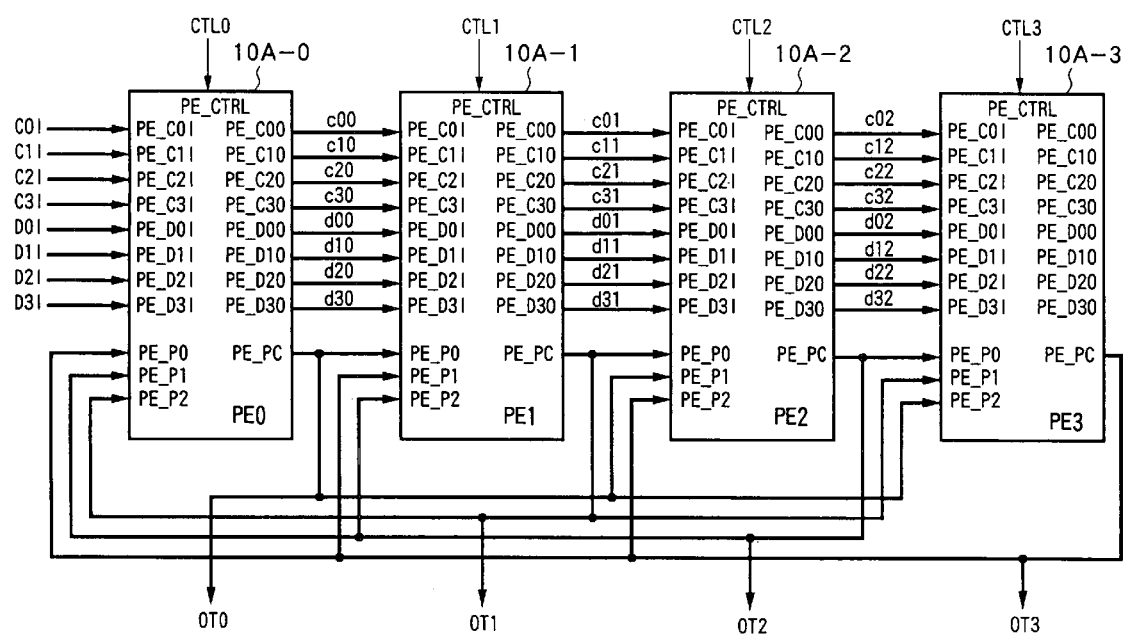
FIG. 4 is a view explaining the operation of the second embodiment and shows the configuration of hardware in the arithmetic device of FIG. 3 when n=4.

Next, the operation of the second embodiment will be explained taking as an example the case of a number of cascade connected arithmetic devices of 4 (n=4) as shown in FIG. 4.

Each of the arithmetic devices 10A-0 to 10A-3 has the configuration shown in FIG. 2. Therefore, the operation will be explained with reference to FIG. 2 and FIG. 4.

Note that, here, an explanation will be given taking as an example the following operations.

$$out = a*x + b*y + c*z + d*w$$

Further, the coefficient inputs C0I, C1I, C2I, C3I to the arithmetic device 10A-0 are made a, b, c, d, while the data inputs D0I, D1I, D2I, D3I are made x, y, z, w.

First, the arithmetic device 10A-0 is controlled in accordance with the control signal CTL0 to perform processing giving the operation result signal OT0=a*x.

In this case, in the arithmetic device 10A-0, the control signal ASEL is set so as to select the coefficient input C0I(a) and is supplied to the first selection device 11.

Further, the control signal BSEL is set so as to select the data input D0I(x) and is supplied to the second selection device 12.

Due to this, the first selection device 11 outputs the coefficient a as the signal asel_out to the ALU 14 and MAC 15. Further, the second selection device 12 outputs the data x as the signal bsel_out to the ALU 14 and MAC 15.

At this time, the control signal MACMD designating multiplication is supplied to the MAC 15. Due to this, the MAC 15 multiplies the coefficient a and data x and outputs the result a*x as the signal mac_out to the fourth selection device 16.

Further, the control signal ESEL is set so as to select the output of the MAC 15 and supplied to the fourth selection device 16. As a result, the fourth selection device 16 selects the output signal mac_out (a*x) of the MAC 15 and outputs it as the signal esel_out (a*x) to the register 17.

The register 17 stores the operation results a*x of the MAC 15 and outputs the stored data from the operation output terminal PE_C as the operation result signal OT0 to the cascade Input PE_P0 of the arithmetic device 10A-1, the cascade input PE_P1 of the arithmetic device 10A-2, and the cascade input PE_P2 of the arithmetic device 10A-3.

The arithmetic device 10A-0 outputs the coefficients a, b, c, d delayed by exactly the desired amount of delay by the C0FIFO18-0 to C3FIFO18-3 from the coefficient output terminals PE_C0O to PE_C3O as the coefficient outputs c00 to c30 to the coefficient input terminals PE_C0I to PE_C3I of the arithmetic device 10A-1 of the next stage and outputs the data x, y, z, w delayed by exactly the desired amount of delay by the D0FIFO19-0 to D3FIFO19-3 from the data output terminals PE_D0O to PE_D3O as the data outputs d00 to d30 to the data input terminals PE_D0I to PE_D3I of the arithmetic device 10A-1 of the next stage.

Next, the arithmetic device 10A-1 is controlled in accordance with the control signal CTL1 to perform processing giving the operation result signal OT1=OT0+b*y=a*x+b*y.

In this case, the control signal ASEL is set so as to select the coefficient output c10(b) of the arithmetic device 10A-0 supplied to the coefficient input terminal PE_C1I and is supplied to the first selection device 11.

Further, the control signal BSEL is set so as to select the data output d10(y) of the arithmetic device 10A-0 supplied to the coefficient input terminal PE_D1I and is supplied to the second selection device 12.

Further, the control signal CSEL is set so as to select operation result signal OT0 (a*x) of the arithmetic device 10A-0 supplied to the cascade input terminal PE_P0 and is supplied to the third selection device 13.

Due to this, the first selection device 11 outputs the coefficient b as the signal asel_out to the ALU 14 and MAC 15. Further, the second selection device 12 outputs the data y as the signal bsel_out to the ALU 14 and MAC 15. Further, the third selection device 13 outputs the cascade input data a*x as the signal csel_out to the first selection device 11, ALU 14, and MAC 15.

At this time, the control signal MACMD designating multiplication and addition is supplied to the MAC 15. Due to this, the MAC 15 multiplies the coefficient b and the data y and adds the results b*y and a*x. Due to this, the MAC 15 outputs the multiplication and addition result a*x+b*y as the signal mac_out to the fourth selection device 16.

Further, the control signal ESEL is set so as to select the output of the MAC 15 and is supplied to the fourth selection device 16. As a result, the fourth selection device 16 selects the output signal mac_out (a*x+b*y) of the MAC 15 and outputs it as the signal esel_out (a*x+b*y) to the register 17.

The register 17 stores the operation results a*x+b*y of the MAC 15 and outputs the stored data from the operation output terminal PE_C as the operation result signal OT1 to the cascade input PE_P2 of the arithmetic device 10A-0, the cascade input PE_P0 of the arithmetic device 10A-2, and the cascade input PE_P1 of the arithmetic device 10A-3.

The arithmetic device 10A-1 outputs the coefficients a, b, c, d delayed by exactly the desired amount of delay by the C0FIFO18-0 to C3FIFO18-3 from the coefficient output terminals PE_C0O to PE_C3O as the coefficient outputs c01 to c31 to the coefficient input terminals PE_C0I to PE_C3I of the arithmetic device 10A-2 of the next stage and outputs the data x, y, z, w delayed by exactly the desired amount of delay by the D0FIFO19-0 to D3FIFO19-3 from the data output terminals PE_D0O to PE_D3O as the data outputs d01 to d31 to the data input terminals PE_D0I to PE_D3I of the arithmetic device 10A-2 of the next stage.

Next, the arithmetic device 10A-2 is controlled in accordance with the control signal CTL2 to perform processing giving the operation result signal OT2=OT1+c*z=a*x+b*y+c*z.

In this case, the control signal ASEL is set so as to select the coefficient output c21(c) of the arithmetic device 10A-1 supplied to the coefficient input terminal PE_C2I and is supplied to the first selection device 11.

Further, the control signal BSEL is set so as to select the coefficient output c21(z) of the arithmetic device 10A-1 supplied to the data input terminal PE_D2I and is supplied to the second selection device 12.

Further, the control signal CSEL is set so as to select the operation result signal OT1 ($a*x+b*y$) of the arithmetic device 10A-1 supplied to the cascade input terminal PE_P0 and is supplied to the third selection device 13.

Due to this, the first selection device 11 outputs the coefficient c as the signal asel_out to the ALU 14 and MAC 15. Further, the second selection device 12 outputs the data z as the signal bsel_out to the ALU 14 and MAC 15. Further, the third selection device 13 outputs the cascade input data $a*x+b*y$ as the signal csel_out to the first selection device 11, ALU 14, and MAC 15.

At this time, the control signal MACMD designating multiplication and addition is supplied to the MAC 15. Due to this, the MAC 15 multiplies the coefficient c and data z and adds the result $c*z$ and ($a*x+b*y$). Due to this, the MAC 15 outputs the multiplication and addition result $a*x+b*y+c*z$ as the signal mac_out to the fourth selection device 16.

Further, the control signal ESEL is set so as to select the output of the MAC 15 and is supplied to the fourth selection device 16. As a result, the fourth selection device 16 selects the output signal mac_out ($a*x+b*y+c*z$) of the MAC 15 and outputs it as the signal esel_out ($a*x+b*y+c*z$) to the register 17.

The register 17 stores the operation results $a*x+b*y+c*z$ of the MAC 15 and outputs the stored data from the operation output terminal PE_C as the operation result signal OT2 to the cascade input PE_P1 of the arithmetic device 10A-0, the cascade input PE_P2 of the arithmetic device 10A-2, and the cascade input PE_P0 of the arithmetic device 10A-3.

The arithmetic device 10A-2 outputs the coefficients a, b, a, d delayed by exactly the desired amount of delay at the C0FIFO18-0 to C3FIFO18-3 from the coefficient output terminals PE_C0O to PE_C3O as the coefficient outputs c02 to c32 to the coefficient input terminals PE_C0I to PE_C3I of the arithmetic device 10A-3 of the next stage and outputs the data x, y, z, w delayed by exactly the desired amount of delay at the D0FIFO19-0 to D3FIFO19-3 from the data output terminals PE_D0O to PE_D3O as the data outputs d02 to d32 to the data input terminals PE_D0I to PE_D3I of the arithmetic device 10A-3 of the next stage.

Next, the arithmetic device 10A-3 is controlled in accordance with the control signal CTL3 to perform processing giving the operation result signal OT3=OT2+$d*w$=$a*x+b*y+c*z+d*w$.

In this case, the control signal ASEL is set so as to select the coefficient output c32($d$) of the arithmetic device 10A-2 supplied to the coefficient input terminal PE_C3I and is supplied to the first selection device 11.

Further, the control signal BSEL is set so as to select the coefficient output c32($w$) of the arithmetic device 10A-2 supplied to the coefficient input terminal PE_D3I and is supplied to the second selection device 12.

Further, the control signal CSEL is set so as to select the operation result signal OT2 ($a*x+b*y+c*z$) of the arithmetic device 10A-2 supplied to the cascade input terminal PE_P0 and is supplied to the third selection device 13.

Due to this, the first selection device 11 outputs the coefficient d as the signal asel_out to the ALU 14 and MAC 15. Further, the second selection device 12 outputs the data w as the signal bsel_out to the ALU 14 and MAC 15. Further, the third selection device 13 outputs the cascade input data $a*x+b*y+c*z$ as the signal csel_out to the first selection device 11, ALU 14, and MAC 15.

At this time, the control signal MACMD designating multiplication and addition is supplied to the MAC 15. Due to this, the MAC 15 multiplies the coefficient d and data w and adds the result $d*w$ and ($a*x+b*y+c*z$). Due to this, the MAC 15 outputs the multiplication and addition result $a*x+b*y+c*z+d*w$ as the signal mac_out to the fourth selection device 16.

Further, the control signal ESEL is set so as to select the output of the MAC 15 and is supplied to the fourth selection device 16. As a result, the fourth selection device 16 selects the output signal mac_out ($a*x+b*y+c*z+d*w$) of the MAC 15 and outputs it as the signal esel_out ($a*x+b*y+c*z+d*w$) to the register 17.

The register 17 stores the operation results $a*x+b*y+c*z+d*w$ of the MAC 15 and outputs the stored data from the operation output terminal PE_C as the operation result signal OT3 as the desired operation results out, and outputs it to the cascade input PE_P0 of the arithmetic device 10A-0, the cascade input PE_P1 of the arithmetic device 10A-2, and the cascade input PE_P2 of the arithmetic device 10A-2.

In the above, in FIG. 2, the delay control signals C0DL, C1DL, C2DL, C3DL shown in FIG. 4 are supplied to the C0FIFO18-0 to C3FIFO18-3 to all become the delay 0.

Further, the delay control signal D0DL is supplied to the D0FIFO19-0 to become the delay 0, the delay control signal D1DL is supplied to the D1FIFO19-1 to become the delay 1, the delay control signal D2DL is supplied to the D2FIFO19-2 to become the delay 2, and the delay control signal D3DL is supplied to the D3FIFO19-3 to become the delay 3.

As explained above, according to the second embodiment, since provision is made of a plurality of arithmetic devices 10-0 to 10-n−1 each having the first selection device 11 for selecting the coefficient inputs C0I, C1I, . . . , CkI and the data 0 in accordance with the control signal ASEL, the second selection device 12 for selecting the data inputs D0I, D1I, . . . , DmI in accordance with the control signal BSEL, the third selection device 13 for selecting the cascade inputs P0, P1, . . . , Pn−2 and the data 0 in accordance with the control signal CSEL, the ALU 14 for receiving as input the output signal asel_out of the first selection device 11, the output signal bsel_out of the second selection device 12, and the output signal csel_out of the third selection device 13 and perform a logic operation in accordance with instructions of the control signals ALUMD, RNDMD, SATMD, OSFMD, ACCMD, the MAC 15 for receiving as input the output signal asel_out of the first selection device 11, the output signal bsel_out of the second selection device 12, and the output signal csel_out of the third selection device 13 and performing operations in accordance with instructions of the control signals MACMD, RNDMD, SATMD, OSFMD, ACCMD, the fourth selection device 16 for selecting one of the output signal alu_out of the ALU 14 and the output signal mac_out of the MAC 15 in accordance with the control signal ESEL, C0FIFO18-0 to CkFIFO18-k able to give delay of any cycles according to values of the delay control signals C0DL to CkDL and delaying coefficient inputs by cycles in accordance with the values of the delay control signals C0DL to CkDL to obtain the coefficient outputs and output them to the device of the next stage, and D0FIFO19-0 to DmFIFO19-m able to give delay of any cycles according to values of the delay control signals D0DL to DmDL and delaying data inputs by cycles in accordance with the values of the delay control signals D0DL to DmDL to obtain the data outputs and output them to the device of the next stage and since the inputs and outputs of the coefficients and data of the arithmetic devices 10-0 to 10-n−1 are connected in cascade and the operation result signals OT0 to OTn−1 of the arithmetic devices are supplied as cascade input PE_P0, PE_P1, . . . PE_Pn−2 of the other devices, the arithmetic devices themselves can be reconfigured from the outside.

Therefore, according to the second embodiment, in the same way as the above first embodiment, there is the advantage that it is possible to realize an arithmetic device which can optimize the logic level of course and prevent an increase of the component data and prevent deterioration of the area efficiency as an integrated circuit.

Further, since an arithmetic device can be reconfigured, it is possible to realize not only cascade processing, but also parallel processing by the same hardware. Therefore, it is possible to increase the number of arithmetic devices and efficiently execute more parallel processable processing.

Further, while it was necessary to rewrite data temporarily in registers to obtain the operation results when performing the operation of MEMW=ax+by+cz+dw by a DSP having one or two MACs or ALUs, according to the second embodiment, operation of MEMW at one time becomes possible by allocating the operations of ax, by, cz, dw to the arithmetic devices and connecting the operation results of the previous stages in cascade.

Therefore, the number of cycles of execution becomes shorter. Further, there is the advantage that it is possible to keep down the consumption of power since there are less temporary accesses to the registers.

Third Embodiment

Figure 5:
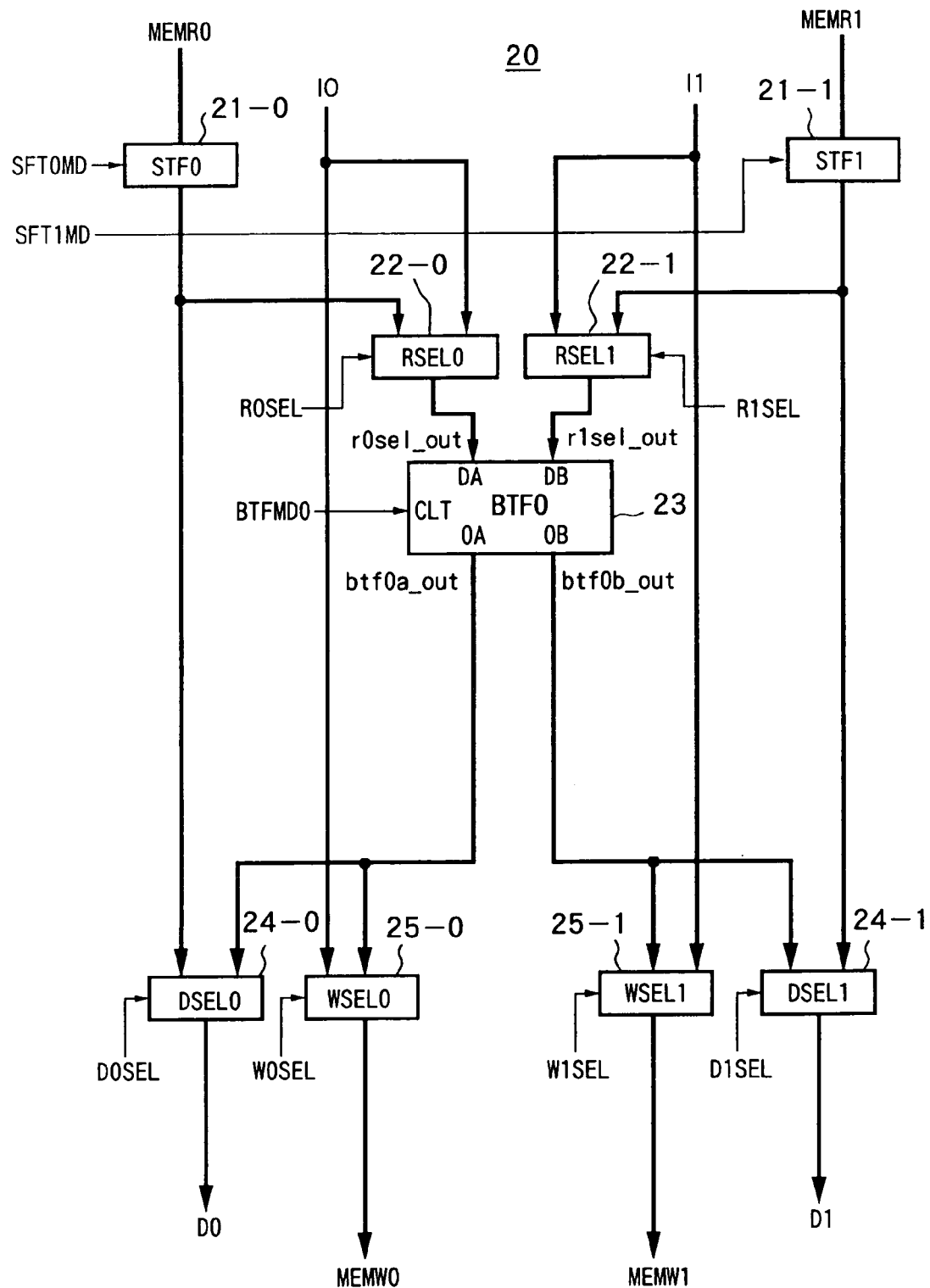
FIG. 5 is a view of the configuration showing a third embodiment of an arithmetic device according to the present invention.

FIG. 5 is a view of the configuration showing a third embodiment according to the present invention.

The arithmetic device 20 of FIG. 5 is an arithmetic device reconfigurable based on component data, performs four-input, four-output processing, and can be configured to simultaneously execute butterfly operation and shift operation.

The arithmetic device 20 has a shift computing unit (SFT0) 21-0 and shift computing unit (SFT1) 21-1 as a monadic arithmetic means, input selection device (RSEL0) 22-0, input selection device (RSEL1) 22-1, two-input, two-output butterfly computing unit (BTF0) 23, output selection device (DSEL0) 24-0, output selection device (DSEL1) 24-1, output selection device (WSEL0) 25-0, and output selection device (WSEL1) 25-1.

Further, the arithmetic device 20 has data inputs MEMR0, MEMR1, I0, I1, and data outputs MEMW0, MEMW1, D0, D1 and is supplied with control signals for reconfiguration BTFMD0, R0SEL, R1SEL, W0SEL, W1SEL, D0SEL, D1SEL.

The shift computing unit 21-0 performs monadic operation on the value of the data input MEMR0 in accordance with the control signal SFT0MD, specifically processing for shifting to the left or right by any bits in accordance with the value (amount of shift) shown by the control signal SFT0MD, and outputs the result to the input selection device 22-0 and output selection device 24-0. Note that the shift computing unit 21-0 does not perform shift operation and outputs the data input MEMR0 as it is when for example the amount of shift shown by the control signal SFT0MD is zero.

The shift computing unit 21-1 performs monadic operation on the value of the data input MEMR1 in accordance with the control signal SFT1MD, specifically processing for shifting to the left or right by any bits in accordance with the value (amount of shift) shown by the control signal SFT1MD, and outputs the result to the input selection device 22-1 and output selection device 24-1. Note that the shift computing unit 21-1 does not perform shift operation and outputs the data input MEMR1 as it is when for example the amount of shift shown by the control signal SFT1MD is zero.

The input selection device 22-0, in accordance with the control signal R0SEL, selects one of the output data of the shift computing unit 21-0 and data input I0 and outputs it as the signal r0sel_out to the butterfly computing unit 23.

The input selection device 22-1, in accordance with the control signal R1SEL, selects one of the output data of the shift computing unit 21-1 and data input I1 and outputs it as the signal r1sel_out to the butterfly computing unit 23.

The butterfly computing unit 23 inputs to the input terminal DA the output signal r0sel_out of the input selection device 22-0, inputs to the input terminal DB the output signal r1sel_out of the input selection device 22-1, performs operation in accordance with instructions of the control signal BTFMD0 supplied to the control terminal CTL to obtain two operation results, outputs one of the operation results from the output terminal OA as the signal btf0a_out to the output selection devices 24-0 and 25-0, and outputs the other of the operation results from the output terminal OB as the signal btf0b_out to the output selection devices 24-1 and 25-1.

Specifically, the butterfly computing unit 23 performs one of the following operations in accordance with the value of the control signal BTFMD0:

btf0a_out=r1sel_out, btf0b_out=r0sel_out btf0a_out=r1sel_out, btf0b_out=−r0sel_out btf0a_out=−r1sel_out, btf0b_out=r0sel_out btf0a_out=−r1sel_out, btf0b_out=−r0sel_out btf0a_out=r0sel_out, btf0b_out=r1sel_out btf0a_out=r0sel_out, btf0b_out=−r1sel_out btf0a_out=−r0sel_out, btf0b_out=r1sel_out btf0a_out=−r0sel_out, btf0b_out=−r1sel_out btf0a_out=r0sel_out+r1sel_out, btf0b_out=r0sel_out−r1sel_out btf0a_out=r0sel_out+r1sel_out, btf0b_out=r1sel_out−r0sel_out btf0a_out=r0sel_out−r1sel_out, btf0b_out=r0sel_out+r1sel_out btf0a_out=r1sel_out−r0sel_out, btf0b_out=r0sel_out+r1sel_out The output selection device 24-0, in accordance with the control signal D0SEL, selects one of the output signal of the shift computing unit 21-0 (for example MEMR0) and the output signal btf0a_out of the buterfly computing unit 23 and outputs it as the signal D0.

The output selection device 24-1, in accordance with the control signal D1SEL, selects one of the output signal (for example MEMR1) of the shift computing unit 21-1 and output signal btf0b_out of the buterfly computing unit 23 and outputs it as the signal D1.

The output selection device 25-0, in accordance with the control signal W0SEL, outputs one of the data input I0 and the output signal btf0a_out of the buterfly computing unit 23 and outputs it as the signal MEMW0.

The output selection device 25-1, in accordance with the control signal W1SEL, selects one of the data input I1 and the output signal btf0b_out of the butterfly computing unit 23 and outputs it as the signal MEMW1.

Next, the operation according to the above configuration will be explained.

Here, the following operations are executed:

D0-MEMR0,

D1=MEMR0−MEMR1,

MEMW0=MEMR0+MEMR1,
MEMW1=I1

For example, the amounts of shift of the shift computing units 21-0, 21-1 are set to zero by the control signals SFT0MD, SFT1MD.

Therefore, the output of the shift computing unit 21-0 becomes MEMR0 and is supplied to the input selection device 22-0 and output selection device 24-0.

Similarly, the output of the shift computing unit 21-1 becomes MEMR1 and is supplied to the input selection device 22-1 and output selection device 24-1.

The input selection device 22-0 is controlled in accordance with the control signal R0SEL to select the output signal, that is, MEMR0, of the shift computing unit 21-0. The selected data MEMR0 is supplied as the signal r0sel_out to the input terminal DA of the butterfly computing unit 23.

Further, the input selection device 22-1 is controlled in accordance with the control signal R1SEL to select the output signal of the shift computing unit 21-1, that is, MEMR1. The selected data MEMR1 is supplied as the signal r1sel_out to the input terminal DB of the butterfly computing unit 23.

The butterfly computing unit 23 is set by the control signal BTFMD0 supplied to the control terminal CTL to a mode where OA=DA+DB, OB=DA−DB are calculated.

Due to this, the butterfly computing unit 23 adds the data MEMR0 supplied to the input terminal DA and the data MEMR1 supplied to the input terminal DB and outputs the result, that is, (MEMR0+MEMR1), from the output terminal OA as the signal btf0a_out to the output selection devices 24-0 and 25-0.

Further, the butterfly computing unit 23 finds the difference between the data MEMR0 supplied to the input terminal DA and the data MEMR1 supplied to the input terminal DB and outputs the result, that is, (MEMR0−MEMR1), from the output terminal OB as the signal btf0b_out to the output selection devices 24-1 and 25-1.

The output selection device 24-0 is supplied with the control signal D0SEL so as to select the output signal (MEMR0) of the shift computing unit 21-0 from the output signal (MEMR0) of the shift computing unit 21-0 and the output signal btf0a_out (=MEMR0+MEMR1) of the butterfly computing unit 23. The data selected by this is output as the signal D0=MEMR0.

The output selection device 25-0 is supplied with the control signal W0SEL so as to select the output signal btf0a_out of the butterfly computing unit 23 from the data input I0 and the output signal btf0a_out (=MEMR0+ MEMR1) of the butterfly computing unit 23. The data selected by this is output as the signal MEMW0=MEMR0+ MEMR1.

Further, the output selection device 25-1 is supplied with the control signal W1SEL so as to select the data input I1 from the data input I1 and the output signal btf0b_out (=MEMR0−MEMR1) of the butterfly computing unit 23. The data selected by this is output as the signal MEMW1=I1.

The output selection device 24-1 is supplied with the control signal D1SEL so as to select the output signal btf0b_out of the butterfly computing unit 23 from the output signal (MEMR1) of the shift computing unit 21-1 and the output signal btf0b_out (=MEMR0−MEMR1) of the butterfly computing unit 23. The data selected by this is output as the signal D1=MEMR0−MEMR1.

As explained above, according to the third embodiment, since provision is made of a shift computing unit 21-0 for performing operation for shifting the value of the data input MEMR0 to the left or right by any bits in accordance with a value shown by the control signal SFT0MD, a shift computing unit 21-1 for performing operation for shifting the value of the data input MEMR1 to the left or right by any bits in accordance with a value shown by the control signal SFT1MD, an input selection device 22-0 for selecting one of the output data of the shift computing unit 21-0 and the data input I0 in accordance with the control signal R0SEL and outputting it as the signal r0sel_out, an input selection device 22-1 for selecting one of the output data of the shift computing unit 21-1 and data input I1 in accordance with the control signal R1SEL and outputting it as the signal r1sel_out, a butterfly computing unit 23 receiving as input at the input terminal DA the output signal r0sel_out of the input selection device 22-0, receiving as input at the input terminal DB the output signal r1sel_out of the input selection device 22-1, performs operation in accordance with the control signal BTFMD0 supplied to the control terminal CTL to obtain two operation results, outputs one of the operation results from the output terminal OA as the signal btf0a_out to the output selection devices 24-0 and 25-0, and outputs the other of the operation results from the output terminal OB as the signal btf0b_out to the output selection devices 24-1 and 25-1, an output selection device 24-0 for selecting one of the output signal of the shift computing unit 21-0 and the output signal btf0a_out of the butterfly computing unit 23 in accordance with the control signal D0SEL and outputting it as the signal D0, an output selection device 24-1 for selecting one of the output signal of the shift computing unit 21-1 and the output signal btf0b_out of the butterfly computing unit 23 in accordance with the control signal D1SEL and outputting it as the signal D1, an output selection device 25-0 for selecting one of the data input I0 and the output signal btf0a_out of the butterfly computing unit 23 in accordance with the control signal W0SEL and outputting it as the signal MEMW0, and an output selection device 25-1 for selecting one of the data input I1 and the output signal btf0b_out of the butterfly computing unit 23 in accordance with the control signal W1SEL and outputting it as the signal MEMW1, the following effects can be obtained.

In the case of butterfly operation or other multiple input, multiple output operation, it is possible to simultaneously perform processing such as y0=x0+x1, y1=x0−x1.

Therefore, it is sufficient to read out as input data x0 and x1 one time each. Therefore, there is the advantage of a high efficiency of access to the memories/registers.

Further, unlike with dedicated hardware, there is the advantage that it is possible to easy realize a configuration enabling flexible calculation of not only y0=x0+x1 and y1=x0−x1, but also y0=x0+x+x2+x3.

Further, since the arithmetic device itself can be reconfigured from the outside, there is the advantage that it is possible to realize an arithmetic device which can not only optimize the logic level but also prevent an increases in the component data and prevent a drop in the area efficiency as an integrated circuit.

Fourth Embodiment

Figure 6:
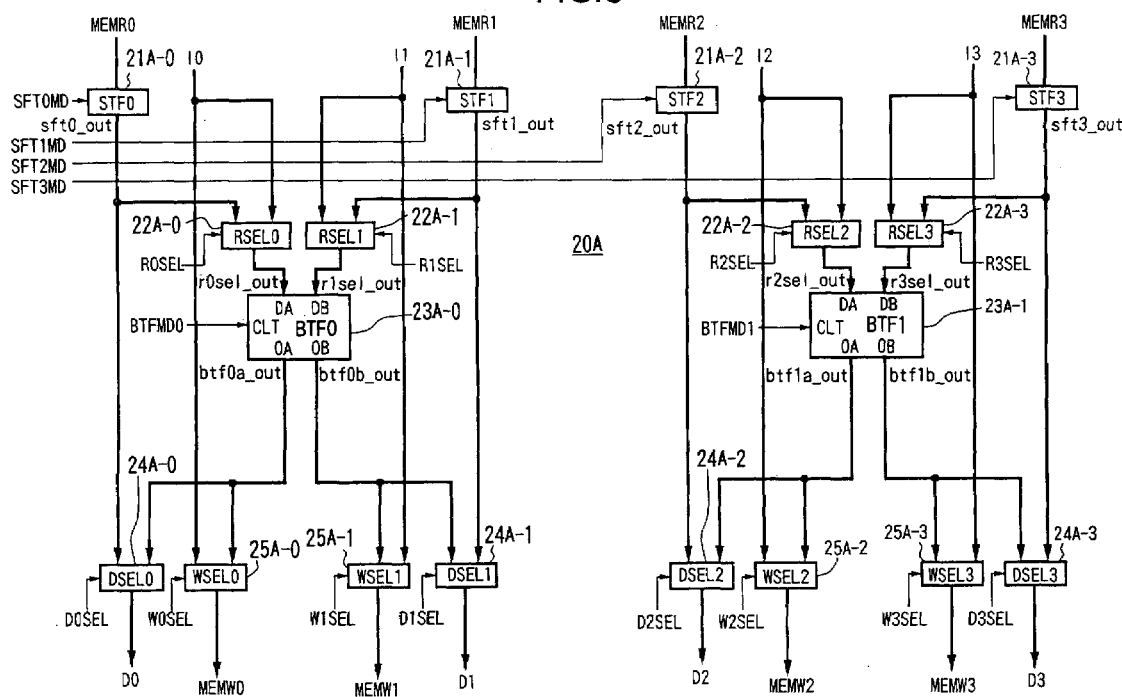
FIG. 6 is a view of the configuration showing a fourth embodiment of an arithmetic device according to the present invention.

FIG. 6 is a view of the configuration showing a fourth embodiment according to the present invention.

The arithmetic device 20A of FIG. 6 is an arithmetic device reconfigurable based on component data which performs 8-input, 8-output operation and can simultaneously execute butterfly operation and shift operation.

The arithmetic device 20A has a shift computing unit (SFT0) 21A-0, shift computing unit (SFT1) 21A-1, shift computing unit (SFT2) 21A-2, shift computing unit (SFT3)

21A-3, input selection device (RSEL0) 22A-0, input selection device (RSEL1) 22A-1, input selection device (RSEL2) 22A-2, input selection device (RSEL3) 22A-3, butterfly computing unit (BTF0) 23A-0, butterfly computing unit (BTF1) 23A-1, output selection device (DSEL0) 24A-0, output selection device (DSEL1) 24A-1, output selection device (DSEL2) 24A-2, output selection device (DSEL3) 24A-3, output selection device (WSEL0) 25A-0, output selection device (WSEL1) 25A-1, output selection device (WSEL2) 25A-2, and output selection device (WSEL3) 25A-3.

Further, the arithmetic device 20A has data inputs MEMR0, MEMR1, MEMR2, MEMR3, I0, I1, I2, I3, and data outputs MEMW0, MEMW1, MEMW2, MEMW3, D0, D1, D2, D3 and is supplied with control signals for reconfiguration control signals BTFMD0, BTFMD1, R0SEL, R1SEL, R2SEL, R3SEL, W0SEL, W1SEL, W2SEL, W3SEL, D0SEL, D1SEL, D2SEL, D3SEL.

The shift computing unit 21A-0 performs monadic operation on the value of the data input MEMR0 in accordance with a control signal SFT0MD, specifically operation for shifting to the left or right by any bits in accordance with the value (amount of shift) shown by the control signal SFT0MD, and outputs the result as the signal sft0_out to the input selection device 22A-0 and output selection device 24A-0. Note that the shift computing unit 21A-0 does not perform shift operation and outputs the data input MEMR0 as it is when for example the amount of shift of the control signal SFT0MD is zero.

The shift computing unit 21A-1 performs monadic operation on the value of the data input MEMR1 in accordance with a control signal SFT1MD, specifically operation for shifting to the left or right by any bits in accordance with the value (amount of shift) shown by the control signal SFT1MD, and outputs the result as the signal sft1_out to the input selection device 22A-1 and output selection device 24A-1. Note that the shift computing unit 21A-1 does not perform shift operation and outputs the data input MEMR1 as it is when for example the amount of shift of the control signal SFT1MD is zero.

The shift computing unit 21A-2 performs monadic operation on the value of the data input MEMR2 in accordance with a control signal SFT2MD, specifically operation for shifting to the left or right by any bits in accordance with the value (amount of shift) shown by the control signal SFT2MD, and outputs the result as the signal sft2_out to the input selection device 22A-2 and output selection device 24A-2. Note that the shift computing unit 21A-2 does not perform shift operation and outputs the data input MEMR2 as it is when for example the amount of shift of the control signal SFT2MD is zero.

The shift computing unit 21A-3 performs monadic operation on the value of the data input MEMR3 in accordance with a control signal SFT3MD, specifically operation for shifting to the left or right by any bits in accordance with the value (amount of shift) shown by the control signal SFT3MD, and outputs the result as the signal sft3_out to the input selection device 22A-3 and output selection device 24A-3. Note that the shift computing unit 21A-3 does not perform shift operation and outputs the data input MEMR3 as it is when for example the amount of shift of the control signal SFT3MD is zero.

The input selection device 22A-0, in accordance with the control signal R0SEL, selects one of the output data of the shift computing unit 21A-0 and the data input I0 and outputs it as the signal r0sel_out to the butterfly computing unit 23A-0.

The input selection device 22A-1, in accordance with the control signal R1SEL, selects one of the output data of the shift computing unit 21A-1 and the data input I1 and outputs it as the signal r1sel_out to the butterfly computing unit 23A-0.

The input selection device 22A-2, in accordance with the control signal R2SEL, selects one of the output data of the shift computing unit 21A-2 and the data input I2 and outputs it as the signal r2sel_out to the butterfly computing unit 23A-1.

The input selection device 22A-3, in accordance with the control signal R3SEL, selects one of the output data of the shift computing unit 21A-3 and the data input I3 and outputs it as the signal r3sel_out to the butterfly computing unit 23A-1.

The butterfly computing unit 23A-0 receives at the input terminal DA the output signal r0sel_out of the input selection device 22A-0, receives at the input terminal DB the output signal r1sel_out of the input selection device 22A-1, performs operation in accordance with instructions of the control signal BTFMD0 supplied to the control terminal CTL to obtain two operation results, outputs one of the operation results from the output terminal OA as the signal btf0a_out to the output selection devices 24A-0 and 25A-0, and outputs the other of the operation results from the output terminal OB as the signal btf0b_out to the output selection devices 24A-1 and 25A-1.

Specifically, the butterfly computing unit 23A-0 selectively performs one of the following operations in accordance with the value of the control signal BTFMD0:
btf0a_out=r1sel_out, btf0b_out=r0sel_out
btf0a_out=r1sel_out, btf0b_out=−r0sel_out
btf0a_out=−r1sel_out, btf0b_out=r0sel_out
btf0a_out=−r1sel_out, btf0b_out=−r0sel_out
btf0a_out=r0sel_out, btf0b_out=r1sel_out
btf0a_out=r0sel_out, btf0b_out=−r1sel_out
btf0a_out=−r0sel_out, btf0b_out=r1sel_out
btf0a_out=−r0sel_out, btf0b_out=−r1sel_out
btf0a_out=r0sel_out+r1sel_out, btf0b_out=r0sel_out−r1sel_out
btf0a_out=r0sel_out+r1sel_out, btf0b_out=r1sel_out−r0sel_out
btf0a_out=r0sel_out−r1sel_out, btf0b_out=r0sel_out+r1sel_out
btf0a_out=r1sel_out−r0sel_out, btf0b_out= r0sel_out+r1sel_out The butterfly computing unit 23A-1 receives at the input terminal DA the output signal r2sel_out of the input selection device 22A-2, receives at the input terminal DB the output signal r3sel_out of the input selection device 22A-3, performs operation in accordance with instructions of the control signal BTFMD1 supplied to the control terminal CTL to obtain two operation results, outputs one of the operation results from the output terminal OA as the signal btf1a_out to the output selection devices 24A-2 and 25A-2, and outputs the other of the operation results from the output terminal OB as the signal btf1b_out to the output selection devices 24A-3 and 25A-3.

Specifically, the butterfly computing unit 23A-1 selectively performs one of the following operations in accordance with the value of the control signal BTFMD1:
btf1a_out=r3sel_out, btf1b_out=r2sel_out
btf1a_out=r3sel_out, btf1b_out=−r2sel_out
btf1a_out=−r3sel_out, btf1b_out=r2sel_out
btf1a_out=−r3sel_out, btf1b_out=−r2sel_out
btf1a_out=r2sel_out, btf1b_out=r3sel_out
btf1a_out=r2sel_out, btf1b_out=−r3sel_out btf1a_out=−r2sel_out, btf1b_out=r3sel_out
btf1a_out=−r2sel_out, btf1b_out=−r3sel_out
btf1a_out=r2sel_out+r3sel_out,   btf1b_out=r2sel_out−r3sel_out
btf1a_out=r2sel_out+r3sel_out,   btf1b_out=r3sel_out−r2sel_out
btf1a_out=r2sel_out−r3sel_out,   btf1b_out=r2sel_out+r3sel_out
btf1a_out=r3sel_out−r2sel_out,   btf1b_out=r2sel_out+r3sel_out The output selection device 24A-0, in accordance with the control signal D0SEL, select one of the output signal sft0_out of the shift computing unit 21A-0 (for example MEMR0) and the output signal btf0a_out of the butterfly computing unit 23A-0 and outputs it as the signal D0.

The output selection device 24A-1, in accordance with the control signal D1SEL, selects one of the output signal sft1_out of the shift computing unit 21A-1 (for example MEMR1) and the output signal btf0b_out of the butterfly computing unit 23A-0 and outputs it as the signal D1.

The output selection device 24A-2, in accordance with the control signal D2SEL, selects one of the output signal sft2_out of the shift computing unit 21A-2 (for example MEMR2) and the output signal btf1a_out of the butterfly computing unit 23A-1 and outputs it as the signal D2.

The output selection device 24A-3, in accordance with the control signal D3SEL, selects one of the output signal sft3_out of the shift computing unit 21A-3 (for example MEMR3) and the output signal btf1b_out of the butterfly computing unit 23A-1 and outputs it as the signal D3.

The output selection device 25A-0, in accordance with the control signal W0SEL, selects one of the data input I0 and the output signal btf0a_out of the butterfly computing unit 23A-0 and outputs it as the signal MEMW0.

The output selection device 25A-1, In accordance with the control signal W1SEL, selects one of the data input I1 and the output signal btf0b_out of the butterfly computing unit 23A-0 and outputs it as the signal MEMW1.

The output selection device 25A-2, In accordance with the control signal W2SEL, selects one of the data input I2 and the output signal btf1a_out of the butterfly computing unit 23A-1 and outputs it as the signal MEMW2.

The output selection device 25A-3, in accordance with the control signal W3SEL, selects one of the data input I3 and the output signal btf1b_out of the butterfly computing unit 23A-1 and outputs it as the signal MEMW3.

Next, the operation according to the above configuration will be explained.

Here, the following operations are executed:
D1=MEMR0−MEMR1,
D3=MEMR2−MEMR3,
MEMW0=MEMR0+MEMR1,
MEMW2=MEMR2+MEMR3,
MEMW1=I1
MEMW3=I3 for example, the amounts of shift of the shift computing units 21A-0, 21A-1, 21A-2, 21A-3 are set to zero by the control signals SFT0MD, SFT1MD, SFT2MD, SFT3MD.

Therefore, the output signal sft0_out of the shift computing unit 21A-0 becomes MEMR0 and is supplied to the input selection device 22A-0 and output selection device 24A-0.

Similarly, the output signal sft1_out of the shift computing unit 21A-1 becomes MEMR1 and is supplied to the input selection device 22A-1 and output selection device 24A-1.

The output signal sft2_out of the shift computing unit 21A-2 becomes MEMR2 and is supplied to the input selection device 22A-2 and output selection device 24A-2.

Further, the output signal sft3_out of the shift computing unit 21A-3 becomes MEMR3 and is supplied to the input selection device 22A-3 and output selection device 24A-3.

The input selection device 22A-0 is controlled by the control signal R0SEL so as to select the output signal of the shift computing unit 21A-0, that is, MEMR0. The selected data MEMR0 is supplied as the signal r0sel_out to the input terminal DA of the butterfly computing unit 23A-0.

The input selection device 22A-1 is controlled by the control signal R1SEL so as to select the output signal of the shift computing unit 21A-1, that is, MEMR1. The selected data MEMR1 is supplied as the signal r1sel_out to the input terminal DB of the butterfly computing unit 23A-0.

Further, the input selection device 22A-2 is controlled by the control signal R2SEL so as to select the output signal of the shift computing unit 21A-2, that is, MEMR2. The selected data MEMR2 is supplied as the signal r2sel_out to the input terminal DA of the butterfly computing unit 23A-1.

The input selection device 22A-3 is controlled by the control signal R3SEL so as to select the output signal of the shift computing unit 21A-3, that is, MEMR3. The selected data MEMR3 is supplied as the signal r3sel_out to the input terminal DB of the butterfly computing unit 23A-1.

The butterfly computing unit 23A-0 is set by the control signal BTFMD0 supplied to the control terminal CTL to a mode in which OA=DA+DB, OB=DA−DB are calculated.

Due to this, the butterfly computing unit 23A-0 adds the data MEMR0 supplied to the input terminal DA and the data MEMR1 supplied to the input terminal DB and outputs the result, that is (MEMR0+MEMR1), from the output terminal OA as the signal btf0a_out to the output selection devices 24A-0 and 25A-0.

Further, the butterfly computing unit 23A-0 finds the difference between the data MEMR0 supplied to the input terminal DA and the data MEMR1 supplied to the input terminal DB and supplies the result, that is (MEMR0−MEMR1), from the output terminal OB as the signal btf0b_out to the output selection devices 24A-1 and 25A-1.

Similarly, the butterfly computing unit 23A-1 is set by the control signal BTFMD1 supplied to the control terminal CTL to a mode where OA=DA+DB, OB=DA−DB are calculated.

Due to this, the butterfly computing unit 23A-1 adds the data MEMR2 supplied to the input terminal DA and the data MEMR3 supplied to the input terminal DB and outputs the result, that is (MEMR2+MEMR3), from the output terminal OA as the signal btf1a_out to the output selection devices 24A-2 and 25A-2.

Further, the butterfly computing unit 23A-1 finds the difference between the data MEMR2 supplied to the input terminal DA and the data MEMR3 supplied to the input terminal DB and outputs the result, that is (MEMR2−MEMR3), from the output terminal OB as the signal btf1b_out to the output selection devices 24A-3 and 25A-3.

The output selection device 24A-1 is supplied with the control signal D1SEL so as to select the output signal btf0b_out of the butterfly computing unit 23A-0 from the output signal of the shift computing unit 21A-1 (MEMR1) and the output signal btf0b_out of the butterfly computing unit 23A-0 (=MEMR0−MEMR1). The data selected by this is output as the signal D1=MEMR0−MEMR1.

Further, the output selection device 25A-0 is supplied with the control signal W0SEL so as to select the output signal btf0a_out of the butterfly computing unit 23A-0 from the data input I0 and the output signal btf0a_out of the butterfly computing unit 23A-0 (=MEMR0+MEMR1). The data selected by this is output as the signal MEMW0=MEMR0+MEMR1.

Further, the output selection device 25A-1 is supplied with the control signal W1SEL so as to select the data input I1 from the data input I1 and the output signal btf0b_out of the butterfly computing unit 23A-0 (=MEMR0−MEMR1). The data selected by this is output as the signal MEMW1=I1.

Further, the output selection device 24A-3 is supplied with the control signal D3SEL so as to select the output signal btf1b_out of the butterfly computing unit 23B-1 from the output signal (MEMR3) of the shift computing unit 21A-3 and the output signal btf1b_out of the butterfly computing unit 23A-1 (=MEMR2−MEMR3). The data selected by this is output as the signal D3=MEMR2−MEMR3.

Further, the output selection device 25A-2 is supplied with the control signal W2SEL so as to select the output signal btf1a_out of the butterfly computing unit 23A-1 from the data input I2 and the output signal btf1a_out of the butterfly computing unit 23A-1 (=MEMR2+MEMR3). The data selected by this is output as the signal MEMW2=MEMR2+MEMR3.

Further, the output selection device 25A-3 is supplied with the control signal W3SEL so as to select the data input I3 from among the data input I3 and the output signal btf1b_out of the butterfly computing unit 23A-1 (=MEMR2−MEMR3). The data selected by this is output as the signal MEMW3=I3.

According to the 8-input, 8-output arithmetic device 20A according to the fourth embodiment, it is possible to obtain effects similar to the effects of the above third embodiment.

Fifth Embodiment

Figure 7:
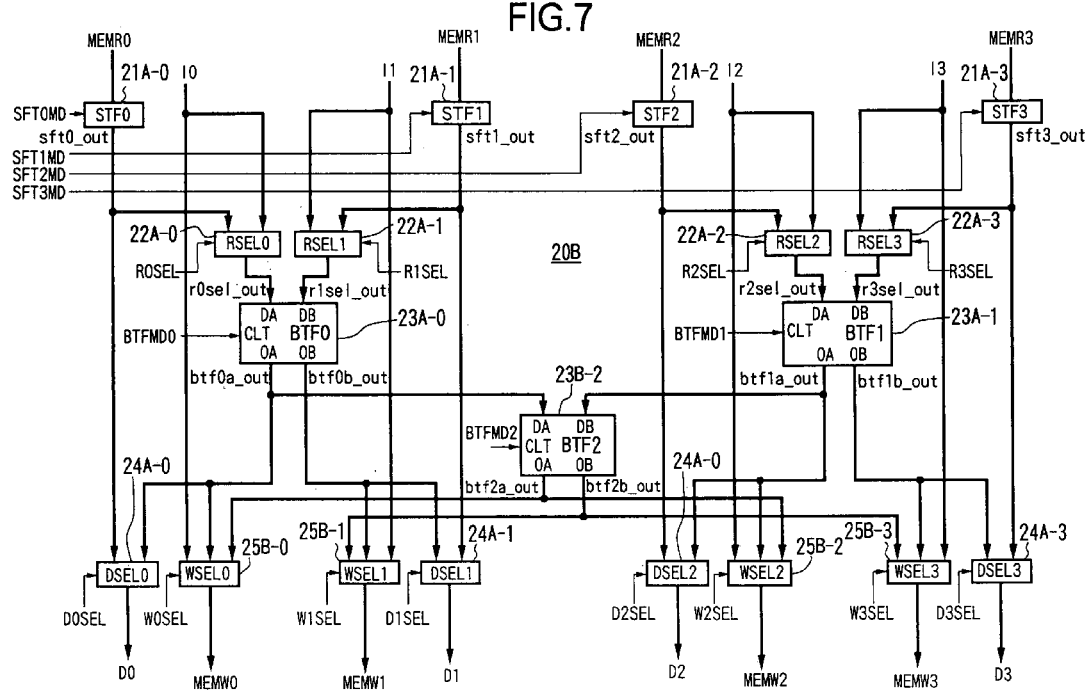
FIG. 7 is a view of the configuration showing a fifth embodiment of an arithmetic device according to the present invention.

FIG. 7 is a view of the configuration showing a fifth embodiment according to the present invention.

The fifth embodiment differs from the above fourth embodiment in the point that it provides butterfly computing units 23B-2 each receiving as input at an input terminal DA the output signal btf0a_out of the butterfly computing unit 23A-0, receives as input at the input terminal DB the output signal btf1a_out of the butterfly computing unit 23A-1, performs operation in accordance with instructions of a control signal BTFMD2 supplied to the control terminal CTL to obtain two operation results, outputs one of the operation results from the output terminal OA as the signal btf2a_out to the output selection devices 25B-0 and 25B-2, outputs the other of the operation results from the output terminal OB as the signal btf2b_out to the output selection devices 25B-1 and 25B-3, arranges three butterfly computing units in multiple stages, and connects them in a tree shape.

Note that, the butterfly computing unit 23B-2 according to the fifth embodiment selectively performs one of the following operations in accordance with the value of the control signal BTFMD2:

btf2a_out=btf0a_out, btf2b_out=btf1a_out
btf2a_out=btf0a_out, btf2b_out=−btf1a_out
btf2a_out=−btf0a_out, btf2b_out=btf1a_out
btf2a_out=−btf0a_out, btf2b_out=−btf1a_out
btf2a_out=btf0a_out, btf2b_out=btf1a_out
btf2a_out=btf0a_out, btf2b_out=−btf1a_out
btf2a_out=−btf0a_out, btf2b_out=btf1a_out
btf2a_out=−btf0a_out, btf2b_out=−btf1a_out
btf2a_out=btf1a_out+btf0a_out, btf2b_out=btf1a_out−btf0a_out
btf2a_out=btf1a_out+btf0a_out, btf2b_out=btf0a_out−btf1a_out
btf2a_out=btf1a_out−btf0a_out, btf2b_out=btf1a_out+btf0a_out
btf2a_out=btf0a_out−btf1a_out, btf2b_out=btf1a_out+btf0a_out Further, in the fifth embodiment, the output selection devices 25B-0 to 25B-3 are configured to select one data from among the three input data in accordance with the control signals W0SEL to W3SEL and output them as the signals MEMW0 to MEMW3.

The output selection device 25B-0, in accordance with the control signal W0SEL, selects one of the data input I0, the output signal btf0a_out of the butterfly computing unit 23A-0, and the output signal btf2a_out of the butterfly computing unit 23B-2 and outputs it as the signal MEMW0.

The output selection device 25B-1, in accordance with the control signal W1SEL, selects one of the data input I1, the output signal btf0b_out of the butterfly computing unit 23A-0, and output signal btf2b_out of the butterfly computing unit 23B-2 and outputs it as the signal MEMW1.

The output selection device 25B-2, in accordance with the control signal W2SEL, selects one of the data input I2, the output signal btf1a_out of the butterfly computing unit 23A-1, and the output signal btf2a_out of the butterfly computing unit 23B-2 and outputs it as the signal MEMW2.

The output selection device 25B-3, in accordance with the control signal W3SEL, selects one of the data input I3, the output signal btf1b_out of the butterfly computing unit 23A-1, and the output signal btf2b_out of the butterfly computing unit 23B-2 and outputs it as the signal MEMW3.

The rest of the configuration and functions are similar to those of FIG. 6 according to the fourth embodiment, so in FIG. 7, portions the same as those in FIG. 6 will be indicated by the same reference numerals.

In this configuration, for example when the output signal btf0a_out of the butterfly computing unit 23A-0 is (MEMR0+MEMR1) and the output signal btf1a_out of the butterfly computing unit 23A-1 is (MEMR2+MEMR3), for example the output signal btf2a_out of the butterfly computing unit 23B-2 becomes (MEMR0+MEMR1+MEMR2+MEMR3) and the output signal btf2b_out becomes (MEMR0+MEMR1−MEMR2−MEMR3).

Further, the output selection device 25B-0 is controlled in accordance with the control signal W0SEL to select the output signal btf2a_out of the butterfly computing unit 23B-2, whereby the signal MEMW0 is output as (MEMR0+MEMR1+MEMR2+MEMR3).

Similarly, the output selection device 25B-2 is controlled in accordance with the control signal W2SEL to select the output signal btf2a_out of the butterfly computing unit 23B-2, whereby the signal MEMW2 is output as (MEMR0+MEMR1+MEMR2+MEMR3).

Further, the output selection device 25B-1 is controlled in accordance with the control signal W1SEL to select the output signal btf2b_out of the butterfly computing unit 23B-2, whereby the signal MEMW1 is output as (MEMR0+MEMR1−MEMR2−MEMR3).

Similarly, the output selection device 25B-3 is controlled in accordance with the control signal W3SEL to select the output signal btf2b_out of the butterfly computing unit 23B-2, whereby the signal MEMW3 is output as (MEMR0+MEMR1−MEMR2−EMR3).

The rest of the configuration and actions are similar to those of the above fourth embodiment, so explanations thereof will be omitted.

According to the fifth embodiment, effects similar to those in the above fourth embodiment can be obtained of course and there is the advantage that more sophisticated and complicated operations can be easily performed.

Sixth Embodiment

Figure 8:
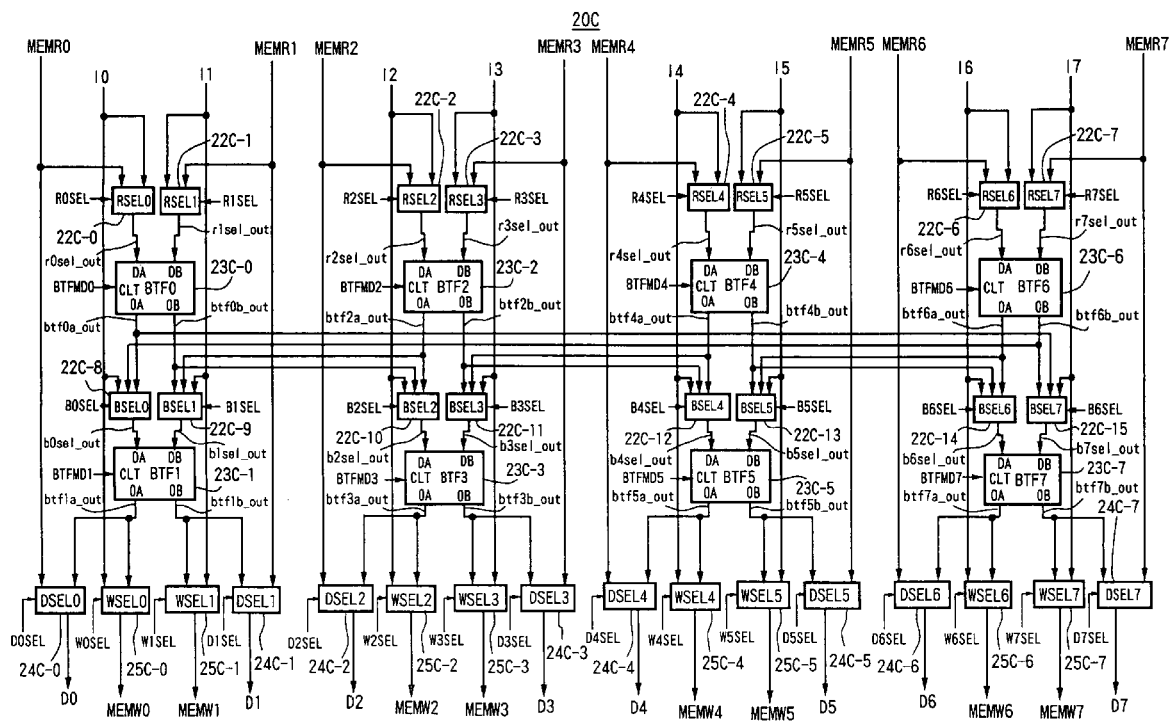
FIG. 8 is a view of the configuration showing a sixth embodiment of an arithmetic device according to the present invention.

FIG. 8 is a view of the configuration showing a sixth embodiment according to the present invention.

The arithmetic device 20C of FIG. 8 is an arithmetic device reconfigurable based on component data which performs 16-input, 16-output operation and can execute butterfly operation.

The arithmetic device 20C has the input selection device (RSEL0) 22C-0, input selection device (RSEL1) 22C-1, input selection device (RSEL2) 22C-2, input selection device (RSEL3) 22C-3, input selection device (RSEL4) 22C-4, input selection device (RSEL5) 22C-5, input selection device (RSEL6) 22C-6, input selection device (RSEL7) 22C-7, input selection device (BSEL0) 22C-8, input selection device (BSEL1) 22C-9, input selection device (BSEL2) 22C-10, input selection device (BSEL3) 22C-11, input selection device (BSEL4) 22C-12, input selection device (BSEL5) 22C-13, input selection device (BSEL6) 22C-14, input selection device (BSEL7) 22C-15, butterfly computing unit (BTF0) 23C-0, butterfly computing unit (BTF1) 23C-1, butterfly computing unit (BTF2) 23C-2, butterfly computing unit (BTF3) 23C-3, butterfly computing unit (BTF4) 23C-4, butterfly computing unit (BTF5) 23C-5, butterfly computing unit (BTF6) 23C-6, butterfly computing unit (BTF7) 23C-7, output selection device (DSEL0) 24C-0, output selection device (DSEL1) 24C-1, output selection device (DSEL2) 24C-2, output selection device (DSEL3) 24C-3, output selection device (DSEL4) 24C-4, output selection device (DSEL5) 24C-5, output selection device (DSEL6) 24C-6, output selection device (DSEL7) 24C-7, output selection device (WSEL0) 25C-0, output selection device (WSEL1) 25C-1, output selection device (WSEL2) 25C-2, output selection device (WSEL3) 25C-3, output selection device (WSEL4) 25C-4, output selection device (WSEL5) 25C-5, output selection device (WSEL6) 25C-6, and output selection device (WSEL7) 25C-7.

Further, the input selection devices 22C-0 to 22C-7 comprise the first input selection devices of the present invention, the input selection devices 22C-9 to 22C-15 comprise the second input selection devices of the present invention, the butterfly computing unit 23C-0, butterfly computing unit 23C-2, butterfly computing unit 23C-4, and butterfly computing unit 23C-6 comprise the first computing units of the present invention, the butterfly computing unit 23C-1, butterfly computing unit 23C-3, butterfly computing unit 23C-5, and butterfly computing unit 23C-7 comprise the second computing units of the present invention, the output selection devices 24C-0 to 24C-7 comprise the first output selection devices of the present invention, and the output selection devices 25C-0 to 25C-7 comprise the second output selection devices of the present invention.

Further, the arithmetic device 20C has the data inputs MEMR0, MEMR1, MEMR2, MEMR3, MEMR4, MEMR5, MEMR6, MEMR7, I0, I1, I2, I3, I4, I5, I6, I7, and data outputs MEMW0, MEMW1, MEMW2, MEMW3, MEMW4, MEMW5, MEMW6, MEMW7, D0, D1, D2, D3, D4, D5, D6, D7 and, further, is supplied with control signals for reconfiguration BTFMD0, BTFMD1, BTFMD2, BTFMD3, BTFMD4, BTFMD5, BTFMD6, BTFMD7, R0SEL, R1SEL, R2SEL, R3SEL, R4SEL, R5SEL, R6SEL, R7SEL, B0SEL, B1SEL, B2SEL, B3SEL, B4SEL, B5SEL, B6SEL, B7SEL, W0SEL, W1SEL, W2SEL, W3SEL, W4SEL, W5SEL, W6SEL, W7SEL, D0SEL, D1SEL, D2SEL, D3SEL, D4SEL, D5SEL, D6SEL, D7SEL.

The input selection device 22C-0, in accordance with the control signal R0SEL, selects one of the data input MEMR0 and data input I0 and outputs it as the signal r0sel_out to the butterfly computing unit 23C-0.

The input selection device 22C-1, in accordance with the control signal R1SEL, selects one of the data input MEMR1 and data input I1 and outputs it as the signal r1sel_out to the butterfly computing unit 23C-0.

The input selection device 22C-2, in accordance with the control signal R2SEL, selects one of the data input MEMR2 and data input I2 and outputs it as the signal r2sel_out to the butterfly computing unit 23C-2.

The input selection device 22C-3, in accordance with the control signal R3SEL, selects one of the data input MEMR3 and data input I3 and outputs it as the signal r3sel_out to the butterfly computing unit 23C-2.

The input selection device 22C-4, in accordance with the control signal R4SEL, selects one of the data input MEMR4 and data input I4 and outputs it as the signal r4sel_out to the butterfly computing unit 23C-4.

The input selection device 22C-5, in accordance with the control signal R5SEL, selects one of the data input MEMR5 and data input I5 and outputs it as the signal r5sel_out to the butterfly computing unit 23C-4.

The input selection device 22C-6, in accordance with the control signal R6SEL, selects one of the data input MEMR6 and data input I6 and outputs it as the signal r6sel_out to the butterfly computing unit 23C-6.

The input selection device 22C-7, in accordance with the control signal R7SEL, selects one of the data input MEMR7 and data input I7 and outputs it as the signal r7sel_out to the butterfly computing unit 23C-6.

The input selection device 22C-8, in accordance with the control signal B0SEL, selects one of the data input I0, the output signal btf0a_out of the butterfly computing unit 23C-0, and the output signal btf6b_out of the butterfly computing unit 23C-6 and outputs it as the signal b0sel_out to the butterfly computing unit 23C-1.

The input selection device 22C-9, in accordance with the control signal B1SEL, selects one of the data input I1, the output signal btf0b_out of the butterfly computing unit 23C-0, and the output signal btf2a_out of the butterfly computing unit 23C-2 and outputs it as the signal b1sel_out to the butterfly computing unit 23C-1.

The input selection device 22C-10, In accordance with the control signal B2SEL, selects one of the data input I2, the output signal btf2a_out of the butterfly computing unit 23C-2, and the output signal btf0b_out of the butterfly computing unit 23C-0 and outputs it as the signal b2sel_out to the butterfly computing unit 23C-3.

The input selection device 22C-11, in accordance with the control signal B3SEL, selects one of the data input I3, the output signal btf2b_out of the butterfly computing unit 23C-2, and the output signal btf4a_out of the butterfly computing unit 23C-4 and outputs it as the signal b3sel_out to the butterfly computing unit 23C-3.

The input selection device 22C-12, in accordance with the control signal B4SEL, selects one of the data input I4, the output signal btf4a_out of the butterfly computing unit 23C-4, and the output signal btf2b_out of the butterfly computing unit 23C-2 and outputs it as the signal b4sel_out to the butterfly computing unit 23C-5.

The input selection device 22C-13, in accordance with the control signal B5SEL, selects one of the data input I5, the output signal btf4b_out of the butterfly computing unit 23C-4, and the output signal btf6a_out of the butterfly computing unit 23C-6 and outputs it as the signal b5sel_out to the butterfly computing unit 23C-5.

The input selection device 22C-14, in accordance with the control signal B6SEL, selects one of the data input I6, the output signal btf6a_out of the butterfly computing unit 23C-6, and the output signal btf4b_out of the butterfly computing unit 23C-4 and outputs it as the signal b6sel_out to the butterfly computing unit 23C-7.

The input selection device 22C-15, in accordance with the control signal B7SEL, selects one of the data input I7, the output signal btf6b_out of the butterfly computing unit 23C-6, and the output signal btf0a_out of the butterfly computing unit 23C-0 and outputs it as the signal b7sel_out to the butterfly computing unit 23C-7.

The butterfly computing unit 23C-0 receives as input at the input terminal DA the output signal r0sel_out of the input selection device 22C-0, receives as input at the input terminal DB the output signal r1sel_out of the input selection device 22C-1, performs operation in accordance with instructions of the control signal BTFMD0 supplied to the control terminal CTL to obtain two operation results, outputs one of the operation results from the output terminal OA as the signal btf0a_out to the input selection devices 22C-8 and 22C-15, and outputs the other of the operation results from the output terminal OB as the signal btf0b_out to the input selection devices 22C-9 and 22C-10.

The butterfly computing unit 23C-1 receives as input at the input terminal DA the output signal b0sel_out of the input selection device 22C-8, receives as input at the input terminal DB the output signal b1sel_out of the input selection device 22C-9, performs operation in accordance with instructions of the control signal BTFMD1 supplied to the control terminal CTL to obtain two operation results, outputs one of the operation results from the output terminal OA as the signal btf1a_out to the output selection devices 24C-0 and 25C-0, and outputs the other of the operation results from the output terminal OB as the signal btf1b_out to the output selection devices 24C-1 and 25C-1.

The butterfly computing unit 23C-2 receives as input at the input terminal DA the output signal r2sel_out of the input selection device 22C-2, receives as input at the input terminal DB the output signal r3sel_out of the input selection device 22C-3, performs operation in accordance with instructions of the control signal BTFMD2 supplied to the control terminal CTL to obtain two operation results, outputs one of the operation results from the output terminal OA as the signal btf2a_out to the input selection devices 22C-10 and 22C-9, and outputs the other of the operation results from the output terminal OB as the signal btf2b_out to the input selection devices 22C-11 and 22C-12.

The butterfly computing unit 23C-3 receives as input at the input terminal DA the output signal b2sel_out of the input selection device 22C-10, receives as input at the input terminal DB the output signal b3sel_out of the input selection device 22C-11, performs operation in accordance with instructions of the control signal BTFMD3 supplied to the control terminal CTL to obtain two operation results, outputs one of the operation results from the output terminal OA as the signal btf3a_out to the output selection devices 24C-2 and 25C-2, and outputs the other of the operation results from the output terminal OB as the signal btf3b_out to the output selection devices 24C-3 and 25C-3.

The butterfly computing unit 23C-4 receives as input at the input terminal DA the output signal r4sel_out of the input selection device 22C-4, receives as input at the input terminal DB the output signal r5sel_out of the input selection device 22C-5, performs operation in accordance with instructions of the control signal BTFMD4 supplied to the control terminal CTL to obtain two operation results, outputs one of the operation results from the output terminal OA as the signal btf4a_out to the input selection devices 22C-12 and 22C-11, and outputs the other of the operation results from the output terminal OB as the signal btf4b_out to the input selection devices 22C-13 and 22C-14.

The butterfly computing unit 23C-5 receives as input at the input terminal DA the output signal b4sel_out of the input selection device 22C-12, receives as input at the input terminal DB the output signal b5sel_out of the input selection device 22C-13, performs operation in accordance with instructions of the control signal BTFMD5 supplied to the control terminal CTL to obtain two operation results, outputs one of the operation results from the output terminal OA as the signal btf5a_out to the output selection devices 24C-4 and 25C-4, and outputs the other of the operation results from the output terminal OB as the signal btf5b_out to the output selection devices 24C-5 and 25C-5.

The butterfly computing unit 23C-6 receives as input at the input terminal DA the output signal r6sel_out of the input selection device 22C-6, receives as input at the input terminal DB the output signal r7sel_out of the input selection device 22C-7, performs operation in accordance with instructions of the control signal BTFMD6 supplied to the control terminal CTL to obtain two operation results, outputs one of the operation results from the output terminal OA as the signal btf6a_out to the input selection devices 22C-14 and 22C-13, and outputs the other of the operation results from the output terminal OB as the signal btf6b_out to the input selection devices 22C-15 and 22C-8.

The butterfly computing unit 23C-7 receives as input at the input terminal DA the output signal b6sel_out of the input selection device 22C-14, receives as input at the input terminal DB the output signal b7sel_out of the input selection device 22C-15, performs operation in accordance with instructions of the control signal BTFMD7 supplied to the control terminal CTL to obtain two operation results, outputs one of the operation results from the output terminal OA as the signal btf7a_out to the output selection devices 24C-6 and 25C-6, and outputs the other of the operation results from the output terminal OB as the signal btf7b_out to the output selection devices 24C-7 and 25C-7.

Specifically, the butterfly computing unit 23C-I (i=0, 2, 4, 6) selectively performs the following operations in accordance with the value of the control signal BTFMDi.

btf[i]a_out=r[i+1]sel_out, btf[i]b_out=r[i]sel_out
btf[i]a_out=r[i+1]sel_out, btf[i]b_out=−r[i]sel_out
btf[i]a_out=−r[i+1]sel_out, btf[i]b_out=r[i]sel_out
btf[i]a_out=−r[i+1]sel_out, btf[i]b_out=−r[i]sel_out
btf[i]a_out=r[i]sel_out, btf[i]b_out=r[i+1]sel_out
btf[i]a_out=r[i]sel_out, btf[i]b_out=−r[i+1]sel_out
btf[i]a_out=−r[i]sel_out, btf[i]b_out=r[i+1]sel_out
btf[i]a_out=−r[i]sel_out, btf[i]b_out=r[i+1]sel_out
btf[i]a_out=r[i]sel_out+r[i+1]sel_out, btf[i]b_out=r[i]sel_out−r[i+1]sel_out
btf[i]a_out=r[i]sel_out+r[i+1]sel_out, btf[i]b_out=r[i+1]sel_out−r[i]sel_out
btf[i]a_out=r[i]sel_out−r[i+1]sel_out, btf[i]b_out=r[i]sel_out+r[i+1]sel_out
btf[i]a_out=r[i1]sel_out−r[i]sel_out, btf[i]a_out=r[i]sel_out+r[i+1]sel_out Further, the butterfly computing unit 23C-j (j=1, 3, 5, 7) selectively performs any of the following operations in accordance with the value of the control signal BTFMDj.

btf[j]a_out=b[j]sel_out, btf[j]b_out=b[j−1]sel_out
btf[j]a_out=b[j]sel_out, btf[j]b_out=−b[j−1]sel_out btf[j]a_out=−b[j]sel_out, btf[j]b_out=b[j−1]sel_out
btf[j]a_out=−b[j]sel_out, btf[j]b_out=−b[j−1]sel_out
btf[j]a_out=b[j−1]sel_out, btf[j]b_out= b[j]sel_out
btf[j]a_out=b[j−1]sel_out, btf[j]b_out=−b[j]sel_out
btf[j]a_out=−b[j−1]sel_out, btf[j]b_out=b[j]sel_out
btf[j]a_out=−b[j−1]sel_out, btf[j]b_out=−b[j]sel_out
btf[j]a_out=b[j−1]sel_out+b[j]sel_out, btf[j]b_out=b[j−1]sel_out−b[j]sel_out
btf[j]a_out=b[j−1]sel_out+b[j]sel_out, btf[j]b_out=b[j]sel_out−b[j−1]sel_out
btf[j]a_out=b[j−1]sel_out−b[j]sel_out, btf[j]b_out=b[j−1]sel_out+b[j]sel_out
btf[j]a_out=b[j]sel_out−b[j−1]sel_out, btf[j]b_out=b[j−1]sel_out+b[j]sel_out The output selection device 24C-0, in accordance with the control signal D0SEL, selects one of the data input MEMR0 and the output signal btf1a_out of the butterfly computing unit 23C-1 and outputs it as the signal D0.

The output selection device 24C-1, in accordance with the control signal D1SEL, selects one of the data input MEMR0 and the output signal btf1b_out of the butterfly computing unit 23C-1 and outputs it as the signal D1.

The output selection device 24C-2, in accordance with the control signal D2SEL, selects one of the data input MEMR2 and the output signal btf3a_out of the butterfly computing unit 23C-3 and outputs it as the signal D2.

The output selection device 24C-3, in accordance with the control signal D3SEL, selects one of the data input MEMR3 and the output signal btf3b_out of the butterfly computing unit 23C-3 and outputs it as the signal D3.

The output selection device 24C-4, in accordance with the control signal D4SEL, selects one of the data input MEMR4 and the output signal btf5a_out of the butterfly computing unit 23C-5 and outputs it as the signal D4.

The output selection device 24C-5, in accordance with the control signal D5SEL, selects one of the data input MEMR5 and the output signal btf5b_out of the butterfly computing unit 23C-5 and outputs it as the signal D5.

The output selection device 24C-6, in accordance with the control signal D6SEL, selects one of the data input MEMR6 and the output signal btf7a_out of the butterfly computing unit 23C-7 and outputs it as the signal D6.

The output selection device 24C-7, in accordance with the control signal D7SEL, selects one of the data input MEMR7 and the output signal btf7b_out of the butterfly computing unit 23C-7 and outputs it as the signal D7.

The output selection device 25C-0, in accordance with the control signal W0SEL, selects one of the data input I0 and the output signal btf1a_out of the butterfly computing unit 23C-1 and outputs it as the signal MEMW0.

The output selection device 25C-1, in accordance with the control signal W1SEL, selects one of the data input I1 and the output signal btf1b_out of the butterfly computing unit 23C-1 and outputs it as the signal MEMW1.

The output selection device 25C-2, in accordance with the control signal W2SEL, selects one of the data input I2 and the output signal btf3a_out of the butterfly computing unit 23C-3 and outputs it as the signal MEMW2.

The output selection device 25C-3, in accordance with the control signal W3SEL, selects one of the data input I3 and the output signal btf3b_out of the butterfly computing unit 23C-3 and outputs it as the signal MEMW3.

The output selection device 25C-4, in accordance with the control signal W4SEL, selects one of the data input I4 and the output signal btf5a_out of the butterfly computing unit 23C-5 and outputs it as the signal MEMW4.

The output selection device 25C-5, in accordance with the control signal W5SEL, selects one of the data input I5 and the output signal btf5b_out of the of the butterfly computing unit 23C-5 and outputs it as the signal MEMW5.

The output selection device 25C-6, in accordance with the control signal W6SEL, selects one of the data input I6 and the output signal btf7a_out of the butterfly computing unit 23C-7 and outputs it as the signal MEMW6.

The output selection device 25C-7, in accordance with the control signal W7SEL, selects one of the data input I7 and the output signal btf7b_out of the butterfly computing unit 23C-7 and outputs it as the signal MEMW7.

Next, the operation according to the above configuration will be explained.

Here, for example, it is assumed that the following operations are executed.

D0=MEMR6−MEMR7+MEMR0−MEMR1,
D1=MEMR1,
D6=MEMR6,
D7=MEMR6+MEMR7−MEMR0−MEMR1,
MEMW0=I0
MEMW1=MEMR6−MEMR7−MEMR0+MEMR1,
MEMW6=MEMR0+MEMR1+MEMR6+MEMR7,
MEMW7=I7

In this case, the input selection device 22C-0 is controlled in accordance with the control signal R0SEL so as to select the data input MEMR0 and supplies the selected data MEMR0 as the signal r0sel_out to the input terminal DA of the butterfly computing unit 23C-0.

The input selection device 22C-1 is controlled in accordance with the control signal R1SEL so as to select the MEMR1 and supplies the selected data MEMR1 as the signal r1sel_out to the input terminal DB of the butterfly computing unit 23C-0.

Further, the input selection device 22C-6 is controlled in accordance with the control signal R6SEL so as to select the MEMR6 and supplies the selected data MEMR6 as the signal r6sel_out to the input terminal DA of the butterfly computing unit 23C-6.

The input selection device 22C-7 is controlled in accordance with the control signal R7SEL so as to select the MEMR7 and supplies the selected data MEMR7 as the signal r7sel_out to the input terminal DB of the butterfly computing unit 23C-7.

The butterfly computing unit 23C-0 is set by a control signal BTFMD0 supplied to the control terminal CTL to a mode in which OA=DA+DB, OB=DA−DB are calculated.

Due to this, the butterfly computing unit 23C-0 adds the data MEMR0 supplied to the input terminal DA and the data MEMR1 supplied to the input terminal DB and outputs the result, that is (MEMR0+MEMR1), from the output terminal OA as the signal btf0a_out to the input selection devices 22C-8 and 22C-15.

Further, the butterfly computing unit 23C-0 finds the difference between the data MEMR0 supplied to the input terminal DA and the data MEMR1 supplied to the input terminal DB and outputs the result, that is (MEMR0−MEMR1), from the output terminal OB as the signal btf0b_out to the input selection devices 22C-9 and 22C-10.

Similarly, the butterfly computing unit 23C-6 is set by the control signal BTFMD6 supplied to the control terminal CTL to a mode in which OA=DA+DB, OB=DA−DB are calculated.

Due to this, the butterfly computing unit 23C-6 adds the data MEMR6 supplied to the input terminal DA and the data MEMR7 supplied to the input terminal DB and outputs the result, that is (MEMR6+MEMR7), from the output terminal OA as the signal btf6a_out to the input selection devices 22C-14 and 22C-13.

Further, the butterfly computing unit 23C-6 finds the difference between the data MEMR6 supplied to the input terminal DA and the data MEMR7 supplied to the input terminal DB and outputs the result, that is (MEMR6−MEMR7), from the output terminal OB as the signal btf6b_out to the input selection devices 22C-15 and 22C-8.

Further, the input selection device 22C-8 is controlled in accordance with the control signal B0SEL so as to select the output signal btf6b_out (=MEMR6−MEMR7) of the butterfly computing unit 23C-6 and supplies the selected data (MEMR6−MEMR7) as the signal b0sel_out to the input terminal DA of the butterfly computing unit 23C-1.

The input selection device 22C-9 is controlled in accordance with the control signal B1SEL so as to select the output signal btf0b_out (=MEMR0−MEMR1) of the butterfly computing unit 23C-0 and supplies the selected data (MEMR0−MEMR1) as the signal b1sel_out to the input terminal DB of the butterfly computing unit 23C-1.

Further, the input selection device 22C-14 is controlled in accordance with the control signal B6SEL so as to select the output signal btf6a_out (=MEMR6+MEMR7) of the butterfly computing unit 23C-6 and supplies the selected data (MEMR6+MEMR7) as the signal b6sel_out to the input terminal DA of the butterfly computing unit 23C-7.

The input selection device 22C-15 is controlled in accordance with the control signal B7SEL so as to select the output signal btf0a_out (=MEMR0+MEMR1) of the butterfly computing unit 23C-0 and supplies the selected data (MEMR0+MEMR1) as the signal b7sel_out to the input terminal DB of the butterfly computing unit 23C-7.

The butterfly computing unit 23C-1 is set by the control signal BTFMD1 supplied to the control terminal CTL to a mode in which OA=DA+DB, OB=DA−DB are calculated.

Due to this, the butterfly computing unit 23C-1 adds the data (MEMR6−MEMR7) supplied to the input terminal DA and the data (MEMR0−MEMR1) supplied to the input terminal DB and outputs the result, that is (MEMR6−MEMR7+MEMR0−MEMR1), from the output terminal OA as the signal btf1a_out to the output selection devices 24C-0 and 25C-0.

Further, the butterfly computing unit 23C-1 finds the difference between the data (MEMR6−MEMR7) supplied to the input terminal DA and the data (MEMR0−MEMR1) supplied to the input terminal DB and outputs the result, that is (MEMR6−MEMR7−MEMR0+MEMR1), from the output terminal OB as the signal btf1b_out to the output selection devices 24C-1 and 25C-1.

Similarly, the butterfly computing unit 23C-7 is set by the control signal BTFMD7 supplied to the control terminal CTL to a mode in which OA=DA+DB, OB=DA−DB are calculated.

Due to this, the butterfly computing unit 23C-7 adds the data (MEMR6+MEMR7) supplied to the input terminal DA and the data (MEMR0+MEMR1) supplied to the input terminal DB and outputs the result, that is (MEMR6+MEMR7+MEMR0+MEMR1), from the output terminal OA as the signal btf7a_out to the output selection devices 24C-6 and 25C-6.

Further, the butterfly computing unit 23C-7 finds the difference between the data (MEMR6+MEMR7) supplied to the input terminal DA and the data (MEMR0+MEMR1) supplied to the input terminal DB and outputs the result, that is (MEMR6+MEMR7−MEMR0−MEMR1), from the output terminal OB as the signal btf7b_out to the output selection devices 24C-7 and 25C-7.

The output selection device 24C-0 is supplied with the control signal D0SEL so as to select the output signal btf1a_out of the butterfly computing unit 23C-1 from the data input MEMR0 and the output signal btf1a_out (=MEMR6−MEMR7+MEMR0−MEMR1) of the butterfly computing unit 23C-1. The data selected by this is output as the signal D0=MEMR6−MEMR7+MEMR0−MEMR1.

The output selection device 24C-1 is supplied with the control signal D1SEL so as to select the data input MEMR1 from the data input MEMR1 and the output signal btf1b_out (=MEMR6−MEMR7−MEMR0+MEMR1) of the butterfly computing unit 23C-1. The data selected by this is output by the signal D1=MEMR1.

The output selection device 24C-6 is supplied with the control signal D6SEL so as to select the data input MEMR6 from the data input MEMR6 and the output signal btf7a_out (=MEMR6+MEMR7+MEMR0+MEMR1) of the butterfly computing unit 23C-7. The data selected by this is output as the signal D6=MEMR6.

The output selection device 24C-7 is supplied with the control signal D7SEL so as to select the output signal btf7b_out of the butterfly computing unit 23C-7 from the data input MEMR7 and the output signal btf7b_out (=MEMR6+MEMR7−MEMR0−MEMR1) of the butterfly computing unit 23C-7. The data selected by this is output as the signal D7=MEMR6+MEMR7−MEMR0−MEMR1.

Further, the output selection device 25C-0 is supplied with the control signal W0SEL so as to select the input data I0 from the data input I0 and the output signal btf1a_out (=MEMR6−MEMR7+MEMR0−MEMR1) of the butterfly computing unit 23C-1. The data selected by this is output as the signal MEMW0=I0.

The output selection device 25C-1 is supplied with the control signal W1SEL so as to select the output signal btf1b_out of the butterfly computing unit 23C-1 from the data input I1 and the output signal btf1b_out (=MEMR6−MEMR7−MEMR0+MEMR1) of the butterfly computing unit 23C-1. The data selected by this is output as the signal MEMW1=MEMR6−MEMR7−MEMR0+MEMR1.

The output selection device 25C-6 is supplied with the control signal W6SEL so as to select the output signal btf7a_out of the butterfly computing unit 23C-7 from the data input I6 and the output signal btf7a_out (=MEMR6+MEMR7+MEMR0+MEMR1) of the butterfly computing unit 23C-7. The data selected by this is output as the signal MEMW6=MEMR0+MEMR1+MEMR6+MEMR7.

Further, the output selection device 25C-7 is supplied with the control signal W7SEL so as to select the input data I7 from the data input I7 and the output signal btf7b_out (=MEMR6+MEMR7−MEMR0−MEMR1) of the butterfly computing unit 23C-7. The data selected by this is output as the signal MEMW7=I7.

In this way, according to the 16-input, 16-output arithmetic device 20C according to the sixth embodiment, it is possible to obtain effects similar to the effects of the above third embodiment.

Note that, in the sixth embodiment, it is possible to similarly arrange the monadic computing units, for example, shift computing units, at the input stages of the data inputs MEMR0 to MEMR7, in the same way as in the above third to fifth embodiments.

In this case, the monadic computing units SFT0, SFT1, SFT2, SFT3, SFT4, SFT5, SFT6, SFT7 receive as input for example the control signal SFT0MD, SFT1MD, SFT2MD, SFT3MD, SFT4MD, SFT5MD, SFT6MD, SFT7MD, performs monadic operation on the values of MEMR0, MEMR1, MEMR2, MEMR3, MEMR4, MEMR5, MEMR6, MEMR7 in accordance with the values of the control signals SFT0MD, SFT1MD, SFT2MD, SFT3MD, SFT4MD, SFT5MD, SFT6MD, SFT7MD, and output the results to the input selection devices 22C-0 to 22C-7 (RSEL0 to RSEL7) and output selection devices 24C-0 to 24C-7 (DSEL0 to DSEL7).

However, here the monadic computing units are computing units realized by processing to shift to the left or right by any bits.

Seventh Embodiment

Figure 9:
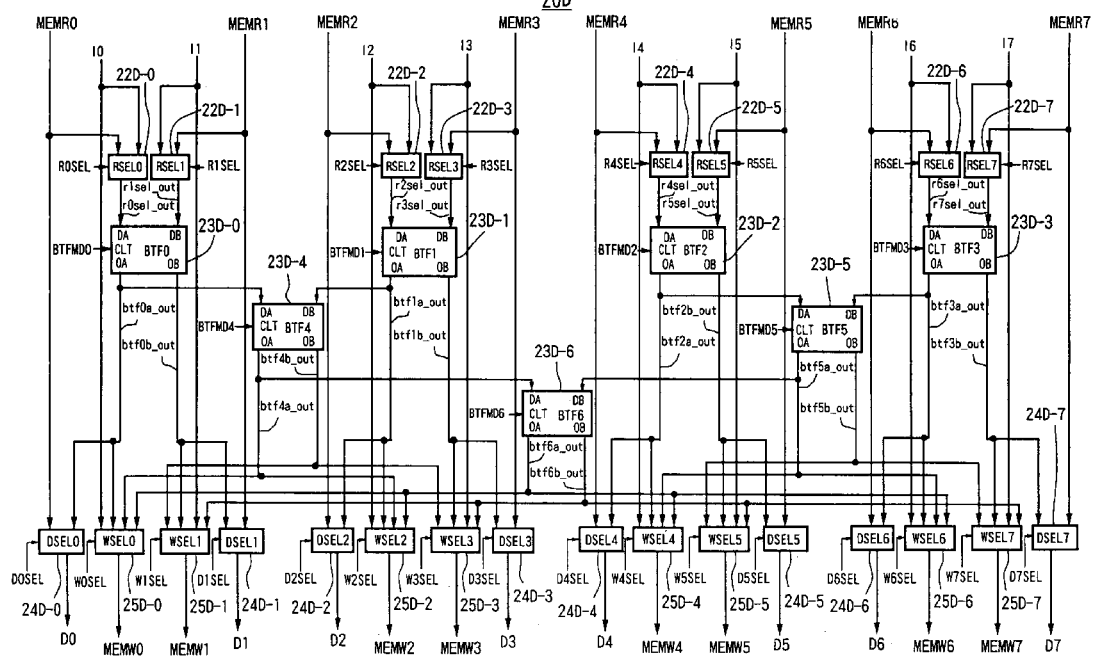
FIG. 9 is a view of the configuration showing a seventh embodiment of an arithmetic device according to the present invention.

FIG. 9 is a view of the configuration showing a seventh embodiment according to the present invention.

The arithmetic device 20D of FIG. 9 is an arithmetic device reconfigurable based on component data which performs 16-input, 16-output operation and can execute butterfly operation.

The arithmetic device 20D has the input selection device (RSEL0) 22D-0, input selection device (RSEL1) 22D-1, input selection device (RSEL2) 22D-2, input selection device (RSEL3) 22D-3, input selection device (RSEL4) 22D-4, input selection device (RSEL5) 22D-5, input selection device (RSEL6) 22D-6, input selection device (RSEL7) 22D-7, butterfly computing unit (BTF0) 23D-0, butterfly computing unit (BTF1) 23D-1, butterfly computing unit (BTF2) 23D-2, butterfly computing unit (BTF3) 23D-3, butterfly computing unit (BTF4) 23D-4, butterfly computing unit (BTF5) 23D-5, butterfly computing unit (BTF6) 23D-6, output selection device (DSEL0) 24D-0, output selection device (DSEL1) 24D-1, output selection device (DSEL2) 24D-2, output selection device (DSEL3) 24D-3, output selection device (DSEL4) 24D-4, output selection device (DSEL5) 24D-5, output selection device (DSEL6) 24D-6, output selection device (DSEL7) 24D-7, output selection device (WSEL0) 25D-0, output selection device (WSEL1) 25D-1, output selection device (WSEL2) 25D-2, output selection device (WSEL3) 25D-3, output selection device (WSEL4) 25D-4, output selection device (WSEL5) 25D-5, output selection device (WSEL6) 25D-6, and output selection device (WSEL7) 25D-7.

Further, the arithmetic device 20D has the data inputs MEMR0, MEMR1, MEMR2, MEMR3, MEMR4, MEMR5, MEMR6, MEMR7, I0, I1, I2, I3, I4, I5, I6, I7 and data outputs MEMW0, MEMW1, MEMW2, MEMW3, MEMW4, MEMW5, MEMW6, MEMW7, D0, D1, D2, D3, D4, D5, D6, D7 and is supplied with control signals for reconfiguration BTFMD0, BTFMD1, BTFMD2, BTFMD3, BTFMD4, BTFMD5, BTFMD6, R0SEL, R1SEL, R2SEL, R3SEL, R4SEL, R5SEL, R6SEL, R7SEL, W0SEL, W1SEL, W2SEL, W3SEL, W4SEL, W5SEL, W6SEL, W7SEL, D0SEL, D1SEL, D2SEL, D3SEL, D4SEL, D5SEL, D6SEL, D7SEL.

The input selection device 22D-0, in accordance with the control signal R0SEL, selects one of the data input MEMR0 and data input I0 and outputs it as the signal r0sel_out to the butterfly computing unit 23D-0.

The input selection device 22D-1, in accordance with the control signal R1SEL, selects one of the data input MEMR1 and data input I1 and outputs it as the signal r1sel_out to the butterfly computing unit 23D-0.

The input selection device 22D-2, in accordance with the control signal R2SEL, selects one of the data input MEMR2 and data input I2 and outputs it as the signal r2sel_out to the butterfly computing unit 23D-1.

The input selection device 22D-3, in accordance with the control signal R3SEL, selects one of the data input MEMR3 and data input I3 and outputs it as the signal r3sel_out to the butterfly computing unit 23D-1.

The input selection device 22D-4, in accordance with the control signal R4SEL, selects one of the data input MEMR4 and data Input I4 and outputs it as the signal r4sel_out to the butterfly computing unit 23D-2.

The input selection device 22D-5, in accordance with the control signal R5SEL, selects one of the data input MEMR5 and data input I5 and outputs it as the signal r5sel_out to the butterfly computing unit 23D-2.

The input selection device 22D-6, in accordance with the control signal R6SEL, selects one of the data input MEMR6 and data input I6 and outputs it as the signal r6sel_out to the butterfly computing unit 23D-3.

The input selection device 22D-7, in accordance with the control signal R7SEL, selects one of the data input MEMR7 and data input I7 and outputs it as the signal r7sel_out to the butterfly computing unit 23D-3.

The butterfly computing unit 23D-0 receives as input at the input terminal DA the output signal r0sel_out of the input selection device 22D-0, receives as input at the input terminal DB the output signal r1sel_out of the input selection device 22D-1, performs operation in accordance with instructions of the control signal BTFMD0 supplied to the control terminal CTL to obtain two operation results, outputs one of the operation results from the output terminal OA as the signal btf0a_out to the butterfly computing unit 23D-4 and output selection devices 24D-0 and 25D-0, and outputs the other of the operation results from the output terminal OB as the signal btf0b_out to the output selection devices 24D-1 and 25D-1.

The butterfly computing unit 23D-1 receives as input at the input terminal DA the output signal r2sel_out of the input selection device 22D-2, receives as input at the input terminal DB the output signal r3sel_out of the input selection device 22D-3, performs operation in accordance with instructions of the control signal BTFMD1 supplied to the control terminal CTL to obtain two operation results, outputs one of the operation results from the output terminal OA as the signal btf1a_out to the butterfly computing unit 23D-4 and the output selection devices 24D-2 and 25D-2, and outputs the other of the operation results from the output terminal OB as the signal btf1b_out to the output selection devices 24D-3 and 25D-3.

The butterfly computing unit 23D-2 receives as input at the input terminal DA the output signal r4sel_out of the input selection device 22D-4, receives as input at the input terminal DB the output signal r5sel_out of the input selection device 22D-5, performs operation in accordance with instructions of the control signal BTFMD2 supplied to the control terminal CTL to obtain two operation results, outputs one of the operation results from the output terminal OA as the signal btf2a_out to the butterfly computing unit 23D-5 and the output selection devices 24D-4 and 25D-4, and outputs the other of the operation results from the output terminal OB as the signal btf2b_out to the output selection devices 24D-5 and 25D-5.

The butterfly computing unit 23D-3 receives as input at the input terminal DA the output signal r6sel_out of the input selection device 22D-6, receives as input at the input terminal DB the output signal r7sel_out of the input selection device 22D-7, performs operation in accordance with instructions of the control signal BTFMD3 supplied to the control terminal CTL to obtain two operation results, outputs one of the operation results from the output terminal OA as the signal btf3a_out to the butterfly computing unit 23D-5 and the output selection devices 24D-6 and 25D-6, and outputs the other of the operation results from the output terminal OB as the signal btf3b_out to the output selection devices 24D-7 and 25D-7.

The butterfly computing unit 23D-4 receives as input at the input terminal DA the output signal btf0a_out of the butterfly computing unit 23D-0, receives as input at the input terminal DB the output signal btf1a_out of the butterfly computing unit 23D-1, performs operation in accordance with instructions of the control signal BTFMD4 supplied to the control terminal CTL to obtain two operation results, outputs one of the operation results from the output terminal OA as the signal btf4a_out to the butterfly computing unit 23D-6 and the output selection devices 25D-0 and 25D-2, and outputs the other of the operation results from the output terminal OB as the signal btf4b_out to the output selection devices 25D-1 and 25D-3.

The butterfly computing unit 23D-5 receives as input at the input terminal DA the output signal btf2a_out of the butterfly computing unit 23D-2, receives as input at the input terminal DB the output signal btf3a_out of the butterfly computing unit 23D-3, performs operation in accordance with instructions of the control signal BTFMD5 supplied to the control terminal CTL to obtain two operation results, outputs one of the operation results from the output terminal OA as the signal btf5a_out to the butterfly computing unit 23D-6 and the output selection devices 25D-4 and 25D-6, and outputs the other of the operation results from the output terminal OB as the signal btf5b_out to the output selection devices 25D-5 and 25D-7.

The butterfly computing unit 23D-6 receives as input at the input terminal DA the output signal btf4a_out of the butterfly computing unit 23D-4, receives as input at the input terminal DB the output signal btf5a_out of the butterfly computing unit 23D-5, performs operation in accordance with instructions of the control signal BTFMD6 supplied to the control terminal CTL to obtain two operation results, outputs one of the operation results from the output terminal OA as the signal btf6a_out to the output selection devices 25D-0, 25D-2, 25D-4 and 25D-6, and outputs the other of the operation results from the output terminal OB as the signal btf6b_out to the output selection devices 25D-1, 25D-3, 25D-5, and 25D-7.

Specifically, the butterfly computing unit 23D-1 (l=0, 1, 2, 3) selectively performs any of the following operations in accordance with the value of the control signal BTFMD1.

btf[l]a_out=r[l+1]sel_out, btf[l]b_out=r[l]sel_out
btf[l]a_out=r[l+1]sel_out, btf[l]b_out=−r[l]sel_out
btf[l]a_out=−r[l+1]sel_out, btf[l]b_out=r[l]sel_out
btf[l]a_out=−r[l+1]sel_out, btf[l]b_out=−r[l]sel_out
btf[l]a_out=r[l]sel_out, btf[l]b_out=r[l+1]sel_out
btf[l]a_out=r[l]sel_out, btf[l]b_out=−r[l+1]sel_out
btf[l]a_out=−r[l]sel_out, btf[l]b_out= r[l+1]sel_out
btf[l]a_out=−r[l]sel_out, btf[l]b_out=−r[l+1]sel_out
btf[l]a_out=r[l]sel_out+r[l+1]sel_out, btf[l]b_out=r[l]sel_out−r[l+1]sel_out
btf[l]a_out=r[l]sel_out+r[l+1]sel_out, btf[l]b_out=r[l+1]sel_out−r[l]sel_out
btf[l]a_out=r[l]sel_out−r[l+1]sel_out, btf[l]b_out=r[l]sel_out+r[l+1]sel_out
btf[l]a_out=r[l+1]sel_out−r[l]sel_out, btf[l]b_out=r[l]sel_out+r[l+1]sel_out Further, the butterfly computing unit 23D-4 selectively performs any of the following operations in accordance with the value of the control signal BTFMD4.

btf4a_out=btf0a_out, btf4b_out=btf1a_out
btf4a_out=btf0a_out, btf4b_out=−btf1a_out
btf4a_out=−btf0a_out, btf4b_out=btf1a_out
btf4a_out=−btf0a_out, btf4b_out=−btf1a_out
btf4a_out=btf0a_out, btf4b_out=btf1a_out
btf4a_out=btf0a_out, btf4b_out=−btf1a_out
btf4a_out=−btf0a_out, btf4b_out=btf1a_out
btf4a_out=−btf0a_out, btf4b_out=−btf1a_out
btf4a_out=btf1a_out+btf0a_out, btf4b_out=btf1a_out−btf0a_out
btf4a_out=btf1a_out+btf0a_out, btf4b_out= btf0a_out−btf1a_out
btf4a_out=btf1a_out−btf0a_out, btf4b_out=btf1a_out+btf0a_out
btf4a_out=btf0a_out−btf1a_out, btf4b_out=btf1a_out+btf0a_out Further, the butterfly computing unit 23D-5 selectively performs any of the following operations in accordance with the value of the control signal BTFMD5.

btf5a_out=btf2a_out, btf5b_out=btf3a_out
btf5a_out=btf2a_out, btf5b_out=−btf3a_out
btf5a_out=−btf2a_out, btf5b_out=btf3a_out
btf5a_out=−btf2a_out, btf5b_out=−btf3a_out
btf5a_out=btf2a_out, btf5b_out=btf3a_out
btf5a_out=btf2a_out, btf5b_out=−btf3a_out
btf5a_out=−btf2a_out, btf5b_out=btf3a_out
btf5a_out=−btf2a_out, btf5b_out=−btf3a_out
btf5a_out=btf3a_out+btf2a_out, btf5b_out=btf3a_out−btf2a_out
btf5a_out=btf3a_out+btf2a_out, btf5b_out=btf2a_out−btf3a_out
btf5a_out=btf3a_out−btf2a_out, btf5b_out=btf3a_out+btf2a_out
btf5a_out=btf2a_out−btf3a_out, btf5b_out=btf3a_out+btf2a_out The output selection device 24D-0, in accordance with the control signal D0SEL, selects either of the data input MEMR0 and the output signal btf0a_out of the butterfly computing unit 23D-0 and outputs it as the signal D0.

The output selection device 24D-1, in accordance with the control signal D1SEL, selects either of the data input MEMR1 and the output signal btf0b_out of the butterfly computing unit 23D-0 and outputs it as the signal D1.

The output selection device 24D-2, in accordance with the control signal D2SEL, selects either of the data input MEMR2 and the output signal btf1a_out of the butterfly computing unit 23D-1 and outputs it as the signal D2.

The output selection device 24D-3, in accordance with the control signal D3SEL, selects either of the data input MEMR3 and the output signal btf1b_out of the butterfly computing unit 23D-1 and outputs it as the signal D3.

The output selection device 24D-4, in accordance with the control signal D4SEL, selects either of the data input MEMR4 and the output signal btf2a_out of the butterfly computing unit 23D-2 and outputs it as the signal D4.

The output selection device 24D-5, in accordance with the control signal D5SEL, selects either of the data input MEMR5 and the output signal btf2b_out of the butterfly computing unit 23D-2 and outputs it as the signal D5.

The output selection device 24D-6, in accordance with the control signal D6SEL, selects either of the data input MEMR6 and the output signal btf3a_out of the butterfly computing unit 23D-3 and outputs it as the signal D6.

The output selection device 24D-7, in accordance with the control signal D7SEL, selects either of the data input MEMR7 and the output signal btf3b_out of the butterfly computing unit 23D-3 and outputs it as the signal D7.

The output selection device 25D-0, in accordance with the control signal W0SEL, selects either of the data input I0, the output signal btf0a_out of the butterfly computing unit 23D-0, the output signal btf4a_out of the butterfly computing unit 23D-4, and the output signal btf6a_out of the butterfly computing unit 23D-6 and outputs it as the signal MEMW0.

The output selection device 25D-1, in accordance with the control signal W1SEL, selects either of the data input I1, the output signal btf0b_out of the butterfly computing unit 23D-0, the output signal btf4b_out of the butterfly computing unit 23D-4, and the output signal btf6b_out of the butterfly computing unit 23D-6 and outputs it as the signal MEMW1.

The output selection device 25D-2, in accordance with the control signal W2SEL, selects either of the data input I2, the output signal btf1a_out of the butterfly computing unit 23D-1, the output signal btf4a_out of the butterfly computing unit 23D-4, and the output signal btf6a_out of the butterfly computing unit 23D-6 and outputs it as the signal MEMW2.

The output selection device 25D-3, in accordance with the control signal W3SEL, selects either of the data input I3, the output signal btf1b_out of the butterfly computing unit 23D-1, the output signal btf4b_out of the butterfly computing unit 23D-4, and the output signal btf6b_out of the butterfly computing unit 23D-6 and outputs it as the signal MEMW3.

The output selection device 25D-4, in accordance with the control signal W4SEL, selects either of the data input I4, the output signal btf2a_out of the butterfly computing unit 23D-2, the output signal btf5a_out of the butterfly computing unit 23D-5, and the output signal btf6a_out of the butterfly computing unit 23D-6 and outputs it as the signal MEMW4.

The output selection device 25D-5, in accordance with the control signal W5SEL, selects either of the data input I5, the output signal btf2b_out of the butterfly computing unit 23D-2, the output signal btf5b_out of the butterfly computing unit 23D-5, and the output signal btf6b_out of the butterfly computing unit 23D-6 and outputs it as the signal MEMW5.

The output selection device 25D-6, in accordance with the control signal W6SEL, selects either of the data input I6, the output signal btf3a_out of the butterfly computing unit 23D-3, the output signal btf5a_out of the butterfly computing unit 23D-5, and the output signal btf6a_out of the butterfly computing unit 23D-6 and outputs it as the signal MEMW6.

The output selection device 25D-7, in accordance with the control signal W7SEL, selects either of the data input I7, the output signal btf3b_out of the butterfly computing unit 23D-3, the output signal btf5b_out of the butterfly computing unit 23D-5, and the output signal btf6b_out of the butterfly computing unit 23D-6 and outputs it as the signal MEMW7.

Next, the operation according to the above configuration will be explained.

Note that here, for example, the operation of the device as a whole will be explained taking as an example the case of obtaining all outputs D0 to D7 and MEMW0 to MEMW7.

D0=MEMR0+MEMR1,
D1=MEMR1,
D2=MEMR2,
D3=MEMR2−MEMR3,
D4=MEMR4+MEMR5,
D5=MEMR5,
D6=MEMR6+MEMR7,
D7=MEMR6−MEMR7,
MEMW0=I0
MEMW1=MEMR0+MEMR1−MEMR2−MEMR3,
MEMW2=MEMR0+MEMR1+MEMR2+MEMR3,
MEMW3=I3
MEMW4=MEMR0+MEMR1+MEMR2+MEMR3+ MEMR4+MEMR5+MEMR6+MEMR7,
MEMW5=MEMR4+MEMR5−MEMR6−MEMR7,
MEMW6=I6
MEMW7=MEMR0+MEMR1+MEMR2+MEMR3− MEMR4−MEMR5−MEMR6−MEMR7

In this case, the input selection device 22D-0 is controlled in accordance with the control signal R0SEL so as to select the data input MEMR0 and supplies the selected data MEMR0 as the signal r0sel_out to the input terminal DA of the butterfly computing unit 23D-0.

The input selection device 22D-1 is controlled in accordance with the control signal R1SEL so as to select the MEMR1 and supplies the selected data MEMR1 as the signal r1sel_out to the input terminal DB of the butterfly computing unit 23D-0.

Further, the input selection device 22D-2 is controlled in accordance with the control signal R2SEL so as to select the MEMR2 and supplies the selected data MEMR2 as the signal r2sel_out to the input terminal DA of the butterfly computing unit 23D-1.

The input selection device 22D-3 is controlled in accordance with the control signal R3SEL so as to select the MEMR3 and supplies the selected data MEMR3 as the signal r3sel_out to the input terminal DB of the butterfly computing unit 23D-1.

Further, the input selection device 22D-4 is controlled in accordance with the control signal R4SEL so as to select the MEMR4 and supplies the selected data MEMR4 as the signal r4sel_out to the input terminal DA of the butterfly computing unit 23D-2.

The input selection device 22D-5 is controlled in accordance with the control signal R5SEL so as to select the MEMR5 and supplies the selected data MEMR5 as the signal r5sel_out to the input terminal DB of the butterfly computing unit 23D-2.

Further, the input selection device 22D-6 is controlled in accordance with the control signal R6SEL so as to select the MEMR6 and supplies the selected data MEMR6 as the signal r6sel_out to the input terminal DA of the butterfly computing unit 23D-3.

The input selection device 22D-7 is controlled in accordance with the control signal R7SEL so as to select the MEMR7 and supplies the selected data MEMR7 as the signal r7sel_out to the input terminal DB of the butterfly computing unit 23D-3.

The butterfly computing unit 23D-0 is set by the control signal BTFMD0 supplied to the control terminal CTL to a mode in which OA=DA+DB, OB=DA−DB are calculated.

Due to this, the butterfly computing unit 23D-0 adds the data MEMR0 supplied to the input terminal DA and the data MEMR1 supplied to the input terminal DB and outputs the result, that is (MEMR0+MEMR1), from the output terminal O as the signal btf0a_out to the input terminal DA of the butterfly computing unit 23D-4 and the output selection devices 24D-0 and 25D-0.

Further, the butterfly computing unit 23D-0 finds the difference of the data MEMR0 supplied to the input terminal DA and the data MEMR1 supplied to the input terminal DB and outputs the result, that is (MEMR0−MEMR1), from the output terminal OB as the signal btf0b_out to the output selection devices 24D-1 and 25D-1.

The butterfly computing unit 23D-1 is set by the control signal BTFMD1 supplied to the control terminal CTL to a mode in which OA=DA+DB, OB=DA−DB are calculated.

Due to this, the butterfly computing unit 23D-1 adds the data MEMR2 supplied to the input terminal DA and the data MEMR3 supplied to the input terminal DB and outputs the result, that is (MEMR2+MEMR3), from the output terminal OA as the signal btf1a_out to the input terminal to DB of the butterfly computing unit 23D-4 and the output selection devices 24D-2 and 25D-2.

Further, the butterfly computing unit 23D-1 finds the difference of the data MEMR2 supplied to the input terminal DA and the data MEMR3 supplied to the input terminal DB and outputs the result, that is (MEMR2−MEMR3), from the output terminal OB as the signal btf1b_out to the output selection devices 24D-3 and 25D-3.

The butterfly computing unit 23D-2 is set by the control signal BTFMD2 supplied to the control terminal CTL to a mode in which OA=DA+DB, OB=DA−DB are calculated.

Due to this, the butterfly computing unit 23D-2 adds the data MEMR4 supplied to the input terminal DA and the data MEMR5 supplied to the input terminal DB and outputs the result, that is (MEMR4+MEMR5), from the output terminal OA as the signal btf2a_out to the input terminal DA of the butterfly computing unit 23D-5 and the output selection devices 24D-4 and 25D-4.

Further, the butterfly computing unit 23D-2 finds the difference of the data MEMR4 supplied to the input terminal DA and the data MEMR5 supplied to the input terminal DB and outputs the result, that is (MEMR4−MEMR5), from the output terminal OB as the signal btf2b_out to the output selection devices 24D-5 and 25D-5.

The butterfly computing unit 23D-3 is set by the control signal BTFMD3 supplied to the control terminal CTL to a mode in which OA=DA+DB, OB=DA−DB are calculated.

Due to this, the butterfly computing unit 23D-3 adds the data MEMR6 supplied to the input terminal DA and the data MEMR7 supplied to the input terminal DB and outputs the result, that is (MEMR6+MEMR7), from the output terminal OA as the signal btf3a_out to the input terminal DB of the butterfly computing unit 23D-5 and the output selection devices 24D-6 and 25D-6.

Further, the butterfly computing unit 23D-3 finds the difference between the data MEMR6 supplied to the input terminal DA and the data MEMR7 supplied to the input terminal DB and outputs the result, that is (MEMR6−MEMR7), from the output terminal OB as the signal btf3b_out to the output selection devices 24D-7 and 25D-7.

The butterfly computing unit 23D-4 is set by the control signal BTFMD4 supplied to the control terminal CTL to a mode in which OA=DA+DB, OB=DA−DB are calculated.

Due to this, the butterfly computing unit 23D-4 adds the data (MEMR0+MEMR1) supplied to the input terminal DA and the data (MEMR2+MEMR3) supplied to the terminal DB and outputs the result, that is (MEMR0+MEMR1+MEMR2+MEMR3) from the output terminal OA as the signal btf4a_out to the input terminal DA of the butterfly computing unit 23D-6 and the output selection devices 25D-0 and 25D-2.

Further, the butterfly computing unit 23D-4 finds the difference between the data (MEMR0+MEMR1) supplied to the input terminal DA and the data (MEMR2+MEMR3) supplied to the input terminal DB and outputs the result, that is (MEMR0+MEMR1−MEMR2−MEMR3), from the output terminal OB as the signal btf4b_out to the output selection devices 25D-1 and 25D-3.

The butterfly computing unit 23D-5 is set by the control signal BTFMD5 supplied to the control terminal CTL to a mode in which OA=DA+DB, OB=DA−DB are calculated.

Due to this, the butterfly computing unit 23D-5 adds the data (MEMR4+MEMR5) supplied to the input terminal DA and the data (MEMR6+MEMR7) supplied to the input terminal DB and outputs the result, that is (MEMR4+MEMR5+MEMR6+MEMR7), from the output terminal OA as the signal btf5a_out to the input terminal DB of the butterfly computing unit 23D-6 and the output selection devices 25D-4 and 25D-6.

Further, the butterfly computing unit 23D-5 finds the difference between the data (MEMR4+MEMR5) supplied to the input terminal DA and the data (MEMR6+MEMR7) supplied to the input terminal DB and outputs the result, that is (MEMR4+MEMR5−MEMR6−MEMR7), from the output terminal OB as the signal btf5b_out to the output selection devices 25D-5 and 25D-7.

Further, the butterfly computing unit 23D-6 is set by the control signal BTFMD6 supplied to the control terminal CTL to a mode in which OA=DA+DB, OB=DA−DB are calculated.

Due to this, the butterfly computing unit 23D-6 adds the data (MEMR0+MEMR1+MEMR2+MEMR3) supplied to the input terminal DA and the data (MEMR4+MEMR5+MEMR6+MEMR7) supplied to the input terminal DB and outputs the result, that is (MEMR0+MEMR1+MEMR2+MEMR3+MEMR4+MEMR5+MEMR6+MEMR7), from the output terminal OA as the signal btf6a_out to the output selection devices 25D-0, 25D-2, 25D-4, and 25D-6.

Further, the butterfly computing unit 23D-6 finds the difference between the data (MEMR0+MEMR1+MEMR2+MEMR3) supplied to the input terminal DA and the data (MEMR4+MEMR5+MEMR6+MEMR7) supplied to the input terminal DB and outputs the result, that is (MEMR0+MEMR1+MEMR2+MEMR3−MEMR4−MEMR5−MEMR6−MEMR7) from the output terminal OB as the signal btf6b_out to the output selection devices 25D-1, 25D-3, 25D-5, and 25D-7.

The output selection device 24D-0 is supplied with the control signal D0SEL so as to select the output signal btf0a_out of the butterfly computing unit 23D-0 from the data input MEMR0 and the output signal btf0a_(=MEMR0+MEMR1) of the butterfly computing unit 23D-0. The data selected by this is output as the signal D0=MEMR0+MEMR1.

The output selection device 24D-1 is supplied with the control signal D1SEL so as to select the data input MEMR1 from the data input MEMR1 and the output signal btf0b_out (=MEMR0−MEMR1) of the butterfly computing unit 23D-0. The data selected by this is output as the signal D1=MEMR1.

The output selection device 24D-2 is supplied with the control signal D2SEL so as to select the data input MEMR2 from the data input MEMR2 and the output signal btf1a_out (=MEMR2+MEMR3) of the butterfly computing unit 23D-1. The data selected by this is output as the signal D2=MEMR2.

The output selection device 24D-3 is supplied with the control signal D3SEL so as to select the output signal btf1b_out of the butterfly computing unit 23D-1 from the data input MEMR3 and the output signal btf1b_out (=MEMR2−MEMR3) of the butterfly computing unit 23D-1. The data selected by this is output as the signal D3=MEMR2−MEMR3.

The output selection device 24D-4 is supplied with the control signal D4SEL so as to select the output signal btf2a_out of the butterfly computing unit 23D-2 from the data input MEMR4 and the output signal btf2a_(=MEMR4+MEMR5) of the butterfly computing unit 23D-2. The data selected by this is output as the signal D D4=MEMR4+MEMR5.

The output selection device 24D-5 is supplied with the control signal D5SEL so as to select the data input MEMR5 from the data input MEMR5 and the output signal btf2b_out of the butterfly computing unit 23D-2 (=MEMR4−MEMR5) of the butterfly computing unit 23D-2. The data selected by this is output as the signal D5=MEMR5.

The output selection device 24D-6 is supplied with the control signal D6SEL so as to select the output signal btf3a_out of the butterfly computing unit 23D-3 from the data input MEMR6 and the output signal btf3a_out (=MEMR6+MEMR7) of the butterfly computing unit 23D-3. The data selected by this is output as the signal D6=MEMR6+MEMR7.

The output selection device 24D-7 is supplied with the control signal D7SEL so as to select the output signal btf3b_out of the butterfly computing unit 23D-3 from the data input MEMR7 and the output signal btf3b_out (=MEMR6−MEMR7) of the butterfly computing unit 23D-3. The data selected by this is output as the signal D7=MEMR6−MEMR7.

Further, the output selection device 25D-0 is supplied with the control signal W0SEL so as to select the input data I0 from the data input I0, the output signal btf0a_out (=MEMR0+MEMR1) of the butterfly computing unit 23D-0, the output signal btf4a_(=MEMR0+MEMR1+MEMR2+MEMR3) of the butterfly computing unit 23D-4, and the output signal btf6a_out (=MEMR0+MEMR1+MEMR2+MEMR3+MEMR4+MEMR5+MEMR6+MEMR7) of the butterfly computing unit 23D-6. The data selected by this is output as the signal MEMW0=I0.

Further, the output selection device 25D-1 is supplied with the control signal W1SEL so as to select the output signal btf4b_out of the butterfly computing unit 23D-4 from the data input I1, the output signal btf0b_out (=MEMR0−MEMR1) of the butterfly computing unit 23D-0, the output signal btf4b_out (=MEMR0+MEMR1−MEMR2−MEMR3) of the butterfly computing unit 23D-4, and the output signal btf6b_out (=MEMR0+MEMR1+MEMR2+MEMR3−MEMR4−MEMR5−MEMR6−MEMR7) of the butterfly computing unit 23D-6. The data selected by this is output as the signal MEMW1=MEMR0+MEMR1−MEMR2−MEMR3.

Further, the output selection device 25D-2 is supplied with the control signal W2SEL so as to select the output signal btf4a_out of the butterfly computing unit 23D-4 from the data input I2, the output signal btf1a_out (=MEMR2+MEMR3) of the butterfly computing unit 23D-1, the output signal btf4a_out (=MEMR0+MEMR1+MEMR2+MEMR3) of the butterfly computing unit 23D-4, and the output signal btf6a_out (=MEMR0+MEMR1+MEMR2+MEMR3+MEMR4+MEMR5+MEMR6+MEMR7) of the butterfly computing unit 23D-6. The data selected by this is output as the signal MEMW2=MEMR0+MEMR1+MEMR2+MEMR3.

Further, the output selection device 25D-3 is supplied with the control signal W3SEL so as to select the input data I3 from the data input I3, the output signal btf1b_out (=MEMR2−MEMR3) of the butterfly computing unit 23D-1, the output signal btf4b_(=MEMR0+MEMR1−MEMR2−MEMR3) of the butterfly computing unit 23D-4 and the output signal btf6b_out (=MEMR0+MEMR1+MEMR2+MEMR3−MEMR4−MEMR5−MEMR6−MEMR7) of the butterfly computing unit 23D-6. The data selected by this is output as the signal MEMW3=I3.

Further, the output selection device 25D-4 is supplied with the control signal W4SEL so as to select the output signal bt6a_out of the butterfly computing unit 23D-6 from the data input I4, the output signal btf2a_out (=MEMR4+MEMR5) of the butterfly computing unit 23D-2, the output signal btf5a_out (=MEMR4+MEMR5+MEMR6+MEMR7) of the butterfly computing unit 23D-5, and the output signal btf6a_out (=MEMR0+MEMR1+MEMR2+MEMR3+MEMR4+MEMR5+MEMR6+MEMR7) of the butterfly computing unit 23D-6. The data selected by this is output as the signal MEMW4=MEMR0+MEMR1+MEMR2+MEMR3+MEMR4+MEMR5+MEMR6+MEMR7.

Further, the output selection device 25D-5 is supplied with a control signal W5SEL so as to select the output signal btf5b_out of the butterfly computing unit 23D-5 from the data input I5, the output signal btf2b_out (=MEMR4−MEMR5) of the butterfly computing unit 23D-2, the output signal btf5b_out (=MEMR4+MEMR5−MEMR6−MEMR7) of the butterfly computing unit 23D-5, and the output signal btf6b_out (=MEMR0+MEMR1+MEMR2+MEMR3−MEMR4−MEMR5−MEMR6−MEMR7) of the butterfly computing unit 23D-6. The data selected by this is output as the signal MEMW5=MEMR4+MEMR5−MEMR6−MEMR7.

Further, the output selection device 25D-6 is supplied with the control signal W6SEL so as to select the data input I6 from the data input I6, the output signal btf3a_out (=MEMR6+MEMR7) of the butterfly computing unit 23D-3, the output signal btf5a_(=MEMR4+MEMR5+MEMR6+MEMR7) of the butterfly computing unit 23D-5, and the output signal btf6a_out (=MEMR0+MEMR1+MEMR2+MEMR3+MEMR4+MEMR5+MEMR6+MEMR7) of the butterfly computing unit 23D-6. The data selected by this is output as the signal MEMW6=I6.

Further, the output selection device 25D-7 is supplied with the control signal W7SEL so as to select the output signal btf6b_out of the butterfly computing unit 23D-6 from the data input I7, the output signal btf3b_out (=MEMR6−MEMR7) of the butterfly computing unit 23D-3, the output signal btf5b_out (=MEMR4+MEMR5−MEMR6−MEMR7) of the butterfly computing unit 23D-5, and the output signal btf6b_out (=MEMR0+MEMR1+MEMR2+MEMR3−MEMR4−MEMR5−MEMR6−MEMR7) of the butterfly computing unit 23D-6. The data selected by this is output as the signal MEMW7=MEMR0+MEMR1+MEMR2+MEMR3−MEMR4−MEMR5−MEMR6−MEMR7.

In the above way, according to the 16-input, 16-output arithmetic device 20D according to the seventh embodiment, it is possible to obtain effects similar to the effects of the above third embodiment.

Note that, in the seventh embodiment, it is possible to arrange monadic computing units, for example, shift computing units, at the input stages of the data inputs MEMR0 to MEMR7 in the same way as the above third to fifth embodiments.

In this case, the monadic computing units SFT0, SFT1, SFT2, SFT3, SFT4, SFT5, SFT6, SFT7 receive as inputs for example the control signals SFT0MD, SFT1MD, SFT2MD, SFT3MD, SFT4MD, SFT5MD, SFT6MD, SFT7MD, perform monadic operation on the values of MEMR0, MEMR1, MEMR2, MEMR3, MEMR4, MEMR5, MEMR6, MEMR7 in accordance with the values of the control signals SFT0MD, SFT1MD, SFT2MD, SFT3MD, SFT4MD, SFT5MD, SFT6MD, SFT7MD, and output the results to the input selection devices 22D-0 to 22D-7 (RSEL0 to RSEL7) and output selection devices 24D-0 to 24D-7 (DSEL0 to DSEL7).

However, here, a monadic computing unit is a computing unit realized by processing for shifting to the left or right by any bits.

Eighth Embodiment

Figure 10:
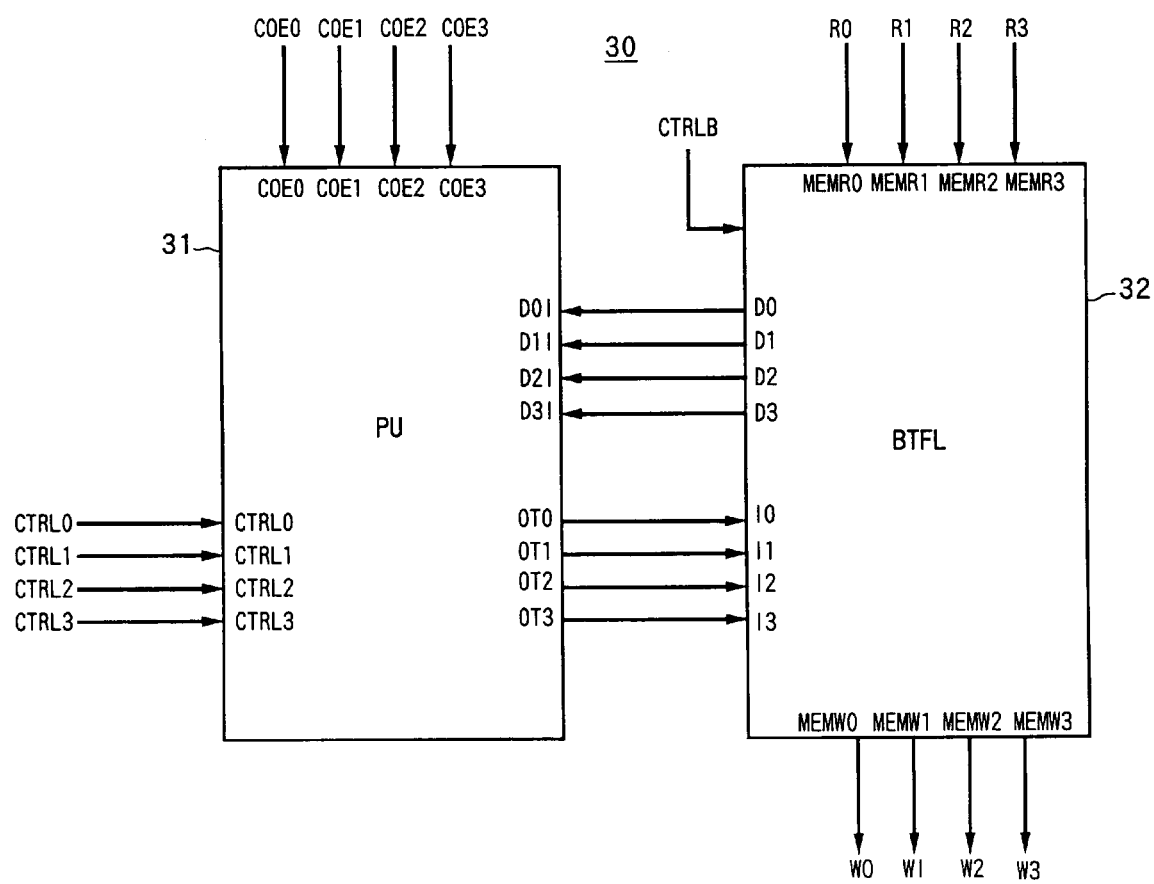
FIG. 10 is a view of the configuration showing an eighth embodiment of an arithmetic device according to the present invention.

FIG. 10 is a view of the configuration showing an eighth embodiment according to the present invention.

The arithmetic device 30 of FIG. 10 connects a first arithmetic device including an ALU and MAC according to the above first and second embodiments and a second arithmetic device including a butterfly computing unit according to the third to seventh embodiments in a reconfigurable manner to enable efficient execution of signal processing by one cycle of a data read operation, operation, and a data write operation.

The arithmetic device 30 according to the eighth embodiment, as shown in FIG. 10, has as main components a first arithmetic device (PU) 31 including an ALU and MAC and a second arithmetic device (BTFL) 32 including a butterfly computing unit.

The first arithmetic device 31 has the same configuration as the arithmetic device of FIG. 4 comprised of for example four arithmetic devices of FIG. 2 connected in cascade. It has the data inputs D0I, D1I, D2I, D3I, coefficient inputs COE0, COE1, COE2, COE3, and data outputs OT0, OT1, OT2, OT3 and is supplied with the control signals for reconfiguration CTRL0, CTRL1, CTRL2, CTRL3.

Further, the control signals include the operation control signals ASEL, BSEL, CSEL, ESEL, MACMD, ALUMD, RNDMD, SATMD, OSFMD, ACCMD, and delay control signals C0DL, C1DL, C2DL, C3DL, D0DL, D1DL, D2DL, D3DL.

The second arithmetic device 32 has the data inputs MEMR0, MEMR1, MEMR2, MEMR3, the operation result inputs I0, I1, I2, I3, data outputs D0, D1, D2, D3, and MEMW0, MEMW1, MEMW2, MEMW3 and is supplied with the reconfiguration control signal CTRLB.

For example taking as an example of the case of the fourth embodiment, the control signal CTRLB includes SFT0MD, R0SEL, BTFMD0, D0SEL, W0SEL, SFT1MD, R1SEL, BTFMD1, D1SEL, W1SEL, SFT2MD, R2SEL, BTFMD2, D2SEL, W2SEL, and SFT3MD, R3SEL, BTFMD3, D3SEL, W3SEL.

Further, the data input MEMR0 of the second arithmetic device 32 is supplied with the data R0, the data input MEMR1 is supplied with the data R1, the data input MEMR2 is supplied with the data R2, and the data input MEMR3 is supplied with the data R3.

The data output D0 of the second arithmetic device 32 is supplied to the data input D0I of the first arithmetic device 31, the data output D1 of the second arithmetic device 32 is supplied to the data input D1I fo the first arithmetic device 31, the data output D2 of the second arithmetic device 32 is supplied to the data input D2I of the first arithmetic device 31, the data output D3 of the second arithmetic device 32 is supplied to the data input D3I of the first arithmetic device 32.

Further, the data output OT0 of the first arithmetic device 31 is supplied to the data input I0 of the second arithmetic device 32, the data output OT1 of the first arithmetic device 31 is supplied to the data input I1 of the second arithmetic device 32, the data output OT2 of the first arithmetic device 31 is supplied to the data input I2 of the second arithmetic device 32, and the data output OT3 of the first arithmetic device 31 is supplied to the data input I3 of the second arithmetic device 32.

Further, the data W0 is output from the data output MEMW0 of the second arithmetic device 32, the data W1 is output from the data output MEMW1, the data W2 is output from the data output MEMW2, and the data W3 is output from the data output MEMW3.

Further, the first arithmetic device 31 is configured to be able to simultaneously (in parallel) execute the following operations.

OT0=
((C0I||C1I||C2I||C3I||D0I||D1I||D2I||D3I||OT1||OT2||OT3||0) op0       (D0I||D1I||D2I||D3I||OT0)op1 (D0I||D1I||D2I||D3I||OT1||OT2||OT3||0)), and
OT1=
((C0I||C1I||C2I||C3I||D0I||D1I||D2I||D3I||OT1||OT2||OT3||0) op2       (D0I||D1I||D2I||D3I||OT0)op3 (D0I||D1I||D2I||D3I||OT2||OT3||OT0||0)), and
OT2=
((C0I||C1I||C2I||C3I||D0I||D1I||D2I||D3I||OT1||OT2||OT3||0) op4       (D0I||D1I||D2I||D3I||OT0)op5 (D0I||D1I||D2I||D3I||OT3||OT0||OT1||0)), and
OT3=
((C0I||C1I||C2I||C3I||D0I||D1I||D2I||D3I||OT1||OT2||OT3||0) op6       (D0I||D1I||D2I||D3I||OT0)op7 (D0I||D1I||D2I||D3I||OT0||OT1||OT2||0))

Here, || indicates selection operation, while op0 to op7 indicate operators. Further, here, the operators op0 to op7 are defined by any of the following.

AoPB=A*B,
AopB=A*−B,
AopB=A+B,
AopB=A−B,
AopB=A&B,
AopB=A|B,
AopB=A∧B,

Further, the second arithmetic device 32 is configured to be able to simultaneously (in parallel) execute the following operations.

MEMW0=((MEMR0||I0)op0(MEMR1||I1))||I0, and
MEMW1=((MEMR0||I0)op1(MEMR1||I1))||I1, and
MEMW2=((MEMR2||I2)op2(MEMR3||I3))||I2, and
MEMW3=((MEMR2||I2)op3(MEMR3||I3))||I3, and
D0=((MEMR0||I0)op4(MEMR1||I1))||MEMR0, and
D1=((MEMR0||I0)op5(MEMR1||I1))||MEMR1, and
D2=((MEMR2||I2)op6(MEMR3||I3))||MEMR2, and
D3=((MEMR2||I2)op7(MEMR3||I3))||MEMR3

Here too, || indicates selection operation, while op0 to op7 indicate operators. Further, here, the operators op0 to op7 are defined by any of the following.

AopB=A+B,
AopB=A−B,
AopB=−A+B,
AopB=−A−B,
AopB=A,
AopB=−A,
AopB=B,
AopB=−B,

Next, the operation of the arithmetic device of FIG. 10 will be explained taking as an example a case where the first arithmetic device 31 has a configuration similar to that of the parallel arithmetic device of FIG. 4 and the second arithmetic device 32 has a configuration similar to that of the device of FIG. 6.

Note that, here, it is assumed that the following operations are executed:

W0=R0+R1,
W1=COE0*(R0−R1)−COE1*(R2−R3),
W2=R2+R3,
W3=COE2*(R0−R1)+COE3*(R2−R3)

First, the second arithmetic device 32, as shown in FIG. 6, is set the amounts of shift of for example the shift computing units 21A-0, 21A-1, 21A-2, 21A-3 to zero by the control signals SFT0MD, SFT1MD, SFT2MD, SFT3MD.

Therefore, the output signal sft0_out of the shift computing unit 21A-0 becomes MEMR0, that is, the data R0, and is supplied to the input selection device 22A-0 and the output selection device 24A-0.

Similarly, the output signal sft1_out of the shift computing unit 21A-1 becomes MEMR1, that is, R1 and is supplied to the input selection device 22A-1 and output selection device 24A-1.

The output signal sft2_out of the shift computing unit 21A-2 becomes MEMR2, that is, R2 and is supplied to the input selection device 22A-2 and output selection device 24A-2.

Further, the output signal sft3_out of the shift computing unit 21A-3 becomes MEMR3, that is, R3, and is supplied to the input selection device 22A-3 and output selection device 24A-3.

The input selection device 22A-0 is controlled in accordance with the control signal R0SEL so as to select the output signal R0 of the shift computing unit 21A-0. The selected data R0 is supplied as the signal r0sel_out to the input terminal DA of the butterfly computing unit 23A-0.

The input selection device 22A-1 is controlled in accordance with the control signal R1SEL so as to select the output signal R1 of the shift computing unit 21A-1. The selected data R1 is supplied as the signal r1sel_out to the input terminal DB of the butterfly computing unit 23A-0.

Further, the input selection device 22A-2 is controlled in accordance with the control signal R2SEL so as to select the output signal R2 of the shift computing unit 21A-2. The selected data R2 is supplied as the signal r2sel_out to the input terminal DA of the butterfly computing unit 23A-1.

The input selection device 22A-3 is controlled in accordance with the control signal R3SEL so as to select the output signal R3 of the shift computing unit 21A-3. The selected data R3 is supplied as the signal r3sel_out to the input terminal DB of the butterfly computing unit 23A-1.

The butterfly computing unit 23A-0 is set by the control signal BTFMD0 supplied to the control terminal CTL to a mode in which OA=DA+DB, OB=DA−DB are calculated.

Due to this, the butterfly computing unit 23A-0 adds the data R0 supplied to the input terminal DA and the data R1 supplied to the input terminal DB and outputs the result, that is (R0+R1), from the output terminal OA as the signal btf0a_out to the output selection devices 24A-0 and 25A-0.

Further, the butterfly computing unit 23A-0 finds the difference between the data R0 supplied to the input terminal DA and the data R1 supplied to the input terminal DB and outputs the result, that is (R0−R1), from the output terminal OB as the signal btf0b_out to the output selection devices 24A-1 and 25A-1.

Similarly, the butterfly computing unit 23A-1 is set by the control signal BTFMD1 supplied to the control terminal CTL to a mode in which OA=DA+DB, OB=DA−DB are calculated.

Due to this, the butterfly computing unit 23A-1 adds the data R2 supplied to the input terminal DA and the data R3 supplied to the input terminal DB and outputs the result, that is (R2+R3), from the output terminal OA as the signal btf1a_out to the output selection devices 24A-2 and 25A-2.

Further, the butterfly computing unit 23A-1 finds the difference between the data R2 supplied to the input terminal DA and the data R3 supplied to the input terminal DB and outputs the result, that is (R2−R3), from the output terminal OB as the signal btf1b_out to the output selection devices 24A-3 and 25A-3.

Further, in the second arithmetic device 32, the output selection device 24A-1 is supplied with a control signal D1SEL so as to select the output signal btf0b_out of the butterfly computing unit 23A-0 from the output signal (R1) of the shift computing unit 21A-1 and the output signal btf0b_out (=R0−R1) of the butterfly computing unit 23A-0. The data selected by this is supplied as the signal D1=R0−R1 to the data input D1I of the first arithmetic device 31.

Similarly, in the second arithmetic device 32, the output selection device 24A-3 is supplied with the control signal D3SEL so as to select the output signal btf1b_out of the butterfly computing unit 23A-1 from the output signal (R3) of the shift computing unit 21A-3 and the output signal btf1*b*_out (=R2−R3) of the butterfly computing unit 23A-1. The data selected by this is supplied as the signal D3=R2−R3 to the data input D3I of the first arithmetic device 31.

In the first arithmetic device 31, first, the arithmetic device 10A-0 is controlled in accordance with the control signal CTL0 to perform the processing of the operation result signal OT0=COE0*D1.

In this case, in the arithmetic device 10A-0, the control signal ASEL is set so as to select the coefficient input COE0 and is supplied to the first selection device 11.

Further, the control signal BSEL is set so as to select the data input D1I (=D1=R0−R1) and is supplied to the second selection device 12.

Due to this, the first selection device 11 outputs the coefficient COE0 as the signal asel_out to the ALU 14 and MAC 15. Further, the second selection device 12 outputs the data D1 (=R0−R1) as the signal bsel_out to the ALU 14 and MAC 15.

At this time, a control signal MACMD designating multiplication is supplied to the MAC 15. Due to this, the MAC 15 multiplies the coefficient COE0 and the data D1 and outputs the result COE0*D1 as the signal mac_out to the fourth selection device 16.

Further, the control signal ESEL is set so as to select the output of the MAC 15 and is supplied to the fourth selection device 16. As a result, the fourth selection device 16 selects the output signal mac_out of the MAC 15 (COE0*D1) and outputs it as the signal esel_out (COE0*D1) to the register 17.

The register 17 stores the operation results COE0*D1 of the MAC 15 and outputs the stored data from the operation output terminal PE_C as the operation result signal OT0 to the cascade input PE_P0 of the arithmetic device 10A-1, the cascade input PE_P1 of the arithmetic device 10A-2, and the cascade input PE_P2 of the arithmetic device 10A-3.

The arithmetic device 10A-0 outputs the coefficients COE0 to COE3 delayed by exactly the desired amounts of delay by the C0FIFO18-0 to C3FIFO18-3 from the coefficient output terminals PE_C0O to PE_C3O as the coefficient outputs c00 to c30 to the coefficient input terminals PE_C0I to PE_C3I of the arithmetic device 10A-1 of the next stage and outputs the data D1, D3 delayed by exactly the desired amounts of delay by the D0FIFO19-1, D3FIFO19-3 from the data output terminals PE_D1O, PE_D3O as the data outputs d10, d30 to the data input terminals PE_D1I, PE_D3I of the arithmetic device 10A-1 of the next stage.

Next, the arithmetic device 10A-1 is controlled in accordance with the control signal CTL1 so as to perform the processing of the operation result signal OT1=OT0−COE1*D3.

In this case, the control signal ASEL is set so as to select the coefficient output c10 (COE1) of the arithmetic device 10A-0 supplied to the coefficient input terminal PE_C1I and is supplied to the first selection device 11.

Further, the control signal BSEL is set so as to select the data output d10 (D3=R2−R3) of the arithmetic device 10A-0 supplied to the data input terminal PE_D1I and is supplied to the second selection device 12.

Further, the control signal CSEL is set so as to select the operation result signal OT0 (COE0*D1) of the arithmetic device 10A-0 supplied to the cascade input terminal PE_P0 and is supplied to the third selection device 13.

Due to this, the first selection device 11 outputs the coefficient COE1 as the signal asel_out to the ALU 14 and MAC 15. Further, the second selection device 12 outputs the data D3 (=R2−R3) as the signal bsel_out to the ALU 14 and MAC 15. Further, the third selection device 13 outputs the cascade input data COE0*D1 as the signal csel_out to the first selection device 11, ALU 14, and MAC 15.

At this time, a control signal MACMD designating multiplication and subtraction is supplied to the MAC 15. Due to this, the MAC 15 multiplies the coefficient COE1 and the data D3 and obtains the difference of the result COE0*D1 from the COE1*D3. Due to this, the MAC 15 outputs the multiplication and subtraction result (COE0*D1−COE1*D3) as the signal mac_out to the fourth selection device 16.

Further, the control signal ESEL is set so as to select the output of the MAC 15 and is supplied to the fourth selection device 16. As a result, the fourth selection device 16 selects the output signal mac_out (COE0*D1−COE1*D3) of the MAC 15 and outputs it as the signal esel_out to the register 17.

The register 17 stores the operation result (COE0*D1−COE1*D3) of the MAC 15 and outputs the stored data from the operation output terminal PE_C as the operation result signal OT1 to the cascade input PE_P2 of the arithmetic device 10A-0, the cascade input PE_P0 of the arithmetic device 10A-2, and the cascade input PE_P1 of the arithmetic device 10A-2.

Further, an operation result signal OT1 showing the (COE0*D1−COE1*D3) of the arithmetic device 10A-1 is supplied to the data input I1 of the second arithmetic device 32 of FIG. 10.

Further, the arithmetic device 10A-1 outputs the coefficients COE0 to COE3 delayed by exactly the desired amounts of data by the C0FIFO18-0 to C3FIFO18-3 from the coefficient output terminals PE_C0O to PE_C3O as the coefficient outputs c01 to c31 to the coefficient input terminals PE_C0I to PE_C3I of the arithmetic device 10A-2 of the next stage and outputs the data D1, D3 delayed by exactly the desired amounts of delay by the D0FIFO19-1, D3FIFO19-3 from the data output terminals PE_D1O, PE_D3O as the data outputs d11, d31 to the data input terminals PE_D1I, PE_D3I of the arithmetic device 10A-2 of the next stage.

Next, the arithmetic device 10A-2 is controlled in accordance with the control signal CTL2 to perform the processing of the operation result signal OT2=COE2*D1.

In this case, the control signal ASEL is set so as to select the coefficient output c21 (COE2) of the arithmetic device 10A-1 supplied to the coefficient input terminal PE_C2I and supplied to the first selection device 11.

Further, the control signal BSEL is set so as to select the data output d11(D1) of the arithmetic device 10A-1 supplied to the data input terminal PE_D1I and supplied to the second selection device 12.

Due to this, the first selection device 11 outputs the coefficient COE2 as the signal asel_out to the ALU 14 and MAC 15. Further, the second selection device 12 outputs the data D1 as the signal bsel_out to the ALU 14 and MAC 15.

At this time, a control signal MACMD designating multiplication is supplied to the MAC 15. Due to this, the MAC 15 multiplies the coefficient COE2 and data D1. Due to this, the MAC 15 outputs the multiplication result COE2*D1 as the signal mac_out to the fourth selection device 16.

Further, the control signal ESEL is set so as to select the output of the MAC 15 and supplied to the fourth selection device 16. As a result, the fourth selection device 16 selects the output signal mac_out (COE2*D1) of the MAC 15 and outputs it as the signal esel_out (COE2*D1) to the register 17.

The register 17 stores the operation results COE2*D1 of the MAC 15 and outputs the stored data from the operation output terminal PE_C as the operation result signal OT2 to the cascade input PE_P1 of the arithmetic device 10A-0, the cascade input PE_P2 of the arithmetic device 10A-2, and the cascade input PE_P0 of the arithmetic device 10A-3.

The arithmetic device 10A-2 outputs the coefficients COE0, COE1, COE2, COE3 delayed by exactly the desired amount of delay by the C0FIFO18-0 to C3FIFO18-3 from the coefficient output terminals PE_C0O to PE_3O as the coefficient outputs c02 to c32 to the coefficient input terminals PE_C0I to PE_C3I of the arithmetic device 10A-3 of the next stage and outputs the data D1, D3 delayed by exactly the desired amount of delay by the D0FIFO19-1, D3FIFO19-3 from the data output terminals PE_D1O, PE_D3O as the data output d12, d32 to the data input terminals PE_D1I to PE_D3I of the arithmetic device 10A-3 of the next stage.

Next, the arithmetic device 10A-3 is controlled in accordance with the control signal CTL3 to perform the processing of the operation result signal OT3=OT2+COE3*D3=COE2*D1+COE3*D3.

In this case, the control signal ASEL is set so as to select the coefficient output c32 (COE3) of the arithmetic device 10A-2 supplied to the coefficient input terminal PE_C3I and is supplied to the first selection device 11.

Further, the control signal BSEL is set so as to select the data output d32 (D3) of the arithmetic device 10A-2 supplied to the data input terminal PE_D3I and is supplied to the second selection device 12.

Further, the control signal CSEL is set so as to select the operation result signal OT2 (COE2*D1) of the arithmetic device 10A-2 supplied to the cascade input terminal PE_P0 and is supplied to the third selection device 13.

Due to this, the first selection device 11 outputs the coefficient COE3 as the signal asel_out to the ALU 14 and MAC 15. Further, the second selection device 12 outputs the data D3 as the signal bsel_out to the ALU 14 and MAC 15. Further, the third selection device 13 outputs the cascade input data COE2*D1 as the signal csel_out to the first selection device 11, ALU 14, and MAC 15.

At this time, a control signal MACMD designating multiplication and addition is supplied to the MAC 15. Due to this, the MAC 15 multiplies the coefficient COE3 and data D3 and adds the result COE3*D3 and (COE2*D1). Due to this, the MAC 15 outputs the multiplication and addition result COE3*D3+COE2*D1 as the signal mac_out to the fourth selection device 16.

Further, the control signal ESEL is set so as to select the output of the MAC 15 and supplied to the fourth selection device 16. As a result, the fourth selection device 16 selects the output signal mac_out (COE2*D1+COE3*D3) of the MAC 15 and outputs it as the signal esel_out (COE2*D1+ COE3*D3) to the register 17.

The register 17 stores the operation results (COE2*D1+ COE3*D3) of the MAC 15 and outputs the stored data from the operation output terminal PE_C as the operation result signal OT3 as the desired operation results out and outputs it to the cascade input PE_P0 of the arithmetic device 10A-0, cascade input PE_P1 of the arithmetic device 10A-2, and cascade input PE_P2 of the arithmetic device 10A-2.

Further, the operation result signal OT3 showing the (COE2*D1+COE3*D3) of the arithmetic device 10A-3 is supplied to the data input I3 of the second arithmetic device 32 of FIG. 10.

Note that, in the above, the delay control signals C0DL, C1DL, C2DL, C3DL shown in FIG. 2 are supplied to the C0FIFO to C3FIFO 18-0 to 18-3 so as to all become the delay 0.

Further, the delay control signal D0DL is supplied to the D0FIFO 19-0 to become the delay 0, the delay control signal D1DL is supplied to the D1FIFO 19-1 to become the delay 1, the delay control signal D2DL is supplied to the D2FIFO 19-2 to become the delay 2, and the delay control signal D3DL is supplied to the D3FIFO 19-3 to become the delay 3.

The operation results (COE0*D1−COE1*D3) of the first arithmetic device 31 supplied to the data input I1 of the second arithmetic device 32 are supplied to the output selection device 25A-1 of FIG. 6.

Further, the operation results (COE2*D1+COE3*D3) of the first arithmetic device 31 supplied to the data input I3 of the second arithmetic device 32 are supplied to the output selection device 25A-3 of FIG. 6.

Further, in the second arithmetic device 32, the output selection device 25A-0 is supplied with the control signal W0SEL so as to select the output signal btf0a_out of the butterfly computing unit 23A-0 from the data input I0 and the output signal btf0a_out (=R0+R1) of the butterfly computing unit 23A-0. The data selected by this is output as the signal MEMW0=R0+R1.

Further, the output selection device 25A-1 is supplied with the control signal W1SEL so as to select the data input I1 from the data input I1 and output signal btf0b_out (=R0−R1) of the butterfly computing unit 23A-0. The data selected by this is output by as the signal MEMW1=I1= (COE0*D1−COE1*D3)=(COE0*(R0−R1)−COE1*(R2− R3)).

Further, the output selection device 25A-2 is supplied with the control signal W2SEL so as to select the output signal btf1a_out of the butterfly computing unit 23A-1 from the data input I2 and the output signal btf1a_out (=R2+R3) of the butterfly computing unit 23A-1. The data selected by this is output as the signal MEMW2=R2+R3.

Further, the output selection device 25A-3 is supplied with the control signal W3SEL so as to select the data input I3 from the data input I3 and the output signal btf1b_out (=R2−R3) of the butterfly computing unit 23A-1. The data selected by this is output as the signal MEMW3=I3= (COE2*D1+COE3*D3)=(COE2*(R0−R1)+COE3*(R2− R3)).

As explained above, according to the eighth embodiment, since arithmetic devices including ALUs and MACs according to the first and second embodiments and arithmetic devices including butterfly computing units according to the third to seventh embodiments are connected in a reconfigurable manner, there are the following advantages.

That is, when a conventional DSP or other processor executed the following operations
MEMW0=x[k0]+x[k1],
MEMW1=px*(x[k0]−x[k1])−py*(y[k0]−y[k1]),
MEMW2=y[k0]+y[k1],
MEMW3=px*(x[k0]−x[k1])+py*(y[k0]−y[k1])

processing for storing values temporarily in registers to give the following by calculation of for example MEMW1 became necessary:
reg1=x[k0]−x[k1],
reg2=px*reg1,
reg3=y[k0]−y[k1],
reg4=py*reg3,
MEMW1=reg2−reg4, Therefore, there were more unnecessary write operations into registers and read operations from the registers in the processing and the number of operating cycles and power consumption increased. By combining MACs, ALUs, and butterfly operation, however, when reading from a memory and then performing operation and write operations in the memory, the freedom of operation in the arithmetic blocks is increased and efficient processing becomes possible. Therefore, the number of cycles of executions becomes smaller and the temporary reading and writing of data becomes less frequent, so the power is cut.

Further, when as in the operation of MEMW0 and the operation of MEMW1 common use is made of x[k0], x[k1], a conventional processor could not simultaneously perform the processing of x[k0]+x[k1], x[k0]−x[k1] and therefore the number of cycles required for processing increased, but in the eighth embodiment, these operations are performed simultaneously, so fewer required number of cycles become necessary.

Further, according to the eighth embodiment, there is the advantage that it is possible to realize an arithmetic device which, in the same way as the above first embodiment, can optimize the logic level of course and also can prevent an increase in the component data and can prevent a fall in the area efficiency as an integrated circuit.

Further, since the arithmetic device can be reconfigured, it is possible to realize not only cascade processing, but also parallel processing by the same hardware. Therefore, it is possible to increase the number of arithmetic devices and perform more parallel processable processing efficiently.

Ninth Embodiment

Figure 11:
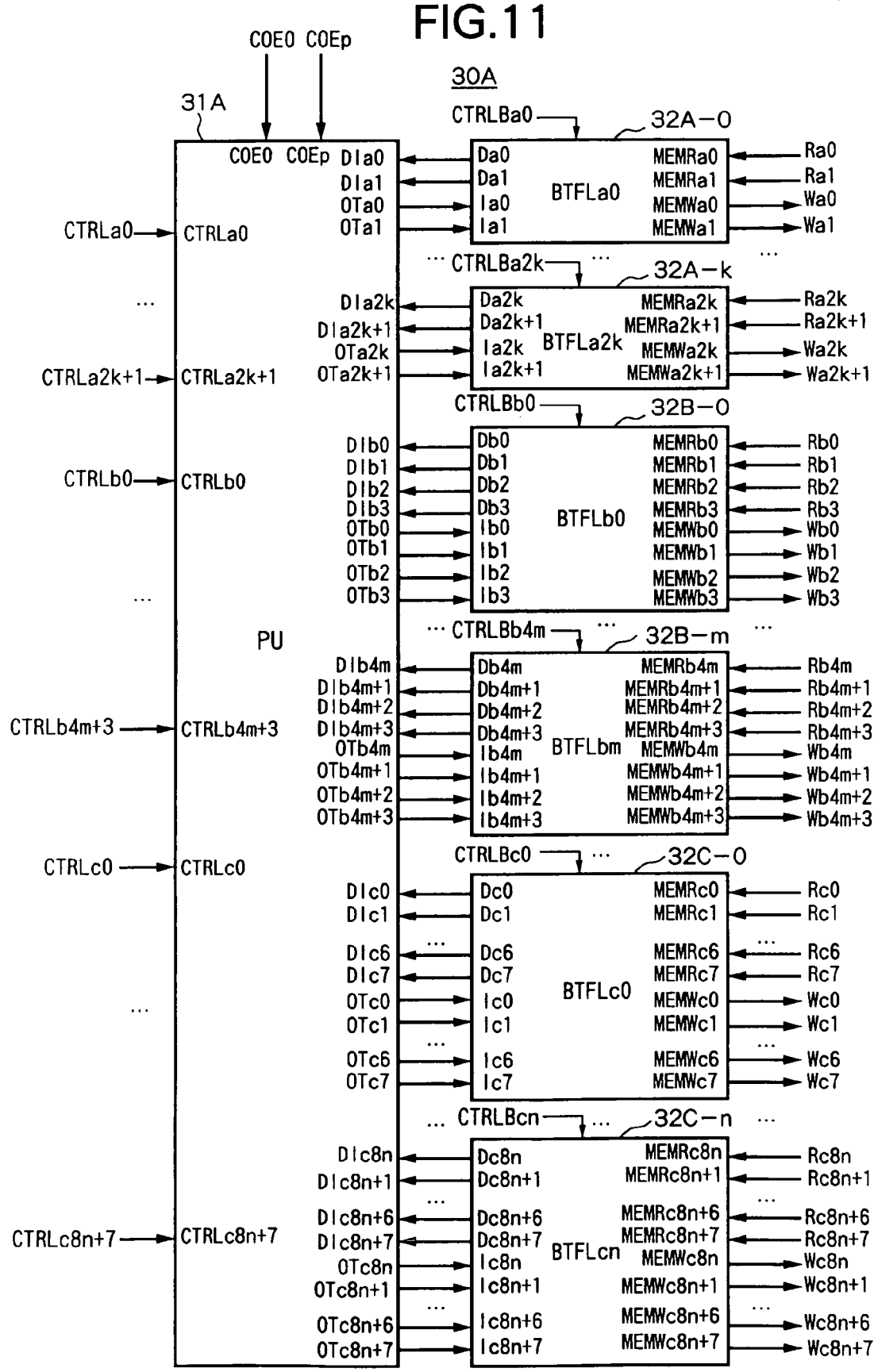
FIG. 11 is a view of the configuration showing a ninth embodiment of an arithmetic device according to the present invention.

FIG. 11 is a view of the configuration showing a ninth embodiment according to the present invention.

The arithmetic device 30A according to the ninth embodiment, like the eighth embodiment, is an example of a device in the case of further generalizing an arithmetic device comprising first arithmetic devices including ALUs and MACs according to the above first and second embodiments and second arithmetic devices including butterfly computing units according to the third to seventh embodiments in a reconfigurable manner.

This arithmetic device 30A is also configured to be able to efficiently execute signal processing by one cycle of a data reading operation, operation, and data write operation.

The arithmetic device 30A, as shown in FIG. 11, has as main components a first arithmetic device (PU) 31A including an ALU and MAC and second arithmetic devices 32A-0 (BTFLa0), . . . , 32A-k (BTFLak), 32B-0 (BTFLb0), . . . , 32B-m (BTFLbm), 32C-0 (BTFLc0), . . . , 32C-n (BTFLcn) including butterfly computing units.

Below, the data inputs and outputs and control signals and the connections of the first arithmetic device 31A and second arithmetic devices 32A-0 (BTF1a0), 32A-k (BTFLak), 32B-0 (BTFLb0), . . . , 32B-m (BTFLbm), 32C-0 (BTFLc0), . . . , 32C-n (BTFLcn) will be explained in detail. The operations of the parts are similar to the case of the eighth embodiment, so details will be omitted.

The first arithmetic device 31A includes an arithmetic device comprising a plurality of two, four, eight, etc. arithmetic devices of for example FIG. 1 or FIG. 2 connected in cascade, has the data inputs DIa0, DIa1, DIa2k, DIa2k+1, DIb0, DIb1, DIb2, DIb3, DIb4m, DIb4m+1, DIb4m+2, DIb4m+3, DIc0, DIc1, . . . , DIc6, DIc7, DIc8n, DIc8n+1, . . . , DIc8n+6, DIc8n+7, coefficient inputs COE0, . . . , COEp, and data outputs OTa0, OTa1, OTa2k, OTa2k+1, OTb0, OTb1, OTb2, OTb3, OTb4m, OTb4m+1, OTb4m+2, OTb4m+3, Otc0, Otc1 . . . OTc6, OTc7, OTc8n, OTc8n+1, . . . , OTc8n+6, OTc8n+7, and is supplied with control signals for reconfiguration CTRLa0, . . . , CTRLa2k+1, CTRLb0, . . . , CTRLb4m+3, CTRLc0, . . . , CTRLc8n+7.

Further, the control signals include the operation control signals ASEL, BSEL, CSEL, ESEL, MACMD, ALUMD, RNDMD, SATMD, OSFMD, ACCMD and delay control signals C0DL, C1DL, . . . , CkDL, D0DL, D1DL, . . . , DmDL.

The second arithmetic device 32A-0 is a 4-input, 4-output arithmetic device as shown in for example FIG. 5, has data inputs MEMRa0, MEMRa1, operation result inputs Ia0, Ia1, data outputs (operation result output) Da0, Da1, and data outputs MEMWa0, MEMWa, and is supplied with the control signal for reconfiguration CTRLBa0.

For example, taking as an example the third embodiment, the control signal CTRLBa0 includes the SFT0MD, R0SEL, BTFMD0, D0SEL, W0SEL, and SFT1MD, R1SEL, BTFMD1, D1SEL, W1SEL.

The second arithmetic device 32A-k is a 4-input, 4-output arithmetic device as shown in for example FIG. 5, has data inputs MEMRa2k, MEMRa2k+1, operation result inputs Ia2k, Ia2k+1, data outputs (operation result outputs) Da2k, Da2k+1, and data outputs MEMWa2k, MEMWa2k+1, and is supplied with control signal for reconfiguration CTRLBa2k.

For example, taking as an example the third embodiment, the control signal CTRLBa2k includes the SFT0MD, R0SEL, BTFMD0, D0SEL, W0SEL, and SFT1MD, R1SEL, BTFMD1, D1SEL, W1SEL.

The second arithmetic device 32B-0 is an 8-input, 8-output arithmetic device as shown in for example FIG. 6 or FIG. 7, has data inputs MEMRb0, MEMRb1, MEMRb2, MEMRb3, operation result inputs Ib0, Ib1, Ib2, Ib3, data outputs (operation result outputs) Db0, Db1, Db2, Db3, and data outputs MEMWb0, MEMWb1, MEMWb2, MEMWb3, and is supplied with control signal for reconfiguration CTRLBb0.

For example, taking as an example the fourth or fifth embodiment, the control signal CTRLBb0 includes the SFT0MD, R0SEL, BTFMD0, D0SEL, W0SEL, SFT1MD, R1SEL, BTFMD1, D1SEL, W1SEL, SFT2MD, R2SEL, BTFMD2, D2SEL, W2SEL, and SFT3MD, R3SEL, BTFMD3, D3SEL, W3SEL.

The second arithmetic device 32B-m is an 8-input, 8-output arithmetic device as shown in for example FIG. 6 or FIG. 7, has data inputs MEMRb4m, MEMRb4m+1, MEMRb4m+2, MEMRb4m+3, operation result inputs Ib4m, Ib4m+1, Ib4m+2, Ib4m+3, data outputs (operation result outputs) Db4m, Db4m+1, Db4m+2, Db4m+3, and data outputs MEMWb4m, MEMWb4m+1, MEMWb4m+2, MEMWb4m+3, and is supplied with the control signal for reconfiguration CTRLBb4m.

For example, taking as an example the fourth or fifth embodiment, the control signal CTRLBb4m includes the SFT0MD, R0SEL, BTFMD0, D0SEL, W0SEL, SFT1MD, R1SEL, BTFMD1, D1SEL, W1SEL, SFT2MD, R2SEL, BTFMD2, D2SEL, W2SEL, and SFT3MD, R3SEL, BTFMD3, D3SEL, W3SEL.

The second arithmetic device 32C-0 is a 16-input, 16-output arithmetic device as shown in for example FIG. 8 or FIG. 9, has the data inputs MEMRc0, MEMRc1, . . . , MEMRc6, MEMRc7, operation result inputs Ic0, Ic1, . . . , Ic6, Ic7, data outputs (operation result outputs) Dc0, Dc1, . . . , Dc6, Dc7, and data outputs MEMWc0, MEMWc1, . . . , MEMWc6, MEMWc7, and is supplied with the control signal for reconfiguration CTRLBc0.

For example, taking as an example the sixth or seventh embodiment, the control signal CTRLBb4m includes the SFT0MD, R0SEL, MTFMD0, D0SEL, W0SEL, SFT1MD, R1SEL, MTFMD1, D1SEL, W1SEL, SFT2MD, R2SEL, MTFMD2, D2SEL, W2SEL, SFT3MD, R3SEL, MTFMD3, D3SEL, W3SEL, SFT4MD, R4SEL, MTFMD4, D4SEL, W4SEL, SFT5MD, R5SEL, MTFMD5, D5SEL, W5SEL, SFT6MD, R6SEL, MTFMD6, D6SEL, W6SEL, SFT7MD, R7SEL, MTFMD7, D7SEL, W7SEL.

The second arithmetic device 32C-n is a 16-input, 16-output arithmetic device as shown in for example FIG. 8 or FIG. 9, has the data inputs MEMRc8n, MEMRc8n+1, MEMRc8n+6, MEMRc8n+7, operation result inputs Ic8n, Ic8n+1, . . . , Ic8n+6, Ic8n+7, data outputs (operation result outputs) Dc8n, Dc8n+1, . . . , Dc8n+6, Dc8n+7, and data outputs MEMWc8n, MEMWc8n+1 . . . MEMWc8n+6, MEMWc8n+7, and is supplied with the control signal for reconfiguration CTRLBc8n.

For example, taking as an example the case of the sixth or the seventh embodiments, the control signal CTRLBb4m includes the SFT0MD, R0SEL, MTFMD0, D0SEL, W0SEL, SFT1MD, R1SEL, MTFMD1, D1SEL, W1SEL, SFT2MD, R2SEL, MTFMD2, D2SEL, W2SEL, SFT3MD, R3SEL, MTFMD3, D3SEL, W3SEL, SFT4MD, R4SEL, MTFMD4, D4SEL, W4SEL, SFT5MD, R5SEL, MTFMD5, D5SEL, W5SEL, SFT6MD, R6SEL, MTFMD6, D6SEL, W6SEL, SFT7MD, R7SEL, MTFMD7, D7SEL, and W7SEL.

Further, the data input MEMRa0 of the second arithmetic device 32A-0 is supplied with the data Ra0, while the data input MEMRa1 is supplied with the data Ra1.

The data output Da0 of the second arithmetic device 32A-0 is supplied to the data input DIa0 of the first arithmetic device 31A, while the data output Da1 of the second arithmetic device 32A-0 is supplied to the data input DIa1 of the first arithmetic device 31A.

Further, the data output OTa0 of the first arithmetic device 31A is supplied to the data input Ia0 of the second arithmetic device 32A-0, while the data output OTa1 of the first arithmetic device 31A is supplied to the data input Ia1 of the second arithmetic device 32A-0.

Further, the second arithmetic device 32A-0 outputs the data Wa0 from the data output MEMWa0, while it outputs the data Wa1 from the data output MEMWa1.

The data input MEMRa2k of the second arithmetic device 32A-k is supplied with the data Ra2k, while the data input MEMRa2k+1 is supplied with the data Ra2k+1.

The data output Da2k of the second arithmetic device 32A-k is supplied to the data input DIa2k of the first arithmetic device 31A, while the data output Da2k+1 of the second arithmetic device 32A-k is supplied to the data input DIa2k+1 of the first arithmetic device 31A.

Further, the data output OTa2k of the first arithmetic device 31A is supplied to the data input Ia2k of the second arithmetic device 32A-k, while the data output OTa2k+1 of the first arithmetic device 31A is supplied to the data input Ia2k+1 of the second arithmetic device 32A-k.

Further, the second arithmetic device 32A-k outputs the data Wa2k from the data output MEMWa2k, while it outputs the data Wa2k+1 from the data output MEMWa2k+1.

The data input MEMRb0 of the second arithmetic device 32B-0 is supplied with the data Rb0, the data input MEMRb1 is supplied with the data Rb1, the data input MEMRb2 is supplied with the data Rb2, and the data input MEMRb3 is supplied with the data Rb3.

The data output Db0 of the second arithmetic device 32B-0 is supplied to the data input DIb0 of the first arithmetic device 31A, the data output Db1 of the second arithmetic device 32B-0 is supplied to the data input DIb1 of the first arithmetic device 31A, the data output Db2 of the second arithmetic device 32B-0 is supplied to the data input DIb2 of the first arithmetic device 31A, and the data output Db3 of the second arithmetic device 32B-0 is supplied to the data input DIb3 of the first arithmetic device 31A.

Further, the data output OTb0 of the first arithmetic device 31A is supplied to the data input Ib0 of the second arithmetic device 32B-0, the data output OTb1 of the first arithmetic device 31A is supplied to the data input Ib1 of the second arithmetic device 32B-0, the data output OTb2 of the first arithmetic device 31A is supplied to the data input Ib2 of the second arithmetic device 32B-0, and the data output OTb3 of the first arithmetic device 31A is supplied to the data input Ib3 of the second arithmetic device 32B-0.

Further, the second arithmetic device 32B-0 outputs the data Wb0 from the data output MEMWb0, outputs the data Wb1 from the data output MEMWb1, outputs the data Wb2 from the data output MEMWb2, and outputs the data Wb3 from the data output MEMWb3.

The data input MEMRb4m of the second arithmetic device 32B-m is supplied with the data Rb4m, the data input MEMRb4m+1 is supplied with the data Rb4m+1, the data input MEMRb4m+2 is supplied with the data Rb4m+2, while the data input MEMRb4m+3 is supplied with the data Rb4m+3.

The data output Db4m of the second arithmetic device 32B-m is supplied to the data input DIb4m of the first arithmetic device 31A, the data output Db4m+1 of the second arithmetic device 32B-m is supplied to the data input DIb4m+1 of the first arithmetic device 31A, the data output Db4m+2 of the second arithmetic device 32B-m is supplied to the data input DIb4m+2 of the first arithmetic device 31A, and the data output Db4m+3 of the second arithmetic device 32B-m is supplied to the data input DIb4m+3 of the first arithmetic device 31A.

Further, the data output OTb4m of the first arithmetic device 31A is supplied to the data input Ib4m of the second arithmetic device 32B-m, the data output OTb4m+1 of the first arithmetic device 31A is supplied to the data input Ib4m+1 of the second arithmetic device 32B-m, the data output OTb4m+2 of the first arithmetic device 31A is supplied to the data input Ib4m+2 of the second arithmetic device 32B-m, and the data output OTb4m+3 of the first arithmetic device 31A is supplied to the data input Ib4m+3 of the second arithmetic device 32B-m.

Further, the second arithmetic device 32B-m outputs the data Wb4m from the data output MEMWb4m, outputs the data Wb4m+1 from the data output MEMWb4m+1, outputs the data Wb4m+2 from the data output MEMWb4m+2, and outputs the data Wb4m+3 from the data output MEMWb4m+3.

The data input MEMRc0 of the second arithmetic device 32C-0 is supplied with the data Rc0, the data input MEMRc1 is supplied with the data Rd1, similarly the data input MEMRc6 is supplied with the data Rc6, and the data input MEMRc7 is supplied with the data Rc7.

The data output Dc0 of the second arithmetic device 32C-0 is supplied with the data input DIc0 of the first arithmetic device 31A, the data output Dc1 of the second arithmetic device 32C-0 is supplied with the data input DIc1 of the first arithmetic device 31A, similarly the data output Dc6 of the second arithmetic device 32C-0 is supplied to the data input DIc6 of the first arithmetic device 31A, and the data output Dc7 of the second arithmetic device 32C-0 is supplied to the data input DIc7 of the first arithmetic device 31A.

Further, the data output Otc0 of the first arithmetic device 31A is supplied to the data input Ic0 of the second arithmetic device 32C-0, the data output Otc1 of the first arithmetic device 31A is supplied to the data input Ic1 of the second arithmetic device 32C-0, similarly the data output OTc6 of the first arithmetic device 31A is supplied to the data input Ic6 of the second arithmetic device 32C-0, and the data output OTc7 of the first arithmetic device 31A is supplied to the data input Ic7 of the second arithmetic device 32C-0.

Further, the second arithmetic device 32C-0 outputs data Wc0 from the data output MEMWc0, outputs the data Wc1 from the data output MEMWc1, similarly it outputs the data Wc6 from the data output MEMWc6, and outputs the data Wc7 from the data output MEMWc7.

The data input MEMRc8n of the second arithmetic device 32C-n is supplied with the data Rc8n, the data input MEMRc8n+1 is supplied with the data Rc8n+1, similarly the data input MEMRc8n+6 is supplied with the data Rc8n+6, and the data input MEMRc8n+7 is supplied with the data Rc8n+7.

The data output DC8n of the second arithmetic device 32C-n is supplied to the data input DIc8n of the first arithmetic device 31A, the data output Dc8n+1 of the second arithmetic device 32C-n is supplied to the data input DIc8n+1 of the first arithmetic device 31A, similarly the data output Dc8n+6 of the second arithmetic device 32C-n is supplied to the data input DIc8n+6 of the first arithmetic device 31A, and the data output Dc8n+7 of the second arithmetic device 32C-n is supplied to the data input DIc8n+7 of the first arithmetic device 31A.

Further, the data output OTc8n of the first arithmetic device 31A is supplied to the data input Ic8n of the second arithmetic device 32C-n, the data output OTc8n+1 of the first arithmetic device 31A is supplied to the data input Ic8n+1 of the second arithmetic device 32C-n, similarly the data output OTc8n+6 of the first arithmetic device 31A is supplied to the data input Ic8n+6 of the second arithmetic device, and the data output OTc8n+7 of the first arithmetic device 31A is supplied to the data input Ic8n+7 of the second arithmetic device 32C-n.

Further, the second arithmetic device 32C-n outputs the data Wc8n from the data output MEMWc8n, outputs the data Wc8n+1 from the data output MEMWc8n+1, similarly it outputs the data Wc8n+6 from the data output MEMWc8n+6, and outputs the data Wc8n+7 from the data output MEMWc8n+7.

When an arithmetic device 30A having this configuration transfers data for processing between for example the first arithmetic device 31A and the 8-input, 8-output second arithmetic devices 32B-0 to 32B-m, it performs an operation similar to the operation explained in the above eighth embodiment.

Even when transferring data for processing between other second arithmetic device 32A-0 to 32A-k, 32C-0 to 32C-n and the first arithmetic device 31A, only the number of inputs and outputs differs. The operation is substantially the same.

Therefore, as explained above, details of the operations of the parts will be omitted.

According to the ninth embodiment, since provision is made of a first arithmetic device 31A having a plurality of arithmetic devices including three-term arithmetic devices and/or two-term arithmetic devices and second arithmetic devices 32A-0 (BTFLa0), ..., 32A-k (BTFLak), 32B-0 (BTFLb0), ..., 32B-m (BTFLbm), 32C-0 (BTFLc0), ..., 32C-n (BTFLcn) including 2-input, 2-output arithmetic devices and since an outside reconfigurable arithmetic device 30A uses the operation results of the second arithmetic device 32A-0 (BTFLa0), ..., 32A-k (BTFLak), 32B-0 (BTFLb0), ..., 32B-m (BTFLbm), 32C-0 (BTFLc0), ..., 32C-n (BTFLcn) as inputs of the first arithmetic device 31A, uses the operation results of the first arithmetic device 31A as inputs of the second arithmetic devices, and thereby obtains final operation results, effects similar to the effects of the above eighth embodiment can be obtained.

That is, when a conventional DSP or other processor executed the following operations
MEMW0=x[k0]+x[k1],
MEMW1=px*(x[k0]−x[k1])−py*(y[k0]−y[k1]),
MEMW2=y[k0]+y[k1],
MEMW3=px*(x[k0]−x[k1])+py*(y[k0]−y[k1])

processing for storing values temporarily in registers to give the following by calculation of for example MEMW1 became necessary:
reg1=x[k0]−x[k1],
reg2=px*reg1,
reg3=y[k0]−y[k1],
reg4=py*reg3,
MEMW1=reg2−reg4, Therefore, there were more unnecessary write operations into registers and read operations from the registers in the processing and the number of operating cycles and power consumption increased. By combining MACs, ALUs, and butterfly operation, however, when reading from a memory and then performing operation and write operations in the memory, the freedom of operation in the arithmetic blocks is increased and efficient operation becomes possible. Therefore, the number of cycles of executions becomes smaller and the temporary reading and writing of data becomes less frequent, so the power is cut.

Further, when as in the processing of MEMW0 and the processing of MEMW1 common use is made of x[k0], x[k1], a conventional processor could not simultaneously perform the operations of x[k0]+x[k1], x[k0]−x[k1] and therefore the number of cycles required for processing increased, but in the ninth embodiment, these operations are performed simultaneously, so fewer required number of cycles become necessary.

Further, according to the ninth embodiment, there is the advantage that it is possible to realize an arithmetic device which, in the same way as the above first embodiment, can optimize the logic level of course and also can prevent an increase in the component data and can prevent a fall in the area efficiency as an integrated circuit.

Further, since the arithmetic device can be reconfigured, it is possible to realize not only cascade processing, but also parallel processing by the same hardware. Therefore, it is possible to increase the number of arithmetic devices and perform more parallel processable processing efficiently.

10th Embodiment

Figure 12:
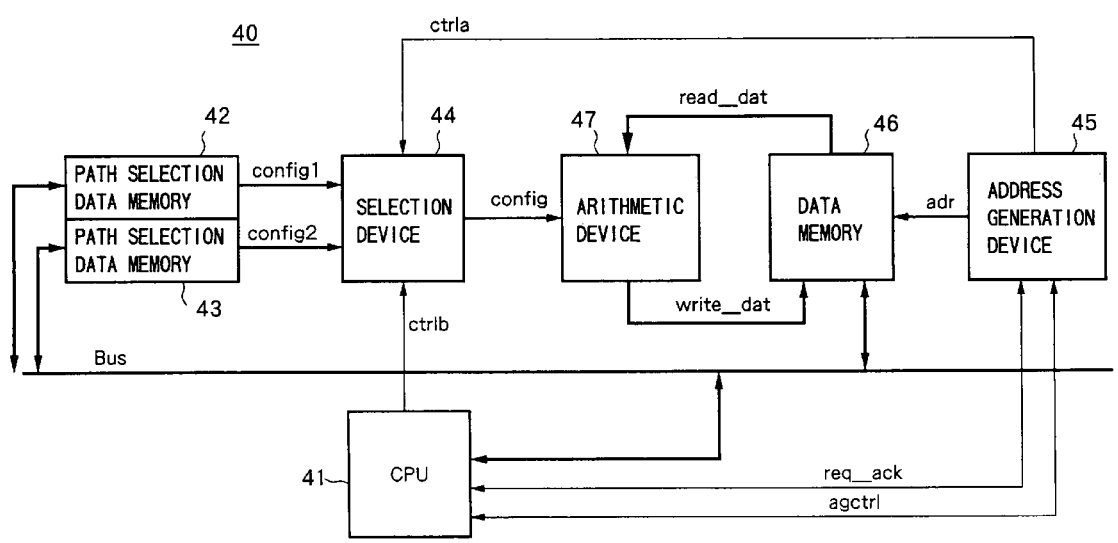
FIG. 12 is a view of the configuration showing a 10th embodiment of an arithmetic device according to the present invention.

FIG. 12 is a view of the configuration showing an arithmetic system according to a 10th embodiment of the present invention.

In the arithmetic system 40, use is made of an arithmetic device able to reconfigure the array of computing units of for example the above first embodiment to ninth embodiment, coefficient parameters at the time of execution of operations, etc. based on component data.

Therefore, the arithmetic system 40 includes an arithmetic device, memory, address generation device, and memory for storing the path information and is configured as a reconfigurable system able to switch the path information under specific conditions based on a control signal generated by the address generation device in addition to the selection of the path information using the CPU.

Specifically, the arithmetic system 40, as shown in FIG. 12, has a CPU 41 as a control circuit, a plurality, for example, two memories, that is, a first path selection data memory 42 and second path selection data memory 43, selection device 44, address generation device 45, data memory 46, and reconfigurable arithmetic device 47.

The CPU 41 is able to access through the bus BUS the first path selection data memory 42, second path selection data memory 43, and data memory 46.

The CPU 41 uses req_ack signal to start up the address generation device 45 and uses the req_ack signal from the address generation device 45 to confirm the end of the operation of the address generation device 45.

Further, the CPU 41 writes the first path selection data config1 in the first path selection data memory 42 and writes the second path selection data config2 in the second path selection data memory 43.

Further, the CPU 41 writes a plurality of data in the data memory 46. Further, the CPU 41 designates an address generation pattern at the address generation device 45 by the signal agctrl and starts up the address generation device 45.

Further, the CPU 41 outputs the control signal ctrlb to the selection device 44 to instruct selection of one of the path selection data from the first path selection data config1 of the first path selection data memory 42 and the second path selection data config2 of the second path selection data memory 43. In other words, the CPU 41 dynamically changes the control signal ctrlb while the address generation device 45 is generating addresses and performs control so as to select the path selection data from a plurality of path selection data memories 42, 43.

The first path selection data memory 42 is written in by the CPU 41 through the bus BUS with the first path selection data config1 and outputs the written first path selection data config1 to the selection device 44.

The second path selection data memory 43 is written in by the CPU 41 through the bus BUS with the second path selection data config2 and outputs the written second path selection data config2 to the selection device 44.

The selection device 44 selects either of the first path selection data config1 of the first path selection data memory 42 and the second path selection data config2 of the second path selection data memory 43 in accordance with the control signal ctrla of the address generation device 45 and the control signal ctrlb of the CPU 41 and supplies it to the arithmetic device 47.

The address generation device 45 starts up by receiving the req_ack signal of the CPU 41, automatically generates an address adr by an address generation pattern designated by the control signal agctrl from the CPU 41, reads from the data memory 46, and writes in the data memory 46.

Further, the address generation device 45 outputs a control signal ctrla including selection information in accordance with the generated address to the selection device 44 to cause selection of either of the first path selection data config1 of the first path selection data memory 42 and second path selection data config2 of the second path selection data memory 43 and supply of the same to the arithmetic device 47.

Further, the address generation device 45 uses req_ack signal to inform the CPU 41 of the end of the operation when address generation is ended.

The data memory 46 reads the stored data of the data memory 46 by the address adr generated by the address generation device 45, supplies the read data read_dat to the arithmetic device 47, and writes the operation results of the arithmetic device 47, that is, the write data write_dat.

Further, the data memory 46 is accessed through the bus BUS by the CPU 41.

The arithmetic device 47 reconfigures the array of computing units, coefficient parameters at the time of execution of operations, etc. based on the first path selection data config1 of the first path selection data memory 42 and the second path selection data config2 of the second path selection data memory 43 selected by the selection device 44, performs designated operation on the read data read_dat of the data memory 46, and supplies the operation results as the write data write_dat to the data memory 46.

Next, the operation according to the above configuration will be explained with reference to FIGS. 13A and 13B.

First, the CPU 41 writes the first path selection data config1 through the bus BUS in the first path selection data memory 42 and writes the second path selection data config2 in the second path selection data memory 43.

Further, the CPU 41 writes a plurality of data in advance through the bus BUS in the data memory 46.

Further, the CPU 41 outputs the control signal agctrl to the address generation device 45 to designate the address generation pattern and start up the address generation device 45.

Due to this, control shifts from the CPU 41 to the address generation device 45. The address generation device 45 starts automatic generation of addresses and supplies them to the data memory 46.

Note, that, here, for simplification, it is assumed that the read address pattern generated at the address generation device 45 is 0, 1, 2, 3, 4, 5.

Further, the data memory 46 is read from based on the generated address adr. The data supplied to the arithmetic device 47 becomes the read dat [0], read_dat [1], read_dat [2], read_dat [3], read_dat [4], and read_dat [5].

Further, the address generation device 45 outputs the control signal ctrla in accordance with the generated address to the selection device 44.

The selection device 44 selects either of the first path selection data config1 of the first path selection data memory 42 and second path selection data config2 of the second path selection data memory 43 in accordance with the control signal ctrla of the address generation device 45 and the control signal ctrlb of the CPU 41 and supplies it to the arithmetic device 47.

The arithmetic device 47 reconfigures the array of computing units, coefficient parameters at the time of execution of operations, etc. based on the first path selection data config1 of the first path data memory 42 supplied from the selection device 44 or the second path selection data config2 of the second path selection data memory 43.

Further, the reconfigured arithmetic device 47 performs designated operation on the read data of the data memory 46, that is, read_dat [0], read_dat [1], read_dat [2], read_dat [3], read_dat [4], and read_dat [5].

The operation results of the arithmetic device 47 become the write_dat [0], write_dat [1], write_dat [2], write_dat [3], write_dat [4], and write_dat [5].

Here, the operation executed by the first path selection data config1 is designated as func1( ), while the operation executed by the second path selection data config2 is designated as func2( ).

Figure 13:
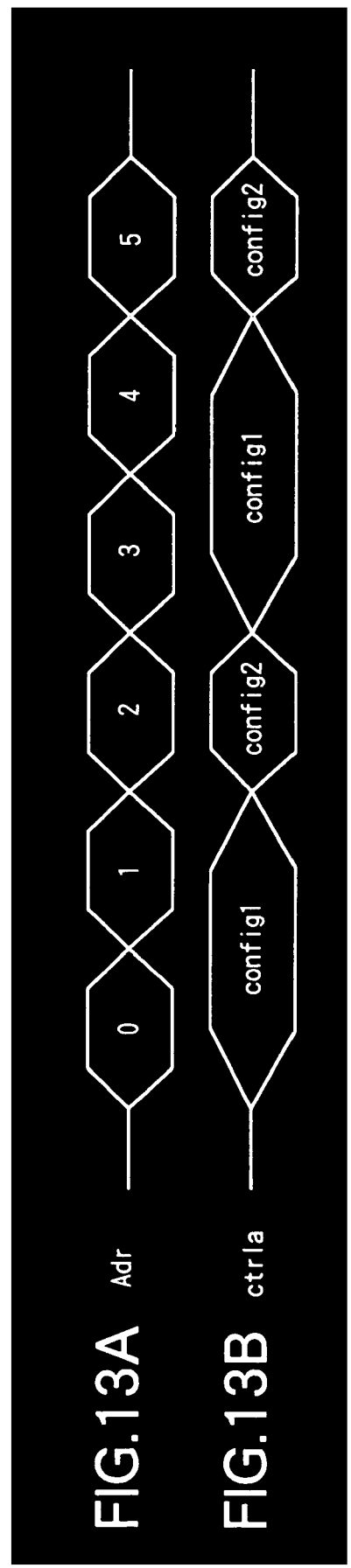
FIGS. 13A and 13B are views showing an example of the selection timing of path selection data selected by the address generated by an address generation device according to the present invention and a control signal.

Further, as shown in FIGS. 13A and 13B, it is assumed that the first path selection data config1 can be selected when the address is 0, 1, 3, 4 and the second path selection data config2 can be selected when the address is 2, 5 by the control information ctrla from the address generation device 45.

The operation results in this case can be expressed as follows:

write_dat [0]=func1(read_dat [0])
write_dat [1]=func1(read_dat [1])
write_dat [2]=func2(read_dat [2])
write_dat [3]=func1(read_dat [3])
write_dat [4]=func1(read_dat [4])
write_dat [5]=func2(read_dat [5])

These operation results are written in the data memory 46, and the automatic generation adr by the address generation device 45 ends.

Further, the address generation device 45 sends the ask_req signal to the CPU 41 to inform it of the end of the processing.

As explained above, according to the 10th embodiment, since provision is made of the first path selection data memory 42 for storing the first path selection data config1, the second path selection data memory 43 for storing the second path selection data config2, the selection device 44 for selecting either of the first path selection data config1 of the first path selection data memory 42 and the second path selection data config2 of the second path selection data memory 43 in accordance with the control signal ctrla and control signal ctrlb, an address generation device 45 for automatically generating an address adr by a designated address generation pattern, reading from the data memory 46, writing in the data memory 46, and outputting the control signal ctrla to the selection device 44 in accordance with the generated address, and an arithmetic device 47 for reconfiguring the array of computing units, coefficient parameters at the time of execution of operations, etc. based on the first path selection data config1 or the second path selection data config2 selected by the selection device 44, performing designated operation on the read data read_dat of the data memory 46, and rewriting the operation results as the write data write_dat in the data memory 46, so there are the following advantages.

That is, in the past, in an arithmetic system comprised of a CPU, address generation device, a plurality of component data memories, and a reconfigurable arithmetic device, in order to use the CPU to control the selection of a plurality of component memories and to use the CPU to select memories while the address generation device is generating addresses, it is necessary to provide a synchronization mechanism between the CPU and the address generation device. Therefore, there are the defects that the control becomes complicated, extra hardware becomes necessary, and, depending on the hardware structure, synchronization itself becomes impossible.

As opposed to this, according to the arithmetic system according to the 10th embodiment, it is possible to use the control signal output by the address generation device to select a plurality of component memories, so there is the advantage that it is no longer necessary to provide a synchronization mechanism.

Further, since control returns once to the CPU, the overhead for the processing becomes smaller and it is possible to improve the processing ability of the system as a whole.

11th Embodiment

Figure 14:
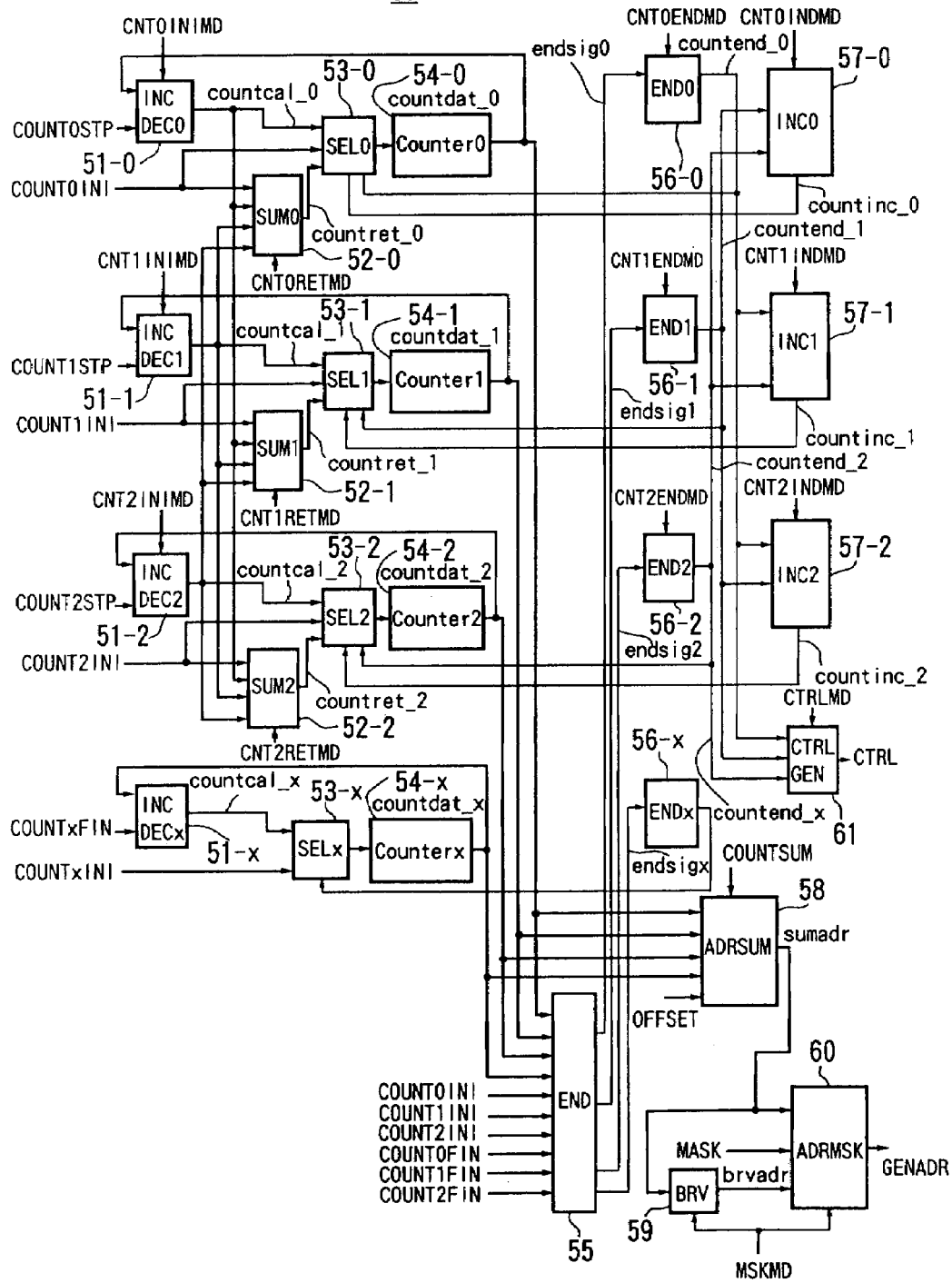
FIG. 14 is a view explaining an 11th embodiment of the present invention and shows one example of an address generation device applicable to an arithmetic system according to the present invention.

FIG. 14 is a view for explaining an 11th embodiment of the present invention and shows an example of an address generation device able to be applied to the arithmetic system according to the present invention.

The address generation device 50 is a device which can be applied to the arithmetic system of FIG. 12 showing for example the above 10th embodiment and generates addresses using four (generally n number of) counters. It generates the access pattern of the array in a for-loop of the C-language or its nesting and the address pattern of the FFTs, bit reverse, etc., generates addresses, and outputs the control signal CTRL (ctrla of FIG. 12).

Next, the specific configuration and functions of the address generation device 50 will be successively explained.

The address generation device 50, as shown in FIG. 14, has a computing unit (INCDEC0) 51-0, computing unit (INCDEC1) 51-1, computing unit (INCDEC2) 51-2, computing unit (INCDECx) 51-X, selector equipped computing unit (SUM0) 52-0, selector equipped computing unit (SUM1) 52-1, selector equipped computing unit (SUM2) 52-2, selector (SEL0) 53-0, selector (SEL1) 53-1, selector (SEL2) 53-2, selector (SELx) 53-x, counter (Counter0) 54-0, counter (Counter1) 54-1, counter (Counter2) 54-2, counter (Counterx) 54-x, comparator (END) 55, comparator (END0) 56-0, comparator (END1) 56-1, comparator (END2) 56-2, comparator (ENDx) 56-x, comparator (INC0) 57-0, comparator (INC1) 57-1, comparator (INC2) 57-2, selector equipped computing unit (ADRSUM) 58, bit inverter (BRV) 59, mask generator (ADRMSK) 60, and control signal generator (CTRLGEN) 61.

Further, the address generation device 50 is supplied with the input signals COUNT0STP, COUNT1STP, COUNT2STP, COUNT0INI, COUNT1INI, COUNT2INI, COUNTxINI, COUNT0FIN, COUNT1FIN, COUNT2FIN, COUNTxFIN, OFFSET, MASK, control signals CNT0INIMD, CNT1INIMD, CNT2INIMD, CNT0RETMD, CNT1RETMD, CNT2RETMD, CNT0ENDMD, CNT1ENDMD, CNT2ENDMD, CNT0INCMD, CNT1INCMD, CNT2INCMD, CTRLMD, COUNTSUM, MSKMD, COUNTEN and outputs the control signal CTRL and generation address GENADR.

The computing unit 51-0 processes the input signal COUNT0STP and the count data countdat_0 of the counter 54-0 in accordance with the value of the control signal CNT0INIMD and outputs the result as the signal countcal_0 to the selector 53-0 and selector equipped computing units 52-0 to 52-2.

Specifically, the computing unit 51-0 performs one of the following operations in accordance with the value of the control signal CNT0INIMD.
countcal_0=COUNT0STP+countdat_0,
countcal_0=COUNT0STP−countdat_0

The computing unit 51-1 processes the input signal COUNT1STP and the count data countdat_1 of the counter 54-1 in accordance with the value of the control signal CNT1INIMD and outputs the result as the signal countcal_1 to the selector 53-1 and selector equipped computing units 52-0 to 52-2.

Specifically, the computing unit 51-1 performs one of the following operations in accordance with the value of the control signal CNT1INIMD:
countcal_1=COUNT1STP+countdat_1,
countcal_1=COUNT1STP−countdat_1

The computing unit 51-2 processes the input signal COUNT2STP and the count data countdat_2 of the counter 54-2 in accordance with the value of the control signal CNT2INIMD and outputs the result as the signal countcal_2 to the selector 53-2 and selector equipped computing units 52-0 to 52-2.

Specifically, the computing unit 51-2 performs one of the following operations in accordance with the value of the control signal CNT2INIMD:
countcal_2=COUNT2STP+countdat_2,
countcal_2=COUNT2STP−countdat_2

The computing unit 51-x processes the input signal COUNTxFIN and the count data countdat_x of the counter 54-x and outputs the results as the signal countcal_x to the selector 53-x.

The selector equipped computing unit 52-0 processes the input signal COUNT0INI, output signal countcal_0 of the computing unit 51-0, output signal countcal_1 of the the computing unit 51-1, and output signal countcal_2 of the computing unit 51-2 in accordance with the value of the control signal CNT0RETMD and outputs the results as the signal countret_0 to the selector 53-0.

Specifically, the computing unit 52-0 performs one of the following operations in accordance with the value of the control signal CNT0RETMD:
countret_0=COUNT0INI,
countret_0=countcal_0,
countret_0=countcal_1,
countret_0=countcal_2,
countret_0=COUNT0INI+countcal_0,
countret_0=COUNT0INI+countcal_1,
countret_0=COUNT0INI+countcal_2

The selector equipped computing unit 52-1 processes the input signal COUNT1INI, output signal countcal_0 of the computing unit 51-0, output signal countcal_1 of the computing unit 51-1, and output signal countcal_2 of the computing unit 51-2 in accordance with the value of the control signal CNT1RETMD and outputs the results as the signal countret_1 to the selector 53-1.

Specifically, the computing unit 52-1 performs one of the following operations in accordance with the value of the control signal CNT1RETMD:
countret_1=COUNT1INI,
countret_1=countcal_0,
countret_1=countcal_1,
countret_1=countcal_2,
countret_1=COUNT1INI+countcal_0,
countret_1=COUNT1INI+countcal_1,
countret_1=COUNT1INI+countcal_2

The selector equipped computing unit 52-2 processes the input signal COUNT2INI, output signal countcal_0 of the computing unit 51-0, output signal countcal_1 of the computing unit 51-1, and output signal countcal_2 of the computing unit 51-2 in accordance with the value of the control signal CNT2RETMD and outputs the results as the signal countret_2 to the selector 53-2.

Specifically, the computing unit 52-2 performs one of the following operations in accordance with the value of the control signal CNT2RETMD:
    countret_2=COUNT2INI,
    countret_2=countcal_0,
    countret_2=countcal_1,
    countret_2=countcal_2,
    countret_2=COUNT2INI+countcal_0,
    countret_2=COUNT2INI+countcal_1,
    countret_2=COUNT2INI+countcal_2

The selector 53-0 selects the values of the output signal countcal_0 of the computing unit 51-0, input signal COUNT0INI, and output signal countret_0 of the computing unit 52-0 in accordance with the values of the output signal countend_0 of the comparator 56-0 and the output signal countinc_0 of the comparator 57-0 and outputs the same to the counter 54-0.

The selector 53-1 selects the values of the output signal countcal_1 of the computing unit 51-1, input signal COUNT1INI, and output signal countret_1 of the computing unit 52-1 in accordance with the values of the output signal countend_1 of the comparator 56-1 and the output signal countinc_1 of the comparator 57-1 and outputs the same to the counter 54-1.

The selector 53-2 selects the values of the output signal countcal_2 of the computing unit 51-2, input signal COUNT2INI, and output signal countret_2 of the computing unit 52-2 in accordance with the values of the output signal countend_2 of the comparator 56-2 and the output signal countinc_2 of the comparator 57-2 and outputs the same to the counter 54-2.

The selector 53-x selects the value of the output signal countcal_x of the computing unit 51-x and the input signal COUNTxINI in accordance with the value of the output signal countend_x of the comparator 56-x and outputs it to the counter 54-x.

The counter 54-0 stores the output signal of the selector 53-0 as the count data countdat_0 and outputs the stored data to the computing unit 51-0, comparator 55, and selector equipped computing unit 58.

The counter 54-1 stores the output signal of the selector 53-1 as the count data countdat_1 and outputs the stored data to the computing unit 51-1, comparator 55, and selector equipped computing unit 58.

The counter 54-2 stores the output signal of the selector 53-2 as the count data countdat_2 and outputs the stored data to the computing unit 51-2, comparator 55, and selector equipped computing unit 58.

The counter 54-x stores the output signal of the selector 53-x as the count data countdat_x and outputs the stored data to the computing unit 51-x, comparator 55, and selector equipped computing unit 58.

The comparator 55 processes the values of the counter data countdat_0 of the counter 54-0, counter data countdat_1 of the counter 54-1, counter data countdat_2 of the counter 54-2, counter data countdat_x of the counter 54-x, and input signals COUNT0INI, COUNT1INI, COUNT2INI, COUNT0FIN, COUNT1FIN, COUNT2FIN and outputs the results endsig0 to the comparator 56-0, outputs the results endsig1 to the comparator 56-1, outputs the results endsig2 to the comparator 56-2, and outputs the results endsigx to the comparator 56-x.

Specifically, the comparator 55, for j=0, 1, 2, x, sets endsigj=eq0 when the count data countdat_0 of the counter 54-0 and the input signal COUNT0INI are equal, endsigj=eq1 when count data countdat_1 of the counter 54-1 and the input signal COUNT1INI are equal, and endsigj=eq2 when the count data countdat_2 of the counter 54-2 and input signal COUNT2INI are equal.

Similarly, the comparator 55 sets endsigj=eg3 when the count data countdat_0 of the counter 54-0 and input signal COUNT0FIN are equal, endsigj=eq4 when the count data countdat_1 of the counter 54-1 and input signal COUNT1FIN are equal, and endsigj=eq5 when the count data countdat_2 of the counter 54-2 and the input signal COUNT2FIN are equal.

Further, the comparator 55 sets endsigj=eq6 when the count data countdat_0 of the counter 54-0 and the count data countdat_1 of the counter 54-1 are equal, endsigj=eq7 when the count data countdat_1 of the counter 54-1 and the count data countdat_2 of the counter 54-2 are equal, and endsigj=eq8 when the count data countdat_2 of the counter 54-2 and the count data countdat_0 of the counter 54-0 are equal.

The comparator 56-0 generates the signal countend_0 from the output signal endsig0 of the comparator 55 in accordance with the value of the control signal CNT0ENDMD and outputs it to the selector 53-0, comparators 57-1, 57-2, and control signal generator 61.

Specifically, the comparator 56-0 sets the signal countend_0 as true when the value of the control signal CNT0ENDMD and the value of the output signal endsig0 of the comparator 55 match and sets the signal countend_0 as false when they do not match.

The comparator 56-1 generates the signal countend_1 from the output signal endsig1 of the comparator 55 in accordance with the value of the control signal CNT1ENDMD and outputs it to the selector 53-1, comparators 57-0, 57-2, and control signal generator 61.

Specifically, the comparator 56-1 sets the signal countend_1 as true when the value of the control signal CNT1ENDMD and the value of the output signal endsig1 of the comparator 55 match and sets the signal countend_1 as false when they do not match.

The comparator 56-2 generates the signal countend_2 from the output signal endsig2 of the comparator 55 in accordance with the value of the control signal CNT2ENDMD and outputs it to the selector 53-2, comparators 57-0, 57-1, and control signal generator 61.

Specifically, the comparator 56-2 sets the signal countend_2 as true when the value of the control signal CNT2ENDMD and the value of the output signal endsig2 of the comparator 55 match and sets the signal countend_2 as false when they do not match.

The comparator 56-x generates the signal countend_x from the value of the output signal endsigx of the comparator 55 and outputs it to the selector 53-x.

The comparator 57-0 generates the signal countinc_0 from the values of the output signal countend_1 of the comparator 56-1 and the output signal countend_2 of the comparator 56-2 in accordance with the value of the control signal CNT0INCMD and outputs it to the selector 53-0.

Specifically, the comparator 57-0 sets the signal countinc_0 as true when the output signal countend_1 of the comparator 56-1 is true and sets the signal countinc_0 as false when it is false in accordance with the value of the control signal CNT0INCMD.

Further, the comparator 57-0 sets the signal countinc_0 as true when the output signal countend_2 of the comparator 56-2 is true and sets the signal countinc_0 as false when it is false in accordance with the value of the control signal CNT0INCMD.

Further, the comparator 57-0 sets the signal countinc_0 as true when the output signal countend_1 of the comparator

56-1 and the output signal countend_2 of the comparator 56-2 is true and sets the signal countinc_0 as false when they are false in accordance with the value of the control signal CNT0INCMD.

The comparator 57-1 generates the signal countinc_1 from the values of the output signal countend_2 of the comparator 56-2 and the output signal countend_0 of the comparator 56-0 in accordance with the value of the control signal CNT1INCMD and outputs it to the selector 53-1.

Specifically, the comparator 57-1 sets the signal countinc_1 as true when the output signal countend_2 of the comparator 56-2 is true and sets the signal countinc_1 as false when it is false in accordance with the value of the control signal CNT1INCMD.

Further, the comparator 57-1 sets the signal countinc_1 as true when the output signal countend_0 of the comparator 56-0 is true and sets the signal countinc_1 as false when it is false in accordance with the value of the control signal CNT0INCMD.

Further, the comparator 57-1 sets the signal countinc_1 as true when the output signal countend_2 of the comparator 56-2 and the output signal countend_0 of the comparator 56-0 are true and sets the signal countinc_1 as false when they are false in accordance with the value of the control signal CNT1INCMD.

The comparator 57-2 generates the signal countinc_2 from the output signal countend_0 of the comparator 56-0 and the output signal countend_1 of the comparator 56-1 in accordance with the value of the control signal CNT2INCMD and outputs it to the selector 53-2.

Specifically, the comparator 57-2 sets the signal countinc_2 as true when the output signal countend_0 of the comparator 56-0 is true and sets the signal countinc_2 as false when it is false in accordance with the value of the control signal CNT2INCMD.

Further, the comparator 57-2 sets the signal countinc_2 as true when the output signal countend_1 of the comparator 56-1 is true and sets the signal countinc_2 as false when it is false in accordance with the value of the control signal CNT2INCMD.

Further, the comparator 57-2 sets the signal countinc_2 as true when the output signal countend_0 of the comparator 56-0 and the output signal countend_1 of the comparator 56-1 is true and sets the signal countinc_2 as false when it is false in accordance with the value of the control signal CNT2INCMD.

The selector equipped computing unit 58 generates the signal sumadr based on the count data countdat_0 of the counter 54-0, count data countdat_1 of the counter 54-1, count data countdat_2 of the counter 54-2, count data countdat_x of the counter 54-x, and input signal OFFSET in accordance with the value of the control signal COUNTSUM and outputs it to the bit inverter 59 and mask generator 60.

Specifically, the computing unit 58 performs one of the following operations in accordance with the value of the control signal COUNTSUM:

sumadr=OFFSET+countdat_0,
sumadr=OFFSET+countdat_1,
sumadr=OFFSET+countdat_2,
sumadr=OFFSET+countdat_0+countdat_1,
sumadr=OFFSET+countdat_0+countdat_2,
sumadr=OFFSET+countdat_1+countdat_2,
sumadr=OFFSET+countdat_0+countdat_1+countdat_2,
sumadr=OFFSET+countdat_0+countdat_1+countdat_2,
sumadr=OFFSET+countdat_0+countdat_1*2^(countdat_x+1)
sumadr=OFFSET+countdat_0+countdat_1*2^(countdat_x+1)−1,
sumadr=OFFSET+countdat_0+countdat_1*2^(countdat_x+1)+1,
sumadr=OFFSET+countdat_0+countdat_1*2^(countdat_x+1)+2 ^(countdat_x),
sumadr=OFFSET+countdat_0*2^(COUNTxFIN−countdat_x)

The bit inverter 59 generates a signal brvadr from the signal sumadr generated by the selector equipped computing unit 58 in accordance with the value of the control signal MSKMD and outputs it to the mask generator 60.

Specifically, the bit inverter 59 decides on m in accordance with the value of the control signal MSKMD and sets the signal brvadr for bit inversion from the LSB to m−1 bits of the signal sumadr generated by the selector equipped computing unit 58.

The mask generator 60 generates the address signal GENADR based on the signal brvadr generated by the bit inverter 59, the signal sumadr generated by the selector equipped computing unit 58, and input signal MASK in accordance with the value of the control signal MSKMD.

Specifically, the mask generator 60 selects the signal brvadr generated by the bit inverter 59 and the signal sumadr generated by the selector equipped computing unit 58 in accordance with the value of the control signal MSKMD and performs on the result and the value of the input signal MASK in bit units either or an AND, OR, or XOR operation.

The thus generated address signal GENADR is for example supplied to the data memory 46 of the arithmetic system of FIG. 12.

The control signal generator 61 generates the control signal CTRL based on the output signal countend_0 of the comparator 56-0, output signal countend_1 of the comparator 56-1, and output signal countend_2 of the comparator 56-2 in accordance with the value of the control signal CTRLMD and makes the address valid signal VALID address valid while addresses are being generated.

Further, it controls the authorization/nonauthorization of countup of the counters 54-0, 54-1, 54-2, and 54-x having content according to the value of the control signal COUNTEN.

Specifically, the control signal generator 61 validates the control signal CTRL in any of the following cases in accordance with the value of the control signal CTRLMD:

when the signal countend_0 is true,
when the signal countend_1 is true,
when the signal countend_2 is true,
when the signal countend_0 is true and signal countend_1 is true,
when the signal countend_0 is true and signal countend_2 is true,
when the signal countend_1 is true and signal countend_2 is true and invalidates the CTRL in other cases.

Next, a specific operation for generation of addresses by this configuration will be explained with reference to FIGS. 15A to 15L taking as an example the case of the triple loop of FIG. 14.

First, the step values, initial values, and finish values of the counters given as the input signals are set as follows:

The step value signal COUNT0STP is set to "3" and supplied to the computing unit 51-0, the initial value signal COUNT0INI is set to "0" and supplied to the computing unit 52-0 and selector 53-0, and the finish value signal COUNT0FIN is set to "3" and supplied to the comparator 55.

Similarly, the step value signal COUNT1STP is set to "5" and supplied to the computing unit 51-1, the initial value signal COUNT1INI is set to "0" and supplied to the computing unit 52-1 and selector 53-1, and the finish value signal COUNT1FIN is set to "10" and supplied to the comparator 55.

The step value signal COUNT2STP is set to "1" and supplied to the computing unit 51-2, the initial value signal COUNT2INI is set to "0" and supplied to the computing unit 52-2 and selector 53-2, and the finish value signal COUNT2FIN is set to "1" and supplied to the comparator 55.

Further, the initial value signal COUNTxINI is set to "0" and supplied to the selector 53-x, while the finish value signal COUNTxFIN is set to "0" and supplied to the computing unit 51-x.

Further, the control signal CNT0INIMD is set so as to select execution of addition and is supplied to the computing unit 51-0.

Similarly, the control signal CNT1INIMD is set so as to select execution of addition and is supplied to the computing unit 51-1, while the control signal CNT2INIMD is set so as to select execution of addition and is supplied to the computing unit 51-2.

Further, the control signal CNT0RETMD is set so as to select COUNT0INI and is supplied to the computing unit 52-0.

Similarly, the control signal CNT1RETMD is set so as to select COUNT1INI and is supplied to the computing unit 52-1, while the control signal CNT2RETMD is set to select COUNT2INI and is supplied to the computing unit 52-2.

Further, the control signal CNT0ENDMD is supplied to the comparator 56-0 so as to set the signal countend_0 as true when receiving as input the output signal ednsigo of the comparator 55 when the count data countdat_0 of the counter 54-0 and the finish value signal COUNT0FIN match.

Similarly, the control signal CNT1ENDMD is supplied to the comparator 56-1 so as to set the signal countend_1 as true when receiving as input the output signal ednsig1 of the comparator 55 when the count data countdat_1 of the counter 54-1 and the finish value signal COUNT1FIN match.

Further, the control signal CNT2ENDMD is supplied to the comparator 56-2 so as to set the signal countend_2 as true when receiving as input the output signal ednsig2 of the comparator 55 when the count data countdat_2 of the counter 54-2 and the finish value signal COUNT2FIN match.

Further, the control signal CNT0INCMD is supplied to the comparator 57-0 so as to set the signal countinc_0 as true when the output signal countend_2 of the comparator 57-2 is true and the output signal countend_1 of the comparator 57-1 is true.

Further, the control signal CNT1INCMD is supplied to the comparator 57-1 so as to set the signal countinc_1 as true when the output signal countend_2 of the comparator 57-2 is true.

Further, the control signal CNT2INCMD is supplied to the comparator 57-2 so as to set the signal countinc_2 as true at all times.

Further, the control signal COUNTSUM is supplied to the selector equipped computing unit 58 so as to set it to a mode for outputting the total of the value of the count data countdat_0 of the counter 54-0, the value of the count data countdat_1 of the counter 54-1, and the count data countdat_2 of the counter 54-2.

Further, the input signal OFFSET supplied to the selector equipped computing unit 58 and the input signal MASK supplied to the mask generator 60 are set to "0".

Further, the control signal MSKMD is supplied to the bit inverter 59 and the mask generator 60 so as to set them to a no bit reverse and no masking mode.

In this state, the address generation device 50 receives an address generation startup signal from a not shown control circuit, whereby the counters 54-0 to 54-x start count operations at a predetermined timing.

Figure 15:
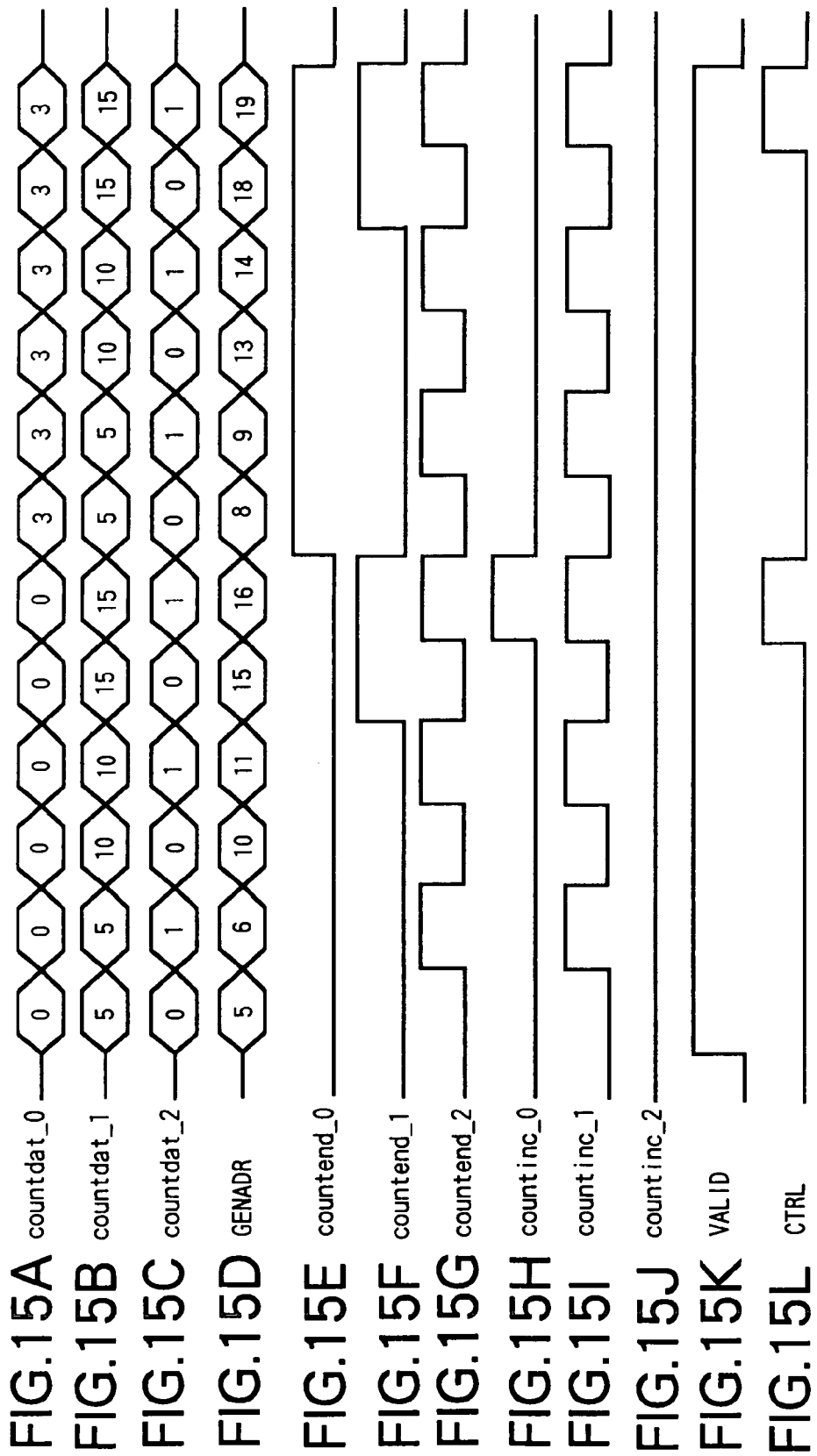
FIGS. 15A to 15L are views for explaining the operation in FIG. 14.

In this case, in the counter 54-2, as shown in FIG. 15J, the output signal countinc_2 of the comparator 57-2 is continuously true (in FIG. 15J, the high level), that is, continuously shows countup, so countup starts, the value of the step signal COUNT2STP is added to the initial value 0, and the count data countdat_2 changes from 0 to 1 as shown in FIG. 15C.

The count data countdat_2 of the counter 54-2 becomes "1" and is supplied to the comparator 55. The value "1" of the count data countdat_2 becomes equal to the finish value signal COUNT2FIN, so a signal endsig2 showing that is supplied to the comparator 56-2. As shown in FIG. 15G, the output signal countend_2 of the comparator 56-2 is set as true and is supplied to the comparators 57-1, 57-0 and control signal generator 61.

In a comparator 57-1 where the output signal countend_2 of the comparator 56-2 is supplied as true, as shown in FIG. 15I, the output signal countinc_1 is set as true.

Due to this, the counter 54-1 counts up and the count data countdat_1 becomes "5" as shown in FIG. 15B.

At this time, the counter 54-2 is returned to the initial value 0 through the selector 53-2 in accordance with the control signal CNT1RETMD.

At this time, in the counter 54-0, as shown in FIG. 15H, since the output signal countinc_0 of the comparator 57-0 is false (in FIG. 15H, low level), the countup operation is not started.

When the count data countdat_2 of the counter 54-2 again becomes "1" as shown in FIG. 15C, the counter 54-1 is repeatedly counted up.

As shown in FIG. 15B, when the count data countdat_1 of the counter 54-1 becomes 0 it becomes "10", equal to the finish value signal COUNT1FIN, so a signal endsig1 to that effect is supplied to the comparator 56-1. As shown in FIG. 15F, the output signal countend_1 of the comparator 56-1 is set as true and is supplied to the comparator 57-0, 57-2 and control signal generator 61.

In the comparator 57-0 where the output signal countend_1 of the comparator 56-1 is supplied as true, as shown in FIG. 15H, the output signal countinc_0 is set as true.

Due to this, the counter 54-0 is counted up and the count data countdat_0 is changed from "0" to "3" as shown in FIG. 15A.

Looking at the generated address, in a selector equipped computing unit 58 receiving the control signal COUNTSUM, since the mode is one for outputting the total of the count data countdat_0 of the counter 54-0, count data countdat_1 of the counter 54-1, and count data countdat_2 of the counter 54-2, the mask generator 60, as shown in FIG. 15D, outputs the total of the counter as the address signal GENADR.

Further, when the control signal CTRLMD is supplied to the control signal generator 61 so as to output the control signal CTRL when the output signal countend_1 of the comparator 56-1 and the output signal countend_2 of the comparator 56-2 are true, as shown in FIG. 15L, CTRL becomes true at the timing when the two signals are true.

As explained above, according to the 11th embodiment, when attempting tasks for which a conventional DSP etc. could not generate addresses such as in the case of a nest of a complicated loop, FFT access pattern, or bit reversal, it is possible to automatically generate the addresses. Therefore, there are the advantages that it is no longer necessary to calculate addresses using ALUs, the number of cycles required for processing falls, and the efficiency becomes better.

Note that, in the above explanation, the explanation was given taking as an example the case of a triple loop in relation to FIG. 14, but the present invention is not limited to this. Various modes involving different numbers of counters are of course also possible.

Below, an explanation will be made of a general practical example where the number of counters is greater than in the above example.

This address generation device is comprised by counters Counter i, Counter x, computing units INCDECi, INCDECx, selector equipped computing units SUMi, ADRSUM, selectors SELi, SELx, comparators END, ENDi, ENDx, INCi, a bit inverter BRV, and mask generator ADRMSK (where, $0 \leq i \leq n-1$).

Further, this address generation device is supplied with the input signals COUNTiSTP, COUNTiINI, COUNTiFIN, COUNTxFIN, OFFSET, MASK and control signals CNTiINIMD, CNTiRETMD, CNTiENDMD, CNTiINCMD, CTRLMD, COUNTSUM, MSKMD, COUNTEN and outputs the control signal CTRL and generation address GENADR.

Here, for all i of i=0 to n−1, the counter Counter i stores the count data countdat_I and the counter Counter x stores the count data countdat_x.

For all i of i=0 to n−1, the computing unit INCDECi processes the step value signal COUNTiSTP and the count data countdat_i of the counter Counter i in accordance with the value of the control signal CNTiINIMD and outputs the result as the signal countcal_i, while the computing unit INCDECx processes the finish value signal COUNTxFIN and the count data countdat_x of the counter Counter x and outputs the results as the signal countcal_x.

For all i of i=0 to n−1, the selector equipped computing unit SUMi processes the initial value signal COUNTiINI, output signal countcal_0, countcal_1, . . . , countcal_n−1 of the computing unit INCDECi in accordance with the value of the control signal CNTiRETMD and outputs the results through the selector SELi to the counter Counter i.

For all i of i=0 to n−1, the comparator END processes the count data countdat_0, countdat_1, . . . , countcal_n−1 of the counter Counter i, the count data countdat_x of the counter Counter x, the initial value signals COUNT0INI, COUNT1INI, . . . , COUNTn−1INI, and finish value signals COUNT0FIN, COUNT1FIN, . . . , COUNTn−1FIN and outputs the results as the signal endsigi and processes the count data countdat_0, countdat_1, . . . , countcal_n−1 of the counter Counter i, the count data countdat_x of the counter Counter x, initial value signals COUNT0INI, COUNTuINI, . . . , COUNTn−1INI, and finish value signals COUNT0FIN, COUNT1FIN, . . . , COUNTn−1FIN and output the results as the signal endsigx.

For all i of i=0 to n−1, the comparator ENDi generates the signal countend_i from the value of the output signal endsigi of the comparator END in accordance with the value of the control signal CNTiENDMD, and the comparator ENDx generates the signal countend_x from the value of the output signal endsigx of the comparator END.

For all i of i=0 to n−1, the comparator INCi generates the signal countinc_0 from the value of the output signal countend_j of the comparator ENDi for all j of j=0 to n−1 (where j!=i) in accordance with the value of the control signal CNTiINCMD.

For all i of i=0 to n−1, the selector SELi selects the values of the output signal countcal_i of the computing unit INCDECi, initial value signal COUNTiINI, and output signal countret_i of the computing unit SUMi and sets the count data countdat_i of the counter Counter i in accordance with the values of the output signal countinc_i of the comparator INCi and output signal countend_i of the comparator ENDi, while the selector SELx selects the values of the output signal countcal_x of the computing unit INCDECx and the initial value signal COUNTxINI and sets the count data countdat_x of the counter Counter x in accordance with the value of the output signal countend_x of the comparator ENDx.

The selector equipped computing unit ADRSUM generates the signal sumadr from the count data countdat_0, countdat_1, . . . , countcal_n−1 of the counter Counter i, the count data countdat_x of the counter Counter x, and the input signal OFFSET in accordance with the value of the control signal COUNTSUM.

The bit inverter BRV generates the signal brvadr from the output signal sumadr of the selector equipped computing unit ADRSUM in accordance with the value of the control signal MSKMD.

The mask generator ADRMSK generates the address signal GENADR from the output signal sumadr and the input signal MASK of the bit inverter brvadr and the selector equipped computing unit ADRSUM in accordance with the value of the control signal MSKMD.

The control signal generator CTRLGEN generates the control signal CTRL from the count data countdat_0, countdat_1, . . . , countcal_n−1of the counter Counter i in accordance with the value of the control signal CTRLMD.

The control signal generator CTRLGEN validates the valid signal VALID while addresses are being generated.

Further, the address generation device having the above configuration performs the following processing for all i of i=0 to n−1.

For all i of i=0 to n−1, the computing unit INCDECi performs one of the following operations in accordance with the value of the control signal CNTiINIMD:
  countcal_i=COUNTiSTP+countdat_i,
  countcal_i=COUNTiSTP−+countdat_i For all i of i=0 to n−1, the selector equipped computing unit SUMi performs one of the following operations in accordance with the value of the control signal CNTiRETMD:
  countret_i=COUNTiINI,
  countret_i=countcal_0,
  countret_i=countcal_1,
  . . .
  countret_i=countcal_n−1,
  countret_i=COUNTiINI+countcal_0,
  countret-i=COUNTiINI+countcal_1,
  . . .
  countret_i=COUNTiINI+countcal_n−1

For all i of i=0 to n−1, the comparator END sets endsigi=INI0 when the count data countdat_0 and the initial value signal COUNT0INI are equal, endsigi=INI1 when the count data countdat_1 and the initial value signal COUNT1INI are equal, . . . , and endsigi=INIn−1 when the count data countdat_n−1 and initial value signal COUNTn−1INI are equal.

Similarly, the comparator END sets endsigi=FIN0 when the count data countdat_0 and the finish value signal COUNT0FIN are equal, endsigi=FIN1 when the count data countdat_i and the finish value signal COUNT1FIN are equal, . . . , and endsigi=FINn−1 when the count data countdat_n−1 and the finish value signal COUNTn−1FIN are equal.

Further, the comparator END sets endsigi=eq01 when the count data countdat_0 and countdat_1 are equal, endsigi=eq02 when the count data countdat_0 and countdat_2 are equal, . . . endsigi=eqn−1 when the count data countdat_0 and countdat n−1 are equal . . . , and endsigi=eqn−1n−2 when the countdat n−1 and countdat n−2 are equal.

For all i of i=0 to n−1, the comparator ENDi sets the signal countend_i as true if the value of the control signal CNTiENDMD and the value of signal endsigi match and sets the signal countend_i as false when they do not match.

For all i of i=0 to n−1, the comparator INCi sets the signal countinc_i as true when the signal countend_j is true for all j of j=0 to n−1 (where j!=i) in accordance with the value of the control signal CNTiINCMD and sets the signal countinc_i when the signal countend_j is false.

Further, the comparator i sets the signal countinc_i as true when the signal countend_j is true and the signal countend_k is true for all j of j=0 to n−1 (where i!=j) and all k of k=0 to n−1 (where k!=i) and sets the signal countinc_i as false when this is not so.

The selector equipped computing unit ADRSUM performs one of the following operations in accordance with the value of the control signal COUNTSUM:
 sumadr=OFFSET+countdat_0,
 sumadr=OFFSET+countdat_1,
 . . .
 sumadr=OFFSET+countdat_n−1,
 sumadr=OFFSET+countdat_0+countdat_1,
 sumadr=OFFSET+countdat_0+countdat_2, . . .
 sumadr=OFFSET+countdat_0+countdat_n−1,
 sumadr=OFFSET+countdat_1+countdat_2, . . .
 sumadr=OFFSET+countdat_1+countdat_n−1,
 . . .
 sumadr=OFFSET+countdat−2+countdat_n−1,
 sumadr=OFFSET+countdat_0+countdat_1+countdat_2,
 sumadr=OFFSET+countdat_0+countdat_1*2^(countdat_x+1),
 sumadr=OFFSET+countdat_0+countdat_1*2^(countdat_x+1)−1,
 sumadr=OFFSET+countdat_0+countdat_1*2^(countdat_x+1)+1,
 sumadr=OFFSET+countdat_0+countdat_1*2^(countdat_x+1)+2^(countdat_x),
 sumadr=OFFSET+countdat_0*2^(COUNTxFIN−countdat_x)

The bit inverter BRV decides m in accordance with the value of the control signal MSKMD and sets the bit inversion from the LSB to m−1 bits of the generation signal sumadr of the selector equipped computing unit ADRSUM in the signal brvadr.

The mask generator ADRMSK selects the generation signal brvadr of the bit inverter BRV and generation signal sumadr of the selector equipped computing unit ADRSUM in accordance with the value of the control signal MSKMD and performs on the results and the value of the input signal MASK in bit units any of an AND, OR, or XOR operation to generate the signal GENADR.

The control signal generator CTRLGEN, in accordance with the value of the control signal CTRLMD, validates the control signal CTRL when the count data countdat_0 is true, when the count data countdat_1 is true, . . . , when the count data countdat_n−1 is true, when the count data countdat_0 is true and the count data countdat_1 is true, when the count data countdat_0 is true and the count data countdat_2 is true, . . . , when the count data countdat_0 is true and the count data countdat n−1 is true, . . . , and when the count data countdat_n−2 is true and the count data countdat_n−1 is true and invalidates the control signal CTRL in other cases. It validates the address valid signal VALID while addresses are being generated.

Further, in accordance with the value of the control signal COUNTEN, countup of the counter Counter i (where $0 \leq i \leq n-1$), Counter x having content is authorized or not authorized.

In the general example explained above as well, it is possible to obtain similar actions and effects as the action and effects of the device of the above FIG. 14.

12th Embodiment

Figure 16:
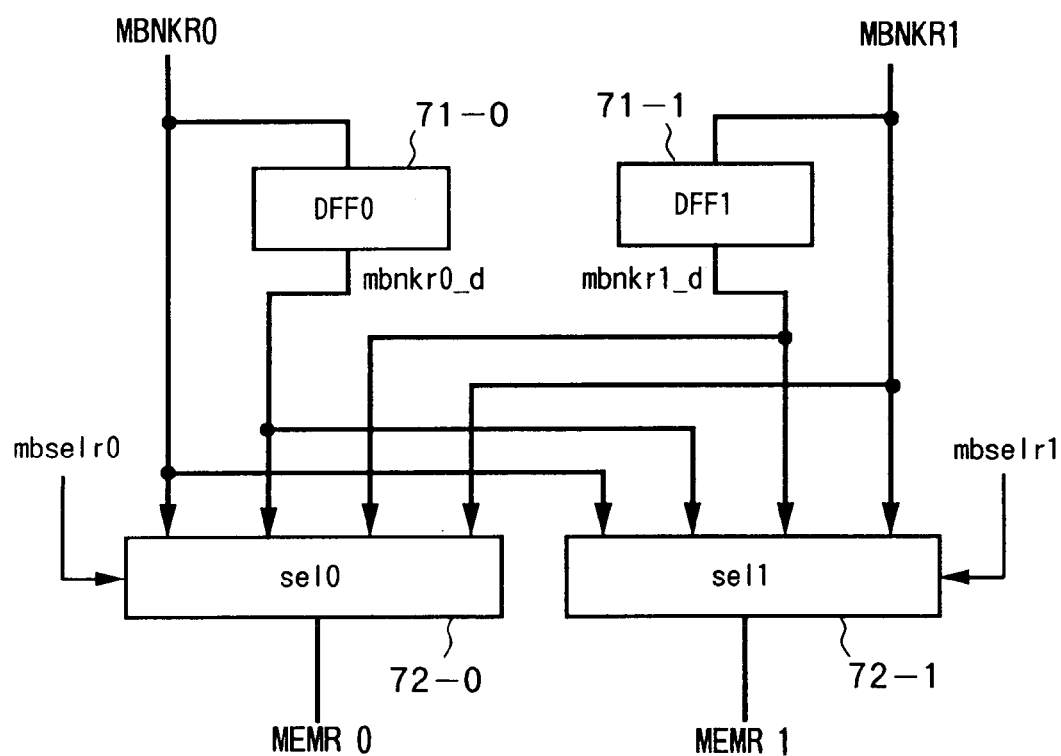
FIG. 16 is a view explaining a 12th embodiment of the present invention and shows an example of a data read system of an interleave device according to the present invention.

FIG. 16 is a view for explaining a 12th embodiment of the present invention and shows an example of a data read system of an interleave device according to the present invention.

The interleave device 70 is a device enabling realizing the access for a specific access pattern required by a dual port memory using a single port memory and can be utilized for data access in FFT operation.

Therefore, the interleave device 70 can be applied to a data transmission system from the data memory to the arithmetic device in the arithmetic system of FIG. 12 showing for example the above 10th embodiment.

Note that, in the following explanation, a not shown single port memory has a memory bank MBNK0 and memory bank MBNK1. It is assumed that the interleave device 70 accesses the memory bank MBNK0 and memory bank MBNK1.

The interleave device 70, as shown in FIG. 16, has a first delay device (DFF0) 71-0, second delay device (DFF1) 71-1, first selection device (sel0) 72-0, and second selection device (sel1) 72-1.

Further, the interleave device 70 has the read data input MBNKR0 from the memory bank MBNK0, the read data input MBNKR1 from the memory bank MBNK1, and the read data outputs MEMR0, MEMR1 and is supplied with the control signals mbselr0, mbselr1.

The first delay device 71-0 is comprised for example of a D-type flipflop, gives a delay of 1 cycle, delays the read data input MBNKR0 from the memory bank MBNK0 by exactly 1 cycle, and outputs the result as the signal mbnkr0_d to the first selection device 72-0 and second selection device 72-1.

The second delay device 71-1 is comprised for example of a D-type flipflop, gives a delay of 1 cycle, delays the read data input MBNKR1 from the memory bank MBNK1 by exactly 1 cycle, and outputs the result as the signal mbnkr1_d to the first selection device 72-0 and second selection device 72-1.

The first selection device 72-0 receives as input the read data input MBNKR0 from the memory bank MBNK0, the read data input MBNKR1 from the memory bank MBNK1, the output signal mbnkr0_d of the first delay device 710, and the output signal mbnkr1_d of the second delay device 71-1 and selects the value of one of the read data input MBNKR0 from the memory bank MBNK0, the read data input MBNKR1 from the memory bank MBNK1, the output signal mbnkr0_d of the first delay device 71-0, and the output signal mbnkr1_d of the second delay device 71-1 in accordance with the value of the control signal mbselr0 as the read data output MEMR0.

The second selection device 72-1 receives as input the read data input MBNKR0 from the memory bank MBNK0, the read data input MBNKR1 from the memory bank MBNK1, the output signal mbnkr0_d of the first delay device 71-0, and the output signal mbnkr1_d of the second delay device 71-1 and selects the value of one of the read data input MBNKR0 from the memory bank MBNK0, the read data input MBNKR1 from the memory bank MBNK1, the output signal mbnkr0_d of the first delay device 71-0, and the output signal mbnkr1_d of the second delay device 71-1 in accordance with the value of the control signal mbselr1 as the read data output MEMR1.

Next, the operation according to the above configuration will be explained with reference to FIGS. 17A to 17F.

FIGS. 17A to 17F show a timing chart for explaining the operation of the read system interleave device of FIG. 16.

This timing chart shows the case where the first 2 cycles (cycle 0, cycle 1) show ordinary memory access, that is, access for sending the read data input MBNKR0 from the memory bank MBNK0 to the read data output MEMR0 and sending the read data MBNKR1 from the memory bank MBNK1 to the read data output MEMR1, while the remaining cycles (cycle 2 on) show simultaneous use of the read data input MBNKR0 from the memory bank MBNK0 in 1 cycle by the read data outputs MEMR0, MEMR1 or simultaneous use of data of the read data input MBNKR1 from the memory bank MBNK1 in 1 cycle.

As shown in FIG. 17A, in the cycle 0, the data input MBNKR0 read from the memory bank MBNK0 becomes data of even0.

At the cycle 1, the read data input MBNKR0 becomes even1, while the read data input MBNKR1 from the memory bank MBNK1 becomes odd0 as shown in FIG. 17B.

Further, the read data input MBNKR0 is input as it is directly to the first selection device 72-0 and second selection device 72-1, is delayed by exactly 1 cycle by the first delay device 71-0, and is input as the signal mbnkr0_d to the first selection device 72-0 and second selection device 72-1.

Similarly, the read data input MBNKR1 is input as it is directly to the first selection device 72-0 and second selection device 72-1, delayed by exactly 1 cycle by the second delay device 71-1, and is input as the signal mbnkr1_d to the first selection device 72-0 and second selection device 72-1.

Further, as shown in FIGS. 17C and 17D, at the cycle 1, to output the data even0, odd0 as the read data outputs MEMR0 and MEMR1, the control signal mbselr0 is supplied to the first selection device 72-0 so as to select the signal mbnkr0_d of the data input MBNKR0 given a delay of 1 cycle as shown in FIG. 17E. Due to this, the read data output MEMR0 of the first selection device 72-0 becomes the data even0.

Similarly, the control signal mbselr1 is supplied to the second selection device 72-1 so as to select the data input MBNKR1 as shown in FIG. 17F. Due to this, the read data output MEMR1 of the second selection device 72-1 becomes the data odd0.

At the cycle 2, the read data input MBNKR0 becomes the data even2 as shown in FIG. 17A, while the read data input MBNKR1 becomes the data odd1 as shown in FIG. 17B.

Further, as shown in FIGS. 17C and 17D, at the cycle 2, to output the data even1 and odd1 as the read data outputs MEMR0 and MEMR1, the control signal mbselr0 is supplied to the first selection device 72-0 so as to select the signal mbnkr0_d of the data input MBNKR0 delayed by 1 cycle as shown in FIG. 17E. Due to this, the read data output MEMR0 of the first selection device 72-0 becomes the data even1.

Similarly, the control signal mbselr1 is supplied to the second selection device 72-1 so as to select the data input MBNKR1 as shown in FIG. 17F. Due to this, the read data output MEMR1 of the second selection device 72-1 becomes the data odd1.

At the cycle 3, the read data input MBNKR0 becomes the data even3 as shown in FIG. 17A, while the read data input MBNKR1 becomes the data odd2 as shown in FIG. 17B.

Further, as shown in FIGS. 17C and 17D, at the cycle 3, to output data even2 and odd3 as the read data outputs MEMR0 and MEMR1, the control signal mbselr0 is supplied to the first selection device 72-0 so as to select the signal mbnkr0_d of the data input MBNKR0 delayed by 1 cycle as shown in FIG. 17E. Due to this, the read data output MEMR0 of the first selection device 72-0 becomes the data even2.

Similarly, the control signal mbselr1 is supplied to the second selection device 72-1 so as to select the data input MBNKR0 as shown in FIG. 17F. Due to this, the read data output MEMR1 of the second selection device 72-1 becomes the data even3.

At the cycle 4, the read data input MBNKR0 becomes data even4 as shown in FIG. 17A, while the read data input MBNKR1 becomes the data odd2 as shown in FIG. 17B.

Further, as shown in FIGS. 17C and 17D, at the cycle 4, to output the data odd2, odd3 as the read data outputs MEMR0 and MEMR1, the control signal mbselr0 is supplied to the first selection device 72-0 so as to select the signal mbnkr1_d of the data input MBNKR1 delayed by 1 cycle. Due to this, the read data output MEMR0 of the first selection device 72-0 becomes the data odd2.

Similarly, the control signal mbselr1 is supplied to the second selection device 72-1 so as to select the data input MBNKR1 as shown in FIG. 17F. Due to this, the read data output MEMR1 of the second selection device 72-1 becomes the data odd3.

As explained above, according to the 12th embodiment, since provision is made of the first delay device 71-0 for delaying the read data input MBNKR0 from the memory bank MBNK0 by exactly 1 cycle and outputting the result as the signal mbnkr0_d to the first selection device 72-0 and the second selection device 72-1, the second delay device 71-1 for delaying the read data input MBNKR1 from the memory bank MBNK1 by exactly 1 cycle, and outputting the same as the signal mbnkr1_d to the first selection device 72-0 and second selection device 72-1, the first selection device 72-0 for selecting one of the values of the read data input MBNKR0 from the memory bank MBNK0, read data input MBNKR1 from the memory bank MBNK1, output signal mbnkr0_d of the first delay device 71-0, and output signal mbnkr1_d of the second delay device 71 in accordance with the value of the control signal mbselr0 as the read data output MEMR0, and second selection device 72-1 for selecting one of the values of the read data input MBNKR0 from the memory bank MBNK0, read data input MBNKR1 from the memory bank MBNK1, output signal mbnkr0_d of the first delay device 71-0, and output signal mbnkr1_d of the second delay device 71 in accordance with the value of the control signal mbselr1 as the read data output MEMR1, even in a state where a dual port memory (2R2W memory) is necessary, in the case of a specific access pattern, it is possible to realize similar functions using a single port memory (1R1W memory).

Due to this, there are the advantages that a reduction of the memory area and an improvement in the process portability become possible and continuous memory access can be realized.

13th Embodiment

Figure 18:
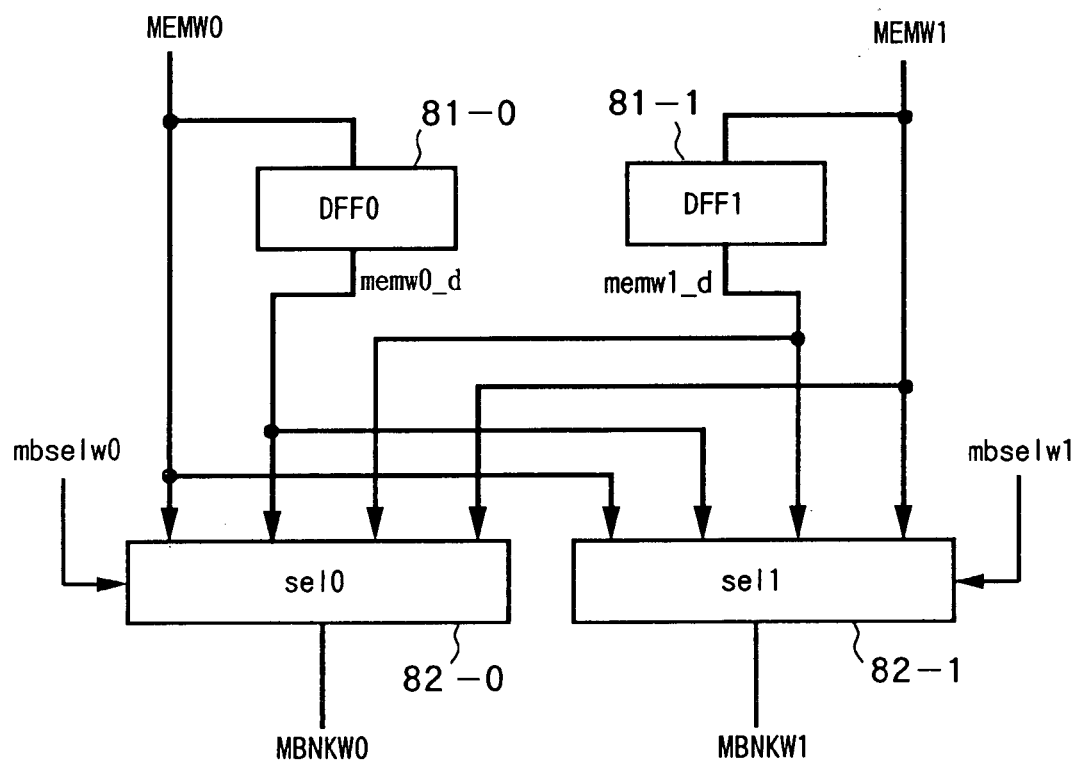
FIG. 18 is a view explaining a 13th embodiment of the present invention and shows an example of a data write system of an interleave device according to the present invention.

FIG. 18 is a view explaining a 13th embodiment of the present invention and shows an example of a data write system of an interleave device according to the present invention.

The interleave device 80 is a device enabling realization of access requiring a dual port memory for a specific access pattern by using a single port memory and can be used for data access of FFT operation.

Therefore, this interleave device 80 can be used for the data transmission system of write data to the data memory of operation results of an arithmetic device of an arithmetic system of FIG. 12 showing the above 10th embodiment.

Note that, in the following explanation, a not shown single port memory has a memory bank MBNK0 and memory bank MBNK1 and it is assumed that the interleave device 80 accesses the memory bank MBNK0 and memory bank MBNK1.

The interleave device 80, as shown in FIG. 18, has the first delay device (DFF0) 81-0, second delay device (DFF1) 81-1, first selection device (sel0) 82-0, and second selection device (sel1) 82-1.

Further, the interleave device 80 has a write data input MEMW0 from the series 0, the write data input MEMW1 from the series 1, the write data output MBNKW0 to the memory bank MBNK0, and the write data output MBNKW1 to the memory bank MBNK1 and is supplied with the control signals mbselw0, mbselw1.

The first delay device 81-0 is comprised for example of a D-type flipflop, gives a delay of 1 cycle, delays the write data input MEMW0 from series 0 by exactly 1 cycle, and outputs the result as the signal memw0_d to the first selection device 82-0 and second selection device 82-1.

The second delay device 81-1 is comprised for example of a D-type flipflop, gives a delay of 1 cycle, delays the write data input MEMW1 from the series 1 by exactly 1 cycle, and outputs the result as the signal memw1_d to the first selection device 82-0 and second selection device 82-1.

The first selection device 82-0 receives as input the write data input MEMW0 from the series 0, the write data input MEMW1 from the series 1, the output signal memw0_d of the first delay device 81-0, and the output signal memw1_d of the second delay device 81-1 and selects one of the write data input MEMW0 from the series 0, the write data input MEMW1 from the series 1, the output signal memw0_d of the first delay device 81-0, and the output signal memw1_d of the second delay device 81-1 in accordance with the value of the control signal mbselw0 as the write data output MBNKW0.

The second selection device 82-1 receives as input the write data input MEMW0 from the series 0, the write data input MEMW1 from the series 1, the output signal memw0_d of the first delay device 81-0, and the output signal memw1_d of the second delay device 81-1 and selects one of the write data input MEMW0 from the series 0, the write data input MEMW1 from the series 1, the output signal memw0_d of the first delay device 81-0, and the output signal memw1_d of the second delay device 81-1 in accordance with the value of the control signal mbselw1 as the write data output MBNKW1.

Next, the operation according to the above configuration will be explained with reference to FIGS. 19A to 19F.

FIGS. 19A to 19F show a timing chart for explaining the operation of the write system interleave device of FIG. 18.

This timing chart shows the case where the first 2 cycles (cycle 0, cycle 1) show ordinary memory access, that is, access for sending the write data input MEMW0 from the series 0 to the write data output MBNKW0 to the memory bank MBNK0 and sending the write data input MEMW1 from the series 1 to the write data output MBNKW1 to the memory bank MBNK1, while the remaining cycles (cycle 2 on) show the need for the write data inputs MEMW0 and MEMW1 to be written in the memory banks MBNK0, MBNK1 as the write data output MBNKW0 or write data output MBNKW1.

At the cycle 0, the write data input MEMW0 from the series 0 becomes the data of even0 as shown in FIG. 19A. Further, the write data input MEMW1 from the series 1 becomes the data of odd0 as shown in FIG. 19B.

Further, the write data input MEMW0 is input as it is directly to the first selection device 82-0 and second selection device 82-1, is delayed by exactly 1 cycle by the first delay device 81-0, and is input as the signal memw0_d to the first selection device 82-0 and second selection device 82-1.

Similarly, the write data input MEMW1 is input as it is directly to the first selection device 82-0 and second selection device 82-1, is delayed by exactly 1 cycle by the second delay device 81-1, and is input as the signal memw1_d to the first selection device 82-0 and second selection device 82-1.

Further, as shown in FIGS. 19C and 19D, at the cycle 0, to output the data even0 as the write data output MBNKW0, the control signal mbselw0 is supplied to the first selection device 82-0 so as to select the data input MEMW0 as shown in FIG. 17E. Due to this, the write data output MBNKW0 of the first selection device 82-0 becomes the data even0.

At the cycle1, the write data input MEMW0 from the series 0 becomes the data of even1 as shown in FIG. 19A. Further, the write data input MEMW1 from the series 1 becomes the data of odd1 as shown in FIG. 19B.

Further, as shown in FIGS. 19C and 19D, at the cycle 1, to output data even1 as the write data output MBNKW0, the control signal mbselw0 is supplied to the first selection device 82-0 so as to select the data input MEMW0 as shown in FIG. 19E. Due to this, the write data output MBNKW0 of the first selection device 82-0 becomes the data even1.

Similarly, the control signal mbselw1, as shown in FIG. 19F, is supplied to the second selection device 82-1 so as to select the signal memw1_d of the data input MEMW1 delayed by 1 cycle. Due to this, the write data output MBNKW1 of the second selection device 82-1 becomes the data odd0.

At the cycle 2, the write data input MEMW0 from the series 0 becomes the data of even2 as shown in FIG. 19A. Further, the write data input MEMW1 from the series 1 becomes the data of even3 as shown in FIG. 19B.

Further, as shown in FIGS. 19C and 19D, at the cycle 2, to output the data even2 as the write data output MBNKW0, the control signal mbselw0 is supplied to the first selection device 82-0 so as to select the data input MEMW0 as shown in FIG. 19E. Due to this, the write data output MBNKW0 of the first selection device 82-0 becomes the data even2.

Similarly, the control signal mbselw1, as shown in FIG. 19F, is supplied to the second selection device 82-1 so as to select the signal memw1_d of the data input MEMW1 delayed by 1 cycle. Due to this, the write data output MBNKW1 of the second selection device 82-1 becomes the data odd1.

At the cycle 3, the write data input MEMW0 from the series 0 becomes data of odd2 as shown in FIG. 19A.

Further, the write data input MEMW1 from the series 1 becomes the data of odd3 as shown in FIG. 19B.

Further, as shown in FIGS. 19C and 19D, at the cycle 3, to output data even3 as the write data output MBNKW0, the control signal mbselw0 is supplied to the first selection device 82-0 so as to select the signal memw1_d of the data input MEMW1 delayed by 1 cycle as shown in FIG. 19E. Due to this, the write data output MBNKW0 of the first selection device 82-0 becomes the data even3.

Similarly, the control signal mbselw1, as shown in FIG. 19F, is supplied to the second selection device 82-1 so as to select the data input MEMW0. Due to this, the write data output MBNKW1 of the second selection device 82-1 becomes the data odd2.

Next, the contents of the cycle 2 and cycle 3 are repeated.

As explained above, according to the 13th embodiment, since provision is made of the first delay device 81-0 for delaying the write data input MEMW0 from the series 0 by exactly 1 cycle and outputting the same as the signal memw0_d to the first selection device 82-0 and second selection device 82-1, the second delay device 81-1 for delaying the write data input MEMW1 from the series 1 by exactly 1 cycle and outputting the same as the signal memw1_d to the first selection device 82-0 and second selection device 82-1, the first selection device 82-0 for selecting the value of any of the write input MEMW0 from the series 0, the write data input MEMW1 from the series 1, the output signal memw0_d of the first delay device 81-0, and the output signal memw1_d of the second delay device 81-1 in accordance with the value of the control signal mbselw0 as the write data output MBNKW0, and the second selection device 82-0 for selecting the value of any of the write input MEMW0 from the series 0, the write data input MEMW1 from the series 1, the output signal memw0_d of the first delay device 81-0, and the output signal memw1_d of the second delay device 81-1 in accordance with the value of the control signal mbselw1 as the write data output MBNKW1, in the same way as in the above 12th embodiment, even in a state where a dual port memory (2R2W memory) is needed, in the case of a specific access pattern, it is possible to realize similar functions using a single port memory (1R1W memory).

Due to this, there are the advantages that a reduction of the memory area and an improvement in the process portability become possible and continuous memory access can be realized.

14th Embodiment

Figure 20:
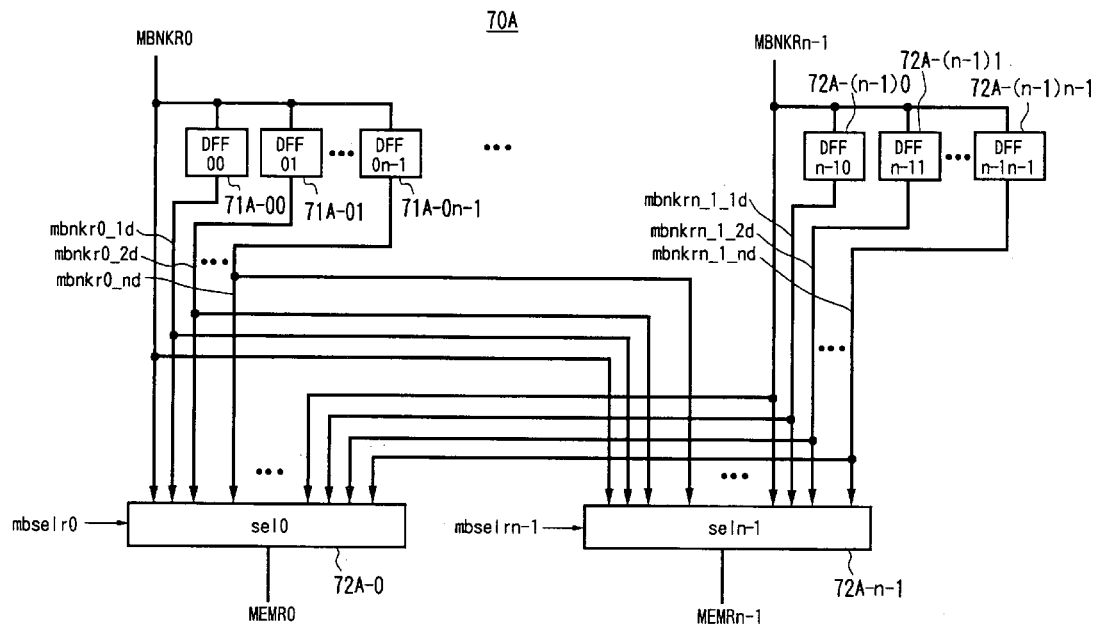
FIG. 20 is a view explaining a 14th embodiment of the present invention and shows a generalized example of the data read system of an interleave device according to the present invention.
Figure 21:
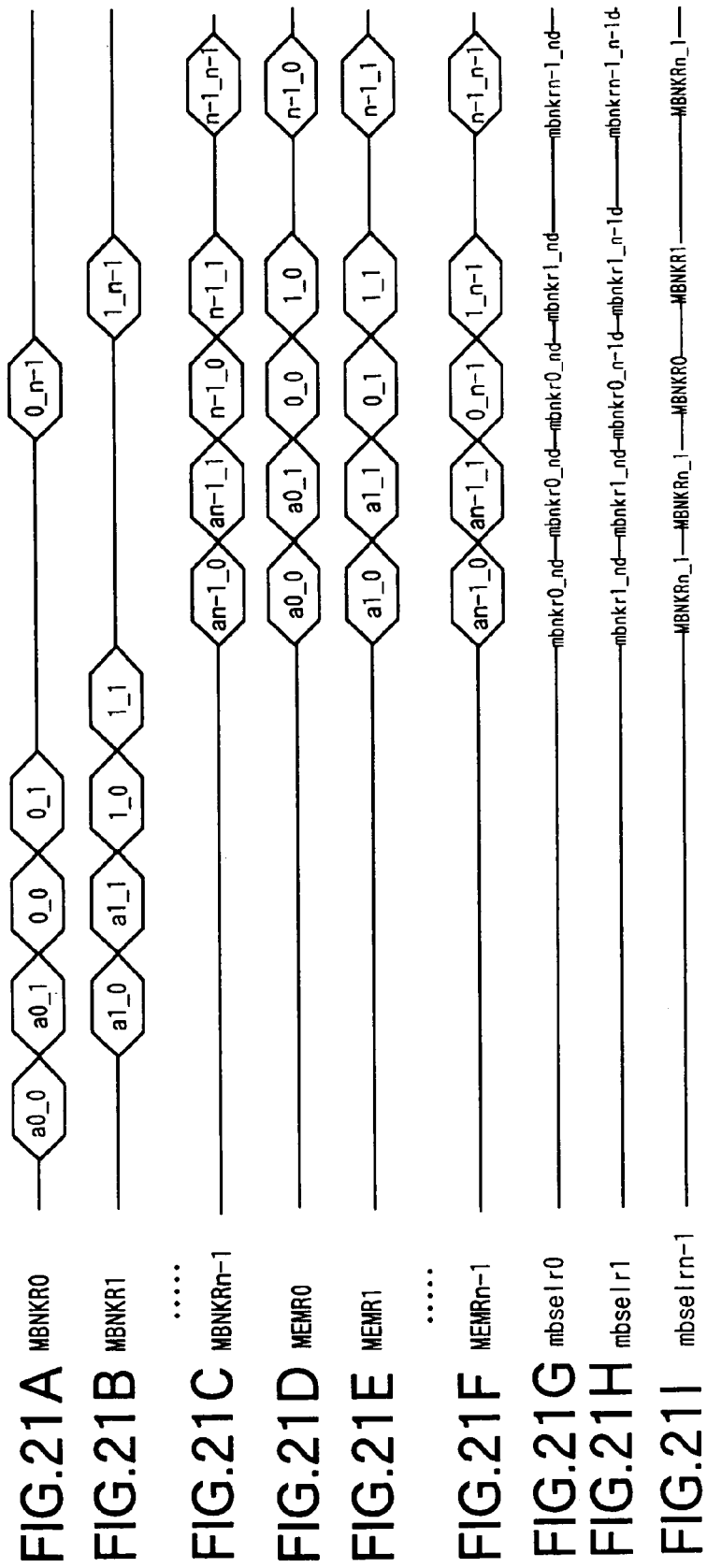
FIGS. 21A to 21I show a timing chart of the read system interleave device of FIG. 20.

FIG. 20 is a view explaining a 14th embodiment of the present invention and shows a general example of a data read system of an interleave device according to the present invention.

The 14th embodiment is a generalized version of the 12th embodiment having two of the delay devices and selection devices. It has n number of delay devices 71A-00 to 71A-0n−1, . . . , 71A-(n−1)0 to 71A-(n−1)n−1 for the n number of read data inputs MBNKR0 to MBNKRn−1 and inputs the delay signals mbnkr0_1d to mbnkr0_nd, mbnkr1_1d to mbnkr1_nd of the delay devices 71A-00 to 71A-0n−1, 71A-(n−1)0 to 71A-(n−1)n−1 in parallel to the n number of selection devices 72A-0 to 72A-n−1.

That is, the interleave device 70A has n×n number of first delay devices 71A-00 to 71A-0n−1, . . . , n-th delay devices 71A-(n−1)0 to 71A-(n−1)n−1, and n number of first to n-th selection devices 72A-0 to 72A-n−1.

Further, the interleave device 70A has the read data input MBNKR0 from the memory bank MBNK0, the read data input MBNKR1 from the memory bank MBNK1, . . . , the read data input MBNKRn−1 from the memory bank MBNKn−1 and the read data outputs MEMR0 to MEMRn−1 and is supplied with the control signals mbselr0, mbselr1, . . . , mbseln−1.

The first delay device 71A-00 is comprised of for example a D-type flipflop and gives a delay of m cycles ($1 \leq m \leq n$) for any k ($0 \leq k \leq n-1$). It delays the read data input MBNKR0 from the memory bank MBNK0 by exactly m number of cycles and outputs the result as the signal mbnkr0_1d to the first to n-th selection devices 72A-0 to 72A-n−1.

The first delay device 71A-01 is comprised of for example a D-type flipflop and gives a delay of m cycles ($1 \leq m \leq n$) for any k ($0 \leq k \leq n-1$). It delays the read data input MBNKR0 from the memory bank MBNK0 by exactly m number of cycles and outputs the result as the signal mbnkr0_2d to the first to n-th selection devices 72A-0 to 72A-n−1.

Similarly, the first delay device 71A-0n−1 is comprised of for example a D-type flipflop and gives a delay of m cycles ($1 \leq m \leq n$) for any k ($0 \leq k \leq n-1$). It delays the read data input MBNKR0 from the memory bank MBNK0 by exactly m number of cycles and outputs the result as the signal mbnkr0_nd to the first to n-th selection devices 72A-0 to 72A-n−1.

The n-th delay device 71A-(n−1)0 is comprised of for example a D-type flipflop and gives a delay of m cycles ($1 \leq m \leq n$) for any k ($0 \leq k \leq n-1$). It delays the read data input MBNKRn−1 from the memory bank MBNKn−1 by exactly m number of cycles and outputs the result as the signal mbnkrn_1_1d to the first to n-th selection devices 72A-0 to 72A-n−1.

The n-th delay device 71A-(n−1)1 is comprised of for example a D-type flipflop and gives a delay of m cycles ($1 \leq m \leq n$) for any k ($0 \leq k \leq n-1$). It delays the read data input MBNKRn−1 from the memory bank MBNKn−1 by exactly m number of cycles and outputs the result as the signal mbnkrn_1_2d to the first to n-th selection devices 72A-0 to 72A-n−1.

Similarly, the n-th delay device 71A-(n−1)n−1 is comprised of for example a D-type flipflop and gives a delay of m cycles ($1 \leq m \leq n$) for any k ($0 \leq k \leq n-1$). It delays the read data input MBNKRn−1 from the memory bank MBNKn−1 by exactly m number of cycles and outputs the result as the signal mbnkrn_1_nd to the first to n-th selection devices 72A-0 to 72A-n−1.

The first selection device 72A-0 receives as input the read data input MBNKR0 from the memory bank MBNK0, the read data input MBNKR1 from the memory bank MBNK1, the read data input MBNKRn−1 from the memory bank MBNKn−1, the output signals mbnkr0_1d to mbnkr0_nd of the first delay devices 71A-00 to 71A-0n−1, . . . , and the output signals mbnkr1_1d to mbnkr1_nd of the n-th delay devices 71A-(n−1)0 to 71A-(n−1)n−1 and selects the value of one of the read data input MBNKR0 from the memory bank MBNK0, the read data input MBNKR1 from the memory bank MBNK1, the read data input MBNKRn−1 from the memory bank MBNKn−1, the output signals mbnkr0_1d to mbnkr0_nd of the first delay devices 71A-00 to 71A-0n−1, . . . , and the output signals mbnkr1_1d to mbnkr1_nd of the n-th delay devices 71A-(n−1)0 to 71A-(n−1)n−1 in accordance with the control signal mbselr0.

Similarly, the n-th selection device 72A-n−1 receives as input the read data input MBNKR0 from the memory bank MBNK0, the read data input MBNKR1 from the memory bank MBNK1, . . . , the read data input MBNKRn−1 from the memory bank MBNKn−1, the output signals mbnkr0_1d to mbnkr0_nd of the first delay device 71A-00 to 71A-0n−1, and the output signals mbnkr1_1d to mbnkr1_nd of the n-th delay device 71A-(n−1)0 to 71A-(n−1)n−1 and, in accordance with the value of the control signal mbselrn1, selects one value from among the read data input MBNKR0 from the memory bank MBNK0, the read data input MBNKR1 from the memory bank MBNK1, . . . , the read data input MBNKRn−1 from the memory bank MBNKn−1, the output signals mbnkr0_1d to mbnkr0_nd of the first delay device 71A-00 to 71A-0n−1, . . . , the output signals mbnkr1_1d to mbnkr1_nd of the n-th delay devices 71A-(n−1)0 to 71A-(n−1)n−1 as the read data output MEMRn−1.

The interleave device 70A having the above configuration is similar to the 12th embodiment except that in the above way it has n number of delay devices 71A-00 to 71A-0n−1, . . . , 71A-(n−1)0 to 71A-(n−1)n−1 for the n number of read data inputs MBNKR0 to MBNKRn−1 and inputs the delay signals mbnkr0_1d to mbnkr0_nd, mbnkr1_1d to mbnkr1_nd of the delay devices 71A-00 to 71A-0n−1, . . . , 71A-(n−1)0 to 71A-(n−1)n−1 in parallel to the n number of selection devices 72A-0 to 72A-n−1 and is similar in functions of the parts, so the operations are explained by showing the timing chart in FIGS. 21A to 21I and detailed explanations will be omitted.

Therefore, according to the 14th embodiment, in the same way as in the above 12th embodiment, even in a state where a dual port memory (2R2W memory) is needed, in the case of a specific access pattern, it is possible to realize similar functions using a single port memory (1R1W memory).

Due to this, there are the advantages that a reduction of the memory area and an improvement in the process portability become possible and continuous memory access can be realized.

15th Embodiment

Figure 22:
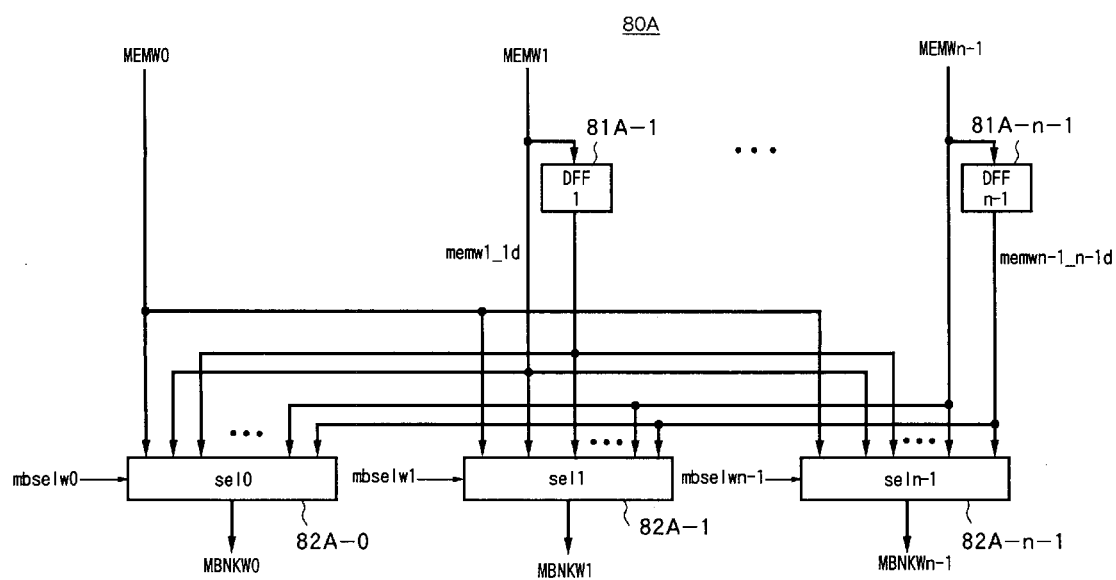
FIG. 22 is a view explaining a 15th embodiment of the present invention and shows a generalized example of the data write system of an interleave device according to the present invention.
Figure 23:
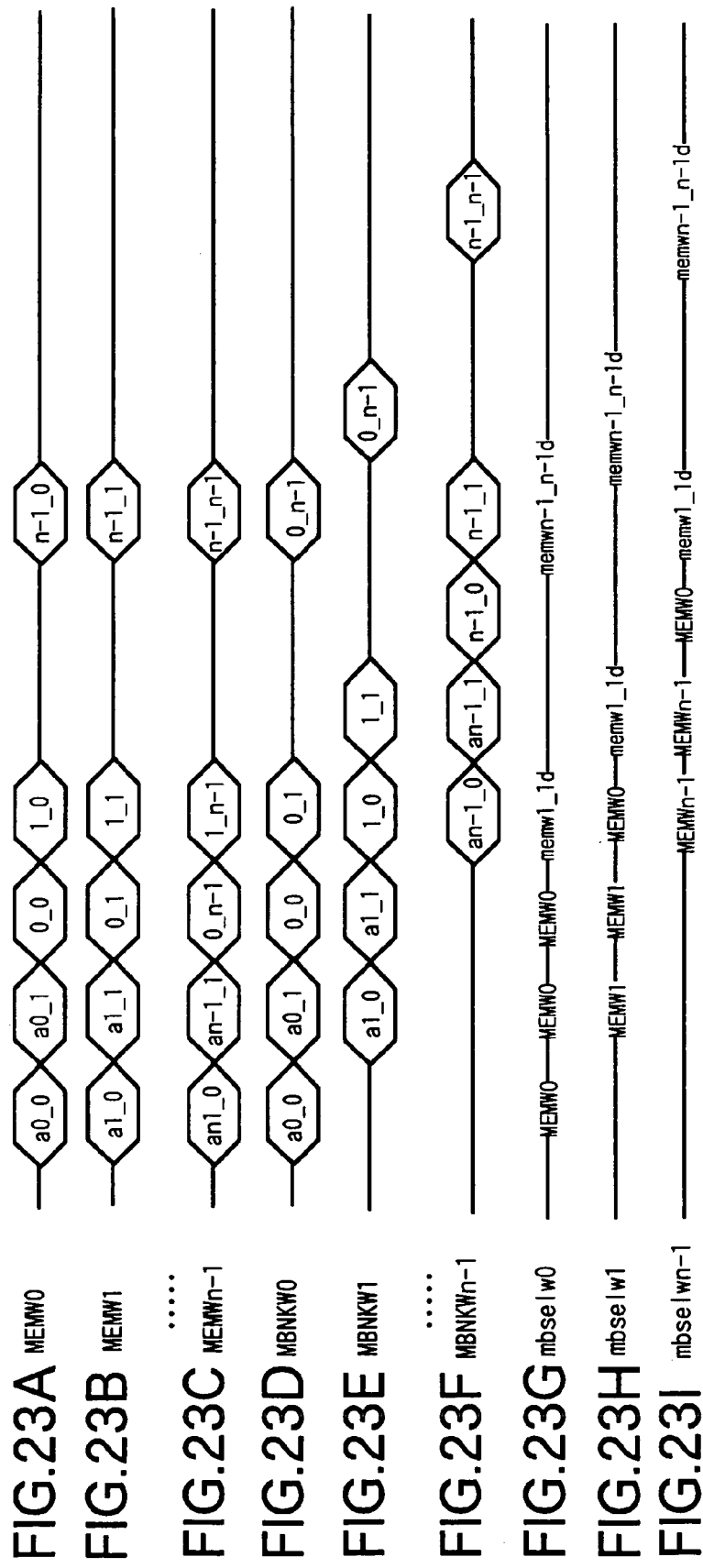
FIGS. 23A to 23I show a timing chart of the write system interleave device of FIG. 22.

FIG. 22 is a view explaining a 15th embodiment of the present invention and shows a generalized example of a data write system of an interleave device according to the present invention.

The 15th embodiment is a generalized version of the 12th embodiment having two delay devices and selection devices. It has second delay devices 81A-1, . . . , n-th delay device 81A-n−1 for n−1 number of read data inputs MBNKR1 to MBNKRn−1 and inputs the delay signals memw1_1d to memwn−1_n−1d of the delay devices 81A-1 to 81A-n−1 to the n number of selection devices 82A-0 to 82A-n−1.

That is, the interleave device 80A has n−1 number of second to n-th delay devices 81A-1 to 81A-n−1 and n number of first to n-th selection devices 82A-0 to 82A-n−1.

Further, the interleave device 80A has the write data input MEMW0 from the series 0, write data input MEMW1 from the series 1, . . . , write data input MEMWn−1 from the series n−1, write data output MBNKW0 to the memory bank MBNK0, write data output MBNKW1 to the memory bank MBNK1, . . . , and write data output MBNKWn−1 to the memory bank MBNKn−1 and is supplied with the control signals mbselw0, mbselw1, . . . , mbselwn−1.

The second delay device 81A-1 is comprised for example of a D-type flipflop and gives a delay of m cycles ($1 \leq m \leq n$) for any k ($0 \leq k \leq n-1$). It delays the write data input MEMW1 from the series 1 by exactly 1 cycle and outputs the result as the signal memw1_d to the first selection device 82A-0 to n-th selection device 82A-n−1.

Similarly, the n-th delay device 81A-n−1 is comprised for example of a D-type flipflop and gives a delay of m cycles ($1 \leq m \leq n$) for any k ($0 \leq k \leq n-1$). It delays the write data input MEMWn−1 from the series n−1 by exactly 1 cycle and outputs the result as the signal memwn−1_d to the first selection device 82A-0 to n-th selection device 82A-n−1.

The first selection device 82A-0 receives as input the write input MEMW0 from the series 0, write data input MEMW1 from the series 1, . . . , write data input MEMWn−1 from the series n−1, output signal memw1_1d of the second delay device 81A-1, . . . , and signal memwn−1_n−1d of the n-th delay device 81A-n−1 and selects the value of one of the write input MEMW0 from the series 0, write data input MEMW1 from the series 1, . . . , write data input MEMWn−1 from the series n−1, output signal memw1_1d of the second delay device 81A-1, . . . , and signal memwn−1_n−1d of the n-th delay device 81A-n−1 in accordance with the value of the control signal mbselw0 as the write data output MBNKW0.

The second selection device 82A-1 receives as input the write input MEMW0 from the series 0, write data input MEMW1 from the series 1, . . . , write data input MEMWn−1 from the series n−1, output signal memw1_1d of the second delay device 81A-1, . . . , and signal memwn−1_n−1d of the n-th delay device 81A-n−1 and selects the value of one of the write input MEMW0 from the series 0, write data input MEMW1 from the series 1, . . . , write data input MEMWn−1 from the series n−1, output signal memw1_1d of the second delay device 81A-1, . . . , and signal memwn−1_n−1d of the n-th delay device 81A-n−1 in accordance with the value of the control signal mbselw1 as the write data output MBNKW1.

Similarly, the n-th selection device 82A-n−1 receives as input the write input MEMW0 from the series 0, write data input MEMW1 from the series 1, . . . , write data input MEMWn−1 from the series n−1, output signal memw1_1d of the second delay device 81A-1, . . . , and signal memwn−1_n−1d of the n-th delay device 81A-n−1 and selects the value of one of the write input MEMW0 from the series 0, write data input MEMW1 from the series 1, . . . , write data input MEMWn−1 from the series n−1, output signal memw1_1d of the second delay device 81A-1, and signal memwn−1_n−1d of the n-th delay device 81A-n−1 in accordance with the value of the control signal mbselwn−1 as the write data output MBNKWn−1.

The interleave device 80A having the above configuration, in the above way, is a generalized version of the 13th embodiment. It is similar to the 13th embodiment except that it has for the second delay device 81A-1, . . . , n-th delay device 81A-n−1 for the n−1 number of read data inputs MEMW1 to MEMWn−1 and inputs the delay signals memw1_1d to memwn−1_n−1d of the delay devices 81A-1 to 81A-n−1 in parallel to the n number of selection devices 82A-0 to 82A-n−1 and has similar functions of parts, so the operations are explained by the timing chart shown in FIGS. 23A to 23I and detailed explanations are omitted.

Therefore, according to the 15th embodiment, in the same way as the above 13th embodiment, in the case of a specific access pattern, it is possible to realize similar functions using a single port memory (1R1W memory).

Due to this, there are the advantages that a reduction of the memory area and an improvement in the process portability become possible and continuous memory access can be realized.

16th Embodiment

Figure 24:
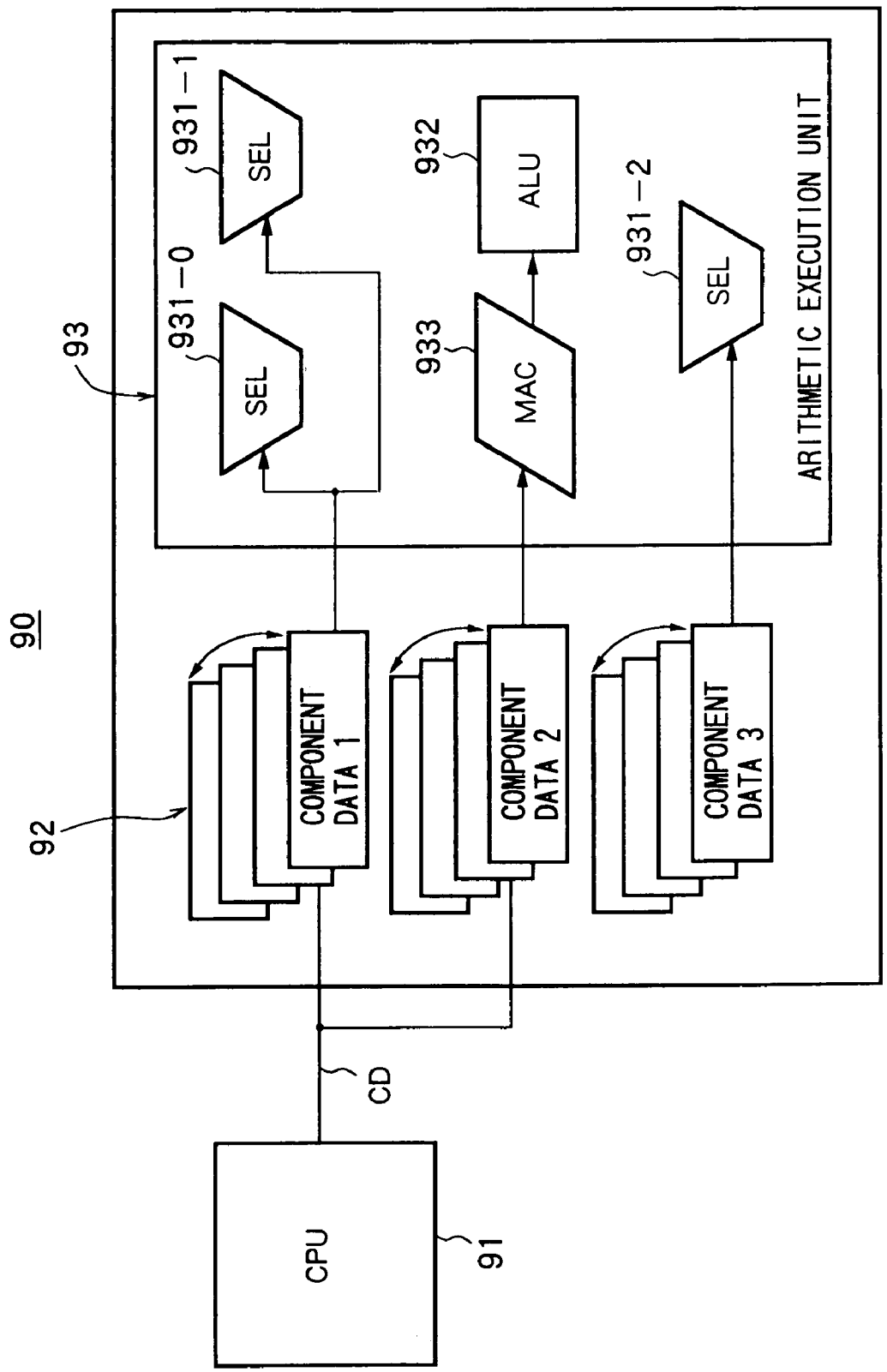
FIG. 24 is a view of the configuration of an arithmetic system according to a 16th embodiment of the present invention.

FIG. 24 is a view of the configuration of an arithmetic system according to a 16th embodiment of the present invention.

The arithmetic system 90 uses an arithmetic device able to the array of computing units, coefficient parameters at the time of execution of operations, etc. based on component data according to for example the above first embodiment to ninth embodiment.

Further, the arithmetic system 90 includes an arithmetic execution unit and a component data storage unit for storing component data for reconfiguration of the arithmetic execution unit. The component data storage unit has a storage unit configured in a ring for storing a plurality of component data when rewriting component data of the arithmetic execution unit using the CPU, is divided into a component data storage unit used at the time of execution of operation and a component data storage unit for rewriting, reduces the overhead accompanying rewriting of component data, and can switch among a plurality of configurations at a high speed.

Specifically, the arithmetic system 90, as shown in FIG. 24, has as main components, the CPU 91 as the control circuit, component data storage unit 92, and arithmetic execution unit 93.

The CPU 91 can access the component data storage unit 92 through a bus.

Further, the CPU 91 writes the component data for reconfiguration of the arithmetic execution unit 93 in the component data storage unit 92 using the write signal CWR.

Further, the CPU 91 uses the shift signal CEX to change the component data for reconfiguration of the arithmetic execution unit 93 to already stored other data.

The component data storage unit 92 is written with the component data from the CPU 91 through the bus and outputs the written component data to the arithmetic execution unit 93.

The component data storage unit 92, as shown in FIG. 24, is designed so that storage units of component data such as the component data 1, component data 2 . . . can hold a plurality of component data.

One of these is for storing the component data at the time of execution of one operation, the another serves as a storage area for writing component data from the outside.

Further, the contents of the component data can be instantaneously switched all at once.

Figure 25A:
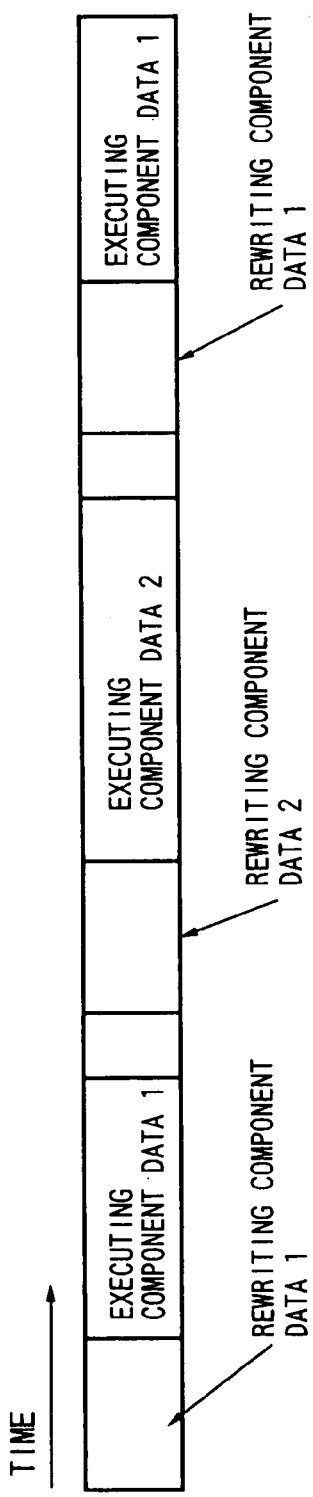
FIGS. 25A and 25B are views for explaining the effects of provision of the component data storage unit according to the present invention.
Figure 25B:
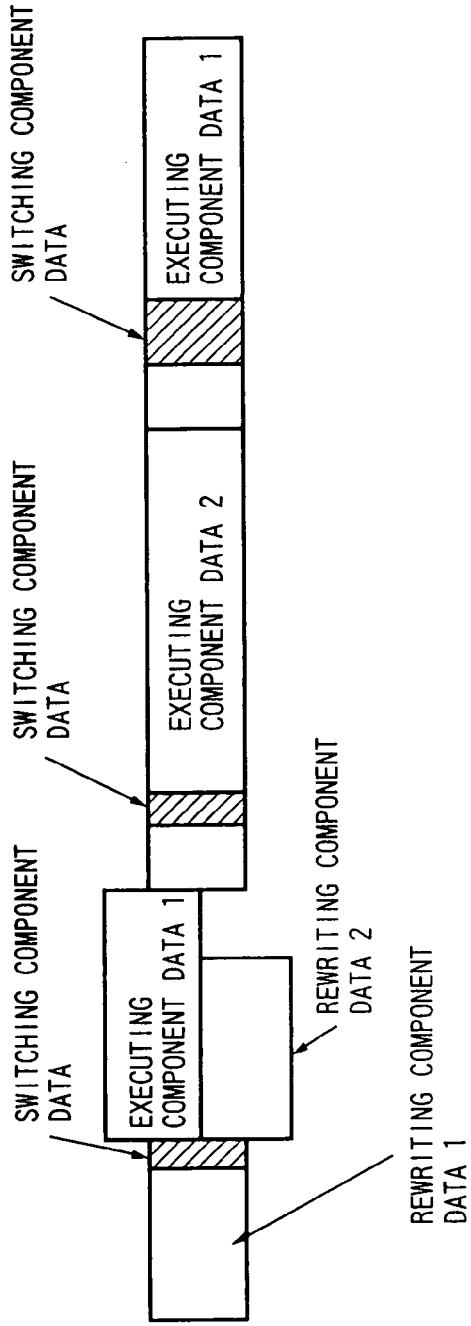

Due to this, while the arithmetic execution unit 93 is processing, it is possible to simultaneously rewrite content of another page. Therefore, the past problem of the large time overhead required for rewriting component data as shown in FIG. 25A can be solved by concealing the time overhead required for rewriting component data behind the time of execution of operation as shown in FIG. 25B.

Figure 26:
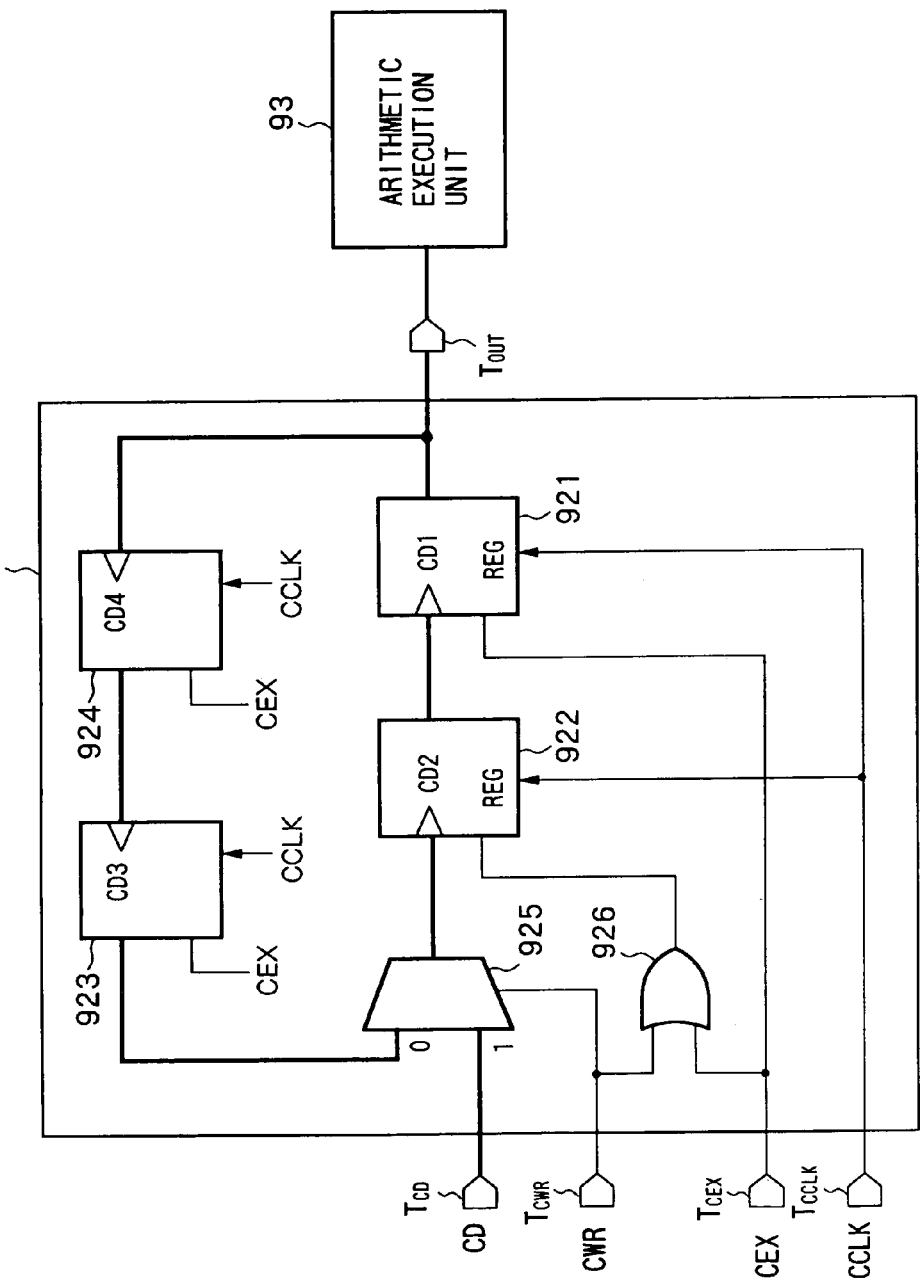
FIG. 26 is a view of an example of the specific configuration of the component data storage unit according to the present invention.

FIG. 26 is a view of an example of the configuration of a component data storage unit able to hold four component data.

The component data storage unit 92, as shown in FIG. 26, has the registers 921 to 924, selection device 925, and OR gate 926.

Further, in FIG. 26, TCD indicates the input terminal of the component data CD, TCWR indicates the 3input terminal of the write signal CWR, TCEX indicates the input terminal of the shift signal CEX, TCCLK indicates a clock input terminal, and TOUT indicates an output terminal to the arithmetic execution unit 93 of the stored component data.

The registers 921 to 924 (CD1 to CD4) are registers for storing component data. These registers 921 to 924 are connected in a ring.

Specifically, the output of the register 921 is connected to the input of the register 924 and the output terminal TOUT of the component data, the output of the register 924 is connected to the input of the register 923, the output of the register 923 is connected to the input of the register 922 through the first input terminal "0" of the selection device 925, and the output of the register 922 is connected to the input of the register 921.

Further, the second input terminal "1" of the selection device 925 is connected to the input terminal TCD of the component data CD. The control terminal of the selection device 925 is connected to the input terminal TCWR of the write signal CWR.

The selection device 925 selects the component data CD input to the input terminal TCD when the write signal CWR is supplied at the logic "1" to the control terminal and inputs it to the register 922.

On the other hand, the selection device 925 selects the output data of the register 923 when the write signal CWR is supplied at the logic "0" to the control terminal and inputs it to the register 922.

The two-input OR gate 926 is connected at the first input terminal to the input terminal TCWR of the write signal CWR, is connected at the second input terminal to the input terminal TCEX of the shift signal CEX, and is connected at the output terminal of the control terminal to the register 922.

Further, the control terminals of the registers 921, 923, 924 are connected to the input terminal TCEX of the shift signal CEX. Further, the clock terminals of the registers 921 to 924 are connected to the clock input terminal TCCLK.

Further, these registers 921 to 924 store the number of bits of the component data which the reconfigured parts to be connected in the future will require.

Among these, the content of the register 921 (CD1) is used as the component data of the arithmetic execution unit 93.

The output of the register 921 is directly connected to the reconfiguration circuit of the arithmetic execution unit 93, if its value is rewritten, this is immediately reflected in the hardware configuration of the processing execution unit 93.

Therefore, if writing into the register 921 from the outside during operation of the arithmetic execution unit 93, there is an effect on the operation results during execution.

To avoid this, component data CD from the outside is written into the register 922 (CD2).

The component data CD is rewritten by inputting the component data CD into the input terminal TCD and making the write signal CWR "1".

In this write operation, the content of the register 921 (CD1) is not changed.

To reflect the newly written component data CD into the configuration of the arithmetic execution unit 93, the write signal CWR is made 0, the shift signal CEX is made 1, and the content of the register 922 (CD2) is transferred to the register 921 (CD1).

At this time, simultaneously, the component data is held by rotation in a ring in the manner of register 921 (CD1) →register 924 (CD4)→register 923 (CD3)→register 922 (CD2).

Since the component data CD is switched simultaneously in all component data storage units 92, this is completed in 1 cycle of the clock "CCLK".

Further, if just performing the above switching operation without writing new component data, it is possible switch at a high speed and reuse an amount of past component data corresponding the number of registers making up the ring.

Note that, when preparing a storage unit able to store a plurality of component data, there is sometimes a desire to enable free switching of any component data without regard as to order.

However, the means for controlling switching of the component data of the storage unit becomes complicated. If the amount of the component data of the system as a whole increases, the area occupied and power consumed by the storage unit, that is, the overhead, can no longer be ignored.

The means for switching the component data in a ring according to the 16th embodiment cannot immediately call up any stored component data CD, but has the feature of simplification of the circuit configuration of the storage unit and control signals for switching.

The restriction of the limited freedom of switching of the stored component data CD does not pose a problem when considering the case of executing the plurality of processing included in one signal processing application while switching configurations and when the reconfiguration is repeated by a set pattern in accordance with the application algorithms.

The arithmetic execution unit 93 has a similar configuration to the arithmetic device etc. such as shown in FIG. 1. It has selection devices (SEL) 931-0 to 931-2 for selecting coefficients, data, and other paths based on the component data of the component data storage unit 92, an ALU 932 for performing arithmetic and logic operations based on the component data of the component data storage unit 92 (control signals for instructing content of operations), and a MAC structure computing unit 933 for performing multiplication and addition operation based on the component data of the component data storage unit 92 (control signals instructing content of operations), reconfigures the array of computing units, coefficient parameters at the time of execution of operations, etc. and performs the designated operation based on the component data of the component data storage unit 92, and outputs the operation results to for example a not shown data memory etc.

Next, the operation according to the above configuration will be explained.

Note that, here, it is assumed that each of the four registers 921 to 924 of the component data storage unit 92 holds the component data CD.

In this case, as the component data of the arithmetic execution unit 93, the content of the register 921 (CD1) of the component data storage unit 92 is used.

The output of the register 921 is directly connected to a reconfiguration circuit of the arithmetic execution unit 93. Therefore, the arithmetic execution unit 93 reconfigures the array of computing units, coefficient parameters at the time of execution of operations, etc. and performs the designated operation based on the component data of the component data storage unit 92. Further, the operation results are output to for example a not shown data memory.

Here, when rewriting the value of the component data CD supplied to the arithmetic execution unit 93, if trying to write into the register 921 during operation of the arithmetic execution unit 93, there is an effect on the operation results during execution.

To avoid this, the component data CD from the outside is written in the write register 922 (CD2).

The component data CD is rewritten by inputting the component data CD from the CPU 91 to the input terminal TCD and setting the write signal CWR to "1". Due to this, the register 922 is written with the component data CD supplied from the CPU 91.

Note that, the content of the register 921 (CD1) is not changed by this write operation.

Next, to reflect the newly written component data CD in the configuration of the arithmetic execution unit 93, the CPU 91 sets the write signal CWR to "0" and the shift signal CEX to "1". Due to this, the content of the register 922 (CD2) is transferred to the register 921 (CD1).

At the same time, simultaneously, the component data is held rotated in the ring in the manner of register 921 (CD1)→register 924 (CD4)→register 923 (CD3)→register 922 (CD2).

The component data CD is switched simultaneously in all component data storage units 92, so this is completed in one clock CCLK cycle.

As explained above, according to the 16th embodiment, since there is provided an arithmetic system 90 having an arithmetic device able to reconfigure the array of computing units or the rest of the hardware configuration, wherein the component data storage unit 92 holding the component data is comprised of a plurality of registers 921 to 924 connected in a ring, a component data rewrite unit and reconfigurable arithmetic execution unit 93 are connected so as to enable rewriting of other content of the component storage unit while performing operation using one component data in it, and the component data stored in the registers 921 to 924 can be switched by rotation in the ring, the following effects are obtained.

That is, there are the advantages that even when the computing unit is executing operation, it is made possible to set the component data to be used next and it becomes possible to reutilize the component data used in the past by changing the configuration rather than writing new component data.

That is, if enabling reconfiguration of the hardware simultaneous with execution of operations, this overhead can be concealed behind the time of execution of operations.

Further, due to the property of enabling a plurality of component data to be simultaneously held and enabling the data to be switched instantaneously, there are the advantages that it is possible to simultaneously store repeatedly used component data and switch the same for use so as to reduce the overhead for reconfiguration to substantially zero.

Note that, in the 16th embodiment, a configuration able to hold four component data is shown, but if necessary it is also possible to hold any number of component data.

As explained above, according to the present invention, the arithmetic device itself can be reconfigured from the outside. Therefore, there is the advantage that it is possible to realize an arithmetic device able to optimize the logic level of course and also prevent an increase in the component data and prevent deterioration of the area efficiency as an integrated circuit.

Further, since an arithmetic device can be reconfigured, it becomes possible to realize not only cascade processing, but also parallel processing by the same hardware. Therefore, it is possible to increase the number of arithmetic devices and perform more parallel processable processing efficiently.

Further, when performing a plurality of operations, by allocating the arithmetic devices processing and connecting the operation results of the previous stages in cascade, it is possible to obtain operation results at one time. Therefore, the number of cycles of execution becomes shorter. Further, there is the advantage that since there are fewer temporary accesses to registers, the consumption of power can also be held down.

Further, according to the present invention, when performing butterfly operation or other multiple-input, multiple-output operation, it is possible to simultaneously process $y0=x0+x1$, $y1=x0-x1$, etc.

Therefore, as the input data, it is sufficient to read x0 and x1 one time each. Therefore, there is the advantage that the efficiency of access to a memory/register rises.

Further, unlike with dedicated hardware, there is the advantage that it is possible to easily realize a configuration enabling flexible calculation of not only y0=x0+x1 and y1=x0−x1, but also y0=x0+x+x2+x3 etc.

Further, since the arithmetic device itself can be reconfigured from the outside, there is the advantage that it is possible to realize an arithmetic device which can optimize the logic level of course and also prevent an increase in the component data and prevent a fall in the area efficiency as an integrated circuit.

Further, according to the present invention, by combining a first arithmetic device including a MAC, ALU, or other arithmetic means performing monadic or multiple-term operation and a second arithmetic device including multiple-input, multiple-output computing units, when performing operation and writing in the memory after reading from the memory, the degree of freedom of processing in a processing block is increased and efficient processing becomes possible. Therefore, the number of cycles of execution becomes smaller and the temporary reading and writing of data are reduced, so the power is reduced.

Further, in the case of the operation of MEMW0 and the operation of MEMW1 where x[k0], x[k1] are used in common, a conventional processor could not simultaneously perform the processing of x[k0]+x[k1], x[k0]−x[k1] and therefore the number of cycles required for processing increased, but with the present invention, the number of cycles required for simultaneously performing this processing can be reduced.

Further, according to the present invention, an arithmetic device itself can be reconfigured from the outside. Therefore, there is the advantage that it is possible to realize an arithmetic device able to optimize the logic level of course and also prevent an increase in the component data and prevent deterioration of the area efficiency as an integrated circuit.

Further, since the arithmetic device can be reconfigured, it is possible to realize not only cascade processing, but also parallel processing by the same hardware. Therefore, it is possible to increase the number of arithmetic devices and execute more parallel processable processing efficiently. Further, according to the present invention, it is possible to use the control signal output by the address generation device itself to select a plurality of component memories, so there is the advantage that it is no longer necessary to provide a synchronization mechanism.

Further, since control does not return to the control circuit once, the overhead for the processing becomes smaller and it is possible to improve the processing capability of the system as a whole. Further, according to the present invention, when performing operation for which a DSP etc. could not generate addresses, such as complicated loop nesting, FFT access patterns, and bit reverse, it is possible to automatically generate addresses.

Therefore, there are the advantages that it is no longer possible to use an ALU to calculate addresses, the number of cycles required for processing can be reduced, and the addresses can be generated efficiently.

Further, according to the present invention, even in a state where a dual port memory (2R2W memory) is necessary, in the case of a specific access pattern, it is possible realize a similar function using a single port memory (1R1W memory).

Due to this, there are the advantages that a reduction of the memory area and an improvement in the process portability become possible and continuous memory access can be realized.

Further, according to the present invention, the hardware can be reconfigured simultaneous with execution of operations. This ovehead can be concealed at the read of the processing execution time.

Further, due to its property of enabling a plurality of component data to be held simultaneously and enabling these to be switched instantaneously, by simultaneously storing repeatedly used component data and switching them for use, it is possible to reduce the overhead for reconfiguration to substantially zero.

While the invention has been described with reference to specific embodiment chosen for purpose of illustration, it should be apparent that numerous modifications could be made thereto by those skilled in the art without departing from the basic concept and scope of the invention.

What is claimed is:

1. An arithmetic device that reconfigures an operation path by outside control, comprising:
   first selecting means for selecting desired data from a plurality of input data in accordance with a control signal;
   second selecting means for selecting desired data from a plurality of input data in accordance with a control signal;
   arithmetic means receiving as input the output signal of the first selecting means and the output signal of the second selecting means and performing operations in accordance with instructions of a control signal; and
   delay means for outputting the input data delayed by an amount of delay according to a value of a control signal.

2. An arithmetic device as set forth in claim 1, wherein the arithmetic means performs dyadic operation.

3. An arithmetic device as set forth in claim 2, wherein the arithmetic means performs monadic operation on the result of the dyadic operation.

4. An arithmetic device that reconfigures an operation path by outside control, comprising:
   first selecting means for selecting desired data from a plurality of input data in accordance with a control signal;
   second selecting means for selecting desired data from a plurality of input data in accordance with a control signal;
   third selecting means for selecting desired data from a plurality of input data in accordance with a control signal;
   arithmetic means receiving as input the output signal of the first selecting means, the output signal of the second selecting means, and the output signal of the third selecting means and performing operation in accordance with instructions of a control signal; and
   delay means for outputting the input data delayed by an amount of delay according to a value of a control signal.

5. An arithmetic device as set forth in claim 4, wherein the arithmetic means performs trinomial operation.

6. An arithmetic device as set forth in claim 5, wherein the arithmetic means performs monadic operation on the result of the trinomial operation.

7. An arithmetic device that reconfigures an operation path by outside control, comprising:
   first selecting means for selecting desired data from a plurality of input data in accordance with a control signal;

second selecting means for selecting desired data from a plurality of input data in accordance with a control signal;

third selecting means for selecting desired data from a plurality of input data in accordance with a control signal;

first arithmetic means receiving as input the output signal of the first selecting means and the output signal of the second selecting means and performing operation in accordance with instructions of a control signal;

second arithmetic means receiving as input the output signal of the first selecting means and the output signal of the second selecting means and third selecting means and performing operation in accordance with instructions of a control signal; and delay means for outputting the input data delayed by an amount of delay according to a value of a control signal.

8. An arithmetic device as set forth in claim 7, further comprising a fourth selecting means for selecting one of the output signal of the first arithmetic means and the output signal of the second arithmetic means in accordance with a control signal.

9. An arithmetic device as set forth in claim 7, wherein the first arithmetic means performs dyadic operation, while the second arithmetic means performs trinomial operation.

10. An arithmetic device as set forth in claim 9, wherein the first arithmetic means performs monadic operation on the result of the dyadic operation, while the second arithmetic means performs monadic operation on the result of the trinomial operation.

11. An arithmetic device able to reconfigure operation path by outside control, comprising:
a first selecting means for selecting from a first data group in accordance with a control signal,
a second selecting means for selecting one from a second data group in accordance with a control signal,
a first arithmetic means for receiving as input the output signal of the first selecting means and the output signal of the second selecting means and performing operation in accordance with instructions of a control signal,
a second arithmetic means for receiving as input the output signal of the first selecting means and the output signal of the second selecting means and performing operation in accordance with instructions of a control signal,
a third selecting means for selecting one of the output signal of the first arithmetic means and the output signal of the second arithmetic means; and
delay means for outputting the input data delayed by an amount of delay according to a value of a control signal.

12. An arithmetic device able to reconfigure an operation path by outside control, comprising:
a first selecting means for selecting one data from a first data group in accordance with a control signal,
a second selecting means for selecting one data from a second data group in accordance with a control signal,
a third selecting means for selecting one data of a third data group in accordance with a control signal,
a first arithmetic means for receiving as input at least two signals among the output signal of the first selecting means, the output signal of the second selecting means, and the output signal of the third selecting means and performing operation in accordance with instructions of a control signal, a second arithmetic means for receiving as input at least two signals among the output signal of the first selecting means, the output signal of the second selecting means, and the output signal of the third selecting means and performing operation in accordance with instructions of a control signal,
a fourth selecting means for selecting one of the output signal of the first arithmetic means and the output signal of the second arithmetic means; and
delay means for outputting the input data delayed by an amount of delay according to a value of a control signal.

13. A parallel arithmetic device having a plurality of arithmetic devices, each comprising:
first selecting means for selecting desired data from a plurality of input data in accordance with a control signal;
second selecting means for selecting desired data from a plurality of input data in accordance with a control signal;
arithmetic means for receiving as an input the output signal of the first selecting means and the output signal of the second selecting means in accordance with a control signal;
configuration means for reconfiguring an operation path by outside control;
connection means for connecting the inputs and outputs of data of the plurality of arithmetic devices in cascade;
supply means for supplying the operation result signal of an arithmetic device as one of a plurality of data inputs of another device; and
delay means for delaying the input data by an amount of delay in accordance with a value of a control signal and outputting it to the arithmetic device of the next stage.

14. A parallel arithmetic device having a plurality of arithmetic devices, each comprising:
a first selecting means for selecting desired data from a plurality of input data in accordance with a control signal;
a second selecting means for selecting desired data from a plurality of input data in accordance with a control signal;
a third selecting means for selecting desired data from a plurality of input data in accordance with a control signal;
an arithmetic means for receiving as input the output signal of the first selecting means, the output signal of the second selecting means, and the output signal of the third selecting means, and performing an operation in accordance with instructions of a control signal;
configuration means for reconfiguring an operation path under outside control;
connection means for connecting in cascade the inputs and outputs of data of the plurality of arithmetic devices;
supply means for supplying the operation result signal of an arithmetic device as one data of the plurality of data inputs of another device; and
a delay means for delaying the input data by an amount of delay in accordance with a vlaue of a control signal and outputting it to the arithmetic device of the next stage.

15. A parallel arithmetic device having a plurality of arithmetic devices, each comprising:
a first selecting means for selecting desired data from a plurality of input-data in accordance with a control signal;

a second selecting means for selecting desired data from a plurality of input data in accordance with a control signal;
a third selecting means for selecting desired data from a plurality of input data in accordance with a control signal;
a first arithmetic means for receiving as input the output signal of the first selecting means and the output signal of the second selecting means and performing operation in accordance with instructions of a control signal;
a second arithmetic means for receiving as an input the output signal of the first selecting means, the output signal of the second selecting means, and the output signal of the third selecting means and performing operation in accordance with instructions of a control signal;
a fourth selecting means for selecting one of the output of the first arithmetic means and the output of the second arithmetic means in accordance with a control signal and outputting the same as an operation result signal;
configuration means for reconfiguring an operation path under outside control;
connection means for connecting in cascade the inputs and outputs of data of the plurality of arithmetic devices, and
supply means for supplying the operation result signal of one of the plurality of arithmetic devices as one of the plurality of data inputs of another device; and
a delay means for delaying the input data by an amount of delay in accordance with a value of a control signal and outputting it to the arithmetic device of the next stage.

16. A parallel arithmetic device having a plurality of arithmetic devices, each comprising:
a first selecting means for selecting one data from a first data group in accordance with a control signal;
a second selecting means for selecting one data from a second data group in accordance with a control signal;
a first arithmetic means receiving as an input the output signal of the first selecting means and the output signal of the second selecting means and perfonning operation in accordance with instructions of a control signal;
a second arithmetic means receiving as an input the output signal of the first selecting means and the output signal of the second selecting means and performing operation in accordance with instructions of a control signal;
a third selecting means for selecting an output of the first arithmetic means and an output of the second arithmetic means in accordance with a control signal and outputting the same as an operation result signal;
configuration means for reconfiguring an operation path under outside control;
connection means for connecting in cascade the inputs and outputs of data of the first data group of the plurality of arithmetic devices;
supply means for supplying the operation result signal of an arithmetic device as data of a second data group of another device; and
a delay means for delaying the first data group by an amount of delay in accordance with a value of a control signal and outputting it to the arithmetic device of the next stage.

17. A parallel arithmetic device having a plurality of arithmetic devices, each comprising:
a first selecting means for selecting one data from a first data group in accordance with a control signal;
a second selecting means for selecting one data from a second data group in accordance with a control signal;
a third selecting means for selecting one from a third data group in accordance with a control signal;
a first arithmetic means receiving as input at least two signals of the output signal of the first selecting means, the output signal of the second selecting means, and the output signal of the third selecting means and performing operation in accordance with instructions of a control signal;
a second arithmetic means receiving as input at least two signals of the output signal of the first selecting means, the output signal of the second selecting means, and the output signal of the third selecting means and performing operation in accordance with instructions of a control signal;
a fourth selecting means for selecting one of the output of the first arithmetic means and the output of the second arithmetic means in accordance with a control signal;
configuration means for reconfiguring an operation path under outside control;
connection means for connecting in cascade the inputs and outputs of data of the first data group and the second data group of the plurality of arithmetic devices;
supply means for supplying the operation result signal of an arithmetic device as one data of a third data group of another device;
a first delay means for outputting the first data group to the arithmetic device of the next stage delayed by an amount of delay in accordance with a value of a control signal; and
a second delay means for outputting the second data group to the arithmetic device of the next stage delayed by exactly an amount of delay in accordance with a value of a control signal.

18. An arithmetic device reconfigurable by outside control, comprising:
at least one computing unit having a plurality of inputs and a plurality of outputs, performing a plurality of operations based on data supplied to the plurality of inputs in accordance with a control signal and outputting the operation results;
a plurality of input selection devices for selecting one data from the plurality of input data in accordance with a control signal and supplying the same to different inputs of the computing unit; and
a delay unit that delays and outputs the plurality of outputs of the at least one computing unit based on a value of a control signal.

19. An arithmetic device as set forth in claim 18, further comprising at least one monadic arithmetic means for performing monadic operation on predetermined data in the plurality of input data and supplying the operation results to one input of the input selection device.

20. An arithmetic device reconfigurable by outside control, comprising:
at least one multiple input, multiple output computing unit each having a plurality of inputs and a plurality of outputs, performing a plurality of operations based on data supplied to the plurality of inputs in accordance with a control signal, and outputting the operation results from the plurality of outputs;
a plurality of output selection devices for selecting and outputting one data from the plurality of input data and the output data of the computing unit in accordance with a control signal; and
a delay unit that delays and outputs the plurality of outputs of the at least one multiple input, multiple output computing unit based on a value of a control signal.

21. An arithmetic device as set forth in claim 20, further comprising at least one monadic arithmetic means for performing monadic operation on predetermined data in the plurality of input data and supplying the operation results to the output selection device.

22. An arithmetic device reconfigurable by outside control, comprising:
   at least one computing unit having a plurality of inputs and a plurality of outputs, performing a plurality of operations based an data supplied to the plurality of inputs in accordance with a control signal, and outputting the operation results from the plurality of outputs,
   a plurality of input selection devices each selecting one data from a plurality of input data in accordance with a control signal and supplying it to different inputs of the computing unit,
   a plurality of output selection devices each selecting and outputting one data from the plurality of input data and the output data of the computing unit in accordance with a control signal; and
   a delay unit that delays and outputs the plurality of outputs of the at least one computing unit based on a value of a control signal.

23. An arithmetic device as set forth in claim 22, further comprising at least one monadic arithmetic means for performing monadic operation on predetermined data among the plurality of input data and supplying operation results to one input of the input selection devices and the output selection device.

24. An arithmetic device reconfigurable by outside control, comprising:
   a plurality of first computing units each having a plurality of inputs and a plurality of outputs, performing a plurality of operations based on data supplied to the plurality of inputs in accordance with a control signal, and outputting the operation results from the plurality of outputs,
   a plurality of input selection devices each selecting one data from a plurality of input data in accordance with a control signal and supplying the same to different inputs of the first computing units,
   at least one second computing unit having a plurality of inputs and a plurality of outputs, supplied at the plurality of inputs with output data of the plurality of first computing units, performing a plurality of operations based on the plurality of data supplied in accordance with a control signal, and outputting the operation results from the plurality of outputs,
   a delay unit that sets a delay between the first and second computing units based on a value of a control signal.

25. An arithmetic device as set forth in claim 24, further comprising at least one monadic arithmetic means for performing monadic operation on predetermined data in the plurality of input data and supplying the operation results to one input of the input selection device.

26. An arithmetic device reconfigurable by outside control, comprising:
   a plurality of first computing units each having a plurality of inputs and a plurality of outputs, performing a plurality of operations based on data supplied to the plurality of inputs in accordance with a control signal, and outputting the operation results from the plurality of outputs,
   at least one second computing unit having a plurality of inputs and a plurality of outputs, supplied at the plurality of inputs with output data of the plurality of first computing units, performing a plurality of operations based on the plurality of data supplied in accordance with a control signal, and outputting the operation results from the plurality of outputs; and
   a plurality of output selection devices each selecting and outputting one data from the plurality of input data and the output data of at least one of the first and second computing units;
   a delay unit that sets a delay between the first and second computing units based on a value of a control signal.

27. An arithmetic device as set forth in claim 26, wherein the plurality of output selection devices include:
   a plurality of first output selection devices for selecting and outputting one data from a plurality of input data and output data of the first computing unit in accordance with a control signal and
   a plurality of second output selection devices selecting and outputting one data from a plurality of input data, the output data of the first computing unit, and the output data of the second computing unit in accordance with a control signal.

28. An arithmetic device as set forth in claim 27, further comprising at least one monadic arithmetic means for performing monadic operation on predetermined data in the plurality of input data and supplying the operation results to the first output selection device.

29. An arithmetic device as set forth in claim 26, further comprising at least one monadic arithmetic means for performing monadic operation on predetermined data in the plurality of input data and supplying the operation results to the output selection device.

30. An arithmetic device reconfigurable by outside control, compnsing:
   a plurality of first computing units each having a plurality of inputs and a plurality of outputs, performing a plurality of operations based on data supplied to the plurality of inputs in accordance with a control signal, and outputting the operation results from the plurality of outputs,
   a plurality of input selection devices for selecting one data from the plurality of input data in accordance with a control signal and supplying the same to different inputs of the first computing units,
   at least one second computing unit each having a plurality of inputs and a plurality of outputs, supplied at the plurality of inputs with the output data of the plurality of first computing units, performing a plurality of operations based on the plurality of data supplied in accordance with a control signal, and outputting the operation results from the plurality of outputs; and
   a plurality of output selection devices each selecting and outputting one data from the plurality of input data and at least one output data among the first and second computing units in accordance with a control signal; and
   a delay unit that sets a delay between the first and second computing units based on a value of a control signal.

31. An arithmetic device as set forth in claim 30, further comprising at least one monadic arithmetic means for performing monadic operation on predetermined data in the plurality of input data and supplying the operation results to one input of the input selection device.

32. An arithmetic device as set forth in claim 30, further comprising at least one monadic arithmetic means for performing monadic operation on predetermined data in the plurality of input data and supplying the operation results to the output selection device.

33. An arithmetic device as set forth in claim 30, wherein the plurality of output selection devices include
a plurality of first output selection devices each selecting and outputting one data from a plurality of input data and the output data of the first computing unit in accordance with a control signal and
a plurality of second output selection devices each selecting and outputting one data from the plurality of input data, the output data of the first computing unit, and the output data of the second computing unit in accordance with a control signal.

34. An arithmetic device as set forth in claim 33, further comprising at least one monadic arithmetic means for performing monadic operation on predetermined data in the plurality of input data and supplying the operation results to the first output selection device.

35. An arithmetic device reconfigurable by outside control, comprising:
a plurality of first computing units each having a plurality of inputs and a plurality of outputs, performing a plurality of operations based on data supplied to the plurality of inputs in accordance with a control signal, and outputting the operation results from the plurality of outputs,
a plurality of first input selection devices each selecting one data from a plurality of input data in accordance with a control signal and supplying the same to different inputs of the first computing units,
at least one second computing unit each having a plurality of inputs and a plurality of outputs, performing a plurality of operations based on a plurality of data supplied to the plurality of inputs in accordance with a control signal, and outputting the operation results from the plurality of outputs; and
a plurality of second input selection devices each selecting one data from the plurality of input data and the output data of the second computing units in accordance with a control signal and supplying it to different inputs of the second computing unit; and
a delay unit that sets a delay between the first and second computing units based on a value of a control signal.

36. An arithmetic device reconfigurable by outside control, comprising:
a plurality of first computing units each having a plurality of inputs and a plurality of outputs, performing a plurality of operations based on data supplied to the plurality of inputs in accordance with a control signal, and outputting the operation results from the plurality of outputs,
a plurality of first input selection devices each selecting one data from a plurality of input data in accordance with a control signal and supplying it to different inputs of the first computing units,
at least one second computing unit having a plurality of inputs and a plurality of outputs,
performing a plurality of operations based on a plurality of data supplied to the plurality of inputs in accordance with a control signal, and outputting the operation results from the plurality of outputs,
a plurality of second input selection devices for selecting one data from the plurality of input data and the output data of the second computing unit in accordance with a control signal and supplying it to different inputs of the second computing unit;
a plurality of output selection devices each selecting and outputting one data from a plurality of input data and at least one output data of the second computing unit in accordance with a control signal; and
a delay unit that sets a delay between the first and second computing units based on a vlaue of a control signal.

37. An arithmetic device reconfigurable by outside control, comprising:
a plurality of computing units, arranged in multiple stages, each having a plurality of inputs and a plurality of outputs, performing a plurality of operations based on data supplied to the plurality of inputs in accordance with a control signal, and outputting the operation results from the plurality of outputs;
a plurality of input selection devices each selecting one data from a plurality of input data in accordance with a control signal and supplying it to different inputs of the plurality of computing units of the first stage; and
a delay unit that delays and outputs the plurality of outputs to a next stage based on a value of a control signal,
the computing units arranged in stages other than the computing units of the first stage each being supplied at the plurality of inputs with output data of the plurality of computing units of the previous stage, performing a plurality of operations based on the plurality of data supplied in accordance with a control signal, and outputting the operation results from the plurality of outputs.

38. An arithmetic device reconfigurable by outside control, comprising:
a plurality of computing units, arranged in multiple stages, each having a plurality of inputs and a plurality of outputs, performing a plurality of operations based on data supplied to the plurality of inputs in accordance with a control signal, and outputting the operation results from the plurality of outputs;
a plurality of output selection devices each selecting and outputting one data from a plurality of input data and at least one output data of the computing units of the each stage in accordance with a control signal; and
a delay unit that delays and outputs the plurality of outputs to a next stage based on a value of a control signal,
the computing units arranged in the stages other than the computing units of the first stage each being supplied at the plurality of inputs with output data of the plurality of computing units of the previous stage, performing a plurality of operations based on the plurality of data supplied in accordance with a control signal, and outputting the operation results from the plurality of outputs.

39. An arithmetic device as set forth in claim 38, wherein the plurality of output selection devices include
a plurality of first output selection devices each selecting and outputting one data from a plurality of input data and the output data of the computing unit of the first stage in accordance with a control signal and
a plurality of second output selection devices each selecting and outputting one data from the plurality of input data and the output data of the computing units of the different stages in accordance with a control signal.

40. An arithmetic device reconfigurable by outside control, comprising:
a plurality of computing units, arranged in multiple stages, each having a plurality of inputs and a plurality of outputs, performing a plurality of operations based on the data supplied to the plurality of inputs in accordance with a control signal, and outputting the operation results from the plurality of outputs, a plurality of input selection devices each selecting one data from a plurality of input data in accordance with a control signal and supplying it to different inputs of the plurality of computing units of the first stage;

a plurality of output selection devices each selecting and outputting one data from the plurality of input data and at least one output data among the computing units of stages in accordance with a control signal; and a delay unit that delays and outputs the plurality of outputs to a next stage based on a value of a control signal, the computing units arranged in the stages other than the computing units of the first stage each being supplied at the plurality of inputs with the output data of the plurality of computing units of the previous stage, performing a plurality of operations based on the plurality of data supplied in accordance with a control signal, and outputting the operation results from the plurality of outputs.

41. An arithmetic device as set forth in claim 40, wherein the plurality of output selection devices include a plurality of first output selection devices each selecting and outputting one data from a plurality of input data and the output data of the computing unit of the first stage in accordance with a control signal and a plurality of second output selection devices each selecting and outputting one data from the plurality of input data and the output data of the computing units of the different stages in accordance with a control signal.

42. A parallel arithmetic device comprising:

a first arithmetic device reconfigurable by outside control having at least two selecting means each selecting desired data from a plurality of input data in accordance with a control signal and at least one arithmetic device including at least one arithmetic means for receiving output signals of the selecting means and performing operation in accordance with instructions of a control signal;

a second arithmetic device reconfigurable by outside control including at least one computing unit having a plurality of inputs and a plurality of outputs, performing a plurality of operations based on data supplied to the plurality of inputs in accordance with a control signal, and outputting the operation results from the plurality of outputs; and delay means for setting any delay between the arithmetic devices according to a value of a control signal, the operation results of at least one of the first arithmetic device and second arithmetic device being supplied as input data of the other arithmetic device.

43. A parallel arithmetic device as set forth in claim 42, wherein the first arithmetic device includes:

a first selecting means for selecting desired data from a plurality of input data in accordance with a control signal, a second selecting means for selecting desired data from a plurality of input data in accordance with a control signal, a third selecting means for selecting desired data from a plurality of input data in accordance with a control signal, a first arithmetic means receiving as input the output signal of the first selecting means and the output signal of the second selecting means and performing operation in accordance with instructions of a control signal, and a second arithmetic means receiving as input the output signal of the first selecting means and the output signals of the second selecting means a third selecting means and performing operation in accordance with instructions of a control signal.

44. A parallel arithmetic device as set forth in claim 43, wherein the first arithmetic device further comprises a fourth selecting means for selecting one of the output signal of the first arithmetic means and the output signal of the second arithmetic means in accordance with a control signal.

45. A parallel arithmetic device as set forth in claim 42, wherein the first arithmetic device includes a plurality of arithmetic devices and connects the inputs and outputs of data of the plurality of arithmetic devices in cascade and supplies the operation result signal of an arithmetic device as one data of a plurality of data inputs of another device.

46. A parallel arithmetic device as set forth in claim 42, wherein the second arithmetic device comprises:

a plurality of input selection devices each selecting one data from a plurality of input data in accordance with a control signal and supplying it to different inputs of the computing unit and a plurality of output selection devices each selecting and outputting one data from the plurality of input data and the output data of the computing unit in accordance with a control signal.

47. A parallel arithmetic device as set forth in claim 42, wherein the second arithmetic device includes:

a plurality of first computing units each having a plurality of inputs and a plurality of outputs, performing a plurality of operations based on data supplied to the plurality of inputs in accordance with a control signal, and outputting the operation results from the plurality of outputs, a plurality of input selection devices each selecting one data from a plurality of Input data in accordance with a control signal and supplying it to different inputs of the find computing unit, and at least one second computing unit having a plurality of inputs and a plurality of outputs, supplied at the plurality of inputs with output data of the plurality of first computing units, performing a plurality of operations based on the supplied plurality of data in accordance with a control signal, and outputting the operation results from the plurality of outputs, a plurality of output selection devices each selecting and outputting one data from the plurality of input data and at least one output data of the first and second computing units in accordance with a control signal.

48. A parallel arithmetic device as set forth in claim 42, wherein the second arithmetic device includes:

a plurality of first computing units each having a plurality of inputs and a plurality of outputs, performing a plurality of operations based on data supplied to the plurality of inputs in accordance with a control signal, and outputting the operation results from the plurality of outputs, a plurality of first input selection devices each selecting one data from a plurality of input data in accordance with a control signal and supplying it to different inputs of the first computing unit, and at least one second computing unit having a plurality of inputs and a plurality of outputs, performing a plurality of operations based on the plurality of data supplied to the plurality of inputs in accordance with a control signal, and outputting the operation results from the plurality of outputs, a plurality of second input selection devices each selecting one data from the plurality of input data and the output data of the second computing units and supplying it to different inputs of the second computing units, and a plurality of output selection devices each selecting and outputting one data from the plurality of input data and at least one output data of the second computing units in accordance with a control signal.

49. A parallel arithmetic device as set forth in claim 42, wherein the second arithmetic device includes:

a plurality of computing units, arranged in multiple stages, each having a plurality of inputs and a plurality of outputs, performing a plurality of operations based on the data supplied to the plurality of inputs in accordance with a control signal, and outputting the operation results from the plurality of outputs, a plurality of input selection devices each selecting one data from a plurality of input data in accordance with a control signal and supplying it to different inputs of the plurality of computing units of the first stage, and a plurality of output selection devices each selecting and outputting one data from the plurality of input data and at least one output data among the computing units of stages in accordance with a control signal, the computing units arranged in the stages other than the computing units of the first stage each being supplied at the plurality of inputs with the out put data of the plurality of computing units of the previous stage, performing a plurality of operations based on the plurality of data supplied in accordance with a control signal, and outputting the operation results from the plurality of outputs.

50. A parallel arithmetic device comprising:

a plurality of first arithmetic devices reconfigurable by outside control each having at least two selecting means each selecting desired data from plurality of input data in accordance with a control signal and at least one arithmetic device including at least one arithmetic means for receiving output signals of the selecting means and performing operation in accordance with instructions of a control signal;

a plurality of second arithmetic devices reconfigurable by outside control each including at least one computing unit each having a plurality of inputs and a plurality of outputs, performing a plurality of operations based on data supplied to the plurality of inputs in accordance with a control signal, and outputting the operation results from the plurality of, outputs, the operation results of the plurality of first arithmetic devices being supplied to the corresponding second arithmetic devices and the operation results of the second arithmetic devices being supplied to the corresponding first arithmetic devices; and a delay means for setting any delay between arithmetic devices according to a value of a control signal.

51. A parallel arithmetic device as set forth in claim 50, wherein the first arithmetic device includes:

a first selecting means for selecting desired data from a plurality of input data in accordance with a control signal, a second selecting means for selecting desired data from a plurality of input data in accordance with a control signal, a third selecting means for selecting desired data from a plurality of input data in accordance with a control signal, a first arithmetic means for receiving as input the output signal of the first selecting means and the output signal of the second selecting means and performing operation in accordance with instructions of a control signal, and a second arithmetic means for receiving as input the output signal of the first selecting means and the output signals of the second selecting means and third selecting means and performing operation in accordance with instructions of a control signal.

52. A parallel arithmetic device as set forth in claim 51, wherein the first arithmetic device further comprises a fourth selecting means for selecting one of the first arithmetic means and the output signal of the second arithmetic means in accordance with a control signal.

53. A parallel arithmetic device as set forth in claim 50, wherein the first arithmetic device includes a plurality of arithmetic devices, connects in cascade the inputs and outputs of data of the plurality of arithmetic devices, and supplies the operation result signal of each arithmetic device as one data of the plurality of data inputs of another device.

54. A parallel arithmetic device as set forth in claim 50, wherein the second arithmetic device comprises:

a plurality of input selection devices each selecting one data from a plurality of input data in accordance with a control signal and supplying it to different inputs of the computing unit and a plurality of output selection devices a selecting and outputting one data from the plurality of input data and the output data of the computing unit of accordance with a control signal.

55. A parallel arithmetic device as set forth in claim 50, wherein the second arithmetic device includes:

a plurality of first computing units each having a plurality of inputs and a plurality of outputs, performing a plurality of operations based on data supplied to the plurality of inputs in accordance with a control signal, and outputting the operation results from the plurality of outputs, a plurality of input selection devices each selecting one data from a plurality of input data in accordance with a control signal and supplying it to different inputs of the first computing units, at least one second computing unit each having a plurality of inputs and a plurality of outputs, supplied at the plurality of inputs with output data of the plurality of first computing units, performing a plurality of operations based on the plurality of data supplied in accordance with a control signal, and outputting the operation results from the plurality of outputs, and a plurality of output selection devices each selecting and outputting one data from a plurality of input data and at least one output data of the first and second computing units in accordance with a control signal.

56. A parallel arithmetic device as set forth in claim 50, wherein the second arithmetic device includes a plurality of first computing units each in having a plurality of inputs and a plurality of outputs, performing a plurality of operations based on data supplied to the plurality of inputs in accordance with a control signal, and outputting the operation results from the plurality of outputs, a plurality of first input selection devices each selecting one data from a plurality of input data in accordance with a control signal and supplying it to different inputs of the first computing units, at least one second computing unit each having a plurality of inputs and a plurality of outputs, performing a plurality of operations based on the plurality of data supplied to the plurality of inputs in accordance with a control signal, and outputting the operation results from the plurality of outputs, a plurality of second input selection devices each selecting one data from the plurality of input data and output data of the second computing unit in accordance with a control signal, and a plurality of output selection devices each selecting and outputting one data from a plurality of input data and at least one output data of the second computing unit in accordance with a control signal.

57. A parallel arithmetic device as set forth in claim 50, wherein the second arithmetic device includes:

a plurality of computing units, arranged in, multiple stages, each having a plurality of inputs and a plurality of outputs, performing a plurality of operations based on data supplied to the plurality of, inputs in accordance with a control signal and outputting the operation results from the plurality of outputs, a plurality of input selection devices each selecting one data from a plurality of input data in accordance with a control signal and supplying it to different inputs of the computing units of the first stage, and a plurality of output selection devices each selecting and outputting one data from a plurality of input data and at least one output data of the computing units of the stages in accordance with a control signal, the computing units arranged in stages other than the computing units of the first stage each being supplied at the plurality of inputs with output data of the plurality of computing units of the previous stage performing a plurality of operations based on the plurality of data supplied in accordance with a control signal, and outputting the operation results from the plurality of outputs.

* * * * *

UNITED STATES PATENT AND TRADEMARK OFFICE
CERTIFICATE OF CORRECTION

PATENT NO. : 7,020,673 B2  Page 1 of 1
APPLICATION NO. : 10/050849
DATED : March 28, 2006
INVENTOR(S) : Kunihiko Ozawa It is certified that error appears in the above-identified patent and that said Letters Patent is hereby corrected as shown below:

Title Page #57
Abstract:
Line 16, "with instructions of" should read:
-- with instructions of the control signal MACMD etc., and a fourth selection device for selecting one of signal of the ALU and the output signal of the MAC in accordance with a control signal ESEL. --

Column 107:
Line 40, "perfonning" should read -- performing --.

Column 112:
Line 4, "vlaue" should read -- value --.

Signed and Sealed this

Twenty-sixth Day of June, 2007

JON W. DUDAS
*Director of the United States Patent and Trademark Office*